(12) United States Patent
Kwak et al.

(10) Patent No.: US 11,855,923 B2
(45) Date of Patent: Dec. 26, 2023

(54) METHOD AND APPARATUS FOR DIVERSITY-BASED DATA TRANSMISSION IN MOBILE COMMUNICATION SYSTEM

(71) Applicant: Samsung Electronics Co., Ltd., Gyeonggi-do (KR)

(72) Inventors: Youngwoo Kwak, Gyeonggi-do (KR); Hoondong Noh, Gyeonggi-do (KR); Cheolkyu Shin, Gyeonggi-do (KR); Taehan Bae, Seoul (KR); Seunghoon Choi, Gyeonggi-do (KR); Taehyoung Kim, Seoul (KR); Sungjin Park, Incheon (KR); Jeongho Yeo, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/510,987

(22) Filed: Oct. 26, 2021

(65) Prior Publication Data

US 2022/0123897 A1    Apr. 21, 2022

Related U.S. Application Data

(63) Continuation of application No. 16/500,214, filed as application No. PCT/KR2018/003907 on Apr. 3, 2018, now Pat. No. 11,343,043.

(30) Foreign Application Priority Data

Apr. 3, 2017 (KR) .......................... 10-2017-0043247
Jul. 24, 2017 (KR) .......................... 10-2017-0093806

(51) Int. Cl.
*H04B 7/0417*    (2017.01)
*H04W 72/23*    (2023.01)
(Continued)

(52) U.S. Cl.
CPC .......... *H04L 5/0051* (2013.01); *H04B 7/0417* (2013.01); *H04W 72/23* (2023.01); *H04B 7/0626* (2013.01)

(58) Field of Classification Search
CPC ... H04B 7/0626; H04B 7/0417; H04W 72/23; H04L 5/0051
See application file for complete search history.

(56) References Cited

U.S. PATENT DOCUMENTS 9,735,941 B2 *  8/2017  Xia ...................... H04L 5/0051
9,930,666 B2    3/2018  Wang et al.
(Continued)

FOREIGN PATENT DOCUMENTS

CN    102158302    8/2011
CN    102340382    2/2012
(Continued)

OTHER PUBLICATIONS

PCT/ISA/210 Search Report dated Jul. 27, 2018 issued on PCT/KR2018/003907, pp. 5.
(Continued)

*Primary Examiner* — James P Duffy
(74) *Attorney, Agent, or Firm* — The Farrell Law Firm, P.C.

(57) ABSTRACT

A method performed by a terminal in a communication system is provided. Information on a demodulation reference signal (DMRS) configuration type corresponding to a mapping pattern of a plurality of DMRS ports is received from a base station. Control information indicating at least one DMRS port among the plurality of DMRS ports is received from the base station. The at least one DMRS port associated with downlink data is identified based on the control information. Downlink data based on the identified DMRS port is received from the base station. The plurality (Continued)

of DMRS ports belong to two or three DMRS groups based on a DMRS configuration type. Resources corresponding to different DMRS groups are multiplexed based on an orthogonal code.

20 Claims, 53 Drawing Sheets

(51) Int. Cl.
  *H04L 5/00* (2006.01)
  *H04B 7/06* (2006.01)

(56) References Cited

U.S. PATENT DOCUMENTS

| | | | | |
|---|---|---|---|---|
| 11,343,043 | B2* | 5/2022 | Kwak | H04B 7/0417 |
| 2012/0207119 | A1 | 8/2012 | Zhang | |
| 2012/0287875 | A1* | 11/2012 | Kim | H04L 5/0053 |
| | | | | 370/329 |
| 2013/0287064 | A1 | 10/2013 | Seo | |
| 2015/0003352 | A1 | 1/2015 | Seo | |
| 2015/0288497 | A1 | 10/2015 | Li et al. | |
| 2016/0105817 | A1* | 4/2016 | Frenne | H04L 1/0026 |
| | | | | 370/252 |
| 2016/0227526 | A1 | 8/2016 | Park et al. | |
| 2017/0201360 | A1 | 7/2017 | Shin et al. | |
| 2018/0242285 | A1 | 8/2018 | Yoo et al. | |

FOREIGN PATENT DOCUMENTS

| | | |
|---|---|---|
| CN | 105706385 | 6/2016 |
| CN | 106470174 | 3/2017 |
| EP | 3 046 284 | 7/2016 |
| KR | 10-2014-0057005 | 5/2014 |
| KR | 10-2017-0019982 | 2/2017 |
| WO | WO 2016/127939 | 8/2016 |

OTHER PUBLICATIONS

PCT/ISA/237 Written Opinion dated Jul. 27, 2018 issued on PCT/KR2017/003907, pp. 5.
Guangdong OPPO Mobile Telecom, 3GPP TSG RAN WG1 Meeting #88bis, R1-1704610, Spokane, USA, Mar. 24, 2017, "CSI-RS design for NR", pp. 5.
Nokia, 3GPP TSG-RAN WG1 Meeting #88bis, R1-1705843, Spokane, WA, USA, Mar. 24, 2017, "CSI-RS for mobility purposes", pp. 8.
Samsung, 3GPP TSG RAN WG1 Meeting #88bis, R1-1705350, Spokane, USA, Mar. 24, 2017, "Discussions on CSI-RS design for NR MIMO", pp. 8.
Mitsubishi Electric, "DMRS Designs for NR MIMO", R1-1702751, 3GPP TSG RAN WG1 Meeting #88, Feb. 13-17, 2017, 12 pages.
Ericsson, ST-Ericsson, "Layer-to-antenna Port Mapping for LTE-Advanced", R1-100848, 3GPP TSG-RAN WG1 #60, Feb. 22-26, 2010, 6 pages.
CATR, "Views on Layer Mapping to DM-RS Ports and Downlink Signalling for Rank 3-8", R1-101026, 3GPP TSG RAN WG1 Meeting #60, Feb. 22-26, 2010, 4 pages.
Huawei, HiSilicon, "Design of DL DMRS for Data Transmission", R1-1704233, 3GPP TSG RAN WG1 Meeting #88bis, Apr. 3-7, 2017, 6 pages.
European Search Report dated Nov. 30, 2020 issued in counterpart application No. 18781460.3-1205, 10 pages.
Chinese Office Action dated Dec. 15, 2021 issued in counterpart application No. 201880029675.5, 21 pages.
Huawei, HiSilicon, "Details of QCL Assumptions and Related RS Design Considerations", R1-1704239, 3GPP TSG RAN WG1 Meeting #88bis, Apr. 3-7, 2017, 5 pages.
ZTE, "On Association Between DM-RS Ports and EPDCCH Transmission", R1-124204, 3GPP TSG RAN WG1 Meeting #70bis, Oct. 8-12, 2012, 5 pages.
NEC Group, "Downlink Control Signalling Support for SU/MU-MIMO", R1-094730, 3GPP TSG-RAN WG1 Meeting #59, Nov. 9-13, 2009, 7 pages.
Xiaolong Liu et al., "Performance Emulation and Test for 5G Massive MIMO Base Station", The National Science and Technology Major Project, Jun. 20, 2020, 12 pages.
Samsung, "On Aperiodic CSI-RS Design" R1-164773, 3GPP TSG RAN WG1 #85, May 23-27, 2016, 4 pages.
Samsung et al., "WF on Aperiodic CSI-RS for Rel.14", R1-168046, 3GPP TSG RAN WG1 Meeting #86, Aug. 22-26, 2016, 6 pages.
Intel Corporation, "Discussion on NR CSI Configuration", R1-1611984, 3GPP TSG-RAN WG1 #87, Nov. 14-18, 2016, 5 pages.
Chinese Office Action dated Sep. 28, 2022 issued in counterpart application No. 201880029675.5, 22 pages.
Korean Office Action dated Jul. 26, 2022 issued in counterpart application No. 10-2022-0077408, 10 pages.
LG Electronics, "Discussion on CSI Framework for NR", R1-1702455, 3GPP TSG RAN WG1 Meeting #88, Feb. 13-17, 2017, 6 pages.
Korean Office Action dated Feb. 12, 2023 issued in counterpart application No. 10-2022-0077408, 8 pages.
KR Decision of Rejection dated Aug. 28, 2023 Issued in counterpart application No. 10-2022-0077408, 7 pages.

* cited by examiner

REVERSE RE ALLOCATION

| 1 | 0 |   | 1 | 0 | 1 | 0 | 1 |   | 0 | 1 | 0 | 1 | 0 |
|---|---|---|---|---|---|---|---|---|---|---|---|---|---|
| 0 | 1 |   | 0 | 1 | 0 | 1 | 0 |   | 1 | 0 | 1 | 0 | 1 |
| 1 | 0 | 1 | 1 | 0 | 1 | 0 | 1 | 0 | 0 | 1 | 0 | 1 | 0 |
| 0 | 1 |   | 0 | 1 | 0 | 1 | 0 |   | 1 | 0 | 1 | 0 | 1 |
| 1 | 0 |   | 1 | 0 | 1 | 0 | 1 |   | 0 | 1 | 0 | 1 | 0 |
| 0 | 1 | 0 | 0 | 1 | 0 | 1 | 0 | 1 | 1 | 0 | 1 | 0 | 1 |
| 1 | 0 |   | 1 | 0 | 1 | 0 | 1 |   | 0 | 1 | 0 | 1 | 0 |
| 0 | 1 |   | 0 | 1 | 0 | 1 | 0 |   | 1 | 0 | 1 | 0 | 1 |
| 1 | 0 | 1 | 1 | 0 | 1 | 0 | 1 | 0 | 0 | 1 | 0 | 1 | 0 |
| 0 | 1 |   | 0 | 1 | 0 | 1 | 0 |   | 1 | 0 | 1 | 0 | 1 |
| 1 | 0 |   | 1 | 0 | 1 | 0 | 1 |   | 0 | 1 | 0 | 1 | 0 |
| 0 | 1 | 0 | 0 | 1 | 0 | 1 | 0 | 1 | 1 | 0 | 1 | 0 | 1 |

| CODEBOOK INDEX | NUMBER OF LAYERS $v = 3$ | | | |
|---|---|---|---|---|
| 0 - 3 | $\frac{1}{2}\begin{bmatrix} 1 & 0 & 0 \\ 1 & 0 & 0 \\ 0 & 1 & 0 \\ 0 & 0 & 1 \end{bmatrix}$ | $\frac{1}{2}\begin{bmatrix} 1 & 0 & 0 \\ -1 & 0 & 0 \\ 0 & 1 & 0 \\ 0 & 0 & 1 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ |

RB #0 (1400)  RB #2 (1420)

RB #1 (1410)

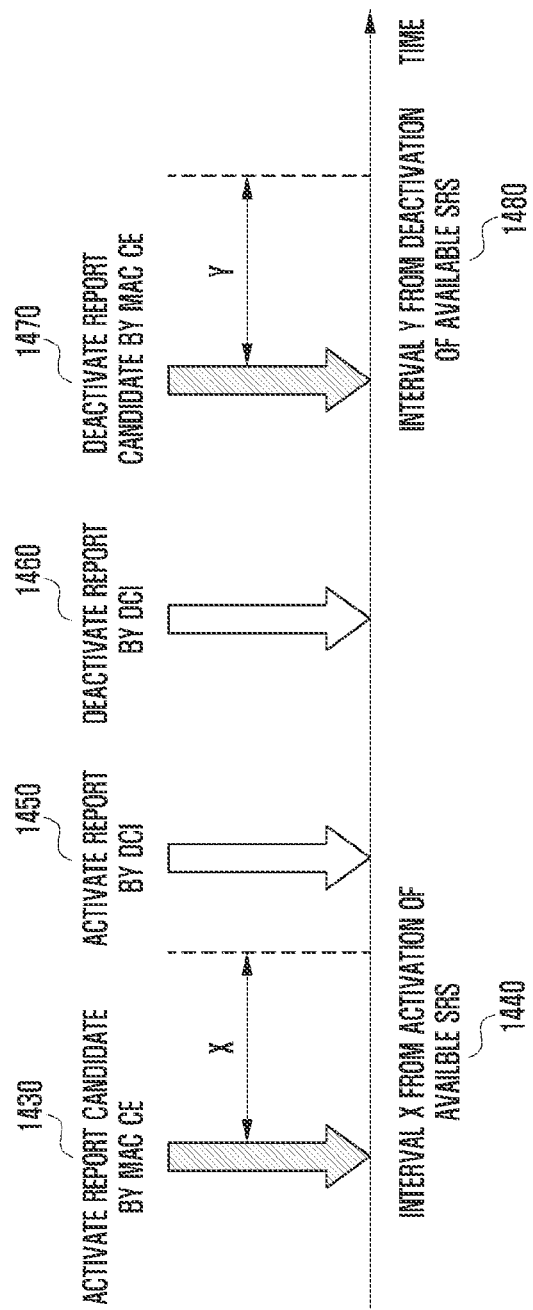

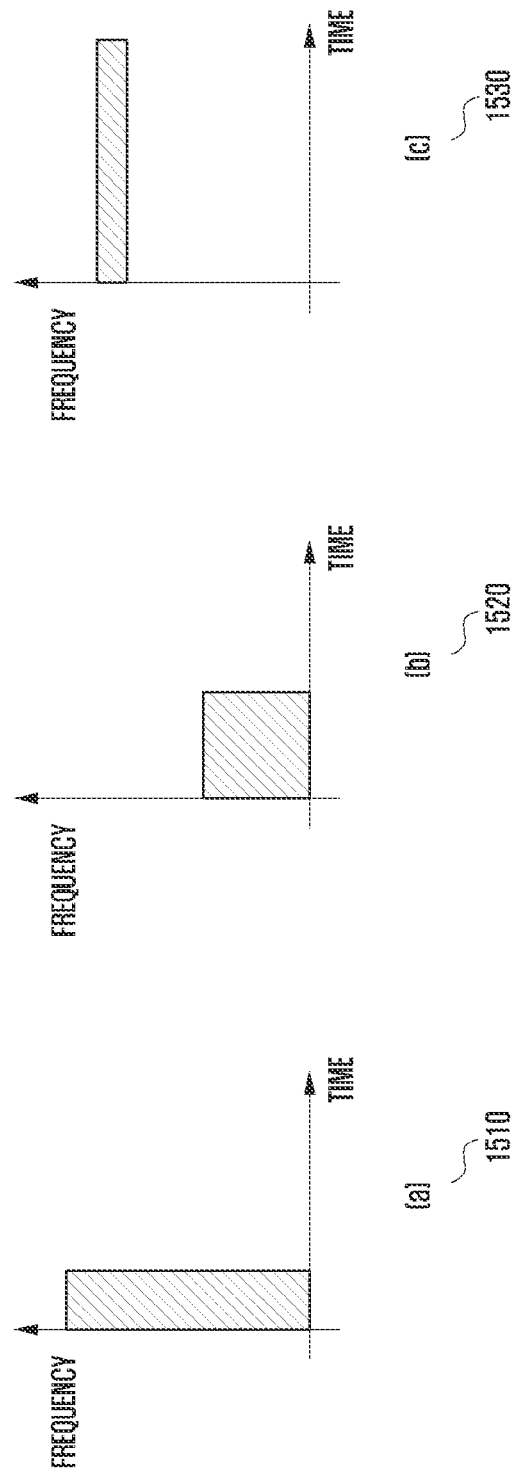

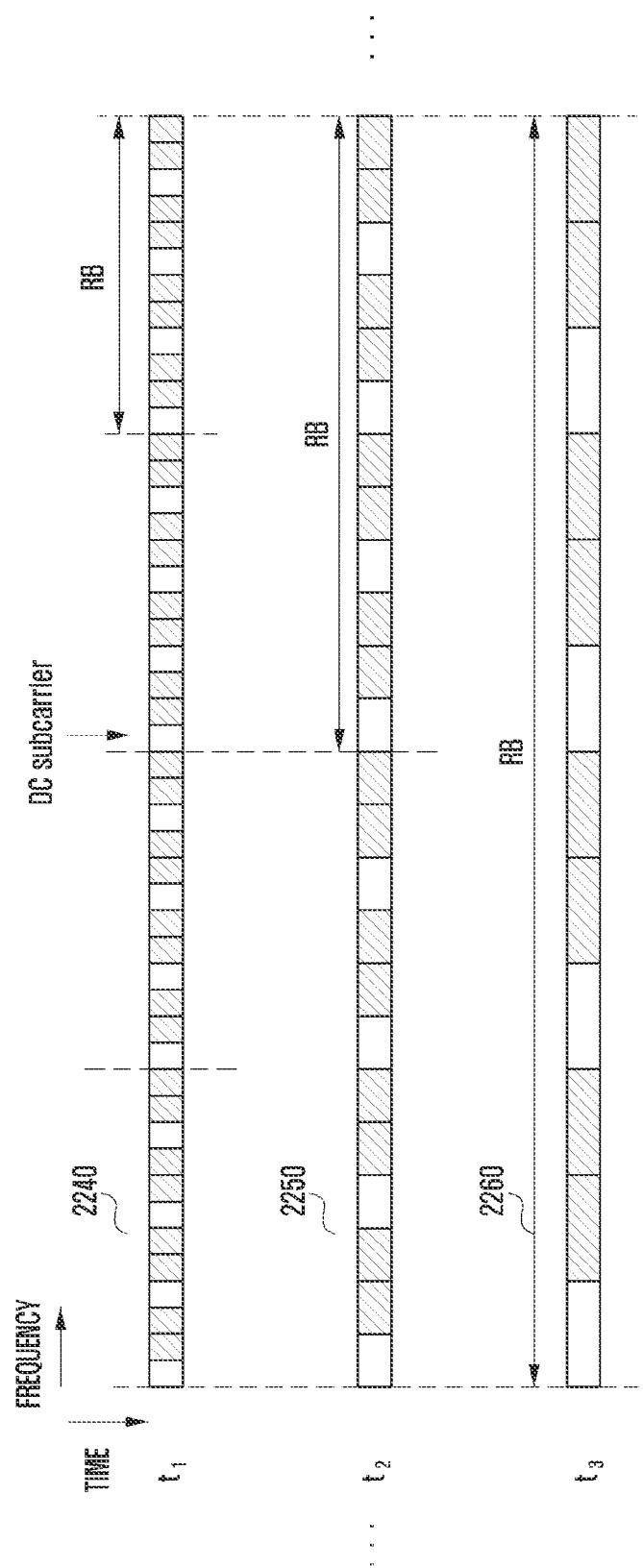

FIG. 30

| P1/P3 | D1~4 |
|---|---|
| P2/P4 | D1~4 |
| P1/P3 | D1~4 |
| P2/P4 | D1~4 |
| P1/P3 | D1~4 |
| P2/P4 | D1~4 |
| P1/P3 | D1~4 |
| P2/P4 | D1~4 |
| P1/P3 | D1~4 |
| P2/P4 | D1~4 |
| P1/P3 | D1~4 |
| P2/P4 | D1~4 |

3010

| P1/P2 | D1~6 |
|---|---|
| P1/P2 | D1~6 |
| P3/P4 | D1~6 |
| P3/P4 | D1~6 |
| P5/P6 | D1~6 |
| P5/P6 | D1~6 |
| P1/P2 | D1~6 |
| P1/P2 | D1~6 |
| P3/P4 | D1~6 |
| P3/P4 | D1~6 |
| P5/P6 | D1~6 |
| P5/P6 | D1~6 |

3020

METHOD AND APPARATUS FOR DIVERSITY-BASED DATA TRANSMISSION IN MOBILE COMMUNICATION SYSTEM

PRIORITY

This application is a Continuation Application of U.S. application Ser. No. 16/500,214, filed in the U.S. Patent and Trademark Office on Oct. 2, 2019, which is a National Phase Entry of PCT International Application No. PCT/KR2018/003907, which was filed on Apr. 3, 2018, and claims priority to Korean Patent Application Nos. 10-2017-0043247 and 10-2017-0093806, which were filed on Apr. 3, 2017 and Jul. 24, 2017, respectively, the content of each of which is incorporated herein by reference.

BACKGROUND

1. Field

The disclosure relates to a wireless communication system and more, particularly to, a method and an apparatus for transmitting a diversity-based signal, a method and an apparatus for configuring a demodulation reference signal (DMRS), and a method and an apparatus for configuring a reference signal to measure a channel state.

2. Description of Related Art

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system. In order to achieve a high data transmission rate, an implementation of the 5G communication system in a mmWave band (for example, 60 GHz band) is being considered. In the 5G communication system, technologies such as beamforming, massive MIMO, full dimensional MIMO (FD-MIMO), array antenna, analog beam-forming, and large scale antenna are being discussed as means to mitigate a propagation path loss in the mm Wave band and increase a propagation transmission distance. Further, the 5G communication system has developed technologies such as an evolved small cell, an advanced small cell, a cloud radio access network (RAN), an ultra-dense network, device to device communication (D2D), a wireless backhaul, a moving network, cooperative communication, coordinated multi-points (CoMP), and received interference cancellation to improve the system network. In addition, the 5G system has developed advanced coding modulation (ACM) schemes such as hybrid FSK and QAM modulation (FQAM) and sliding window superposition coding (SWSC), and advanced access technologies such as filter bank multi carrier (FBMC), non orthogonal multiple access (NOMA), and sparse code multiple access (SCMA).

Meanwhile, the Internet has been evolved to an Internet of things (IoT) network in which distributed components such as objects exchange and process information from a human-oriented connection network in which humans generate and consume information. An Internet of everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, machine-to-machine (M2M) communication, machine-type communication (MTC), and the like for connection between objects has recently been conducted. In an IoT environment, through collection and analysis of data generated in connected objects, an intelligent Internet technology (IT) service to create a new value for peoples' lives may be provided. The IoT may be applied to fields, such as a smart home, smart building, smart city, smart car, connected car, smart grid, health care, smart home appliance, or high-tech medical service, through the convergence of the conventional Information technology (IT) and various industries.

Accordingly, various attempts to apply the 5G communication system to the IoT network are made. For example, 5G communication technologies such as a sensor network, machine-to-machine (M2M) communication, and machine-type communication (MTC) are implemented using beamforming, MIMO, and array-antenna schemes. The application of a cloud RAN as the big data processing technology may be an example of convergence of the 5G technology and the IoT technology.

In a newly researched $5^{th}$ generation mobile communication system (or new radio (NR)), research on application of a diversity scheme to uplink transmission of the UE is conducted. Further, transmission of a reference signal is needed to demodulate a signal through channel estimation, and a demodulation reference signal (DMRS) which can be configured to support an increased channel bandwidth and various numerologies is under consideration in the NR system. In addition, in order to reduce overhead of a channel status information reference signal (CSI-RS), aperiodic CSI-RS transmission and a configuration method according thereto have been researched.

SUMMARY

The disclosure proposes a method of transmitting a signal through a diversity scheme and a method of indicating diversity transmission in uplink.

The disclosure proposes a method of generating a DMRS sequence reflecting various considerations of a 5G wireless communication system, a method of mapping a DMRS sequence, and a detailed parameter according thereto.

The disclosure proposes a method of transmitting and configuring an aperiodic CSI-RS and a method and an apparatus for determining a bandwidth for aperiodic CSI-RS measurement in a wireless communication system.

In accordance with an aspect of the disclosure, a method performed by a terminal in a communication system is provided. Information on a demodulation reference signal (DMRS) configuration type corresponding to a mapping pattern of a plurality of DMRS ports is received from a base station. Control information indicating at least one DMRS port among the plurality of DMRS ports is received from the base station. The at least one DMRS port associated with downlink data is identified based on the control information. Downlink data based on the identified DMRS port is received from the base station. The plurality of DMRS ports belong to two or three DMRS groups based on a DMRS configuration type. Resources corresponding to different DMRS groups are multiplexed based on an orthogonal code.

BRIEF DESCRIPTION OF THE DRAWINGS

FIG. 9 illustrates an example in which RE-specific mapping of application of a precoder to each symbol is different to increase a diversity gain;

FIG. 12 illustrates an example of precoder cycling in units of time based on the assumption that DMRSs are transmitted in one entire symbol;

FIG. 13 illustrates an example in which different precodings are applied to RBs or PRGs based on the assumption that two DMRS ports are used;

FIG. 14A illustrates an example of using the codebook for the diversity-based transmission;

FIG. 14B illustrates an example of an operation for activating SRS candidate resources through the MAC CE and actually activating SRS candidate resources through DCI;

FIG. 15 illustrate time and frequency resources used to transmit uplink data by a plurality of UEs;

FIG. 22B illustrates an example in which DC subcarriers are arranged according to the DMRS structure proposed by the disclosure;

FIG. 30 illustrates an example of DMRS transmission for the type 1 DMRS pattern;

DETAILED DESCRIPTION

Figure 1:
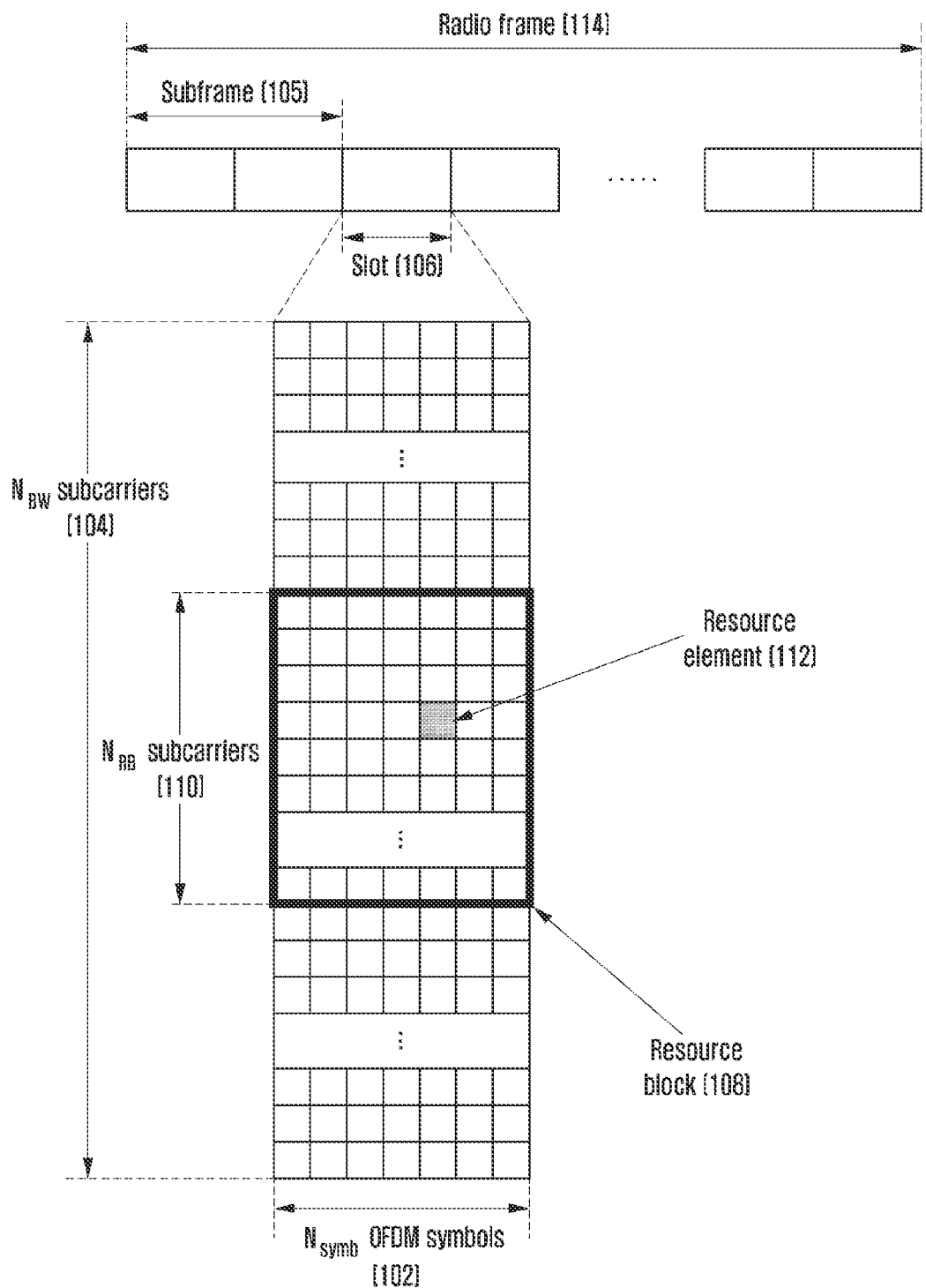
FIG. 1 illustrates the basic structure of a time/frequency region which is a radio resource region in which the data or control channel is transmitted in downlink of the LTE system.

Hereinafter, embodiments of the disclosure will be described in detail with reference to the accompanying drawings.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. The disclosure may have various modifications and various embodiments, among which specific embodiments will now be described more fully with reference to the accompanying drawings. However, it should be understood that there is no intent to limit the disclosure to the particular forms disclosed, but on the contrary, the disclosure is to cover all modifications, equivalents, and alternatives falling within the spirit and scope of the disclosure.

Further, it will be appreciated that singular expressions such as "an" and "the" include plural expressions as well, unless the context clearly indicates otherwise. Accordingly, as an example, a "component surface" includes one or more component surfaces.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the disclosure. As used herein, the term "and/or" includes any and all combinations of one or more associated items.

The terms used herein are used only to describe particular embodiments, and are not intended to limit the disclosure. As used herein, the singular forms are intended to include the plural forms as well, unless the context clearly indicates otherwise. In the disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Hereinafter, all the embodiments of the disclosure may not be exclusive, and one or more embodiments may be performed together. However, for ease of description, the embodiments and examples will be separately described.

First Embodiment

A wireless communication system has developed to be a broadband wireless communication system that provides a high speed and high quality packet data service, like the communication standards, for example, high speed packet access (HSPA) of 3GPP, Long Term Evolution (LTE) or evolved universal terrestrial radio access (E-UTRA), LTE-advanced (LTE-A), high rate packet data (HRPD) of 3GPP2, ultra mobile broadband (UMB), and 802.16e of IEEE, or the like, beyond the voice-based service provided at the initial stage. 5G or new radio (NR) communication standard is being researched as the $5^{th}$ generation wireless communication system.

An LTE system, which is a representative example of the broadband wireless communication system, employs an orthogonal frequency division multiplexing (OFDM) scheme for a downlink (DL), and employs a single carrier frequency division multiple access (SC-FDMA) scheme for an uplink (UL). The uplink is a radio link through which a user equipment (UE) (or a mobile station (MS)) transmits data or a control signal to a base station (BS) (or an eNode B (eNB)), and the downlink is a radio link through which the base station transmits data or a control signal to the UE. In such a multi-access scheme, time-frequency resources for carrying data or control information are allocated and operated in a manner to prevent overlapping of resources, that is, to establish orthogonality, between users so as to identify data or control information of each user. Hereinafter, the LTE system may include LTE and LTE-A systems.

When decoding fails at the initial transmission, the LTE system employs hybrid automatic repeat request (HARQ) that retransmits the corresponding data in a physical layer. In the HARQ scheme, when a receiver does not accurately decode data, the receiver transmits information (negative acknowledgement: NACK) informing a transmitter of a decoding failure and thus the transmitter may re-transmit the corresponding data on the physical layer. The receiver combines the data re-transmitted by the transmitter with the data of which the previous decoding failed, thereby increasing the data reception performance. Also, when the receiver accurately decodes data, the receiver transmits information (acknowledgement: ACK) informing the transmitter of decoding success, and thus the transmitter may transmit new data.

FIG. 1 illustrates the basic structure of a time/frequency region which is a radio resource region in which the data or control channel is transmitted in downlink of the LTE system.

In FIG. 1, the horizontal axis indicates a time region and the vertical axis indicates a frequency region. A minimum transmission unit in the time region is an OFDM symbol. One slot 106 consists of $N_{symb}$ OFDM symbols 102 and one subframe 105 consists of 2 slots. The length of one slot is 0.5 ms, and the length of one subframe is 1.0 ms. A radio frame 114 is a time region interval consisting of 10 subframes. A minimum transmission unit in the frequency region is a subcarrier, and the bandwidth of an entire system transmission band consists of a total of $N_{B}w$ subcarriers 104.

A basic unit of resources in the time-frequency region is a resource element (RE) 112 and may be indicated by an OFDM symbol index and a subcarrier index. A resource block (RB or physical resource block (PRB)) 108 is defined by $N_{symb}$ successive OFDM symbols 102 in the time region and $N_{RB}$ successive subcarriers 110 in the frequency region. Therefore, one RB 108 consists of $N_{symb} \times N_{RB}$ REs 112. In general, a minimum transmission unit of data is the RB unit. In the LTE system, generally, $N_{symb}=7$ and $N_{RB}=12$. $N_{BW}$ is proportional to the bandwidth of the system transmission band. A data rate increases in proportion to the number of RBs scheduled in the UE.

The LTE system defines and operates 6 transmission bandwidths. In the case of a frequency division duplex (FDD) system that operates by separating a downlink and an uplink by frequency, a downlink transmission bandwidth and an uplink transmission bandwidth may be different from each other. A channel bandwidth may indicate an RF bandwidth corresponding to the system transmission bandwidth. [Table 1] indicates the relationship between a system transmission bandwidth and a channel bandwidth defined in the LTE system. For example, when the LTE system has a channel bandwidth of 10 MHz, the transmission bandwidth may consist of 50 RBs.

TABLE 1

| | Channel bandwidth BWChannel [MHz] | | | | | |
|---|---|---|---|---|---|---|
| | 1.4 | 3 | 5 | 10 | 15 | 20 |
| Transmission bandwidth configuration NRB | 6 | 15 | 25 | 50 | 75 | 100 |

Downlink control information is transmitted within first N OFDM symbols in the subframe. Generally, N={1, 2, 3}. Accordingly, the N varies in every subframe depending on an amount of control information which should be transmitted in the current subframe. The control information includes a control channel transmission interval indicator indicating how many OFDM symbols are used for transmitting the control information, scheduling information of downlink data or uplink data, and HARQ ACK/NACK signals.

In the LTE system, the scheduling information of downlink data or uplink data is transmitted from the base station to the UE through downlink control information (DCI). The DCI is defined in various formats. The determined DCI format is applied and operated according to whether the DCI is scheduling information (UL grant) for uplink data or scheduling information (DL grant) for downlink data, whether the DCI is compact DCI having small size control information, whether the DCI applies spatial multiplexing using multiple antennas, and whether the DCI is DCI for controlling power. For example, DCI format 1 corresponding to scheduling control information on downlink data (DL grant) may be configured to include at least the following control information.

Resource allocation type 0/1 flag: notifies whether a resource allocation type is type 0 or type 1. Type 0 applies a bitmap scheme and allocates resources in units of resource block groups (RBGs). In the LTE system, a basic scheduling unit is a resource block (RB) expressed by time and frequency region resources, and an RBG includes a plurality of RBs and is a basic scheduling unit in the type 0 scheme. Type 1 allows allocation of a predetermined RB in an RBG.

Resource block assignment: notifies of RBs allocated to data transmission. Expressed resources are determined according to the system bandwidth and the resource allocation type.

Modulation and coding scheme (MCS): indicates a modulation scheme used for data transmission and the size of a transport block (TB) which is data to be transmitted.

HARQ process number: notifies of a process number of HARQ.

New data indicator: indicates whether data is transmitted by HARQ initial transmission or retransmission.

Redundancy version: indicates a redundancy version of HARQ.

Transmit power control (TPC) command for physical uplink control channel (PUCCH): indicates a transmission power control command for a PUCCH which is an uplink control channel.

The DCI is transmitted through a physical downlink control channel (PDCCH) or enhanced PDCCH (EPDCCH) via a channel-coding and modulation process. Hereinafter, PDCCH or EPDCCH transmission may be interchangeable with DCI transmission through the PDCCH or the EPDCCH. The description may be also applied to other channels.

In general, the DCI is scrambled with a particular radio network temporary identifier (RNTI) (or a UE identifier), independently for each UE, a cyclic redundancy check (CRC) bit is added thereto, and then channel coding is performed, whereby each independent PDCCH is configured and transmitted. In the time region, the PDCCH is mapped and transmitted during the control channel transmission interval. The mapping location of the PDCCH in the frequency region is determined by an identifier (ID) of each UE and distributed to the entire system transmission band.

Downlink data is transmitted through a physical downlink shared channel (PDSCH) which is a physical channel for transmitting downlink data. A PDSCH is transmitted after the control channel transmission interval. Scheduling information such as a modulation scheme, a specific mapping location in the frequency domain, or the like may be reported by DCI transmitted via a PDCCH.

Via an MCS formed of 5 bits in the control information included in the DCI, the base station may report the modulation scheme applied to a PDSCH to be transmitted to the UE and the size (transport block size (TBS)) of data to be transmitted. The TBS corresponds to the size before channel coding for error correction is applied to the data (TB) to be transmitted by the base station.

The modulation scheme supported by the LTE system includes quadrature phase shift keying (QPSK), 16 quadrature amplitude modulation (16QAM), and 64QAM, and modulation orders (Qm) thereof correspond to 2, 4, and 6, respectively. That is, in the case of QPSK modulation, 2 bits may be transmitted per symbol. In the case of 16QAM modulation, 4 bits may be transmitted per symbol. In the case of 64QAM modulation, 6 bits may be transmitted per symbol.

Figure 2:
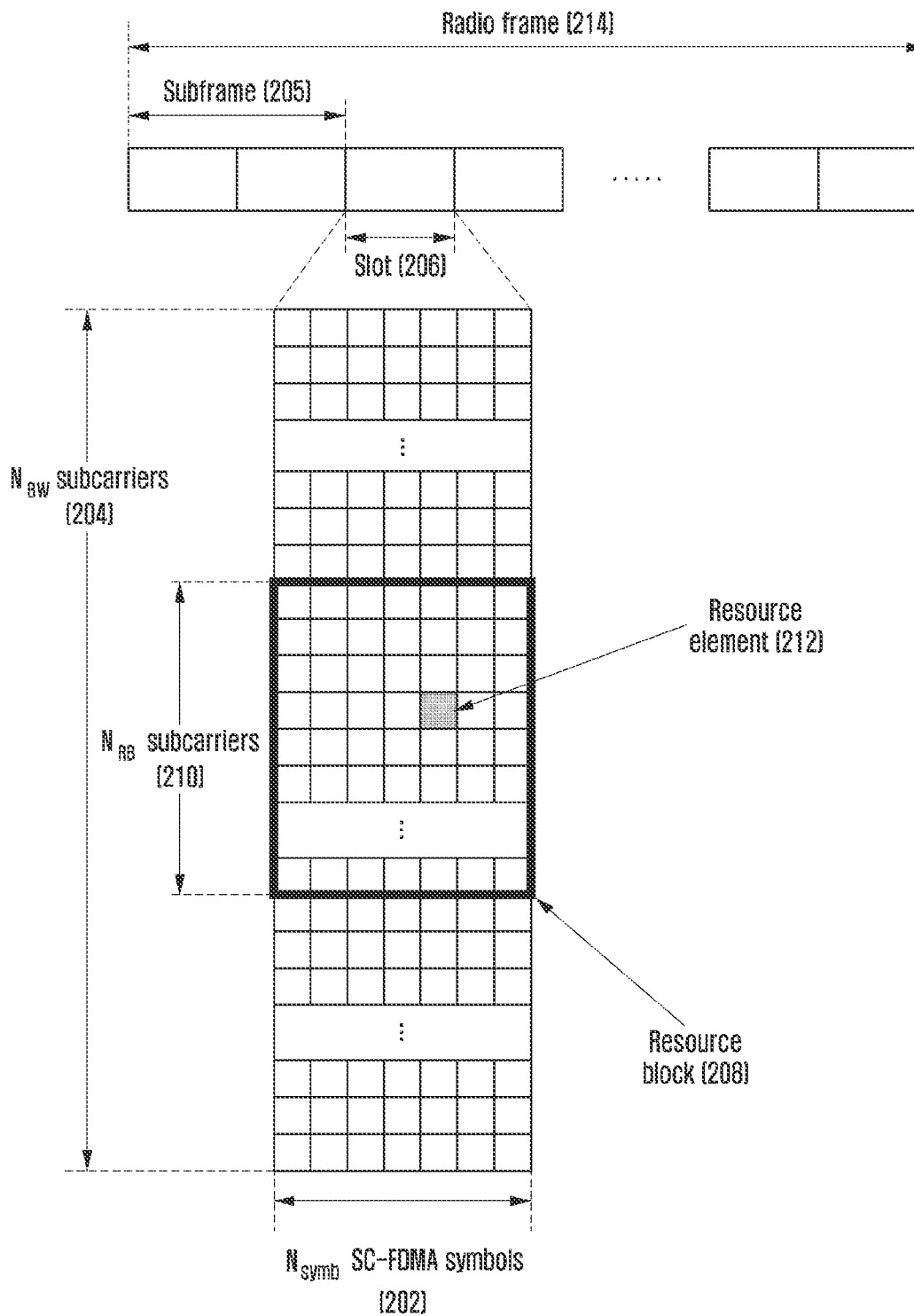
FIG. 2 illustrates the basic structure of a time-frequency region which is a radio resource region in which the data or control channel is transmitted in uplink of the LTE system according to the prior art.

FIG. 2 illustrates the basic structure of a time-frequency region which is a radio resource region in which the data or control channel is transmitted in uplink of the LTE system according to the prior art.

Referring to FIG. 2, the horizontal axis indicates the time region and the vertical axis indicates the frequency region. A minimum transmission unit in the time region is an SC-FDM symbol 202 and one slot 206 consists of $N_{symb}$ SC-FDMA symbols. One subframe 205 consists of two slots. A minimum transmission unit in the frequency region is a subcarrier and an entire system transmission band (transmission bandwidth) 204 consists of a total of $N_{BW}$ subcarriers. $N_{BW}$ has a value, which is proportional to the system transmission band.

A basic unit of resources in the time-frequency region is a resource element (RE) 212 and may be defined by an SC-FDMA symbol index and a subcarrier index. A resource block (RB) 208 is defined by $N_{symb}$ successive SC-FDMA symbols in the time region and $N_{BW}$ successive subcarriers in the frequency region. Therefore, an RB consists of $N_{symb} \times N_{RB}$ REs. In general, a minimum transmission unit of data or control information is an RB. A PUCCH is mapped to a frequency region corresponding to 1 RB, and may be transmitted during one subframe.

The timing relation between a PDSCH which is a physical channel for transmitting downlink data or a PDCCH or an EPDCCH including semi-persistent scheduling release (or SPS release) and a PUCCH or a PUSCH which is an uplink physical channel for transmitting HARQ ACK/NACK is defined in the LTE system. For example, in the LTE system operating in FDD type, HARQ ACK/NACK corresponding to a PDSCH transmitted in an $n-4^{th}$ subframe or a PDCCH or an EPDCCH including SRS release is transmitted through a PUCCH or a PUSCH in an $n^{th}$ subframe.

In the LTE system, downlink HARQ adapts an asynchronous HARQ scheme in which a data retransmission time is not fixed. That is, when the base station receives a feedback of HARQ NACK from the UE with respect to initial transmission data that the base station transmitted, the base station freely determines the time point at which the data is retransmitted via a scheduling operation. For the HARQ operation, the UE buffers data which is determined to be an error as a result of decoding received data, and combines the data with subsequently retransmitted data.

When the UE receives a PDSCH including downlink data transmitted from the base station through subframe n, the UE transmits uplink control information including HARQ ACK or NACK of the downlink data to the base station through a PUCCH or a PUSCH in subframe n+k. In this instance, k is defined differently according to FDD or time division duplex (TDD) of the LTE system and a configuration of the subframe. For example, in the case of the FDD LTE system, k is fixed to 4. Meanwhile, in the case of the TDD LTE system, k may be changed according to a subframe configuration and a subframe number.

In the LTE system, uplink HARQ adapts a synchronous HARQ scheme in which the data transmission time point is fixed unlike downlink HARQ. That is, the uplink/downlink timing relation between a physical uplink shared channel (PUSCH) which is a physical channel for uplink data transmission, and a PDCCH which is a downlink control channel ahead thereof and a physical hybrid indicator channel (PHICH) which is a physical channel for transmitting downlink HARQ ACK/NACK corresponding to uplink data on the PUSCH is fixed by the following rule.

When the UE receives a PDCCH including uplink scheduling control information transmitted from the base station or a PHICH for transmitting downlink HARQ ACK/NACK through subframe n, the UE transmits uplink data corresponding to the control information through a PUSCH in subframe n+k. At this time, k is differently defined depending on FDD or TDD of the LTE system and the configuration thereof. For example, in the case of the FDD LTE system, k is fixed to 4. In the case of the TDD LTE system, k may be changed according to a subframe configuration and a subframe number.

Further, when the UE receives a PHICH for transmitting downlink HARQ ACK/NACK from the base station in sub-frame i, the PHICH corresponds to a PUSCH which the UE transmits in subframe i-k. In this instance, k is defined differently depending on FDD or TDD of the LTE system, and a configuration thereof. For example, in the case of the FDD LTE system, k is fixed to 4. Meanwhile, in the case of the TDD LTE system, k may be changed according to a subframe configuration and a subframe number.

The description of the wireless communication system has been made on the basis of the LTE system, but the disclosure is not limited to the LTE system and may be applied to various wireless communication systems such as NR and 5G.

Figure 3:
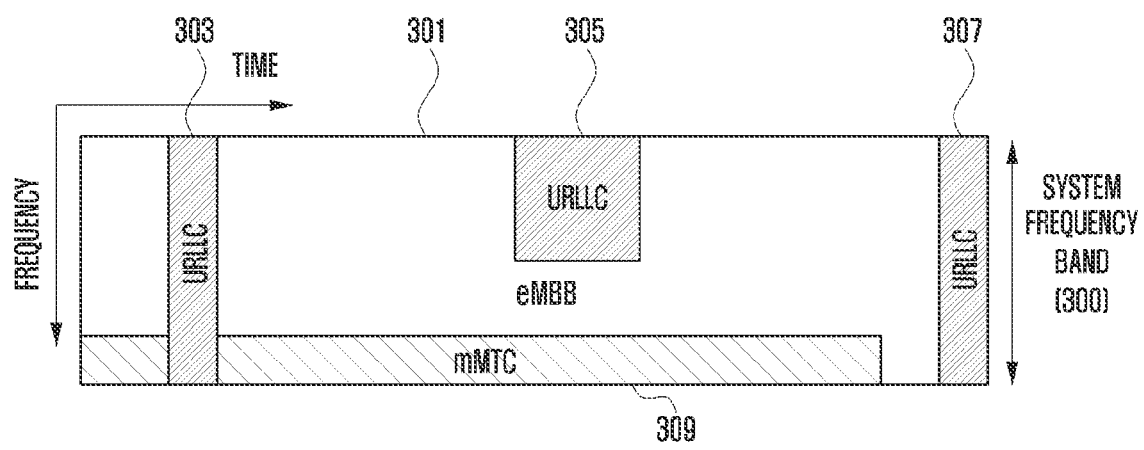
FIGS. 3 and 4 illustrate examples of allocating data for eMBB, URLLC, and mMTC which are services considered in the system to frequency-time regions.
Figure 4:
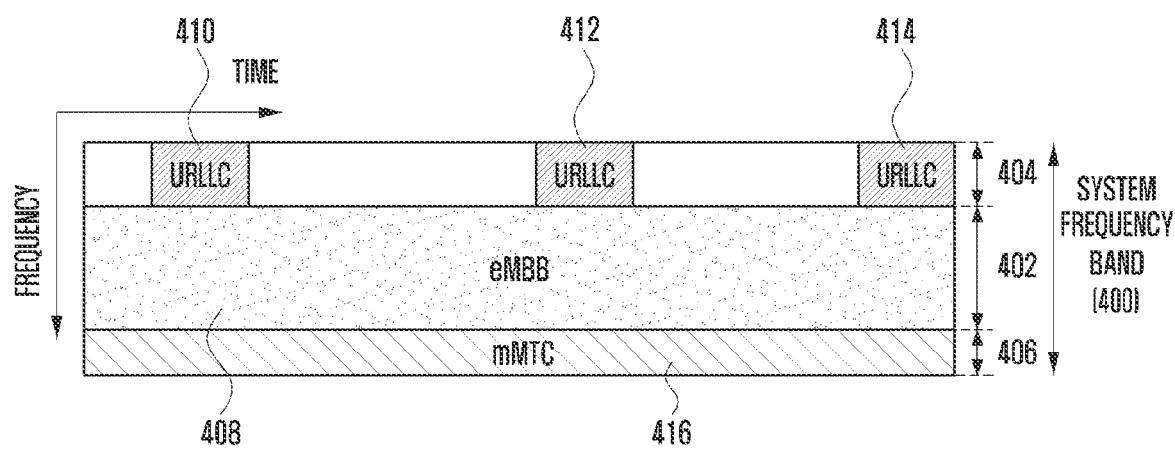

FIGS. 3 and 4 illustrate examples in which data for enhanced Mobile BroadBand (eMBB), ultra-reliable and low latency communications (URLLC), and massive machine type communication (mMTC) which are services considered in the 5G or NR system are allocated to frequency-time resources.

In FIG. 3, eMBB, URLLC, and mMTC data are allocated to an entire system frequency band 300. When URLLC data 303, 305, and 307 are generated while eMBB data 301 and mMTC data 309 are allocated to a specific frequency band and transmitted, and thus transmission thereof is needed, the transmitter may empty parts to which the eMBB data 301 and the mMTC data 309 have been already allocated and transmit the URLLC data 303, 305, and 307. Particularly, a short delay time is important to the URLLC among the services, so that the URLLC data 303, 305, and 307 may be transmitted while being allocated to parts of the resources 301 to which the eMBB is allocated. Of course, when the URLLC is additionally allocated and transmitted in resources to which the eMBB is allocated, eMBB data may not be transmitted in duplicate frequency-time resources and accordingly the performance of eMBB data transmission may be reduced. That is, in the above case, eMBB data transmission may be failed due to URLLC allocation.

In FIG. 4, an entire system frequency band 400 may be divided into subbands 402, 404, and 406 and used for transmitting services and data. The subbands may be divided in advance and information thereof may be transmitted to the UE through higher signaling or the base station may randomly divide the subbands and provide services to the UE without any information on the subbands. FIG. 4 illustrates an example in which a subband 402 is used for eMBB data transmission 408, a subband 404 is used for URLLC data transmission 410, 412, and 414, and a subband 406 is used for mMTC data transmission 416. In FIGS. 3 and 4, the length of a transmission time interval (TTI) used for URLLC transmission may be shorter than the length of a TTI used for eMBB or mMTC transmission.

Hereinafter, an embodiment of the disclosure will be described in detail with reference to the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

Hereinafter, the base station is the entity that allocates resources to the UE, and may be at least one of an eNode B, a Node B, a base station (BS), a radio access unit, an base station controller, and a node on a network. The UE may include a user equipment (UE), a mobile station (MS), a cellular phone, a smartphone, a computer, and a multimedia system capable of performing a communication function. Hereinafter, the embodiment of the disclosure is described on the basis of the LTE or LTE-A system by way of an example, but the embodiment of the disclosure may be applied to other communication systems having a similar technical background or channel form. For example, 5 generation mobile communication technology (5G, new radio (NR)) developed after LTE-A may be included therein. Also, the embodiment of the disclosure may be modified without departing from the scope of the disclosure, and may be applied to other communication systems by the determination by those skilled in the art.

Particularly, terms "physical channel" and "signal" in the conventional LTE or LTE-A system may be used to describe the method and the apparatus proposed by the disclosure. However, embodiments of the disclosure can be applied to a wireless communication system rather than the LTE and LTE-A systems.

Further, the embodiment of the disclosure can be applied to FDD and TDD systems.

Hereinafter, in the disclosure, physical layer signaling is a method of transmitting a signal from the base station to the UE through a downlink control channel of a physical layer or from the UE to the base station through an uplink control channel of a physical layer and may be referred to as L1 signaling or PHY signaling.

In the disclosure, higher signaling or higher layer signaling is a method of transmitting a signal from the base station to the UE through a downlink data channel of a physical layer or from the UE to the base station through an uplink data channel of a physical layer and may be referred to as RRC signaling, L2 signaling, PDCP signaling, or a MAC control element (MAC CE).

In the disclosure, a TPMI indicates a transmit precoding matrix indicator or transmit precoding matrix information and, similarly, may be expressed as beamforming vector information or beam direction information In the disclosure, uplink (UL) DCI or UL-related DCI is physical layer control signaling (L1 control) including information required for uplink transmission such as uplink resource configuration information and resource configuration type information like UL grant, uplink power control information, cyclic shift of an uplink reference signal, an orthogonal cover code (OCC), a channel state information (CSI) request, a sounding reference signal (SRS) request, MCS information for each codeword, and an uplink precoding information field.

In the wireless communication system such as LTE and LTE-A, discrete Fourier transform spread orthogonal frequency division multiplexing (DFT-S OFDM) is used to reduce PAPR and improve coverage in uplink transmission. Further, the LTE and LTE-A systems consider only a small number of UE transmission antennas according to a supported band characteristic and a hardware development step. Accordingly, diversity-based transmission is not supported in consideration of the characteristic.

However, unlike the current wireless communication system assuming a maximum of four UE transmission antennas, it is highly likely to use four or more transmission antennas by the UE due to improvement of an antenna form factor and development of RF technology through a high-frequency carrier in the NR system. Conventional DFT-S OFDM is used only for transmission of rank 1 and transmission using CP-OFMD is supported in transmission of rank 2 or higher. Accordingly, in the NR wireless communication system, demands of diversity transmission in uplink increase. Therefore, the disclosure proposes a method of transmitting a signal in uplink through a diversity scheme and a method of indicating a diversity scheme.

Hereinafter, it is assumed that dynamic beamforming or semi-dynamic beamforming is supported to perform uplink transmission in various scenarios in the disclosure.

Figure 5:
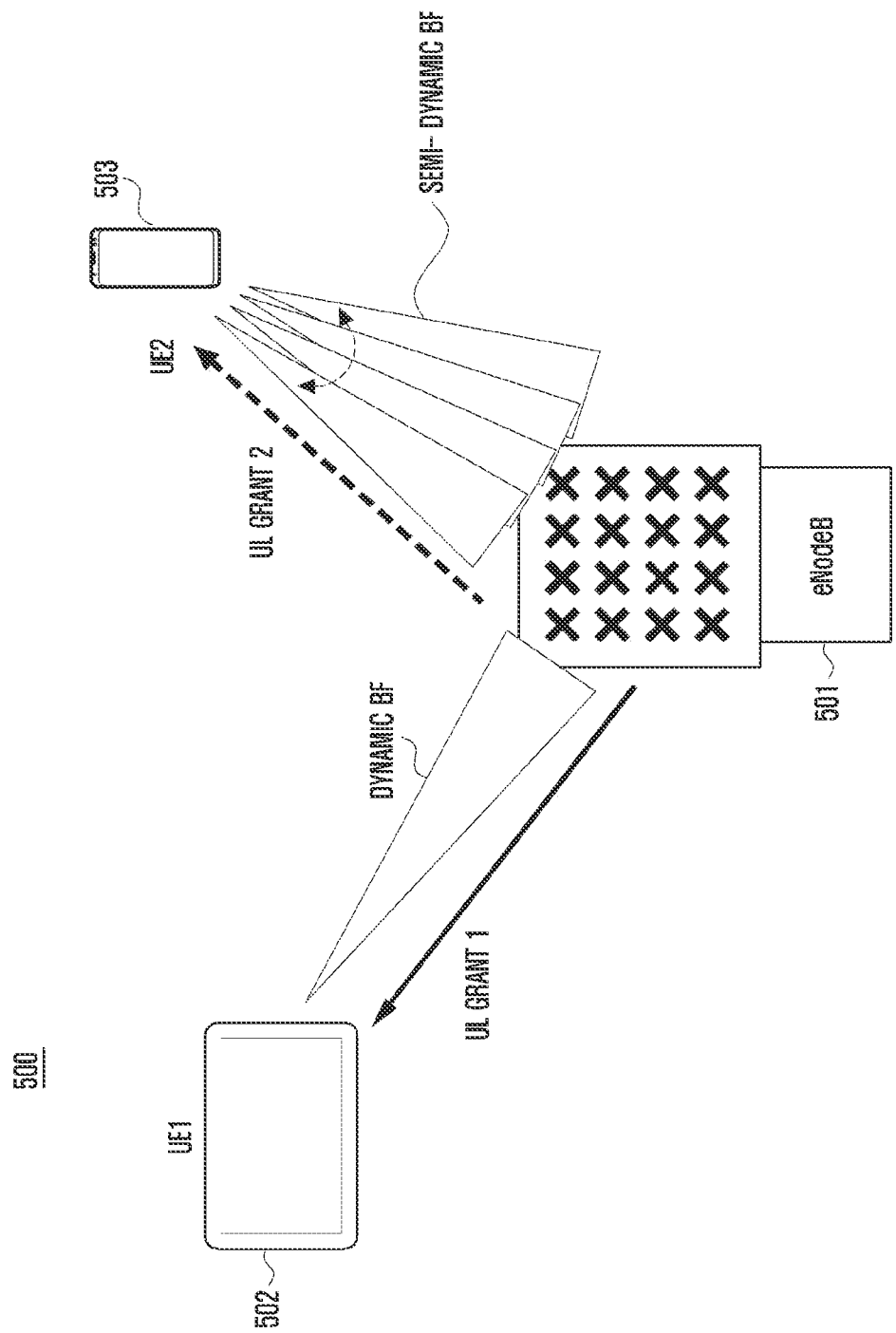
FIG. 5 illustrates an example of uplink transmission through dynamic beamforming and semi-dynamic beamforming.

FIG. 5 illustrates an example of uplink transmission through dynamic beamforming or semi-dynamic beamforming.

Dynamic beamforming is suitable for the case in which a movement speed of the UE is low, separation between cells is good, or accurate uplink channel information is available like in a situation in which inter-cell interference management is good. In this case, a UE 702 may perform uplink transmission using a beam having a narrow beam width on the basis of accurate uplink channel direction information. A base station 701 notifies the UE of a TPMI through UL DCI such as UL grant. After receiving TPMI signaling, the UE transmits uplink data to the base station through a precoder indicated by the TPMI or a beamforming vector (or matrix).

Multi-input multi-output (MIMO) transmission based on a codebook for supporting the dynamic beamforming may be operated by UL DCI including a precoding information (precoding matrix indicator (PMI)) field (determined according to a rank indicator (RI) when the corresponding RI exists). At this time, the precoding information field indicates a precoding matrix used for uplink transmission allocated to the corresponding UE. The precoding matrix may be appointed to direct one direction in the allocated entire band in the case of wideband precoding information and to direct one direction for each subband in the case of subband precoding information. At this time, a precoding vector designated by the subband precoding information may be included in a precoding vector group designated by the wideband precoding information. Accordingly, signaling burden for subband precoding information may be reduced.

The semi-dynamic beamforming is suitable for the case in which a movement speed of the UE is high, separation between cells is not good, or uplink channel information is inaccurate like in the situation in which inter-cell interference management is not good. In this case, the UE 703 may perform uplink transmission using a beam group including beams in various directions on the basis of schematic uplink channel direction information. The base station 701 notifies the UE of a TPMI through UL DCI such as UL grant. After receiving TPMI signaling, the UE transmits uplink data to the base station through a subset of the precoder indicated by the TPMI or a subset of the beamforming vector (or matrix).

MIMO transmission based on a codebook for supporting the semi-dynamic beamforming may be operated by UL DCI including a precoding information (PMI) field (determined according to an RI when the corresponding RI exists). At this time, the precoding information field indicates a group of a precoding vector used for uplink transmission allocated to the corresponding UE. Information on the group of the precoding vector is wideband information and may be equally used in the entire uplink band. The UE can apply precoder cycling according to a predetermined pattern to beams included in the notified precoding vector group, and the precoder cycling may be supported through diversity-based transmission to the UE.

Figure 6:
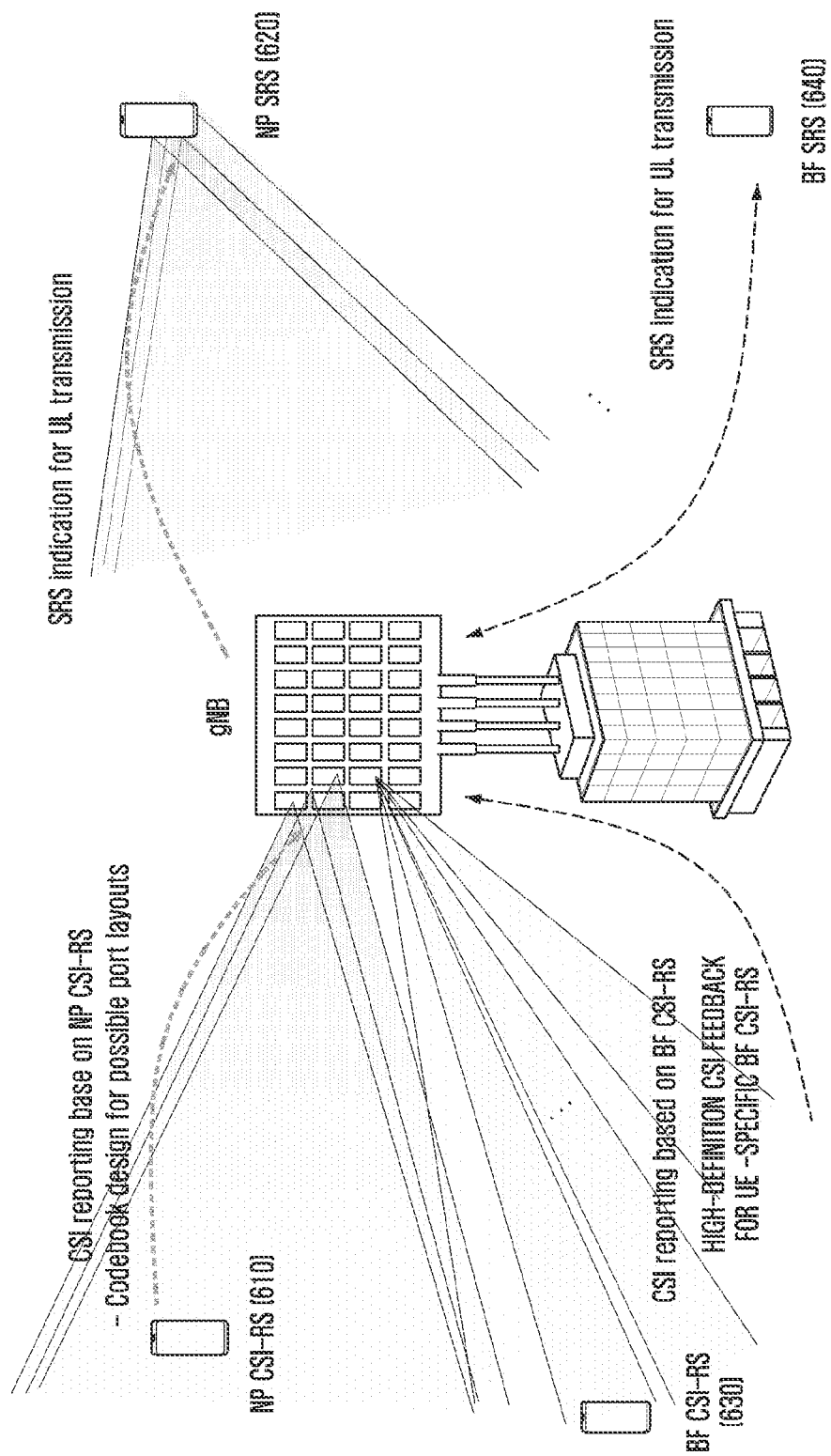
FIG. 6 illustrates an example in which the UE and the base station transmit a reference signal in order to acquire channel state information required for uplink transmission in the NR system.

FIG. 6 illustrates an example in which the UE and the base station transmit a reference signal in order to acquire channel state information required for uplink transmission in the NR system.

Transmission of a reference signal supported by the NR system may use a CSI-RS beam in units of cells which is a wide area for supporting a plurality of antennas or in units of sectors and may vary depending on whether a non-precoded CSI-RS (NP CSI-RS) 610 is used to perform beamforming using precoding feedback of the UE or a beamformed CSI-RS (BF CSI-RS) 630 is used to reduce CSI-RS overhead by applying beamforming to antennas In the case of the corresponding NP CSI-RS, a plurality of unit resource configurations may be used to support many antenna ports, and in the case of the BF CSI-RS, a plurality of CSI-RS sources may be configured rather than the unit resource configurations and the UE may select one or a plurality of resources therefrom and report channel state information.

Similarly, when the UE transmits the SRS, an NP SRS 620 supporting many antennas in one SRS resource and a BF SRS 640 using information on one or a plurality of SRS resources configured in the UE may be applied. The base station may transmit the SRS through the SRS resources configured by the base station, receive the corresponding SRS, indicate an optimal transmission beam required between the UE and the base station to the UE, and discover a reception beam optimized for the base station. Further, if channel reciprocity or beam determination match between uplink and downlink, an uplink beam may be selected using the NP CSI-RS 610 and the BF CSI-RS 630.

A precoding vector group or a beam group in uplink can be defined through two methods below.

A first method is a method of defining a beam group on the basis of a hierarchical PMI. For example, the PMI indicating one code point may include two or more sub PMIs. If it is assumed that the PMI consists of two sub PMIs, it may be appointed that a first PMI is one of beam group indexes including a specific number of precoding vectors and a second PMI is one of indexes of precoding vectors included in the beam group. For example, an uplink codebook including beam groups $G_i$ including M UE transmission antennas and B DFT precoding vectors $v_k$ based on an oversampling factor of 0 may be defined as [Equation 1] below.

$$v_k = \frac{1}{\sqrt{M}} \times [1 \ e^{j\frac{2\pi k}{OM}} \ e^{j\frac{4\pi k}{OM}} \ \ldots \ e^{j\frac{2\pi(M-1)k}{OM}}]^T \quad \text{[Equation 1]}$$

$$G_i = [v_{Ai} \ v_{mod(Ai+1,OM)} \ \ldots \ v_{mod(Ai+B,OM)} \ v_{mod(Ai+B-1,OM)}]$$

A is a beam skipping factor and denotes an interval (beam unit) between beam groups. In this example, a first PMI i is an index of the beam group, and a single precoding vector can be designated by a second PMI having payload of $\lceil \log_2 B \rceil$.

A second method is a method of defining a beam or a beam group on the basis of a single-structure PMI. For example, one PMI may be understood as an indicator indicating a single beam or beam group according to higher layer or physical layer signaling. For example, an uplink codebook including beam groups $G_i$ including M UE transmission antennas, $i^{th}$ DFT precoding vector $v_i$ based on an oversampling factor of 0, and B DFT precoding vectors may be defined as [Equation 2] below.

$$v_k = \frac{1}{\sqrt{M}} \times [1 \ e^{j\frac{2\pi k}{OM}} \ e^{j\frac{4\pi k}{OM}} \ \ldots \ e^{j\frac{2\pi(M-1)k}{OM}}]^T \quad \text{[Equation 2]}$$

$$G_i[v_i \ v_{mod(i+1,OM)} \ \ldots \ v_{mod(i+B-2,OM)} \ v_{mod(i+B-1,OM)}]$$

In this example, an $i^{th}$ PMI may be understood to indicate $v_i$ when the high layer or physical layer signaling indicates dynamic beamforming or wideband precoding. On the other hand, the $i^{th}$ PMI may be understood to indicate $G_i$ when the higher layer or physical layer signaling indicates semi-dynamic beamforming or subband precoding. [Table 2] shows an example of a TPMI analysis method when dynamic or semi-dynamic beamforming transmission or wideband or subband precoding is designated by higher layer signaling in the example. [Table 3] shows an example of a TPMI analysis method when dynamic or semi-dynamic beamforming transmission or wideband or subband precoding is designated by physical layer signaling in the example.

TABLE 2

| PM1 | Precoder or precoder group | |
|---|---|---|
| value i | BeamformingScheme= 'Dynamic' | BeamformingScheme= 'Semi-dynamic' |
| 0 | $v_0$ | $G_0$ |
| 1 | $v_1$ | $G_1$ |

TABLE 2-continued

| PM1 value i | Precoder or precoder group | |
|---|---|---|
| | BeamformingScheme= 'Dynamic' | BeamformingScheme= 'Semi-dynamic' |
| 2 | $v_2$ | $G_2$ |
| ... | ... | ... |
| OM-1 | $v_{OM-1}$ | $G_{OM-1}$ |

TABLE 3

| PMI value i | Interpretation | |
|---|---|---|
| | Beamforming scheme | Precoder or precoder group |
| 0 | Dynamic | Precoder $v_0$ |
| 1 | Dynamic | Precoder $v_1$ |
| 2 | Dynamic | Precoder $v_2$ |
| ... | ... | ... |
| OM-1 | Dynamic | Precoder $v_{OM-1}$ |
| OM | Semi-dynamic | Precoder group $G_0$ |
| OM + 1 | Semi-dynamic | Precoder group $G_1$ |
| OM + 2 | Semi-dynamic | Precoder group $G_2$ |
| ... | ... | ... |
| 2OM-1 | Semi-dynamic | Precoder group $G_{OM-1}$ |

In [Equation 1] and [Equation 2], it is assumed that UE transmission antennas have a one-dimensional antenna array and thus the codebook includes one-dimensional DFT vectors, but another type of an uplink codebook may be used if the UE transmission antennas have a two-dimensional antenna array. For example, if the UE transmission antenna array includes $M_1$ antenna ports in a first dimension and $M_2$ antenna ports in a second dimension, a precoding vector $v_{m_1, m_2}$ and a beam group $G_{m_1, m_2}$ may be defined as shown in [Equation 3] through a pair of indexes ($m_1$, $m_2$).

$$v_{m_1,m_2} = \frac{1}{\sqrt{M_1 M_2}} \times \left[1 \; e^{j\frac{2\pi m_1}{O_1 M_1}} \; e^{j\frac{4\pi m_1}{O_1 M_1}} \; ... \; e^{j\frac{2\pi(M_1-1)m_1}{O_1 m_1}}\right]^T \otimes$$
$$\left[1 \; e^{j\frac{2\pi m_2}{O_2 M_2}} \; e^{j\frac{4\pi m_2}{O_2 M_2}} \; ... \; e^{j\frac{2\pi(M_2-1)m_2}{O_2 M_2}}\right]^T = v_{m_1} \otimes v_{m_2}$$
$$G_{m_1,m_2} = G_{m_1} \otimes G_{m_2}$$
$$G_{m_i} = [v_{m_i} \; v_{mod(m_i+1, O_i M_i)} \; ... \; v_{mod(m_i+B_i-2, O_i M_i)} \; v_{mod(m_i+B_i-1, O_i M_i)}]$$
[Equation 3]

It is assumed that UE transmission antennas have the same polarization in [Equation 1], [Equation 2], and [Equation 3], but if the UE transmission antennas have a dual-polarized array, examples of the uplink codebook can be changed in consideration thereof. For example, if the UE transmission antennas have a one-dimensional array including M antenna ports for each polarization, that is, a total of 2M antenna ports, a rank 1 precoding vector $v_{i,k}$ and a beam group $G_m$ can be defined as shown in [Equation 4] below.

$$v_{i,k} = \frac{1}{\sqrt{2M}} \times \begin{bmatrix} d_i \\ \Phi_k d_i \end{bmatrix}$$
[Equation 4]
$$d_i = \left[1 \; e^{j\frac{2\pi i}{OM}} \; e^{j\frac{4\pi i}{OM}} \; ... \; e^{j\frac{2\pi(M-1)i}{OM}}\right]^T, \Phi_k = e^{j\frac{2\pi k}{K}}$$
$$G_m = [v_m \; v_{mod(m+1, OM)} \; ... \; v_{mod(m+B-2, OM)} \; v_{mod(m+B-1, OM)}],$$
$$m = (K-1)i + k$$

In [Equation 4], K denotes a co-phasing quantization level.

In another example, if the UE transmission antennas have a two-dimensional array including $M_1 M_2$ antenna ports for each polarization, that is a total of $2M_1 M_2$ antenna ports, a rank 1 precoding vector $v_{m_1, m_2, k}$ can be defined as shown in [Equation 5] below. $M_1$ and $M_2$ are numbers of UE transmission antenna ports for each polarization included in the first dimension and the second dimension. In the case of the beam group, the configuration similar to [Equation 3] can be made on the basis of $v_{M_1, M_2, k}$ of [Equation 5].

$$v_{m_1,m_2,k} = \frac{1}{\sqrt{2M_1 M_2}} \times \begin{bmatrix} d_{m_1} \otimes d_{m_2} \\ e^{\Phi_k} d_{m_1} \otimes d_{m_2} \end{bmatrix}$$
[Equation 5]
$$d_{m_1} = \left[1 \; e^{j\frac{2\pi m_1}{O_1 M_1}} \; e^{j\frac{4\pi m_1}{O_1 M_1}} \; ... \; e^{j\frac{2\pi(M_1-1)m_1}{O_1 M_1}}\right]^T$$
$$d_{m_2} = \left[1 \; e^{j\frac{2\pi m_2}{O_2 M_2}} \; e^{j\frac{4\pi m_2}{O_2 M_2}} \; ... \; e^{j\frac{2\pi(M_2-1)m_2}{O_2 M_2}}\right]^T$$

It is apparent that the dynamic/semi-dynamic beamforming or wideband/subband precoding signaling example, that is [Table 2] and [Table 3] can be easily applied to the codebook examples.

The examples have been described on the basis of the rank 1 codebook indicating a single direction, but this principle is not limited thereto in real implementation and can be equally applied to codebooks of rank 2 or higher directing two or more directions.

The examples assume the case in which UL DCI includes one TPMI, and the UE receiving the TPMI can apply uplink precoding for one beam direction or one beam group to the entire uplink band.

Figure 7:
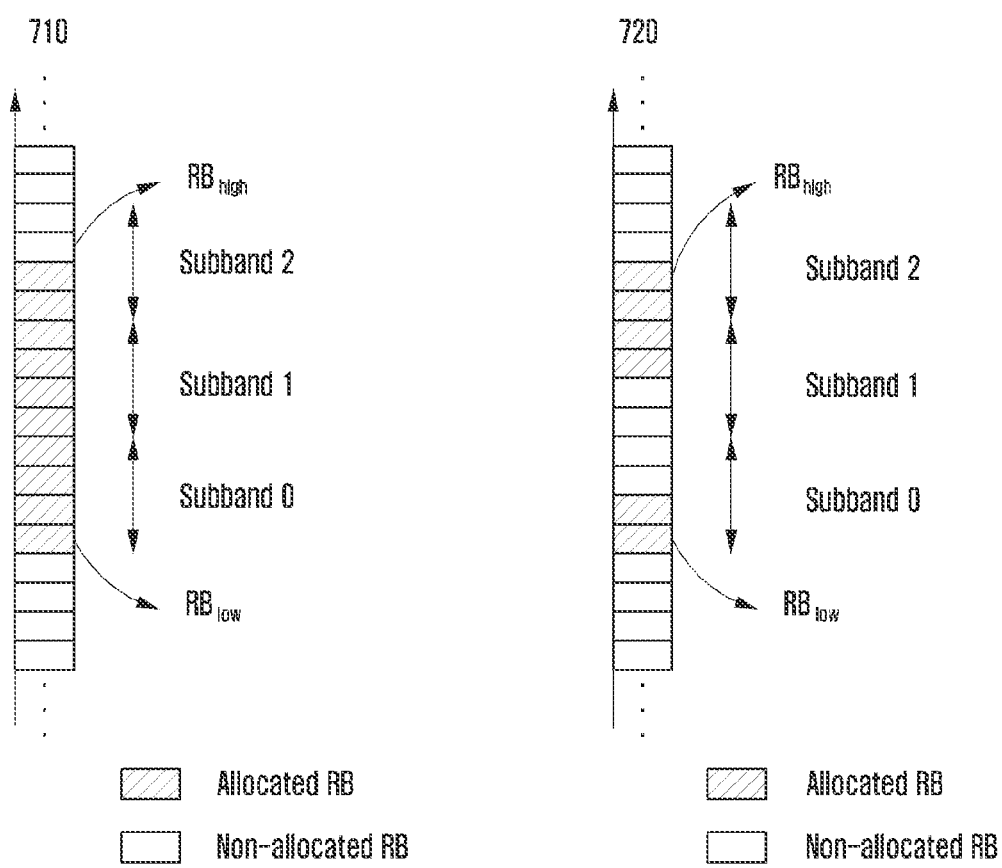
FIG. 7 illustrates an example of allocating resources for uplink transmission and applying subband precoding.

FIG. 7 illustrates an example of allocating resources for uplink transmission and applying subband precoding. For example, the base station may transmit $N_{PMI}$ TPMIs including precoding information for a plurality of subbands, for example, $N_{PMI}$ subbands through UL DCI for subband precoding. The value of $N_{PMI}$ is determined by the number $RA_{RB}$ of uplink resources (RBs) allocated to the UE, the number $P_{SUBBAND}$ of RBs included in the subband, and an uplink resource allocation method.

Reference numeral 710 indicates uplink resources when contiguous RBs are allocated and reference numeral 720 indicates uplink resources when clustered RBs are allocated. In FIG. 7, the case in which $P_{SUBBAND}=4$ is assumed. If resources are allocated as indicated by reference numeral 710, that is, if resources configured as one cluster are allocated, the number of necessary subbands can be calculated through [Equation 6] based on $RA_{RB}$ and $P_{SUBBAND}$. The cluster is a set of contiguously allocated uplink RBs.

$$N_{PMI} = \left\lceil \frac{RA_{RB}}{P_{SUBBAND}} \right\rceil$$
[Equation 6]

However, if resources configured as one or more clusters are allocated as indicated by reference numeral 720, calculation of [Equation 6] may not be accurate in which case $N_{PMI}$ can be calculated on the basis of a method of [Equation 7] or [Equation 8]. [Equation 7] is a method for calculating $N_{PMI}$ on the basis of the lowest index $RB_{low}$ and the highest index $RB_{high}$ among the allocated RBs. [Equation 8] is a method for calculating $N_{PMI}$ on the basis of the number of contiguous RBs allocated for each cluster. In [Equation 8], $RA_{RB,n}$ denotes the number of contiguous RBs allocated to an $n^{th}$ cluster and N denotes the number of clusters allocated to the UE.

$$N_{PMI} = \left\lceil \frac{RB_{high} - RB_{low} + 1}{P_{SUBBAND}} \right\rceil \quad \text{[Equation 7]}$$

$$N_{PMI} = \left\lceil \frac{RA_{RB,1}}{P_{SUBBAND}} \right\rceil + \ldots + \left\lceil \frac{RA_{RB,N}}{P_{SUBBAND}} \right\rceil \quad \text{[Equation 8]}$$

If one uplink PMI includes T bits, transmission of TPMI payload of $N_{PMI}T$ bits may be needed for uplink subband precoding in the example. This means that scores of bits or more may be needed for TPMI signaling when several subbands and a codebook of several bits are used. It may be too burdensome to transmit UL DCI and thus definition of a new method of performing UL subband precoding may be needed to reduce the UL DCI burden. If an environment supporting subband precoding is defined in uplink transmission, UL DCI coverage of the UE having a small number of transmission and reception antennas may be improved, and uplink transmission performance and total system performance of the UE may be improved by supporting subband precoding of the UE having a large number of transmission and reception antennas.

Embodiment 1-1

Figure 8:
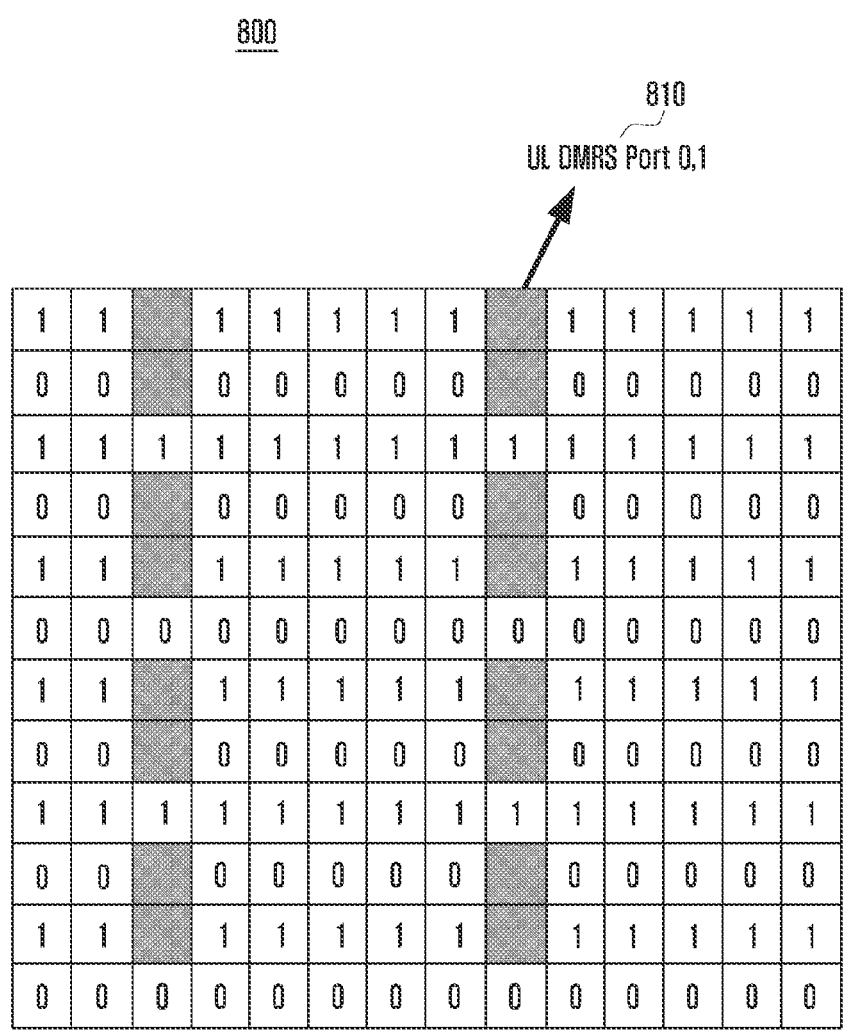
FIG. 8 illustrates a method of applying different precodings to REs proposed by the present embodiment on the assumption that two DMRS ports are used.

The UE may transmit uplink signals by applying different precodings using a plurality of demodulation reference signals (DMRSs) for each RE on the frequency axis in order to perform uplink diversity-based transmission. FIG. 8 illustrates a method of applying different precodings to REs proposed by the present embodiment on the assumption that two DMRS ports are used.

In FIG. 8, the UE may apply different precodings to REs through two DMRS ports within one RB. At this time, the base station may allocate and indicate a plurality of DMRSs for the transmission to the UE, and the UE receiving the same may transmit data through the plurality of DMRS ports. The method may provide a larger number of diversity gains even when resources are allocated to the UE in a small number RBs, and additional diversity gains may be expected by adding and using precoder cycling at a physical resource block (PRB) or precoding resource block group (PRG) level.

Since RE level precoder cycling uses different precoders according to frequencies, it may not be used for uplink data transmission using Discrete Fourier Transform-spread-OFDM (DFT-S OFDM) and is efficient in the case of cyclic prefix OFDM (CP-OFDM). In addition, in order to increase the diversity gain, different precoders may be applied to symbols as illustrated in FIG. 9.

Figure 10:
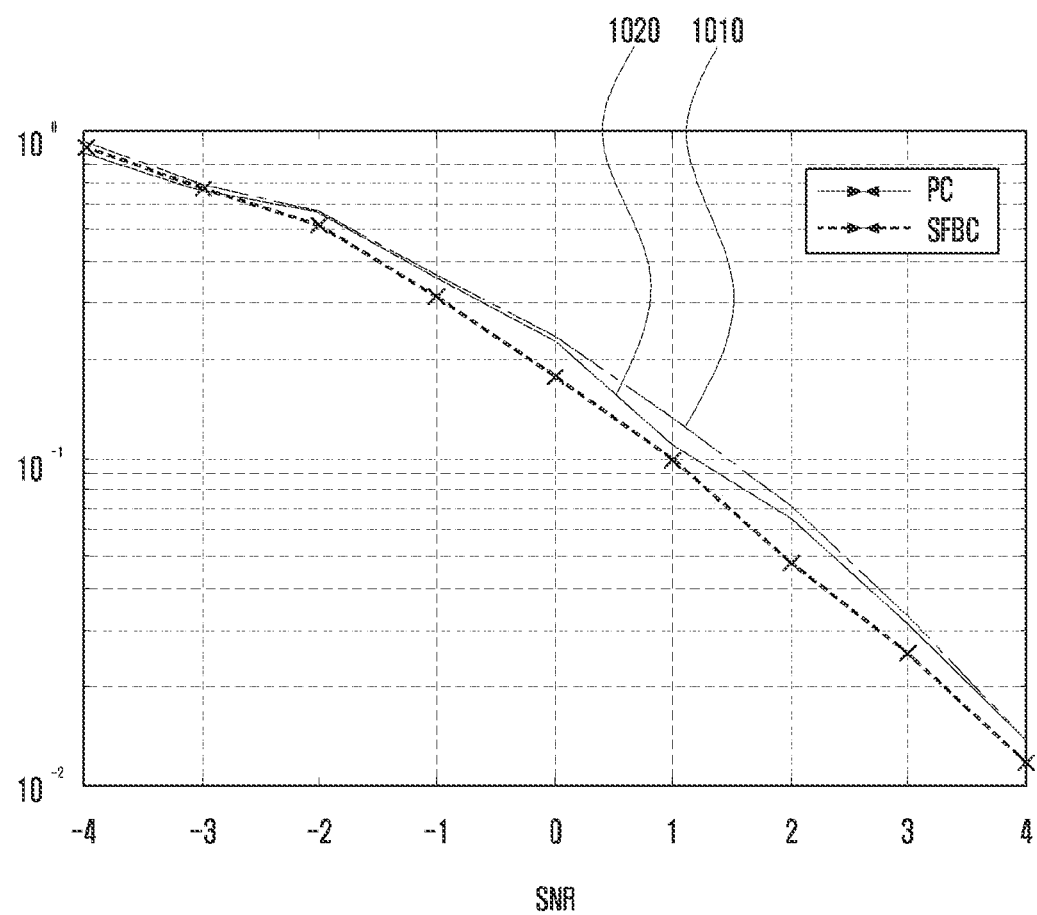
FIG. 10 illustrates a comparison between performance of the precoder cycling method illustrated in FIG. 8 and the precoder cycling method illustrated in FIG. 9.

FIG. 9 illustrates an example in which RE-specific mapping of application of a precoder to each symbol is different to increase a diversity gain. FIG. 10 illustrates a comparison between performance 1010 of the precoder cycling method illustrated in FIG. 8 and performance 1020 of the precoder cycling method illustrated in FIG. 9. As illustrated in FIG. 10, in the method of FIG. 9, the UE should apply more complex precoder mapping but may have better results in terms of performance than the method of FIG. 8.

Embodiment 1-2

Figure 11A:
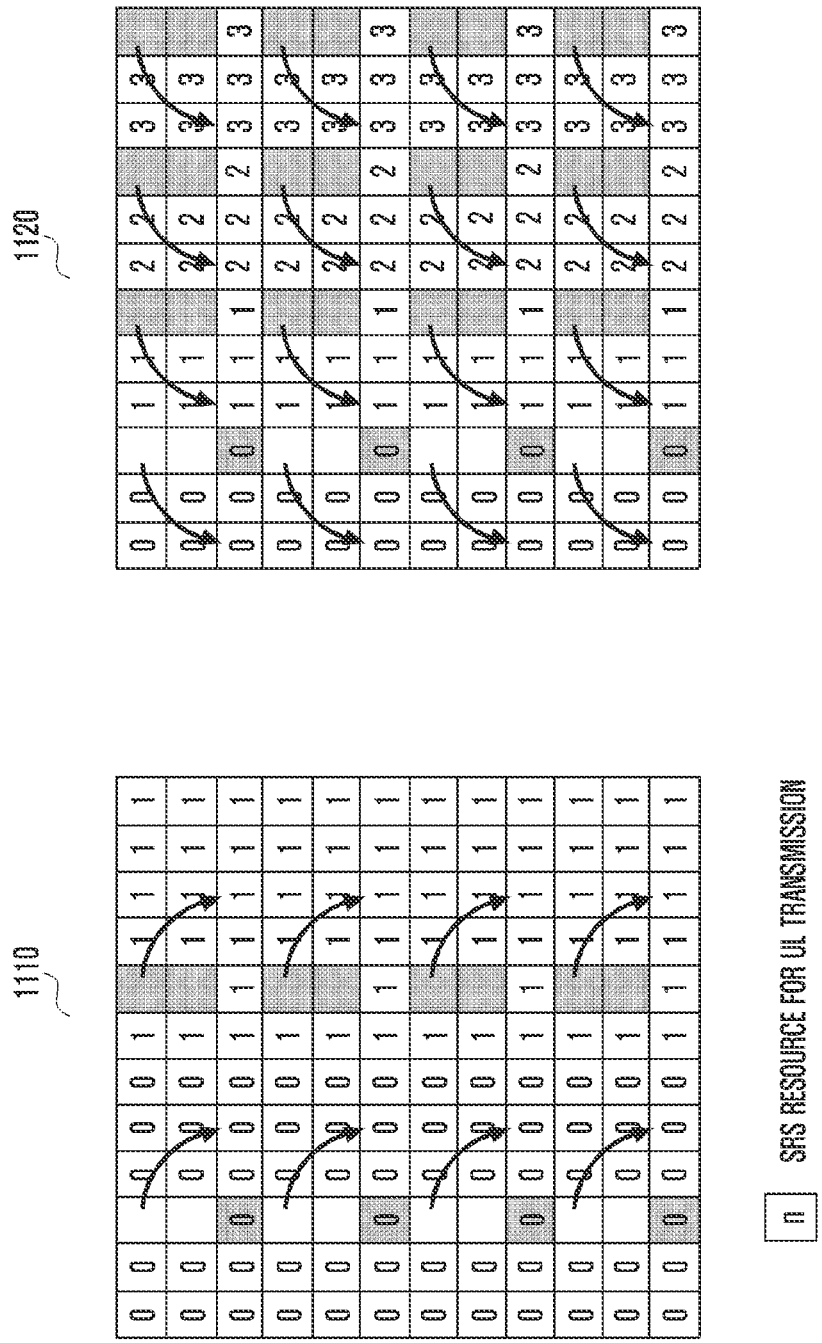
FIGS. 11A and 11B illustrate examples of applying another precoding in units of time resources based on the assumption that the number of DMRS ports which is the same as the number of transmitted ranks are used.
Figure 11B:
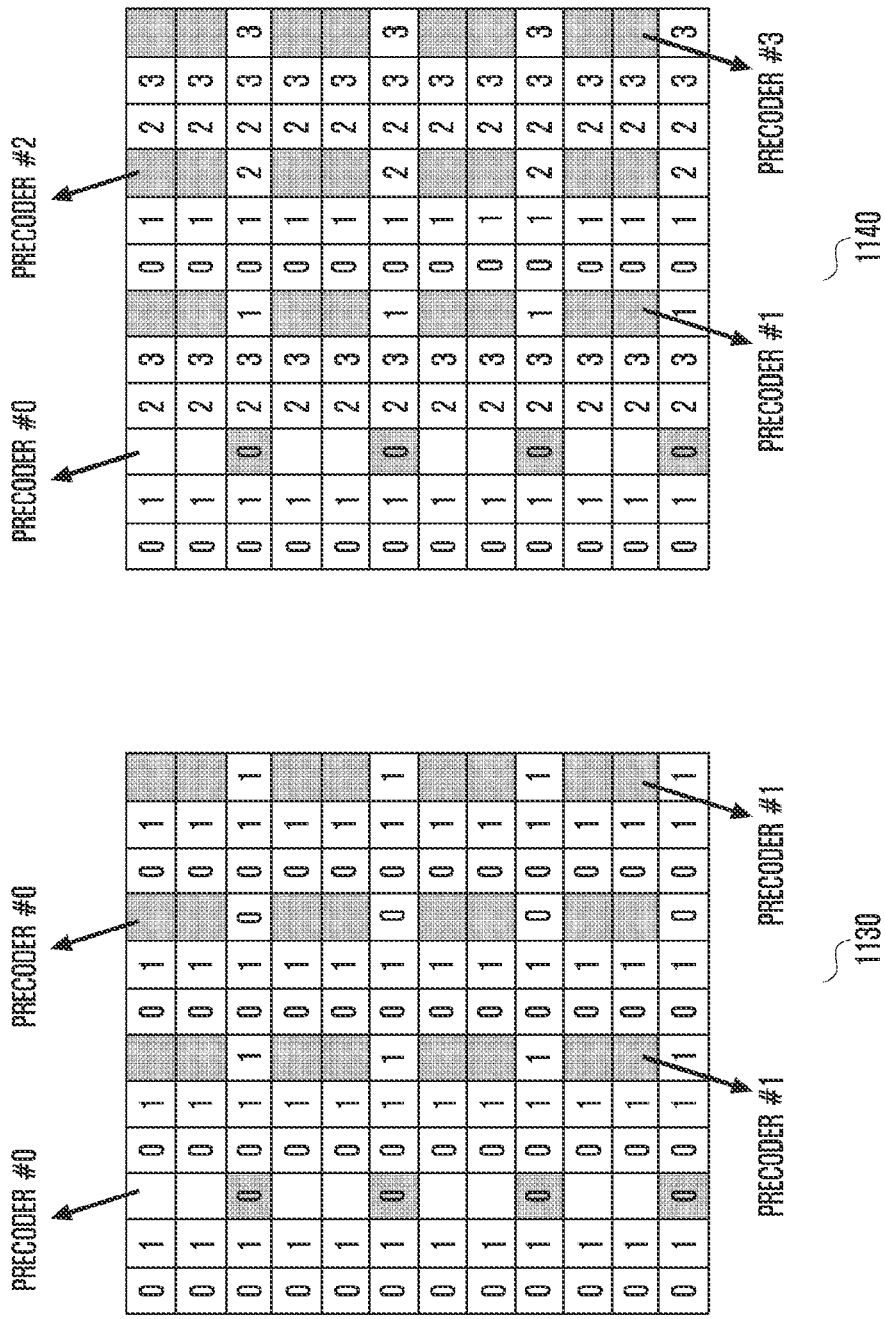

The UE may transmit uplink signals by applying different precodings using a plurality of DMRS ports for each time unit resource in order to perform uplink diversity-based transmission. FIGS. 11A and 11B illustrate an example in which different precodings are applied to time resource units proposed by the present embodiment on the assumption that the number of DMRS ports which is the same as the number of transmitted ranks.

It is assumed that the UE circulates the precoder for each slot or mini-slot as indicated by reference numerals 1110 and 1120. For example, as indicated by reference numeral 1110, a first slot is transmitted using DMRS port 0 and a second slot is transmitted using DMRS port 1. This is a method of supporting diversity transmission based on precoder cycling using the DRMS port transmitted for each slot or mini-slot on the basis of the DMRS structure in which some REs of one symbol are used for one DMRS port.

The precoder cycling method has an advantage in that diversity transmission can be supported for the UE without any increase in overhead of the DMRS port. The UE may estimate a channel of the corresponding unit resource through a channel of the DMRS port of the unit resource allocated for the corresponding precoder.

As indicated by reference numerals 1130 and 1140, a method of circulating two or four precoders for each OFDM symbol on the basis of the DRMS structure in which some REs of one symbol are used for one DMRS port is illustrated. The method indicated by reference numerals 1130 and 1140 may have a shorter precoder cycling unit and thus may obtain higher diversity than the method indicated by reference numerals 1110 or 1120.

Embodiment 1-3

Figure 12:
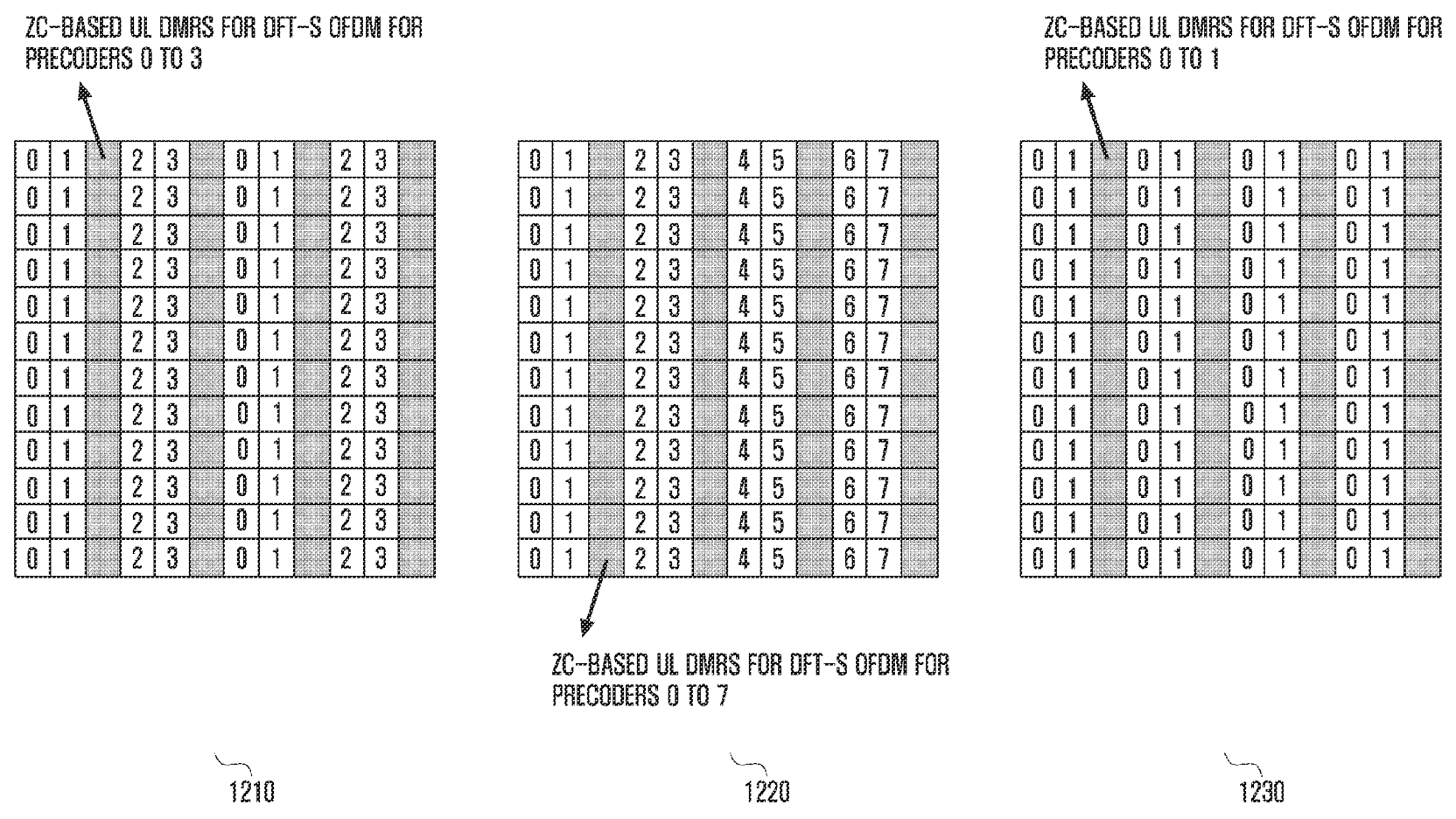

FIG. 12 illustrates an example of precoder cycling in units of time based on the assumption that DMRSs are transmitted in one entire symbol.

In FIG. 12, it is assumed that Zadoff-Chu sequence is used for the DMRS, but various sequences such as pseudo noise (PN), gold sequence, or CDM may be supported. A ZC-based non-orthogonal DMRS multiplexing method may support a relatively larger number of DMRS ports within one symbol. Accordingly, as indicated by reference numeral 1210, different precodings for each OFDM symbol may be applied using a plurality of DMRS ports within one RB. Examples in which different precodings are applied to OFDM symbols using a plurality of DMRS ports are indicated by reference numerals 1220 and 1230. At this time, the base station may allocate and indicate a plurality of DMRSs for the transmission to the UE, and the UE receiving the same may transmit data through the plurality of DMRS ports. The method may provide larger diversity gains through time unit precoding cycling even when resources are allocated to the UE in a smaller number of RBs, and additional diversity gains may be expected by adding and using precoder cycling at the PRB or PRG level. Further, the method uses the same precoder in the time unit and thus can be applied to uplink data transmission using DFT-S OFDM.

Embodiment 1-4

Figure 13:
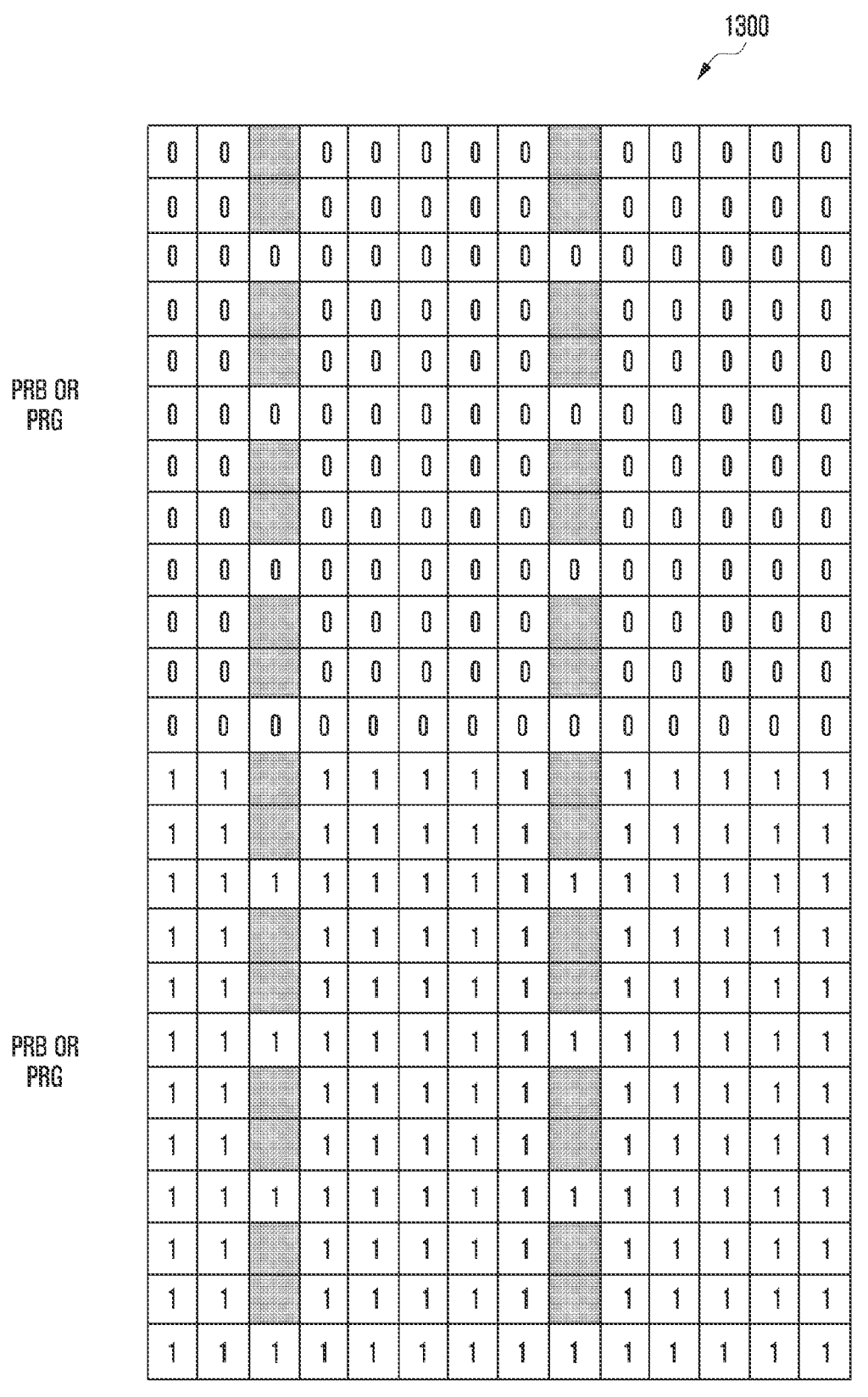

The UE may transmit uplink signals by applying different precodings using a plurality of DMRS ports for each RB or PRG in order to perform uplink diversity-based transmission. FIG. 13 illustrates an example in which different precodings are applied to RBs or PRGs proposed by the present embodiment based on the assumption that two DMRS ports are used.

In FIG. 13, the UE may apply different precodings to REs through the number of DMRS ports which is the same as the number of ranks transmitted for each RB or PRG by the UE. At this time, the base station may allocate and indicate DMRSs for the transmission to the UE, and the UE receiving the same may transmit data through the DMRS ports. Since the precoder cycling at the RB or PRG level uses different precoders for each frequency, the precoder cycling may not be used for uplink data transmission using DFT-S OFDM and is efficient in the case of CP-OFDM is used.

Embodiment 1-5

The base station may transmit the following information to the UE for uplink transmission.

Carrier indicator—indicates which carrier is used for corresponding uplink transmission.

Frequency hopping indicator—indicates whether frequency hopping is performed.

RB allocation and hopping resource allocation—allocates RBs and hopping resources to be used for uplink transmission by the UE. Analysis of the field may vary depending on whether the UE receives information indicating that hopping is performed from the hopping indicator.

MCS and RV—indicates RV required for demodulation, channel coding, and HRQ operation to be used for uplink transmission by the UE.

New data indicator—indicates whether corresponding data is new data.

DMRS indicator—indicates a DMRS port required for corresponding data transmission. If OCC-based orthogonal multiplexing is supported, necessary OCC information may also be transmitted, and in the case of ZC sequence-based transmission, cyclic shift information required for the ZC sequence may also be transmitted.

CSI request indicator—triggered when aperiodic channel state information is needed SRS request indicator—triggered when aperiodic SRS transmission is needed.

Resource allocation type—indicate resource allocation type required for uplink transmission.

Transmitted rank indicator (TRI)—indicates rank information required for uplink transmission.

Transmitted precoding matrix indicator (TPMI)—indicates PMI information required for uplink transmission. At this time, only the wideband TPMI can be transmitted in order to reduce DCI overhead, and if possible, both the wideband TPMI and the subband TPMI can be transmitted.

The base station may indicate diversity transmission to the UE on the basis of the information, and when the UE receives the indication, the UE may receive indication of diversity transmission from the base station through TRI information. For example, precoder cycling is applied to a specific rank, and if another rank is indicated, precoder cycling is not applied. [Table 4] shows such an embodiment.

TABLE 4

| Example 1 | RI = 1, rank1 transmission with non-diversity transmission |
| | RI > 1, rank 1 transmission with diversity transmission with RI precoders |
| Example 2 | RI = 1, rank1 transmission with non-diversity transmission |
| | RI = 2, rank2 transmission with non-diversity transmission |
| | RI > 1, rank 1 transmission with diversity transmission with n precoders |

If the base station indicates rank 1 transmission to the UE as shown in example 1 of FIG. 4, the UE may not support precoder cycling nor diversity-based transmission. If transmission of rank 2 or higher is indicated, the UE applies precoder cycling or diversity-based transmission. As shown in example 2, the UE does not support diversity-based transmission in transmission of rank 2 or lower. Only when transmission of rank 3 or higher is indicated, the UE can apply precoder cycling or diversity-based transmission or different transmission may be applied to other ranks other than ranks 2 and 3. Accordingly, the base station may indicate diversity-based transmission without any additional DCI bit or DCI format for diversity-based transmission.

At this time, the existing codebook may be used for the diversity-based transmission. FIG. 14A illustrates an example of using the codebook for the diversity-based transmission.

In FIG. 14A, it is assumed that the UE receives allocation of a TRI of 3 and a TPMI of 0 and precoder cycling for each RB mentioned in embodiment 1-4 is applied. At this time, precoding indicated by TPMI may be applied to a cycling unit used for cycling. That is, a precoder 1400 for layer 0 may be applied to RB #0, a precoder 1410 for layer 1 may be applied to RB #1, and a precoder 1420 for layer 2 may be applied to RB #2. It has been described only based on <embodiment 1-4>, the description can be applied to all of <embodiment 1-1> to <embodiment 1-4> and other diversity-based transmission methods.

The TRI may be indicated separately from the TPMI but indicated together with the TPMI. [Table 6] shows a method of indicating the TRI and the TPMI together.

TABLE 6

| One codeword: Codeword 0 enabled Codeword 1 disabled | | Two codewords: Codeword 0 enabled Codeword 1 enabled | |
| --- | --- | --- | --- |
| Bit field mapped to index | Message | Bit field mapped to index | Message |
| 0 | 1 layer: TPMI = 0 | 0 | 2 layers: TPMI = 0 |
| 0 | 1 layer: TPMI = 1 | 1 | 2 layers: TPMI = 1 |
| ... | ... | ... | ... |
| 23 | 1 layer: TPMI = 23 | 15 | 2 layers: TPMI = 15 |
| 24 | 2 layers: TPMI = 0 | 16 | 3 layers: TPMI = 0 |
| 25 | 2 layers: TPM1 = 1 | 17 | 3 layers: TPMI = 1 |
| ... | ... | ... | ... |
| 39 | 2 layers: TPM1 = 15 | 27 | 3 layers: TPMI = 11 |
| 40-63 | reserved | 28 | 4 layers: TPMI = 0 |
| | | 29-63 | Reserved |

In this case, a field for the indication may be referred to as an indicator of precoding information and the number of layers.

A configuration indicating whether to use the method may be indicated using RRC or a DCI field. If the RRC is not configured, it is considered as non-diversity transmission and thus all layers may be transmitted together in the same resource. If RRC is configured, the layer may circulated for each resource as described above. In the case of the indication using the DCI field, corresponding TRI and TPMI information are transmitted on the basis of transmission other than diversity transmission when DCI is 0 and the corresponding TRI and TPMI information are transmitted on the basis of diversity transmission when DCI is 1. At this time, a rank used for diversity transmission may be fixed to a lower rank which is different from the actually indicated rank, for example, to rank 1 or rank 2. To this end, support using another table is possible.

The embodiment has an advantage in that the number of precoders required for precoder cycling can be dynamically controlled. For example, if rank 3 transmission and rank 4 transmission are configured and all of the transmissions can use rank 1 transmission based on diversity, the base station may indicate rank 3 when three precoder cycling-based transmission is desired and indicate rank 4 when four precoder cycling-based transmission is desired, and the UE may decode downlink data on the basis of precoder cycling based on the indication of the base station.

In addition, each rank indication may also support diversity-based transmission of other ranks. For example, rank 3 may support diversity-based transmission of rank 1 and rank 4 may support diversity-based transmission of rank 2.

Embodiment 1-6

In order to allow the base station to transmit uplink diversity transmission to the UE and the UE to receive such an indication, the UE may receive an indication of a plurality of SRS resources among SRS resources configured through RRC in advance from the base station.

In the NR system, the base station may detect a channel state in a beam direction in which the UE performs transmission through an SRS transmitted by the UE and indicate again the SRS resources to the UE, so that the UE may identify a beam direction required for uplink data transmission. In addition, the UE may identify how many antenna ports of the codebook are used for transmission of the UE through the indicated SRS resources and how codebook subset restriction of the corresponding codebook is configured.

At this time, detailed information on the SRS required for SRS transmission may be configured. An SRS transmission band, a transmission period, and a slot (or subframe or mini-slot) offset may be configured. Further, the number of antenna ports or the cyclic shift and transmission comb for ZC sequence transmission may also be transmitted for each SRS group.

In order to efficiently use SRS resources for the indication, some of the SRS resources configured through a higher layer such as RRC may be activated in advance and then only some of the activated resources may be indicated through DCI. Particularly, in the case of a high frequency band, a data beam width of the UE becomes narrower due to reduction in a form factor, and accordingly, support of a large number of beams and support of the number of SRS resources according thereto may be needed. At this time, it is possible to optimize resources to be suitable for the UE location and an optimal beam group by activating and deactivating the SRS resources. A method of actually transmitting the SRS may be described below.

SRS resource configuration and trigger method 1: configures a plurality of aperiodic SRS sources in advance, activate some of the configured resources, and triggers some of the activated resources.

SRS resource configuration and trigger method 2: configures a plurality of aperiodic SRS resources in advance and periodically transmits corresponding CSI-RS resources according to activation until deactivation.

SRS resource configuration and trigger method 1 is a method of configuring a plurality of aperiodic SRS resources in advance, activating some of the configured resources, and triggering some of the activated resources. For activation of the resources, the base station may transmit an activation signal through a MAC control element (CE) signal. Upon receiving a DCI trigger for corresponding SRS resource transmission from the base station, the UE receiving the activation signal may transmit the corresponding SRS.

SRS resource configuration and trigger method 2 is a method of configuring a plurality of semi-persistent SRS resources in advance and periodically transmitting the corresponding SRS resources according to activation until deactivation. For activation of the resources, the base station may transmit an activation signal through a MAC CE signal. Further, the base station may activate or deactivate candidate resources through the MAC CE signal, and actual activation or deactivation may be performed through some DCI of the activated candidate resources through the MAC CE signal.

FIG. 14B illustrates an example of an operation for activating SRS candidate resources through the MAC CE and actually activating SRS candidate resources through DCI. Referring to FIG. 14B, the base station activates report candidate resources through the MAC CE in step 1430. In order to receive and then activate the signal, the UE requires time X in step 1440, and then the UE receives DCI for activating report resources from the base station in step 1450. Thereafter, the UE receives DCI for deactivating report resources in step 1460 and receives an MAC CE for deactivating report candidate resources in step 1470. In order to receive and then deactivate the signal, the UE requires time Y in step 1480. For diversity transmission in <Embodiment 1-1> to <Embodiment 1-4> based on the SRS candidate resources, the UE may receive an indication of a plurality of SRS resources or SRS sets. Further, in order to identify a beam for precoder cycling in <Embodiment 1-1> to <Embodiment 1-4>, a plurality of SRS resources may be applied to each cycling unit. For example, precoding applied to a UL DMRS 0 to support precoder cycling illustrated in FIG. 8 may be transmitted on the basis of first indicated SRS resources and precoding applied to a UL DMRS 1 may be transmitted on the basis of second indicated SRS resources. The application may be equally performed on other embodiments, and a different number of SRS resources or SRS sets may be indicated according to the number of circulated precoders. Further, the plurality of SRS resources may be applied together with subband precoding.

FIG. 15 illustrate time and frequency resources used to transmit uplink data by a plurality of UEs.

As illustrated in FIGS. 15A to 15C, uplink transmission allocation varies depending on a channel state of a UE. Particularly, transmission power in uplink is limited due to characteristics of a battery of the UE and hardware limitation. Accordingly, it is required to consider characteristics of allocation of resources different from those in downlink. The UE having a good channel state may transmit uplink data using a wide frequency band and a short time as indicated by reference numeral 1510. This is because sufficient data can be transmitted only with transmission power of the UE since a channel state between the UE and the base station is good. The UE transmits data using somewhat limited frequency bands and an increased time as indicated by reference numeral 1520. This is because the UE has a relatively worse channel state than the UE indicated by reference numeral 1510. In uplink, power spectral density of the frequency may be increased by decreasing the transmission band and increasing the transmission time as illustrated in FIG. 15. Further, although transmission power of the UE is limited within a specific time, an effect of improving actual coverage of UE transmission data can be obtained by repeatedly using the same power. In addition, if the channel between the UE and the base station is very bad, resources may be allocated to transmit a signal for a long time in a very narrow band as indicated by reference numeral 1530.

As illustrated in FIG. 15, the characteristic of uplink transmission is different according to each UE, and thus precoding-related information required when the UE performs transmission may also be different according to each band. Accordingly, the base station indicates one SRS if the UE supports the entire band precoding and the base station indicates SRS resources or SRS resource sets which are the same as or smaller than the number of subbands or the number of bandwidth parts which corresponds to sets of subbands etc., thereby supporting of uplink transmission of the UE. Further, the UE may identify how many antenna ports of the codebook are used for transmission of the UE through the indicated SRS resources and how codebook subset restriction of the corresponding codebook is configured.

The plurality of SRS resources or SRS sets may be indicated to the UE from the base station using a plurality of the same SRS resource or SRS set indication fields. Whether the indicated SRS resources or SRS sets are used for subband precoding or diversity-based transmission is provided on the basis of a DCI field, a MAC CE, or an RRC field. For example, the corresponding SRS sets may be used for subband precoding if the DCI field is 0, and the corresponding SRS sets may be used for diversity-based transmission if the DCI field is 1. Further, whether to perform subband precoding-based transmission or diversity-based transmission is configured through RRC or the MAC CE, and the corresponding SRS resources may be used for the configured purpose according to the result of the configuration. That is, it may be understood that the beam is circulated on the frequency axis (in the case of subband precoding) and on the time axis (in the case of diversity).

At this time, for the transmission, subband precoding or second precoding per each SRS resource may be transmitted through the MAC CE or RRC. Accordingly, it is possible to reduce DCI overhead and receive precoding information.

Further, the numbers of a plurality of configured SRS antenna ports are all the same or only one of the number of antenna ports may be configured. Unlike the base station supporting a relatively larger number of antennas (for example, 16 ports or 32 ports), the UE has a relatively smaller number of antennas due to a form factor of the corresponding UE. Accordingly, there may be little need to differently configure the number of corresponding antennas, and it is possible to reduce complexity depending on varying the number of antenna ports of resources supported by subband precoding and also reduce UL DCI overhead through the same wideband TPMI by making the numbers of antenna ports of all SRS resources the same.

The example in which the SRS resource field for subband precoding and the diversity-based SRS resource field are supported based on the same field and the indication of the corresponding field is different on the basis of the DCI, MAC CE, and/or RRC field has been proposed, the SRS resource field may be shared with fields other than the diversity-based field and the subband precoding field. For example, in the case of rank >1 transmission, if the indication of a plurality of SRS resources or SRS sets for supporting different beam corresponding to each layer is possible, the indication may be performed using the same field.

Embodiment 1-7

The base station may indicate the use of diversity transmission to the UE through the following methods in order to determine whether the UE uses diversity transmission.

Diversity transmission use indication method 1: indication through DCI

Diversity transmission use indication method 2: indicates RRC or MAC CE

Diversity transmission use indication method 3: indication to the UE through the number of SRS resources Diversity transmission use indication method 1 is a method of indicating the use of diversity transmission through DCI. When the base station schedules uplink data transmission for the UE, the base station may transmit information such as the TRI, the wideband TPMI, and the resource allocation through UL DCI as described above. Further, the base station may indicate whether diversity transmission is used through 1 bit. For example, the base station indicates the use of one precoding or the same number of precodings as that of ranks if the bit is 0 and the use of diversity transmission or precoder cycling if the bit is 1.

When the UE receives an indication of diversity transmission through the one bit, preconfigured information, for example, through subband TPMI information within the same DCI, subband TPMI information of second DCI, or MAC CE, subband TPMI information configured in advance may be identified, or through RRC, subband TPMI information configured in advance may be identified. At this time, if the UE receives the subband TPMI through the MAC CE or RRC, the corresponding subband TPMI information may be configured according to each SRS resource which can be indicated to the UE or has been configured, and the UE may identify the subband TPMI through the corresponding one bit information and the indicated SRS resources.

Diversity transmission use indication method 2 is a method of indicating whether diversity transmission is used through RRC or the MAC CE. By configuring whether to use diversity transmission in the UE through RRC or the MAC CE, the UE may identify whether the corresponding diversity transmission is used. In this case, there is an advantage in that an amount of information of UL DCI which the base station transmits to the UE is reduced and thus coverage of the UL DCI can be guaranteed.

Diversity transmission use indication method 3 is a method of indirectly indicating whether diversity transmission is used through the number of SRS resources indicated to the UE. As described above, in order to perform SRS-based diversity transmission, the indication of a plurality of SRS resources or resource sets is needed. Accordingly, only when the plurality of corresponding SRS resources or resource sets are indicated, the UE can perform diversity transmission. Further, the operation can be performed only when the operation is configured to be performed through RRC. At this time, a DCI bit for the SRS indication may be determined by the maximum number of SRS resources which can be indicated in order to reduce the number of blinding decodings of DCI. If the SRS indication is not transmitted, non-transmission of the indication may be provided through a specifically fixed value (for example, 0 means that the SRS is not indicated).

In addition, the diversity transmission use indication methods may include a combination of a plurality of methods. For example, if indication methods 2 and 3 are simultaneously satisfied (if the use of diversity transmission is configured in advance through RRC and the number of indicated and configured SRS resources is larger than a predetermined number), diversity transmission can be performed. In another example, if all of indication methods 1, 2, and 3 are satisfied, diversity transmission can be performed.

In order to indicate the plurality of SRS resources described above, SRS sets may be indicated using an indication field as shown in [Table 7].

TABLE 7

| SRS indicator | notification |
|---|---|
| 00 | SRS set 1 |
| 01 | SRS set 2 |
| 10 | SRS set 3 |
| 11 | SRS set 4 |

Information on which SRS resources are indicated by each SRS set through RRC or the MAC CE may be configured through a bitmap. If the field is used, DCI overhead generated by the SRS resource indication can be reduced and SRS resources can be effectively indicated.

In addition, whether to indicate a plurality of SRS resources may be expressed using one bit of DCI. As described above, one SRS resource is indicated when wideband precoding is supported. At this time, in transmission based on one SRS resource, a beam direction is more important than in transmission based on a plurality of SRS resources, and accordingly, the larger degree of freedom may be needed. On the other hand, the indication of a plurality of SRS resources generates too much DCI overhead under the large degree of freedom. Accordingly, the SRS indication field may indicate one SRS resource if one bit is 0 on the basis of the DCI field of one bit, and the SRS indication field may indicate a plurality of SRS resources or the plurality of SRS resources are indicated using the plurality of SRS set indication fields similar to the example of [Table 7] if one bit is 1.

Embodiment 1-7

When <Embodiment 1-1> to <Embodiment 1-4> are applied to the UE, the method may be differently applied according to a waveform used by the UE. <Embodiment 1-1> and <Embodiment 1-4> cannot be supported if DFT-S OFDM is used, and the two embodiments can be applied if CP-OFDM is used. Accordingly, one or both of <Embodiment 1-1> and <Embodiment 1-4> can be supported if CP-OFDM is used and <Embodiment 1-2> and <Embodiment 1-3> can be supported if DFT-S OFDM is used. Further, all available diversity transmission can be supported if CP-OFDM is used and only <Embodiment 1-2> and <Embodiment 1-3> can be supported if DFT-S OFDM is used.

Embodiment 1-8

The relation between the precoding, the DMRS, and the SRS may be defined as follows.

Precoding, DMRS, and SRS relation definition method 1: the relation is defined on the basis of the sequence indicated to the UE through DCI.

Precoding, DMRS, and SRS relation definition method 2: the relation is indirectly defined through SRS resource ID.

Precoding, DMRS, and SRS relation definition method 3: the relation is directly defined to the UE by the base station through RRC configuration or MAC CE configuration.

Precoding, DMRS, and SRS relation definition method 1 is a method of defining the relation is defined on the basis of the sequence indicated to the UE through DCI. According to the method, precoding of a first layer is indicated through a first indicated DMRS port and SRS resources and precoding of a second layer is indicated through a second indicated DMRS port and SRS resources on the basis of precoding indicated to the UE. That is, a beam according to precoding of a first layer indicated to the UE and SRS resources is associated with a DMRS first indicated by the base station. Through the method, the base station may have an advantage of flexibly configuring diversity-based transmission in the DMRS port and the SRS resources without additional overhead of the UE.

Precoding, DMRS, and SRS relation definition method 2 is a method of indirectly defining the relation through an SRS resource ID. That is, precoding of a low layer in the indicated precoding information is applied to a DMRS port having a low port number among the indicated DMRSs and an SRS resource having a low SRS resource ID. The method has an advantage of reducing indication overhead and implementation complexity.

Precoding, DMRS, and SRS relation definition method 3 is a method of directly defining the relation to the UE by the BS through RRC or MAC CE configuration. Which layer of precoding is mapped to the DMRS port may be configured in advance according to the order indicated through the RRC field.

In addition, a plurality of methods may be used together for the precoding, DMRS, and SRS relation definition method. For example, a combination of definition methods 1 and 2 is a method of applying a DMRS port having a low port number and precoding of a low layer to the DMRS and indicating an SRS through an indicated order. Further, a method of applying the port having a low number and precoding of a low layer to the DMRS and applying configuration by RRC or MAC CE to the SRS may be used.

According to the embodiments of the disclosure, various sequences such as a gold sequence, a pseudo random noise (PN) sequence, a ZC sequence, and a constant amplitude zero autocorrelation waveform) sequence may be applied to the DMRS. Further, according to the embodiment, it is assumed that the DMRS pattern is configured on 8 REs in one symbol, but various patterns such as 6 REs may be used.

The embodiments are made based on uplink diversity transmission but may be used for downlink and sidelink diversity transmission.

In order to apply the embodiments, layer shifting may be considered in the case of transmission of rank larger than 1. For example, in the case of rank 2, it is assumed that DMRS ports 0 and 1 are sequentially used for layers 0 and 1 if transmission is performed using precoder 0, and DMRS ports 1 and 0 are sequentially used for layers 0 and 1 if transmission is performed using precoder 1. Such a principle may be equally applied to transmission of a higher rank larger than or equal to 3.

Further, ranks available for the diversity transmission may be limited. This is because the corresponding diversity gain decreases as the number of ranks increases in the diversity transmission.

Figure 16:
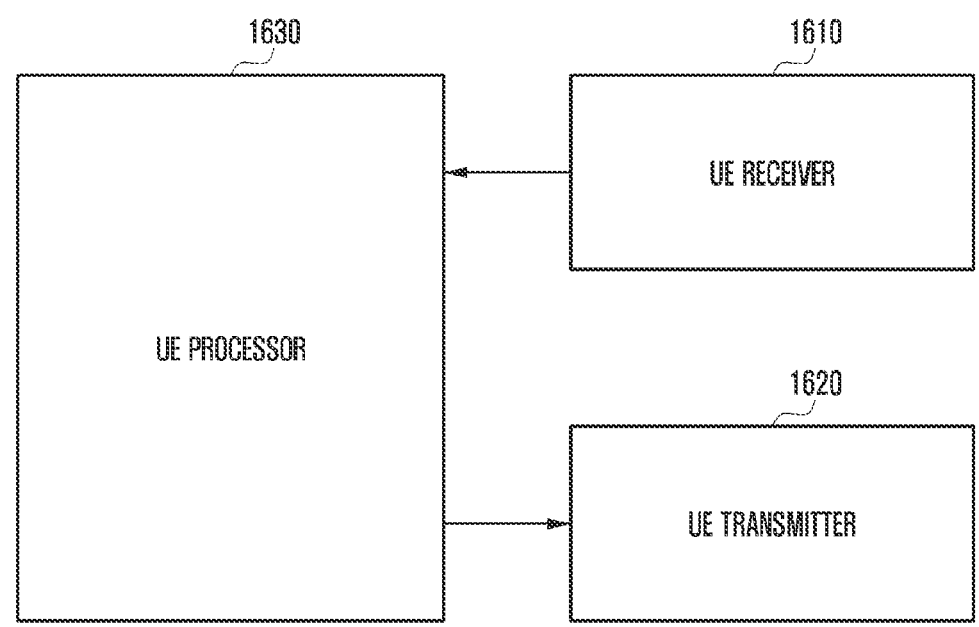
FIG. 16 is a block diagram illustrating an internal structure of the UE according to an embodiment of the disclosure.
Figure 17:
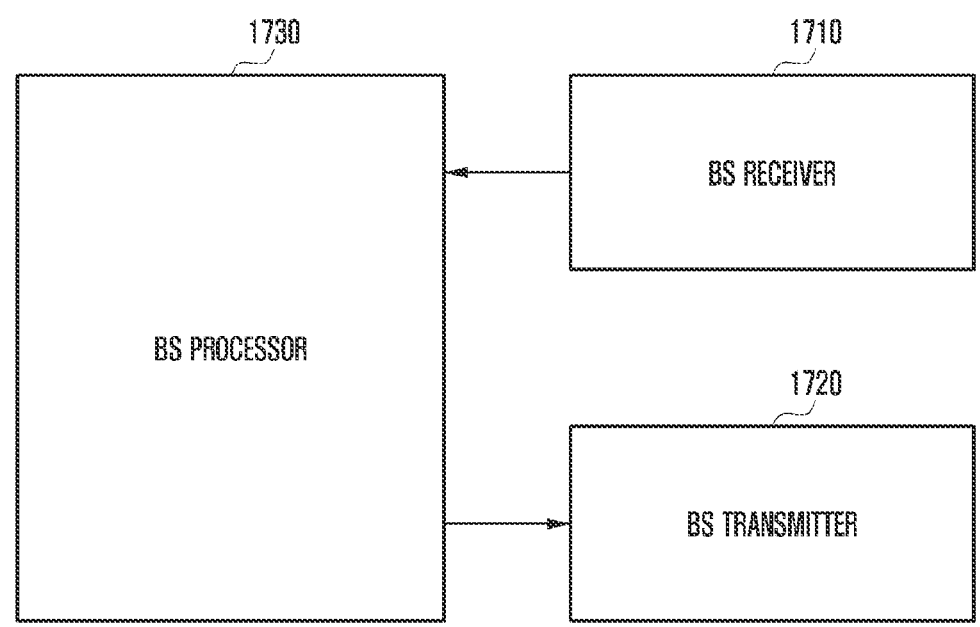
FIG. 17 is a block diagram illustrating an internal structure of the base station according to an embodiment of the disclosure.

In order to implement the above-described embodiments of the disclosure, a transmitter, a receiver, and a processor of each of the UE and the base station are illustrated in FIGS. 16 and 17. The receiver, the processor, and the transmitter of the base station and the UE should operate according to embodiments in order to implement the embodiments.

FIG. 16 is a block diagram illustrating an internal structure of the UE according to an embodiment of the disclosure. As illustrated in FIG. 16, the UE according to the disclosure may include a UE receiver 1610, a UE transmitter 1620, and a UE processor 1630. The UE receiver 1610 and the UE transmitter 1620 may be collectively referred to as a transceiver in embodiments of the disclosure. The transceiver may transmit and receive a signal to/from the base station. The signal may include control information and data. To this end, the transceiver includes an RF transmitter that up-converts and amplifies a frequency of a transmitted signal, an RF receiver that low-noise amplifies a received signal and down-converts the frequency, and the like. Also, the transceiver may receive a signal through a radio channel, output the signal to the UE processor 1630, and transmit the signal output from the UE processor 1630 through the radio channel.

The UE processor 1630 may control a series of processes such that the UE operates according to the above-described embodiments of the disclosure. For example, the UE receiver 1610 may receive a signal including indication signal transmission timing information from the base station, and the UE processor 1630 may perform control to analyze signal transmission timing. Thereafter, the UE transmitter 1620 transmits a signal at the timing.

FIG. 17 is a block diagram of the internal structure of a base station (BS) according to an embodiment of the disclosure. As illustrated in FIG. 17, the base station according to the disclosure may include a base station receiver 1710, an base station transmitter 1720, and an base station processor 1730. The base station receiver 1710 and the base station transmitter 1720 are commonly called a transceiver in the embodiments of the disclosure. The transceiver may transmit and receive a signal to/from the UE. The signal may include control information and data. To this end, the transceiver includes an RF transmitter that up-converts and amplifies a frequency of a transmitted signal, an RF receiver that low-noise amplifies a received signal and down-converts the frequency, and the like. Also, the transceiver may receive a signal through a radio channel, output the signal to the base station processor 1730, and transmit the signal output from the base station processor 1730 through the radio channel.

The base station processor 1730 may control a series of processes such that the base station operates according to the above-described embodiments of the disclosure. For example, the base station processor 1730 may determine a processing method and perform control to generate processing method information to be transmitted to the UE. Thereafter, the base station transmitter 1720 may transmit the information to the UE.

Further, according to an embodiment of the disclosure, base station processor 1730 may perform control to generate downlink control information including reference signal processing information for uplink precoding.

Second Embodiment

A wireless communication system has developed to be a broadband wireless communication system that provides a high speed and high quality packet data service, like the communication standards, for example, high speed packet access (HSPA) of 3GPP, long term evolution (LTE) or evolved universal terrestrial radio access (E-UTRA), LTE-advanced (LTE-A), high rate packet data (HRPD) of 3GPP2, ultra mobile broadband (UMB), and 802.16e of IEEE, or the like, beyond the voice-based service provided at the initial stage. 5G or new radio (NR) communication standard is researched as the $5^{th}$ generation wireless communication system.

An LTE system, which is a representative example of the broadband wireless communication system, employs an orthogonal frequency division multiplexing (OFDM) scheme for a downlink (DL), and employs a single carrier frequency division multiple access (SC-FDMA) scheme for an uplink (UL). The uplink is a radio link through which a user equipment (UE) (or a mobile station (MS)) transmits data or a control signal to an base station (BS) (or an eNode B (eNB)), and the downlink is a radio link through which the base station transmits data or a control signal to the UE. In such a multi-access scheme, time-frequency resources for carrying data or control information are allocated and operated in a manner to prevent overlapping of resources, that is, to establish orthogonality, between users so as to identify data or control information of each user. Hereinafter, the LTE system may include LTE and LTE-A systems.

When decoding fails at the initial transmission, the LTE system employs hybrid automatic repeat request (HARQ) that retransmits the corresponding data in a physical layer. In the HARQ scheme, when a receiver does not accurately decode data, the receiver transmits information (negative acknowledgement: NACK) informing a transmitter of a decoding failure and thus the transmitter may re-transmit the corresponding data on the physical layer. The receiver combines the data re-transmitted by the transmitter with the data of which the previous decoding failed, thereby increasing the data reception performance. Also, when the receiver accurately decodes data, the receiver transmits information (acknowledgement: ACK) informing the transmitter of decoding success, so that the transmitter may transmit new data.

Figure 18:
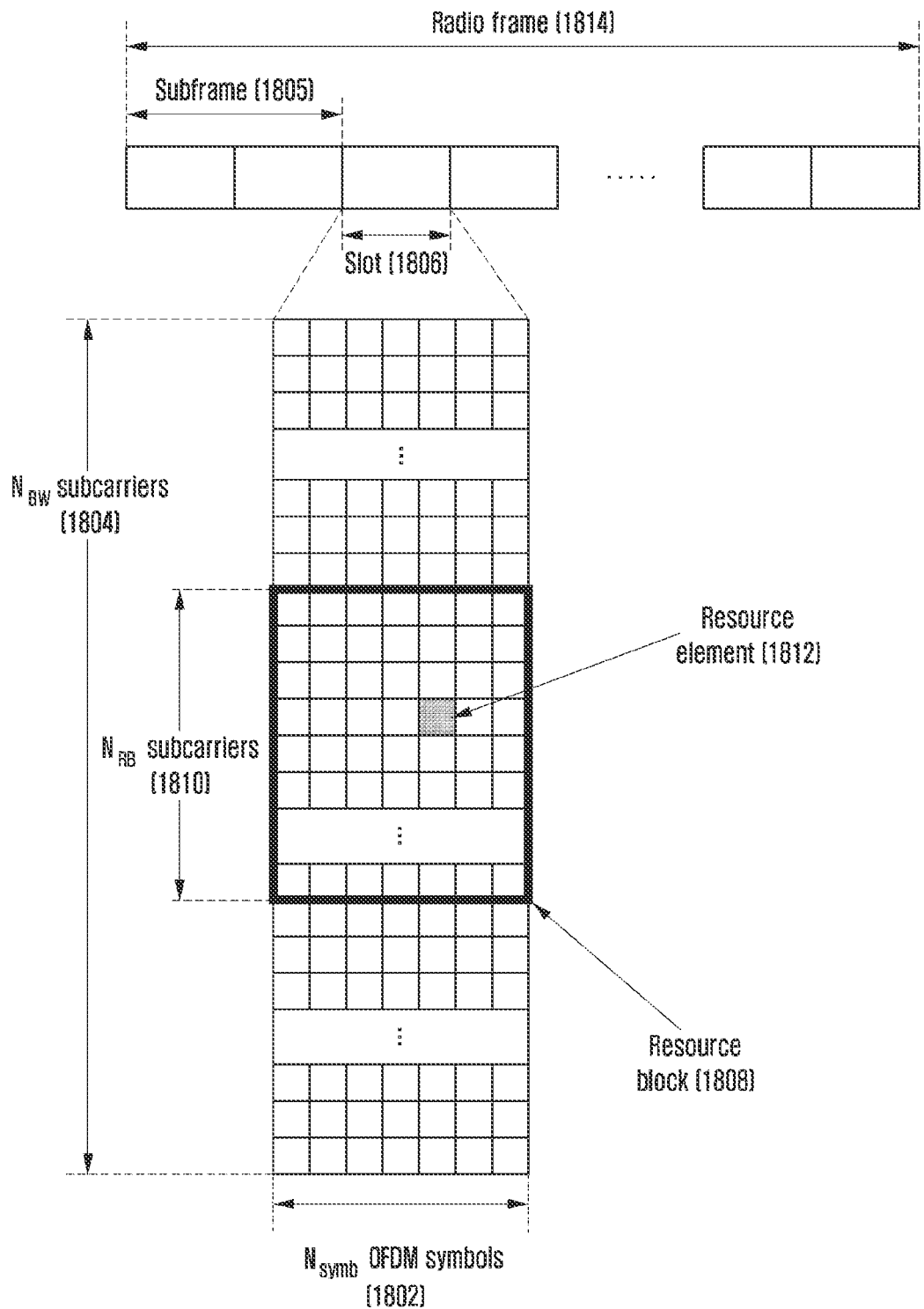
FIG. 18 illustrates the basic structure of a time-frequency region which is a radio frequency region in which a data or control channel is transmitted in downlink of the LTE system.

FIG. 18 illustrates the basic structure of a time-frequency region which is a radio frequency region in which a data or control channel is transmitted in downlink of the LTE system.

In FIG. 18, the horizontal axis indicates a time region and the vertical axis indicates a frequency region. A minimum transmission unit in the time region is an OFDM symbol. One slot 1806 consists of $N^*_{s}b$ OFDM symbols 1802 and one subframe 1805 consists of 2 slots. The length of one slot is 0.5 ms, and the length of one subframe is 1.0 ms. A radio frame 1814 is a time region interval consisting of 10 subframes. A minimum transmission unit in the frequency region is a subcarrier, and the bandwidth of an entire system transmission band consists of a total of New subcarriers 1804.

A basic unit of resources in the time-frequency region is a resource element (RE) 1802 and may be indicated by an OFDM symbol index and a subcarrier index. A resource block (RB or physical resource block (PRB)) 1808 is defined by $N_{symb}$ successive OFDM symbols 1802 in the time region and $N_{RB}$ successive subcarriers 1810 in the frequency region.

Therefore, one RB 1808 includes $N_{symb} \times N$ REs 1812. In general, a minimum transmission unit of data is the RB unit. In the LTE system, generally, $N_{symb}=7$ and $N_{RB}=12$. $N_{BW}$ is proportional to a system transmission bandwidth. A data transmission rate increases in proportion to the number of RBs scheduled to the UE.

The LTE system defines and operates 6 transmission bandwidths. In the case of a frequency division duplex (FDD) system that operates by separating a downlink and an uplink by frequency, a downlink transmission bandwidth and an uplink transmission bandwidth may be different from each other. A channel bandwidth may indicate an RF bandwidth corresponding to a system transmission bandwidth. [Table 1] indicates the relationship between a system transmission bandwidth and a channel bandwidth defined in the LTE system. For example, when the LTE system has a channel bandwidth of 10 MHz, the transmission bandwidth may consist of 50 RBs.

TABLE 8

| | Channel bandwidth $BW_{Channel}$ (MHz) | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Figure 19:
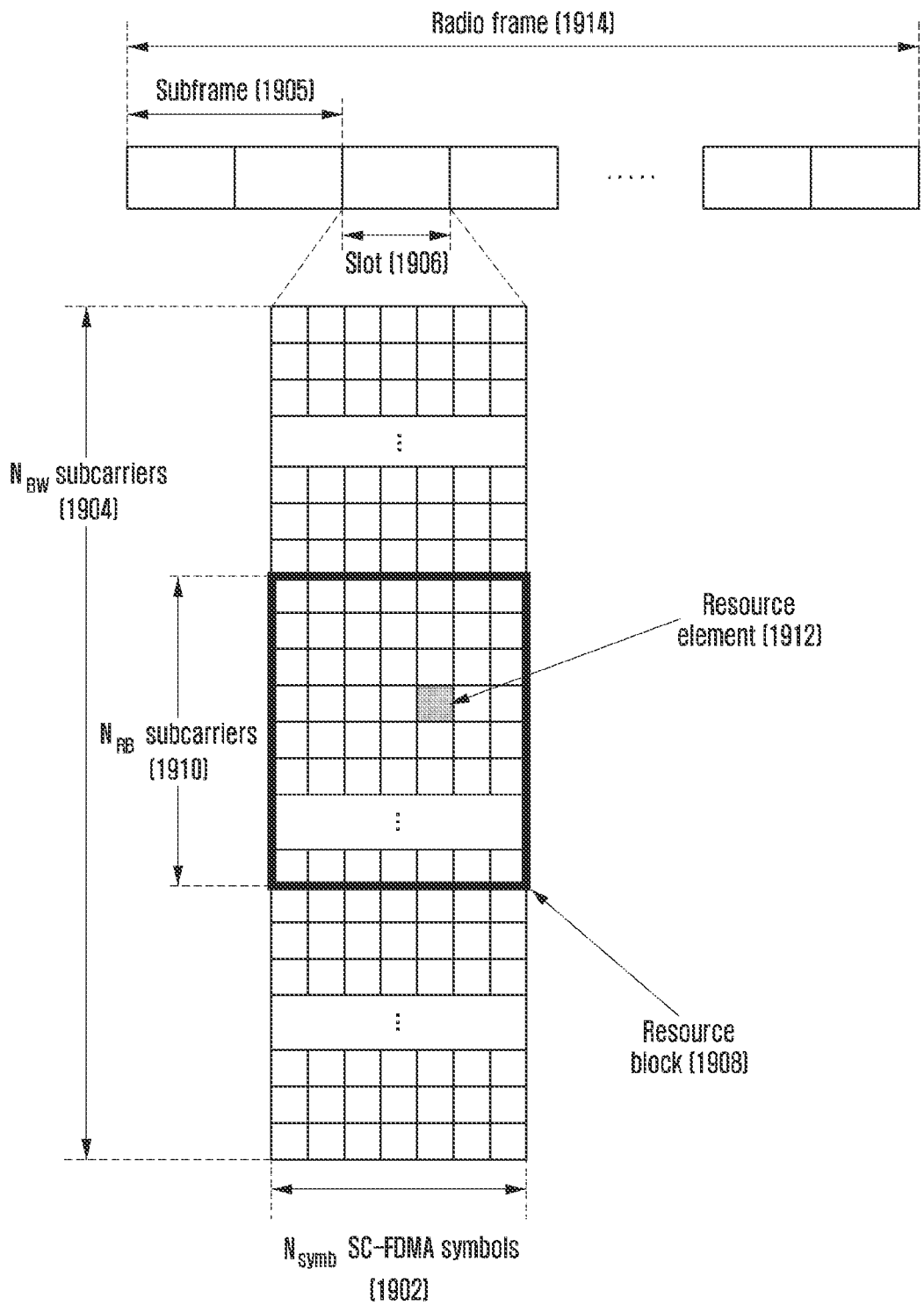
FIG. 19 illustrates the basic structure of a time-frequency region which is a radio frequency region in which a data or control channel is transmitted in uplink of the LTE system.

FIG. 19 illustrates the basic structure of a time-frequency region which is a radio resource region in which a data or control channel is transmitted in uplink of the LTE system according to the prior art.

Referring to FIG. 19, the horizontal axis indicates the time region and the vertical axis indicates the frequency region. A minimum transmission unit in the time region is an SC-FDM system 1902 and one slot 1906 consists of $N_{symb}$ SC-FDMA symbols. One subframe 1905 consists of two slots. A minimum transmission unit in the frequency region is a subcarrier and an entire system transmission band (transmission bandwidth) 1904 consists of a total of $N_{BW}$ subcarriers. $N_{BW}$ has a value, which is proportional to a system transmission band.

A basic unit of resources in the time-frequency region is a resource element (RE) 1912 and may be defined by an SC-FDMA symbol index and a subcarrier index. A resource block (RB) 1908 is defined by $N_{symb}$ successive SC-FDMA symbols in the time region and $N_{BW}$ successive subcarriers in the frequency region. Therefore, one RB consists of $N_{symb} \times N_{RB}$ REs. In general, a minimum transmission unit of data or control information is an RB. A PUCCH is mapped to a frequency region corresponding to 1 RB, and may be transmitted during one subframe.

Figure 20:
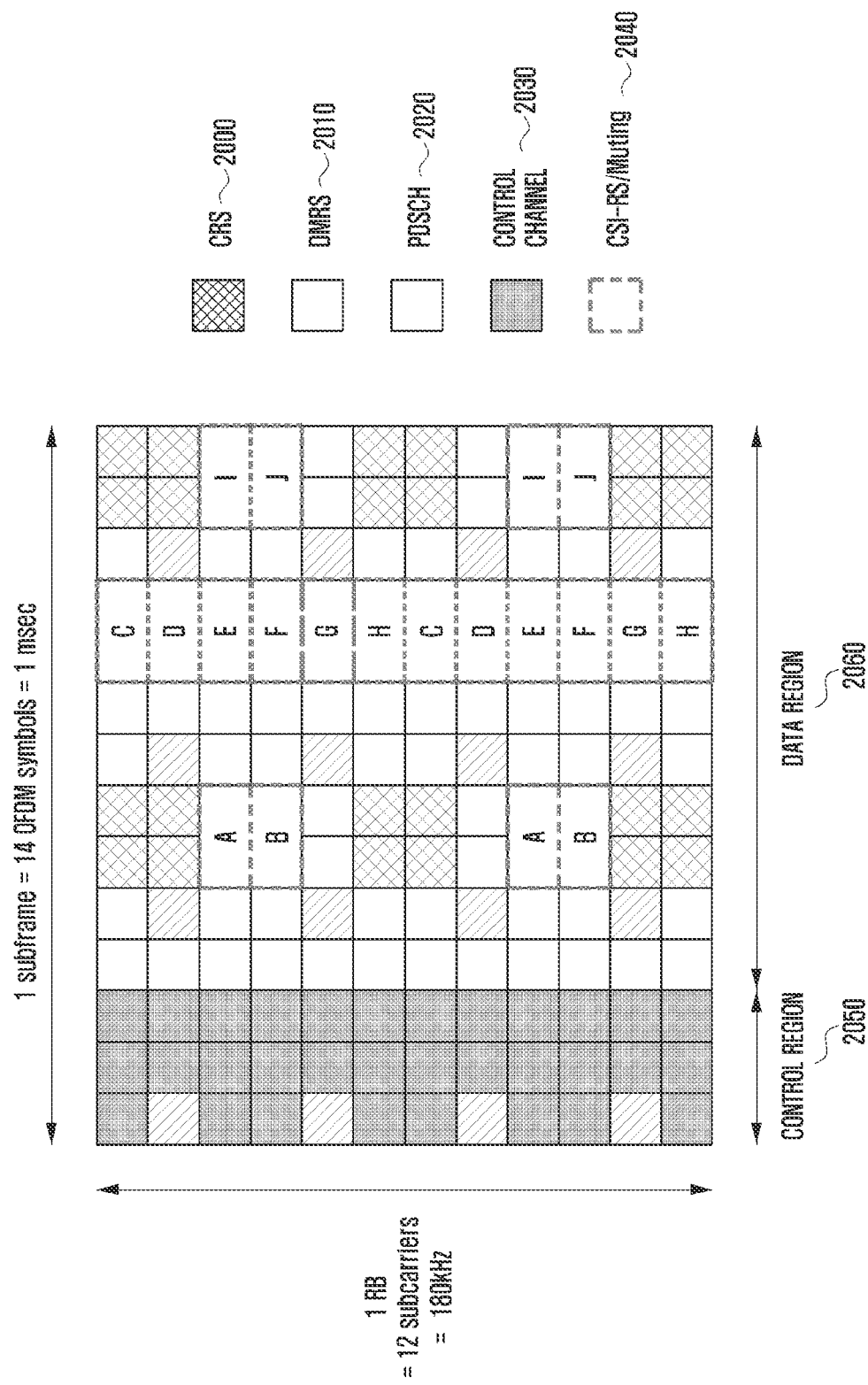
FIG. 20 illustrates radio resources of one RB which is the minimum unit of scheduling in downlink of the LTE system.

FIG. 20 illustrates radio resources of one RB which is the minimum unit of scheduling in downlink of the LTE system. In radio resources illustrated in FIG. 20, a plurality of different types of signals described below may be transmitted.

1. Cell specific RS (CRS) 2000: refers to a reference signal periodically transmitted for all UEs belonging to one cell and may be used by a plurality of UEs in common.
2. Demodulation reference signal (DMRS) 2010: refers to a reference signal transmitted for a specific UE and is transmitted only when data is transmitted to the corresponding UE. The DMRS may include a total of 8 DMRS ports. In the LTE system, port 7 to port 14 correspond to DMRS ports, and the ports maintain orthogonality to prevent interference therebetween through CDM or FDM.
3. Physical downlink shared channel (PDSCH) 2020: used when the base station transmits traffic to the UE through a data channel transmitted through downlink and transmitted using an RE where a reference signal is not transmitted in a data region of FIG. 20.
4. Channel status information reference signal (CSI-RS) 2040: refers to a reference signal transmitted for UEs belonging to one cell and is used to measure a channel status. A plurality of CSI-RSs may be transmitted in one cell.
5. Other channels (a physical hybrid-ARQ indicator channel (PHICH), a physical control format indicator channel (PCFICH), and a physical downlink control channel (PDCCH)) 2030: used when the UE provides control information required for receiving a PDSCH or to transmit ACK/NACK for operating HARQ of uplink data transmission. They are transmitted in a control region 2050.

Figure 21:
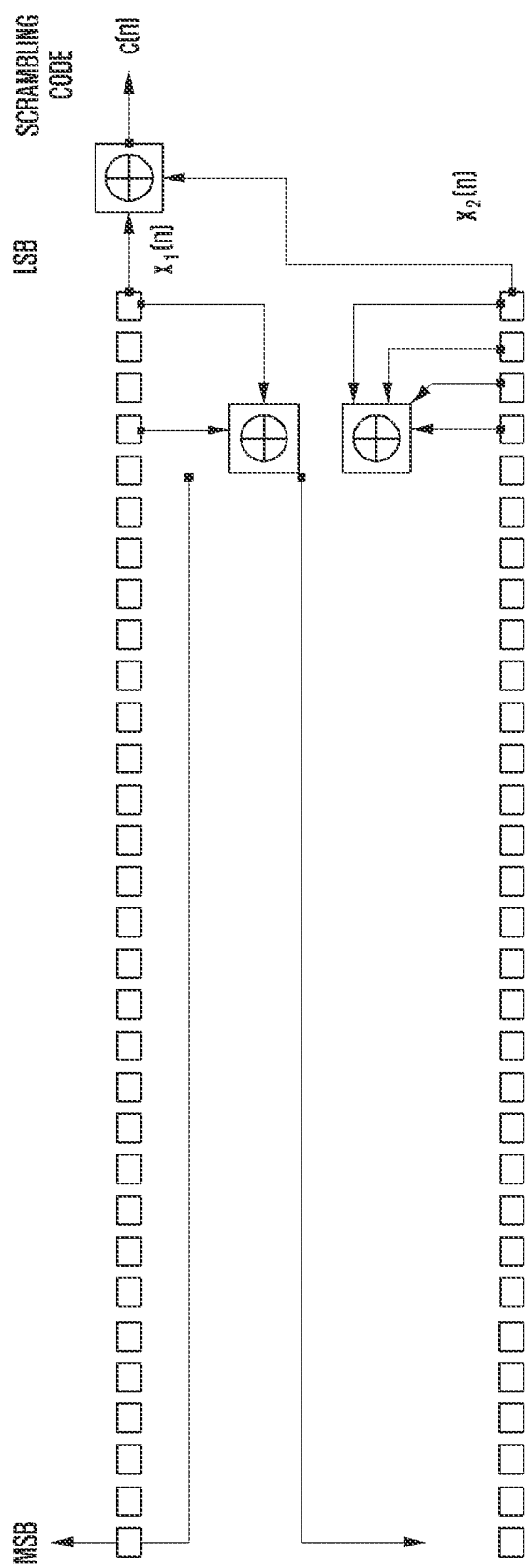
FIG. 21 illustrates an example of a method of generating a DMRS.

FIG. 21 illustrates an example of a method of generating a DMRS. DMRSs are generated from a pseudo-random (PN) sequence based on a gold sequence of the length 31 as illustrated in FIG. 21. More specifically, as illustrated in FIG. 21, a PN sequence C(n) may be generated by concatenating a first m-sequence $x_1(n)$ generated from a polynomial D31+D3+1 of a higher register and a second m-sequence $x_2(n)$ generated from a polynomial D31+D3+D2+D+1 of a lower register, and the processor may be expressed by [Equation 9].

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{[Equation 9]}$$

$N_c=1600$ and register initialization is performed as follows.

The first m-sequence $x_1(n)$ generated from the higher register is initialized into a fixed pattern of $x_1(0)=1$, $x_1(n)=0$, n=1, 2, . . . , 30.

The second m-sequence $x_2(n)$ generated from the lower register is initialized into [Equation 10] below under a scrambling condition required by each signal.

$$c_{init} = \sum_{i=0}^{30} x_2(i) \cdot 2^i \quad \text{[Equation 10]}$$

More specifically, in the case of the DMRS, [Equation 10] may be expressed by [Equation 11] below in order to transmit a DMRS port $p=5$.

$$c_{init}=(\lfloor n_s/2 \rfloor+1) \cdot (2N_{ID}^{cell}+1) \cdot 2^{16}+n_{RNTi} \quad \text{[Equation 11]}$$

In the above equation, $n_s$ denotes a slot number within a transmission frame and $n_{RNTI}$ denotes a UE ID. $N_{ID}^{cell}$ denotes a cell ID. Unlike this, [Equation 10] may be expressed by [Equation 12] below in order to transmit a DMRS port $p \in \{7, 8, \ldots, 14\}$ $$c_{init}=(\lfloor n_s/2 \rfloor+1) \cdot (2n_{ID}^{(nSCID)}+1)+n_{SCID} \quad \text{[Equation 12]}$$

In the equation, $n_s$ denotes a slot number within a transmission frame, and $n_{SCID}$ denotes a scrambling ID having a value of 0 or 1 and it is assumed that the value of the scrambling ID is 0 unless mentioned specifically. $n_{ID}^{(i)}, i=1$ is determined as follows.

$n_{ID}^{(i)} = N_{ID}^{cell}$ if no value for $n_{ID}^{DRMS,i}$ is provided by higher layers or if DCI format 1A, 2B or 2C is used for the DCI associated with the PDSCH transmission $n_{ID}^{(i)} = n_{ID}^{DRMS,i}$ otherwise As described above, in the case of the DMRS, initialization is performed in every subframe, and a reference signal for transmitting a DMRS port p∈{7, 8, . . . , 14} is expressed by [Equation 13].

$$r(m) = \frac{1}{\sqrt{2}}(1-2\cdot c(2m)) + j\frac{1}{\sqrt{2}}(1-2\cdot c(2m+1)), \quad \text{[Equation 13]}$$

$$m = \begin{cases} 0, 1, \ldots, 12N_{RB}^{max,DL} - 1, normalcyclicprefix \\ 0, 1, \ldots, 16N_{RB}^{max,DL} - 1, extendedcyclicprefix \end{cases}$$

$$N_{RB}^{max,DL} = 110,$$

which indicates a maximum number of RBs supported for downlink in the LTE system. In the case of the LTE system, since a fixed DMRS pattern is used for each of a normal CP and an extended CP, the DMRS sequence as shown in [Equation 13] may be generated in consideration of the number of DMRS REs per PRB.

However, unlike the LTE system, the 5G wireless communication system considers support of the DMRS structure which can be configured as well as an increased cell ID, an increased channel bandwidth, support of various subcarrier spacings, support of slot-based transmission and slot aggregation, and DMRS bundling on the time. If such various matters are configured, the DMRS sequence generation method may also be different. The DMRS sequence of the NR system may be UE-specifically generated, transmission and reception point (TRP)-specifically generated, or resource-specifically generated. Accordingly, the DMRS operation method may be different. Therefore, the disclosure proposes a DMRS sequence generation method reflecting such matters.

Hereinafter, an embodiment of the disclosure will be described in detail with reference to the accompanying drawings. Although embodiments of the disclosure are described as examples of the LTE or LTE-A system, the embodiments of the disclosure may be also applied to other communication systems having a similar technical background or channel form. For example, 5 generation mobile communication technology (5G, new radio (NR)) developed after LTE-A may be included therein. In the NR system, the basic structure of the time-frequency region in which downlink and uplink signals are transmitted may be different from that of FIGS. 18 and 19, and the type of the signal transmitted in downlink and uplink may also be different. However, an embodiment of the disclosure can be applied to other communication systems through some modifications without departing from the scope of the disclosure on the basis of determination of those skilled in the art.

In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

Hereinafter, the base station is the entity that allocates resources to the UE and may be one of an eNode B, a Node B, a base station (BS), a radio access unit, an base station controller, and a node on a network. The UE may include a user equipment (UE), a mobile station (MS), a cellular phone, a smartphone, a computer, and a multimedia system capable of performing a communication function. In the disclosure, a downlink (DL) refers to a wireless transmission path of a signal that the base station transmits to the UE, and an uplink (UL) refers to a wireless transmission path of a signal that the UE transmits to the base station.

In the following description, a demodulation reference signal (DMRS) is a reference signal having a characteristic by which the UE can perform demodulation without additional reception of precoding information after a reference signal to which UE-specific precoding is applied is transmitted, and the name thereof used in the LTE system is directly used. However, the term DMRS may be exchangeable with another term according to the user's intention and for the purpose of the use of a reference signal. For example, the DMRS may be interchangeable with a UE-specific signal (UE-specific RS) or a dedicated reference signal (dedicated RS).

More specifically, the term DMRS is only a specific example to easily describe the technology of the disclosure and help understanding of the disclosure, and it is apparent to those skilled in the art that the operation can be performed through other terms based on the technical idea of the disclosure. The term single-user multi-input and multi-output (SU-MIMO) or multi-user MIMO (MU-MIMO) is also used to easily describe the technology of the disclosure and help understanding of the disclosure, and it is apparent to those skilled in the art that the operation of the disclosure can be performed through other terms or without the terms.

Embodiment 2-1

<Embodiment 2-1> describes a method of transmitting DMRSs according to a plurality of orthogonal DMRS antenna ports.

Figure 22A:
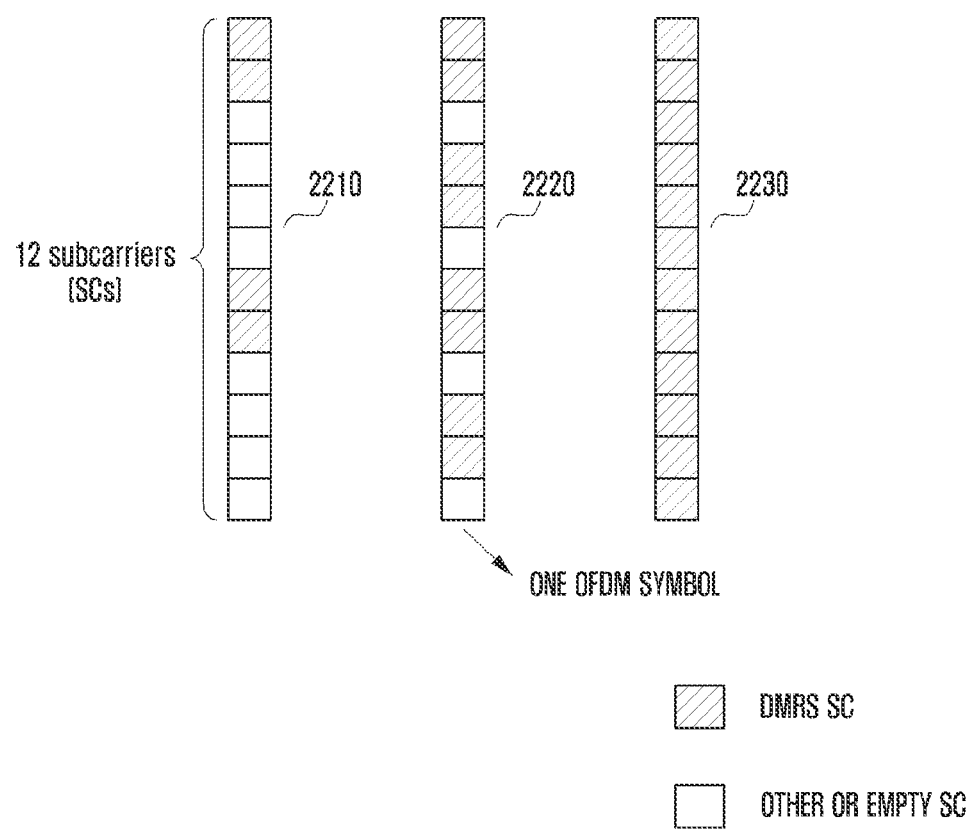
FIG. 22A illustrates an example of the unit DMRS structure proposed by the disclosure.

Specifically, the DMSR structure proposed by the disclosure will be described with reference to FIGS. 22A and 22B. FIG. 22A illustrates an example of the unit DMRS structure proposed by the disclosure. The unit DMRS structure based on one OFDM symbol is advantageous to configure the location of a reference signal for various transmission time intervals (TTIs), support low latency, configure the location of a reference signal for URLLC, and in terms of scalability such as antenna port extension.

As illustrated in FIG. 22A, 12 subcarriers may be included in one OFDM symbol on the basis of a PRB which is a minimum transmission unit of data. Density of a DMRS subcarrier (SC) can be configured in one OFDM symbol as indicated by reference numerals 2210, 2220, and 2230. Reference numerals 2210 and 2220 indicate DMRS structures in which four and eight DMRS SCs are included in twelve subcarriers, respectively, and reference numeral 2230 indicates the DMRS structure in which all subcarriers are used as DMRS SCs. The use of the DMRS structure proposed by FIG. 22A of the disclosure is not limited to a data channel.

The DMRS structure 2210 may be used in an environment in which a small number of DMRS SCs are configured and thus an antenna port of a lower number is supported or a channel change on the frequency is small. The DMRS structure 2210 may be used for a mini-slot or a control channel requiring a relatively lower DMRS density. In contrast to this, the DMRS structure 2220 may be used in an environment in which a large number of DMRS SCs are configured and thus an antenna port of a higher number is supported or a channel change on the frequency is large. Further, the DMRS structure 2220 may be used to improve the channel estimation performance by increasing the DMRS density in a low signal to noise ratio (SNR) area.

While a fixed DMRS pattern may be used for each of a normal CP, an extended CP, and a multicast broadcast single frequency network (MBSFN) subframe in the LTE system, the proposed DRMS pattern 2220 may be used for the extended CP or the MBSFN DMRS in the NR system. Configuring the DMRS with an even number of DMRS SCs as indicated reference numerals 2210 and 2220 may have advantages in that no orphan RE is made if spacing frequency block coding (SFBC) of a transmit diversity scheme is considered.

An SC which is not used as the DMSR SC in the DMRS structures 2210 and 2220 may be used for data or another signal such as another reference signal or may be empty for DMRS power boosting. If the SC which is not used as the DMRS SC is empty for DMRS power boosting, the performance of DMRS channel estimation in a low SNR region may be improved. Further, the DMRS structures 2210 and 2220 have subcarriers that do not transmit the DMRS, and thus a portion thereof may be used as a direct current (DC) subcarrier.

For example, under consideration of various numerologies, a method of using the DC subcarrier together with the DMRS structure 2220 will be described through reference numerals 2240, 2250, and 2260 of FIG. 22B. FIG. 22B illustrates an example in which DC subcarriers are arranged according to the DMRS structure proposed by the disclosure. The DMRS structure 2210 may use the same method as indicated by reference numerals 2240, 2250, and 2260.

In the situation in which various numerologies can be multiplexed on the time in the NR system, the case in which a signal is transmitted with subcarrier spacing of f0 configured at time t0, the case in which a signal is transmitted with subcarrier spacing of 2*f0 configured at time t1, and the case in which a signal is transmitted with subcarrier spacing of 4*f0 configured at time t2 are illustrated. As illustrated in reference numerals 2240, 2250, and 2260, if a specific SC which is not used as the DMRS SC is configured as a DC subcarrier, the DMRS structure of the disclosure has advantages in that there is no need to change the location of the DC subcarriers according to subcarrier spacing changing over time. However, since the DMRS is transmitted in all subcarriers in the DMRS structure 2230, some of the subcarriers are needed to be punctured to transmit the DC.

The DMRS SCs illustrated in reference numerals 2210 to 2230 may be generated on the basis of the pseudo-random sequence or the Zadoff-Chu (ZC) sequence. More specifically, the DMRS structures 2210 and 2220 may be used in a cyclic prefix (CP)-OFDM system. Further, in uplink/downlink, the DMRS structures may be configured and used at the same time-frequency location. If uplink and downlink have the same DMRS structure, uplink and downlink DMRS ports can be allocated to be orthogonal, so that interference cancelation performance can be improved by more increasing channel estimation performance in a flexible duplex environment.

On the other hand, similar to the LTE system, the DMRS structure 2230 is based on the Zadoff-Chu (ZC) sequence, and may be used in uplink in the case of a discrete Fourier transform-spread-OFDM (DFT-s-OFDM) system. In this case, similar to the LTE system, a low peak-to-average power ratio (PAPR) can be obtained. However, the disclosure is not limited to the method of using the proposed structure 2210 to 2230. For example, the DMRS structure 2230 may be used for all of the CP-OFDM, the DFT-s-OFDM, and the uplink/downlink.

Figure 23:
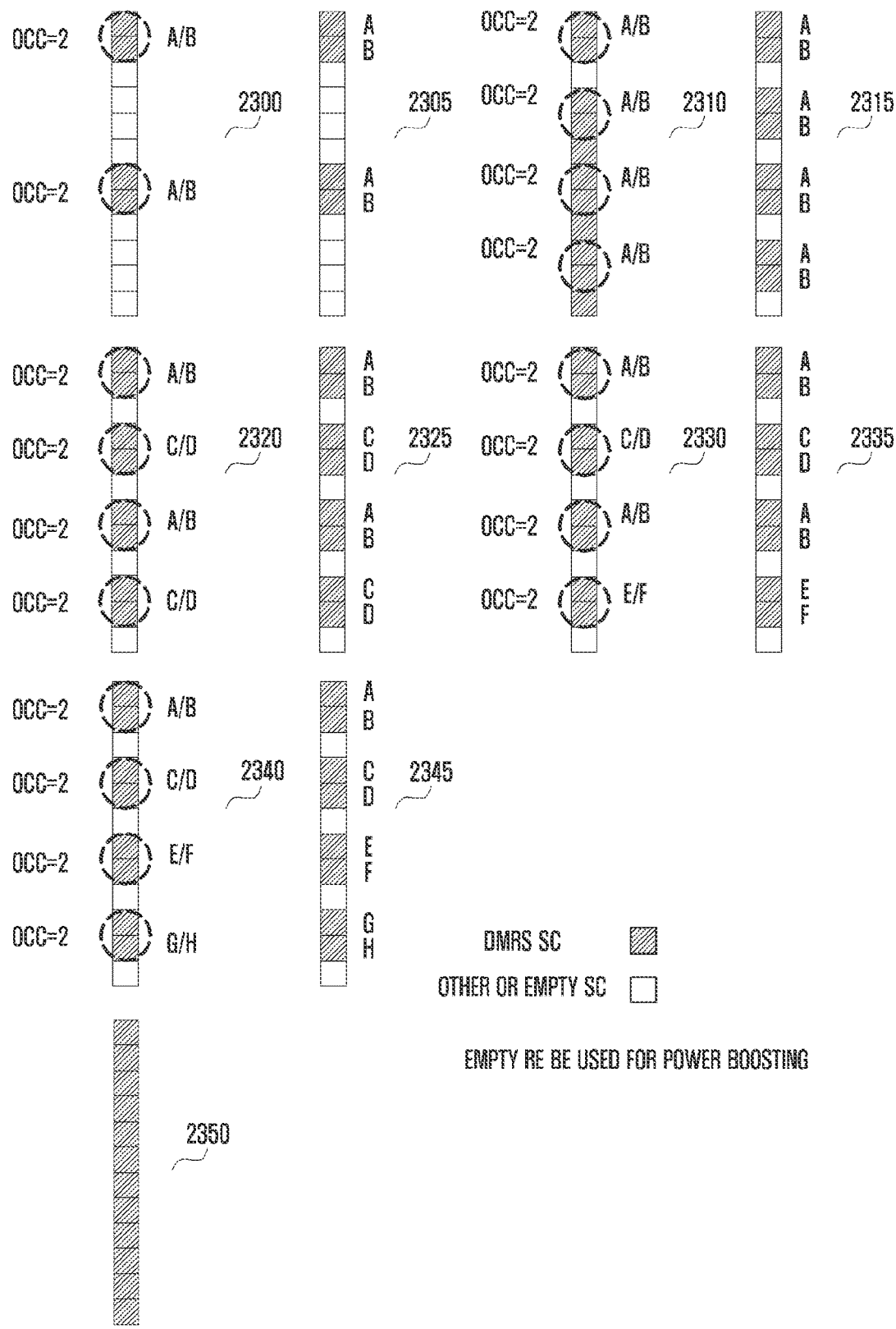
FIG. 23 illustrates an example of a method of mapping antenna ports to the unit DMRS structure proposed by FIG. 22A.

FIG. 23 illustrates an example of a method of mapping antenna ports to the unit DMRS structure proposed by FIG. 22A. In FIG. 23, antenna ports are expressed as p=A, B, C, D, . . . , for convenience. However, antenna port numbers may be expressed as other numbers. Mapping of the antenna ports is to support transmission and ranks of a plurality of layers. Accordingly, the antenna port mapping described below may be related with another term "layer transmission" or "rand support".

Specifically, reference numerals 2300 and 2305 indicate the cases in which two antenna ports are mapped to the DMRS structure 2210. Reference numeral 2300 indicates a method of mapping two antenna ports p=A, B in a frequency division multiplexing (FDM) scheme and a code division multiplexing (CDM) scheme through application of an orthogonal cover code (OCC) having a length of 2, and reference numeral 2300 indicates a method of mapping two antenna ports p=A, B without application of the OCC. Specifically, reference numerals 2310 and 2315 indicate the cases in which two antenna ports are mapped to the DMRS structure 2220. Since the DMRS 2220 has a higher density of the reference signal compared to the DMRS 2210, channel estimation performance can be improved. Reference numeral 2310 indicates the method of mapping two antenna ports p=A, B in the FDM and CDM schemes through application of the OCC having a length of 2, and reference numeral 2315 illustrates the method of mapping two antenna ports p=A, B in the FDM scheme without application of the OCC.

Reference numerals 2320 and 2325 indicate the cases in which four antenna ports are mapped to the DMRS structure 2220. At this time, in order to improve channel estimation performance, subcarriers through which the DMRS is not transmitted in the DMRS structure 2220 are empty and used for DMRS power boosting. Reference numeral 2320 indicates a method of mapping four antenna ports p=A, B, C, D through application of the FDM scheme and the OCC having a length of 2, and reference numeral 2325 illustrates a method of mapping four antenna ports p=A, B, C, D in the FDM scheme without application of the OCC. Reference numerals 2330 and 2335 indicate the cases in which six antenna ports are mapped to the DMRS structure 2220. At this time, in order to improve channel estimation performance, subcarriers through which the DMRS is not transmitted in the DMRS structure 2220 are empty and used for DMRS power boosting. Reference numeral 2330 indicates a method of mapping six antenna ports p=A, B, C, D, E, F in the FDM and CDM schemes through application of the OCC having a length of 2, and reference numeral 2335 illustrates a method of mapping six antenna ports p=A, B, C, D, E, F in the FDM scheme without application of the OCC.

The methods of mapping the antenna ports as indicated by reference numerals 2330 and 2335 have characteristics that a density of reference signals (RSs) for each antenna port is not consistent unlike the antenna port mapping method described above. This is because every UE has a different channel state in the method designated to allocate antenna ports for MU-MIMO, in which case a port having a low RS density may be allocated to a UE having a good channel state and a port having a high RS density may be allocated to a UE having a bad channel state.

Reference numerals 2340 and 2345 indicate the cases in which eight antenna ports are mapped to the DMRS structure 2220. At this time, in order to improve channel estimation performance, subcarriers through which the DMRS is not transmitted in the DMRS structure 2220 are empty and used for DMRS power boosting. Reference numeral 2340 indicates a method of mapping eight antenna ports p=A, B, C, D, E, F, G, H in the FDM and CDM schemes through application of the OCC having a length of 2, and reference numeral 23000 illustrates a method of mapping eight antenna ports p=A, B, C, D, E, F, G, H in the FDM scheme without application of the OCC. The application of the OCC to the frequency region has advantages in that there is no power imbalance problem in reference numerals 2300, 2310, 2320, 2330, and 2340. In the LTE system, if the OCC is applied to the time region, the power imbalance problem may occur and thus different OCCs are used for every PRB within two PRBs.

Last, reference numeral 2350 illustrates the DMRS structure 2230. In the DMRS structure 2230, 12 subcarriers are all used as DMRSs, so that a method of supporting orthogonal DMRS antenna ports using the Zadoff-Chu (ZC) sequence may be considered. At this time, like in the LTE system, based on the assumption that subcarrier spacing is 15 kHz, a maximum of eight orthogonal antenna ports may be supported through application of eight cyclic shift (CS) fields. In another method using the DMRS structure 2230, a method of supporting four orthogonal antenna ports through application of the FDM scheme at four-subcarrier spacing may be considered. The disclosure is not limited to the methods of mapping the antenna ports to the proposed DMRS structures 2300 to 2350.

Figure 24:
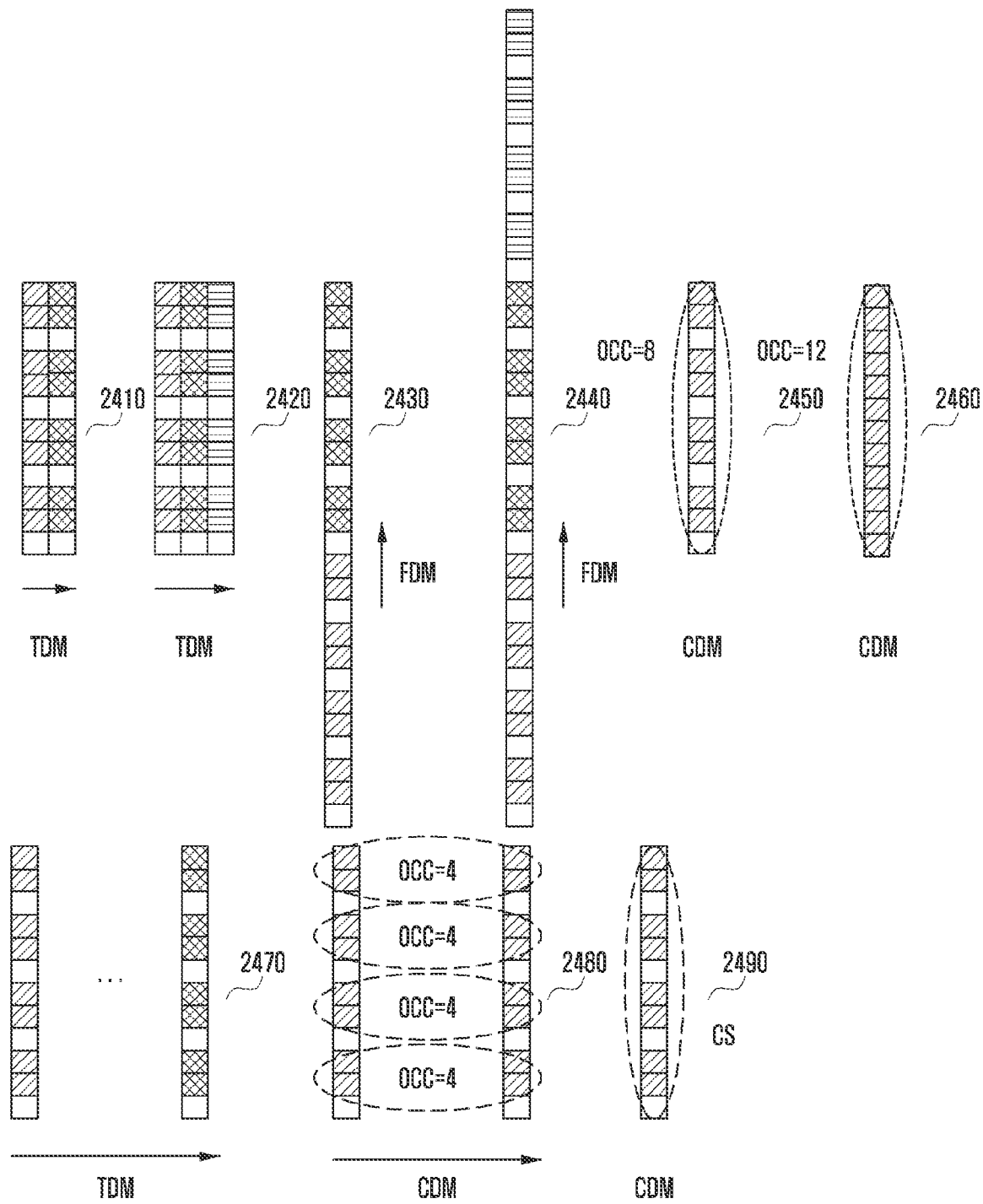
FIG. 24 illustrates an example of a method of mapping a larger number of antenna ports to the unit DMRS structure proposed by FIG. 23.

FIG. 24 illustrates an example of a method of mapping a larger number of antenna ports to the unit DMRS structure proposed by FIG. 23. In order to map a larger number of antenna ports, the DMRS may be configured to additionally apply time division multiplexing (TDM), FDM, and/or CDM to the unit DMRS structure of FIG. 22A. For example, as indicated by reference numerals 2410 and 2420, a larger number of antenna ports can be mapped through TDM of the structure 2220 on the time. If orthogonal antenna ports are extended using TDM, there is an advantage in that the RS density on the frequency is maintained, but there is a disadvantage in that the DMRS density is increased in the transmission unit (one PRB).

In order to maintain the low DMRS density in the transmission unit, a method of extending orthogonal antenna ports using FDM or CDM based on the assumption that a high rank is supported in an environment in which a channel state is very good and selectivity of a channel on the frequency is low may be considered. For example, a larger number of antenna ports can be mapped through FDM of the structure 2220 on the frequency as indicated by reference numerals 2430 and 2440. However, if the number of antenna ports is extended using FDM, there may be a disadvantage in that the transmission unit is extended to several PRBs. A larger number of antenna ports can be mapped through application of an OCC having an extended length as indicated by reference numerals 2450 and 2460. More specifically, reference numeral 2450 indicates a method of multiplexing eight antenna ports through the OCC having the length of 8 as indicated in the structure 2220, and reference numeral 2460 indicates a method of multiplexing twelve antenna ports through the OCC having the length in the structure 2230. The OCC may be generated as a Walsh-Hadamard code.

If all subcarriers are configured as the DMRS SCs as indicated by reference numeral 2230, various antenna port extensions can be performed depending on the antenna port mapping method applied to the structure 2230 as described above. If it is assumed that subcarrier spacing is 15 kHz and eight orthogonal antenna ports are supported by cyclic-shifting the ZC sequence in reference numeral 2230, extension to 16 orthogonal antenna ports is possible through application of TDM as indicated by reference numeral 2140. If FDM is used at an interval of four subcarriers in reference numeral 2230, a maximum of four orthogonal antenna ports may be supported, but if TED is considered as indicated by reference numeral 2410, a maximum of eight orthogonal antenna ports may be supported. Alternatively, as indicated by reference numeral 2420, if additional TDM is considered, a maximum of 12 orthogonal antenna ports may be supported.

The disclosure is not limited to the antenna port extension method presented by FIG. 24. The antenna port extension method can be applied through a combination of TDM, FDM, and CDM, and orthogonal antenna ports can be extended through various methods. For example, as described above, if the antenna ports are extended using only TDM as indicated by reference numeral 2410 or 2420, there is a disadvantage in that the DMRS density increases in the transmission unit. In a method of compensating for the disadvantage, TDM may be applied to contiguous two slots as indicated by reference numeral 2470 and CDM using an OCC having a length of 4 may be applied to contiguous two slots as indicated by reference numeral 2480. The above described is made on the basis of two slots as indicated by reference numerals 2470 and 2480, but the time unit to which TDM or CDM is applied in reference numerals 2470 and 2480 is not limited to the slot.

If the DMRS is generated with the ZC sequence unlike the method of mapping a maximum of eight antenna ports through the application of the OCC having the length of 8 as indicated by reference numeral 2450, additional antenna ports can be supported using the CS as indicated by reference numeral 2490. For example, if the CS is used in the case of multiplexing to four antenna ports through FDM and CDM as indicated by reference 2320, additional antenna port extension is possible. If four CS field are made, antenna ports may be extended to a maximum of 16. If the CS is used instead of the OCC as indicated by reference numeral 2490, there is an advantage in that the RS density on the frequency is maintained.

In the 5G communication system, a plurality of DMRS structures can be configured. For example, the configurable DMRS structures may be divided into a front-loaded DMRS and an extended or additional (hereinafter, extended) DMRS.

Specifically, the front-loaded DMRS is a DMRS located at a front part of a NR-PDSCH for rapid data decoding and may include one or two adjacent OFDM symbols. Further, the front-loaded DMRS is located at the front part of the NR-PDSCH and the location thereof may be fixed or flexible. For example, if the location of the front-loaded DMRS is determined to be a start first symbol of the NR-PDSCH, the front-loaded RS may be flexibly changed by an area of an NR-PDCCH. Advantages of the cases in which the location of the front-loaded DMRS is fixed and flexible will be described. If the location of the front-loaded DMRS is fixed, it may be assumed that a DMRS of a next cell is always transmitted at the same location. However, the front-loaded DMRS may be weak at decoding latency if an area of a control channel can be configured or if a DMRS of a data channel is not located earlier in a subframe in which the control channel is not transmitted.

If the location of the front-loaded DMRS is flexible, the front-loaded RS is always located at a front part of the data channel, and thus there is an advantage in terms of decoding latency. However, as the location of the front-loaded RS varies, the DMRS location in cells is not fixed and there may be a problem about interference control and operation of an advanced receiver. To this end, a method of introducing network signaling may be additionally considered, but a method of configuring a fixed DMRS location is generally more advantageous for system operation. For the reason, a detailed method of configuring the fixed location of the front-loaded DMRS is proposed.

Figure 25:
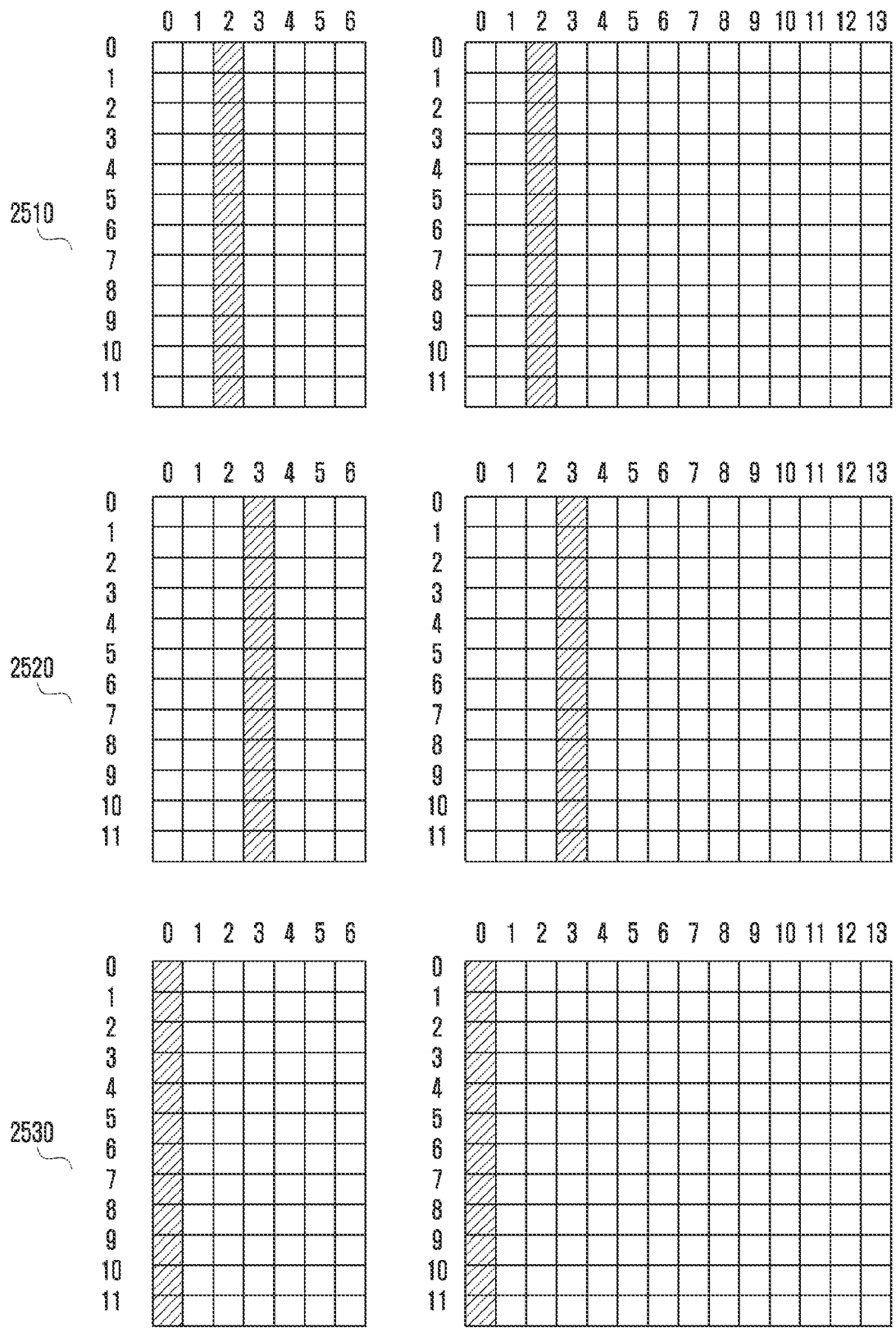
FIG. 25 illustrates the location of the front-loaded DMRS in the case in which a slot length is 7 or 14 OFDM symbols.

FIG. 25 illustrates the location of the front-loaded DMRS in the case in which a slot length is 7 or 14 OFDM symbols. The configuration of the location of the front-loaded DMRS may be determined by an area of the control channel. If the area of the control channel consists of a maximum of two OFDM symbols, the front-loaded DMRS is located at a third OFDM symbol as indicated by reference numeral 2510. If the area of the control channel consists of a maximum of three OFDM symbols, the front-located DMRS is located at a fourth OFDM symbol as indicated by reference numeral 2520. As described above, if the location of the front-loaded DMRS is determined by the maximum number of areas of the control channel which can be configured, there may be a loss to reduce decoding latency when the control channel is not configured in all the areas.

Accordingly, as an extended method, the disclosure proposes another method of configuring the location of the front-loaded DMRS. For example, if the area of the control channel consists of a maximum of two OFDM symbols, an operation of fixing the front-loaded DMRS to a third OFDM symbol as indicated by reference numeral 2510 and an option of fixing the front-loaded DMRS to a first OFDM symbol as indicated by reference numeral 2530 may be configured together. If such two options are configured according to circumstances, a disadvantage of the case in which the location of the front-loaded DMRS is fixed may be compensated for. Specifically, the configuration of a plurality of locations of the front-loaded DRMS may be performed in various ways. For example, a method of semi-static configuration through higher layer signaling such as RRC may be considered. In another method, the location may be configured through system information such as a master information block (MIB) or a system information block (SIB). Further, a method of dynamically configuring the location through DCI may be considered. Unlike this, the location may be configured through semi-persistence scheduling (SPS).

Subsequently, the extended DMRS will be described. The front-loaded DRMS has difficulty in accurately estimating a channel since it is not possible to track a channel rapidly varying on the time in a high Doppler state. Further, it is not possible to correct a frequency offset with the front-loaded DMRS alone. Accordingly, for the reason, it is required to transmit an additional DMRS after the front-loaded DRMS in the slot.

Figure 26:
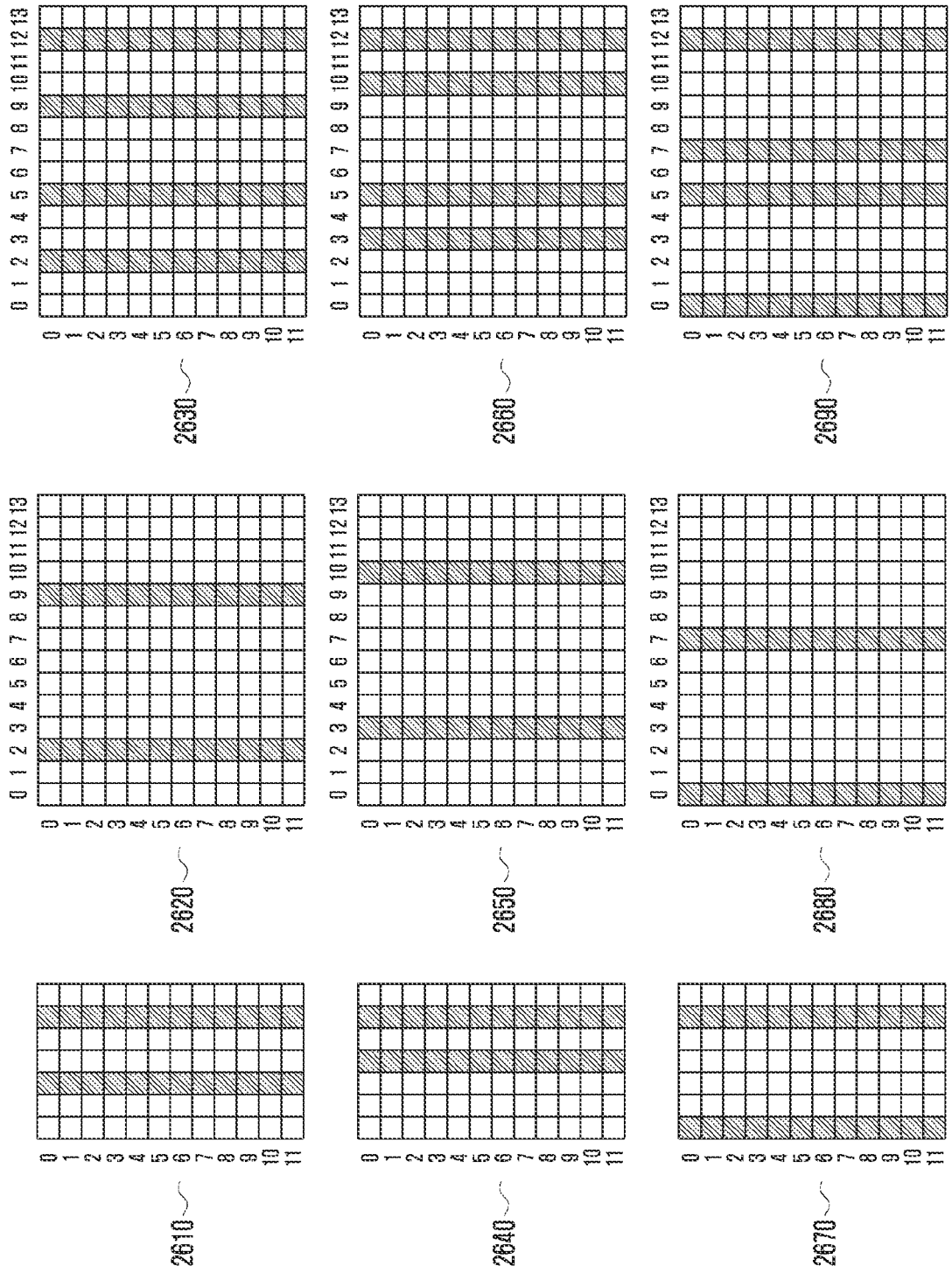
FIG. 26 illustrates the location at which the extended DMRS is transmitted in the case in which the slot length is 7 or 14 OFDM symbols.

FIG. 26 illustrates the location at which the extended DMRS is transmitted in the case in which the slot length is 7 or 14 OFDM symbols. FIG. 26 illustrates the extended DRMS for each of reference numerals 2510, 2520, and 2530 showing the locations of the front-loaded DRMS. The location of the extended DMRS is configured to avoid the location at which the CRS is transmitted in the LTE system as indicated by reference numerals 2610 to 2660. This may have an advantage in terms of influence by an LTE-NR coexistence state. However, in the case of reference numerals 2670 to 2690, the location of the front-loaded DMRS overlaps the location at which the CRS is transmitted in the LTE system like in reference numeral 2530.

While the number of locations of the extended DMRS may be configured as one as illustrated in FIG. 26 if the slot length is 7 OFDM symbols, the number of locations of the extended DMRS may need to be configured as two according to a Doppler state if the slot length is 14 OFDM symbols. For example, the location of the extended DMRS may be configured as indicated by reference numeral 2620 in an environment in which a channel changes rapidly and the location of the extended DMRS may be configured as indicated by reference numeral 2630 in an environment in which a channel changes very rapidly.

The embodiment of FIGS. 25 and 26 illustrates the basis location of the DMRS based on the unit DMRS structure illustrated in FIG. 22, and the location of the DMRS may be additionally configured if the unit DMRS structure is extended for antenna port extension as described with reference to FIG. 24. In the case of the extended DMRS, as a plurality of DMRSs are configured on the time, DMRS overhead may be generated. Accordingly, in this case, it is possible to reduce DMRS overhead by configuring the DMRS having a low density on the frequency as indicated by reference numeral 2210.

Hereinafter, a method by which the base station configures the DMRS structure in consideration of various DMRS structures according to the disclosure will be described. Specifically, according to the disclosure, as the number of supported orthogonal antenna ports increases, a DMRS port multiplexing method may be different. Further, different RS densities may be configured on the frequency in the unit DMRS structure. A front-loaded RS structure and an extended RS structure on the time like the extended DMRS may be configured. Accordingly, if the base station configures a DMRS structure suitable for a transmission environment, a configuration thereof should be signal to the UE in order to allow the UE to accurately perform channel estimation based on the configured DMRS structure.

The DMRS structure may be semi-statically or dynamically configured. The simplest method of semi-statically configuring the DMRS structure is to configure the DMRS structure through higher layer signaling. More specifically, configuration information may be inserted into an RS-related signaling field of RRC as shown in [Table 9] below.

TABLE 9

| -- ASN1START | |
|---|---|
| DMRS-PatternId ::= | INTEGER |
| (0..maxDMRS-Pattern) | |
| DMRS-timeDensityId ::= | INTEGER |
| (0..maxDMRS-Time) | |
| DMRS-frequencyDensityId ::= | |
| INTEGER (0..maxDMRS-Freqeuncy) | |
| -- ASN1STOP | |

Specifically, in [Table 9], mapping information can be indicated in different patterns through a DMRS-PatternId. A maxDMRS-Pattern indicates a maximum number of DMRS-PatternIds which can be configured. For example, it is noted that mapping patterns are different in the case in which 12 orthogonal DMRS ports are mapped for MU- MIMO and the case in which 8 orthogonal DMRS ports are mapped in the embodiment. In this case, different pattern information may be indicated using the DMRS-PatternId. Specifically, the DMRS-PatternId is configured as (0, 1) in which case 0 may indicate a pattern that supports 8 ports for SU-MIMO and 1 may indicates a pattern that supports 12 ports for MU-MIMO. In another example, the DMRS-PatternId is configured as (0, 4, 8, 12) in which case 0 may indicate a DMRS pattern that operates in SU-MIMO, and 4, 8, and 12 may indicate DMRS patterns corresponding to 4, 8, and 12 used DMRS antenna ports, respectively. At this time, if the DMRS-PatternId is configured as 12, only DMRS pattern for MU-MIMO may be indicated.

Further, the extended RS structure on the time can be indicated through a DMRS-timeDensityId in [Table 9]. A maxDMRS-Time indicates a maximum number of DMRS-timeDensityId which can be configured. For example, the maxDMRS-Time may be used to configure the front-loaded RS and the extended RS structure on the time like the extended DMRS. Last, different RS densities on the frequency may be configured through a DMRS-frequencyDensityId in [Table 9]. A maxDMRS-Frequency indicates a maximum number of DMRS-frequencyDensityIds which can be configured. For example, the DMRS-frequencyDensityId may be used to configure a low RS density on the frequency in order to control RS overhead.

The term of a field value configured in [Table 9] may be replaced with another term. The term is only for a specific example to easily describe technology of the disclosure and help understanding of the disclosure and does not limit the scope of the disclosure. That is, it is apparent to those skilled in the art that the operation can be performed through another term based on the technical idea of the disclosure. Through the method, the DMRS structure can be semi-statically configured through RRC and the UE can detect the structure of the currently transmitted DMRS through a value configured in RRC.

Next, a method by which the base station dynamically configures a DMRS structure suitable for a transmission environment will be described. If information on the DMRS is configured through a MAC CE by a method similar to the method of configuring DMRS information through RRC, the information on the DMRS structure may be more dynamically configured. The simplest method of dynamically configuring the DMRS structure is to transmit DCI containing information on the DMRS structure. At this time, a DCI format to which a field for dynamically operating the DMRS structure is not applied may be separately defined for the basic operation. If the DMRS structure is configured using DCI, there is an advantage of dynamically changing the DMRS structure. On the other hand, there is a disadvantage of generating DCI overhead for the operation.

Accordingly, the configuration of the DMRS structure may be performed in a hierarchical configuration structure corresponding to a combination of semi-static signaling and dynamic signaling. Specifically, in [Table 9], the DMRS-timeDensityId and DMRS-frequencyDensityId may be configured through RRC, and the DMRS-PatternId may be configured through the MAC CE or DCI. This is because there is no need to change the DMRS pattern in accordance with a channel change on the time and frequency as rapidly as dynamic signaling is needed and thus the DMRS pattern may be configured through RRC, and there is a need to dynamically operate the DMRS pattern for SU and MU and thus DMRS pattern information therefor may be configured through the MAC CE or DCI.

Embodiment 2-2

<Embodiment 2-2> proposes a method of effectively operating a DMRS sequence when the DMRS sequence is generated according to an increased DMRS sequence length in the NR system. As described above, when a DMRS sequence r(m) is generated on the basis of a PN sequence C(n), a generated sequence length may be determined by the number A of DMRS REs within the PRB and the maximum $N_{RB}^{max}$ of RBs that support DL or UL of the NR system as shown in [Equation 14] below.

$$r(m) = \frac{1}{\sqrt{2}}(1 - 2 \cdot c(2m)) + j\frac{1}{\sqrt{2}}(1 - 2 \cdot c(2m + 1)), \quad \text{[Equation 14]}$$

$$m = 0, 1, \ldots, AN_{RB}^{max} - 1$$

However, various DMRS structures may be supported in the NR system, and a method of effectively generating the DMRS sequence in consideration of various DMRS structures and mapping the DMRS sequence to resources is needed. Further, the NR system supports various numerologies and also considers support of channel bandwidths up to 400 MHz. If supported subcarrier spacings are 15, 30, 60, 120, 240, and 480 kHz and channel bandwidths are 5, 10, 40, 80, 100, 200, and 400 MHz, the maximum number of subcarriers and the maximum number RBs are as shown in [Table 10] and [Table 11].

TABLE 10

| SCS | Channel bandwidth (MHz) | | | | | | |
|---|---|---|---|---|---|---|---|
| (kHz) | 5 | 10 | 40 | 80 | 100 | 200 | 400 |
| 15 | 330 | 660 | 2640 | 5280 | 6600 | 13200 | 26400 |
| 30 | 165 | 330 | 1320 | 2640 | 3300 | 6600 | 13200 |
| 60 | 82.5 | 165 | 660 | 1320 | 1650 | 3300 | 6600 |
| 120 | 41.25 | 82.5 | 330 | 660 | 825 | 1650 | 3300 |
| 240 | 20.625 | 41.25 | 165 | 330 | 412.5 | 825 | 1650 |
| 480 | 10.3125 | 20.625 | 82.5 | 165 | 206.25 | 412.5 | 825 |

TABLE 11

| SCS | | Channel bandwidth (MHz) | | | | | | |
|---|---|---|---|---|---|---|---|---|
| (kHz) | RB size | 5 | 10 | 40 | 80 | 100 | 200 | 400 |
| 15 | 180 kHz | 27.5 | 55 | 220 | 440 | 550 | 1100 | 2200 |
| 30 | 360 kHz | 13.75 | 27.5 | 110 | 220 | 275 | 550 | 1100 |
| 60 | 720 kHz | 6.875 | 13.75 | 55 | 110 | 137.5 | 275 | 550 |
| 120 | 1.44 MHz | 3.4375 | 6.875 | 27.5 | 55 | 68.75 | 137.5 | 275 |
| 240 | 2.88 MHz | 1.71875 | 3.4375 | 13.75 | 27.5 | 34.375 | 68.75 | 137.5 |
| 480 | 5.76 MHz | 0.859375 | 1.71875 | 6.875 | 13.75 | 17.1875 | 34.375 | 68.75 |

The number of subcarriers and the number of RBs presented in [Table 10] and [Table 11] are merely examples, and different values may be used according to progress of the NR standardization. Referring to [Table 10] and [Table 11], the maximum number of RBs supported by the NR system may have a different value depending on supported subcarrier spacing and a channel bandwidth, and if it is assumed that the maximum number of supportable subcarriers is 6600, the maximum number of RBs may increase to 550. On the other hand, if the same channel bandwidth is used but subcarrier spacing increases, the maximum number of supported RBs decreases. Accordingly, a method of effectively operating the DMRS sequence length according to various numbers of supported RBs is needed.

First, a method of determining the number A of DMRS REs within the PRB will be described with reference to [Equation 14]. Specifically, since the NR system supports various DMRS structures, the following alternatives may be considered as a method of effectively generating the DMRS sequence.

Method 1: A is determined as the number of DMRS REs of a DMRS pattern having the highest RE density including different DMRS patterns in various DMRS structures.

Method 2: A is determined as the number of DMRS REs of a front-loaded DMRS pattern in various DMRS structures.

Among the alternatives, method 1 is a method of determining A as the number DMRS REs of the DMRS pattern having the highest RE density including different DMRS pattern in various DMRS structures and generating the DMRS sequence but using only a portion of the sequence in the case of the DMRS pattern having a lower RE density. More specifically, in description based on reference numerals 2510, 2610, 2620, and 2630 of FIGS. 25 and 26, the DMRS sequence is generated based on the DMRS pattern having the highest RE density in method 1 as indicated by reference numeral 2630. If the DMRS pattern having the low RE density is used as indicated by reference numerals 2510, 2610, and 2620, only some of the generated patterns may be mapped to resources.

Unlike this, method 2 is a method of determining A as the number of DMRS REs of the front-loaded DMRS pattern in various DMRS structures and generating the DMRS sequence, but reusing and extending the generated sequence in the case of the DMRS pattern having a higher RE density. More specifically, in description based on reference numerals 2510, 2610, 2620, and 2630 of FIGS. 25 and 26, the DMRS sequence is generated on the basis of the front-loaded DMRS pattern in method 2 as indicated by reference numeral 2510. If the DMRS pattern having the high RE density is used as indicated by reference numerals 2610, 2620, and 2630, the sequence of the generated front-loaded DMRS pattern may be repeatedly mapped to resources for the extended DMRS.

If all of the unit DMRS patterns having different densities on the frequency are supported in method 2 as illustrated in FIG. 22, the sequence may be generated on the basis of the unit DMRS pattern having a higher density. More specifically, if both reference numerals 2210 and 2220 are supported, when the sequence is generated on the basis of reference numeral 2220 and the unit DMRS pattern having the low density is configured as indicated by reference numeral 2210, a portion of the generated sequence may be punctured and the remaining sequence may be mapped to resources. Compared to method 1, method 2 has an advantage of operating a shorter DMRS sequence.

Next, a method of determining a maximum value $N_{RB}^{max}$ of the number of RBs supported for DL or UL in [Equation 14] will be described. As described above, the maximum number of RBs supported by the NR system varies depending on supported subcarrier spacing and a supported channel bandwidth, and the maximum number of supportable RBs may significantly increase compared to the LTE system. Accordingly, a method of effectively operating the DMRS sequence length according to various numbers of supported RBs is needed. At this time, the following alternatives may be considered as the method of determining the DMRS sequence length.

Method 1: $N_{RB}^{max}$ is configured in consideration of a supportable maximum bandwidth in currently configured subcarrier spacing.

Method 2: $N_{RB}^{max}$ is configured in consideration of all subcarrier spacings defined in the NR system and a supportable maximum bandwidth.

Among the alternatives, method 1 is a method of configuring $N_{RB}^{max}$ in consideration of the supportable maximum bandwidth in currently configured subcarrier spacing. More specifically, in [Table 11], if the currently configured subcarrier spacing is 15 kHz, the number of RBs may be 550 in consideration of the supportable maximum bandwidth of 100 MHz. If the currently configured subcarrier spacing is 15 kHz, the number of RBs may be 220 in consideration of the supportable maximum bandwidth of 40 MHz. On the other hand, method 2 is a method of configuring $N_{RB}^{max}$ in consideration of the supportable maximum bandwidth in all subcarrier spacings defined in the NR system, so that $N_{RB}^{max}$ may be configured as 550 which is the largest number of RBs based on [Table 11].

In order to minimize the DMRS sequence length to be generated, all supported subcarrier spacings may be classified into <6 GHz (under 6 GHz) and >6 GHz (above 6 GHz) in method 2. Specifically, in the case of <6 GHz, the supported subcarrier spacing is limited to 15, 30, and 60 kHz in which case $N_{RB}^{max}$ may be configured as 550 which the largest number of RBs based on [Table 11]. However, in the case of >6 GHz, the supported subcarrier spacing is limited to 120, 240, and 480 kHz in which case $N_{RB}^{max}$ may be configured as 275 which the largest number of RBs based on [Table 11]. According to method 2, $N_{RB}^{max}$ may be determined in the set only in consideration of subcarrier spacing supported by the base station and the channel bandwidth. For example, if the subcarrier spacing supported by the base station is limited to 15, 30, and 60 kHz and the supported channel bandwidth is limited to 5, 10, and 40 MHz, $N_{RB}^{max}$ may be configured as 220 which is the largest number of RBs in the set based on [Table 11].

However, even though the alternatives are considered, the DMRS sequence length to be generated may be still very long compared to the current LTE system. Accordingly, in order to solve the problem, the following method may be considered. The proposed method is a method of using two-step resource allocation. In order to prevent an increase in the RBG size due to an increased channel bandwidth, two-step resource allocation may be used.

Figure 27:
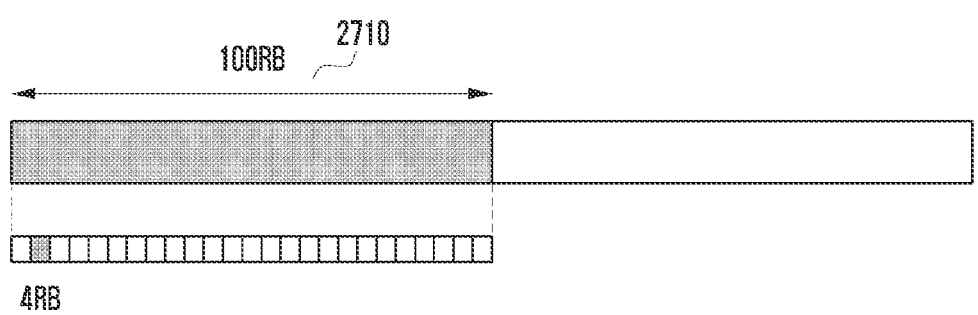
FIG. 27 illustrates an example of a two-step resource allocation method.

FIG. 27 illustrates an example of a two-step resource allocation method. Specifically, as illustrated in FIG. 27, if a system bandwidth corresponding to a maximum of 500 RBs is allocated, the two-step resource allocation method may configure a resource allocation location of 100 RBs among the 500 RBs through a bitmap of 5 bits in a first step and configure a resource allocation location of 4 RBs among the configured 100 RBs through a bitmap of 25 bits in a second step as indicated by reference numeral 2710. Accordingly, $N_{RB}^{max}$ may reflect the two-step resource allocation rather than being determined on the basis of the currently allocated maximum bandwidth. More specifically, if the system bandwidth corresponding to the maximum of 500 RBs is allocated in reference numeral 2710, $N_{RB}^{max}$ is not 500 but may be determined as 100 RBs which are determined in the first step of the two-max step resource allocation. The method of determining $N_{RB}^{max}$ using the two-step resource allocation may be applied to both method 1 and method 2.

Embodiment 2-3

<Embodiment 2-3> describes a method of TRP-specifically generating and initializing the DMRS sequence in the NR system. TRP-specific generation of the DMRS sequence means that every TRP has a different DMRS sequence through generation of the DMRS sequence using a TRP ID. Here, a transmission reception point (TRP) may be used to indicate a cell, and a TRP ID may be used to indicate a cell ID. In all embodiments of the disclosure, the terms "TRP" and "cell" may be interchangeably used. TRP-specific generation of the DMRS sequence has an advantage of randomizing cross-correlation of the DMRS sequence between different TRPs as much as possible. On the other hand, in order to allow the UE to effectively remote an interference signal from another TRP, there is a disadvantage in that the UE should receive signaling of DMRS information of another TRP such as another TRP ID. The disclosure proposes detailed methods of TRP-specifically generating and initializing the DMRS sequence.

Specifically, <Embodiment 2-3> suggests a method of initializing the DMRS sequence with a cell ID, a slot number, and a scrambling identifier. A first method may be expressed by the following equation.

$$c_{init}=2^{X+Y}(n_s+1)+2^X n_{ID}^{(nSCID)}+n_{SCID} \quad \text{[Equation 15]}$$

In the equation, $n_s$ denotes a slot number within a transmission frame and $n_{SCID}$ denotes a scrambling identifier, and it is assumed that a value of the scrambling identifier is 0 unless specifically mentioned. In the NR system, $n_{SCID}$ may have two or more values. In $n_{SCID}$, the number N of values may be configured to have two values such as 0 and 1 in consideration of DMRS sequence scrambling between two TRPs in CoMP operation like in the LTE system or configured to have two or more values such as i=0, 1, . . . , N in consideration of more various operation environments than the NR system. For example, extension of N=4 may be considered. Further, X denotes the number of bits identifying $n_{SCID}$ and may be determined as $X=\log_2(N)$. $n_{ID}^{(i)}=0, 1, \ldots, N$ may be determined as follows.

$n_{ID}^{(i)}=N_{ID}^{cell}$ if no value for $n_{ID}^{DRMS,i}$ is provided by higher layers or if DCI format which does not support $n_{SCID}$ values is used for the DCI associated with the PDSCH transmission $n_{ID}^{(i)}=n_{ID}^{DRMS,i}$ otherwise $n_{ID}^{DRMS,i}$ may be configured in a higher layer through a method similar to [Table 12] below. [Table 12], N_cellID denotes the number of cell IDs, and may be 504 in the LTE system but may be extended to 1000 in the NR system. [Table 12] shows an example of the case in which the number of $n_{SCID}$ is 4, and 4 $n_{SCID}$ may be reduced to 2 $n_{SCID}$ or further increased according to considerations of the NR system. In [Equation 15], Y may be the number of bits for identifying the cell ID, and if the number of cell IDs is 1000, Y=10.

TABLE 12

```
-- ASN1START
DMRS-Config ::=              CHOICE {
  release                        NULL,
  setup                          SEQUENCE {
    scramblingIdentity             INTEGER (0..N_cellID-1),
    scramblingIdentity2            INTEGER (0..N_cellID-1),
    scramblingIdentity3            INTEGER (0..N_cellID-1),
    scramblingIdentity4            INTEGER (0..N_cellID-1)
  }
}
```

Referring to [Equation 15] above, the DMRS sequence is initialized in every slot. However, in the NR system, as subcarrier spacing is larger, a slot length significantly becomes shorter. More specifically, the slot length according to the subcarrier spacing (SCS) is as shown in [Table 13] below.

TABLE 13

| SCS (kHz) | OFDM symbol number within slot | |
|---|---|---|
| | 7 | 14 |
| 15 | 0.5 ms | 1 ms |
| 30 | 0.25 ms | 0.5 ms |
| 60 | 0.125 ms | 0.25 ms |
| 120 | — | 0.125 ms |
| 240 | — | 0.0625 ms |
| 480 | — | 0.03125 ms |

As shown in [Table 13] above, if as the subcarrier spacing is larger, the slot length significantly becomes shorter, initialization of the DMRS sequence in every slot may be a burden to implementation. Accordingly, in order to solve the problem, a modified equation is proposed below.

$$c_{init}=2^{X+Y}(\lfloor n_s/M \rfloor+1)+2^X n_{ID}^{(nSCID)}+n_{SCID} \quad \text{[Equation 16]}$$

In the equation, description of all parameters except for M is the same as that of [Equation 15]. In the equation, M is a parameter for controlling initialization of the DMRS sequence depending on the slot length, and a value of M for DMRS sequence initialization based on a slot length of 1 ms may be as shown in [Table 14] below. A method of varying DMRS sequence initialization depending on the slot length in [Equation 16] may be expressed by another method. For example, according to the use of [Equation 15], the following phrase may be used.

The UE is not expected to update $c_{init}$ less than X msec. Here, X=1 msec.

TABLE 14

| SCS (kHz) | OFDM symbol number within slot | |
|---|---|---|
| | 7 | 14 |
| 15 | 2 | 1 |
| 30 | 4 | 2 |
| 60 | 8 | 4 |
| 120 | — | 8 |
| 240 | — | 16 |
| 480 | — | 32 |

Another method TRP-specifically generating and initializing the DMRS sequence may be expressed by [Equation 17] below. The following method is a method of further randomizing the cross-correlation of the DMRS sequence between different TRPs than the method of [Equation 15]. Specifically, it is assumed that $\overline{Y_1}$ and $\overline{Y_2}$ are PN sequences generated on the basis of initialization values of $X_1$=first cell ID and $X_2$=second cell ID and that $\overline{Y_1^t}$ and $\overline{Y_2^t}$ are PN sequences generated on the basis of initialization values of $X_1+Z$ and $X_2+Z$. It is assumed that Z is a slot number. At this time, based on the assumption of a time synchronized network, the cross-correlation between $\overline{Y_1^t}$ and $\overline{Y_2^t}$ is the same as the cross-correlation between $\overline{Y_1}$ and $\overline{Y_2}$. This means that $\overline{Y_1^t}$ and $\overline{Y_2^t}$ have the bad cross-correlation therebetween if $\overline{Y_1}$ and $\overline{Y_2}$ have the bad cross-correlation therebetween. Accordingly, in order to solve the problem, a modified equation is proposed below.

$$c_{init}=2^{X+Y}(n_s+1) \cdot (2n_{ID}^{(nSCID)}+1)+2^X n_{ID}^{(nSCID)}+n_{SCID} \quad \text{[Equation 17]}$$

In the above equation, description of all parameters except for $(2n_{ID}^{(nSCID)}+1)$ is the same as that of [Equation 15]. In the above equation, $(2n_{ID}^{(nSCID)}+1)$ may be replaced with $(n_{ID}^{(nSCID)}+1)$. In the above equation, $(2n_{ID}^{(nSCID)}+1)$, the reason to use $(2n_{ID}^{(nSCID)}+1)$ is that using $(2n_{ID}^{(nSCID)}+1)$ can further randomize the cross-correlation of the DMRS sequence between different TRPs than using $(n_{ID}^{(nSCID)}+1)$. More specifically, when it is assumed that M1 and M2 are different cell IDs, the case in which M2+1=2(M1+1) is considered. For example, the case corresponds to (0,1), (1,3), (2,5), (3,7) . . . . In this case, if the sequence is initialized using $(n_{ID}^{(nSCID)}+1)$, the cross-correlation between an I component corresponding to the cell ID M1 and a Q component corresponding to the cell ID M2 in [Equation 14] does not vary depending on the slot number. In this case, the above problem may be solved using $(2n_{ID}^{(nSCID)}+1)$.

Referring to [Equation 17] above, the DMRS sequence is initialized in every slot. However, in the NR system, as subcarrier spacing is larger, the slot length significantly becomes shorter. As shown in [Table 13] above, if as the subcarrier spacing is larger, the slot length significantly becomes shorter, initialization of the DMRS sequence in every slot may be a burden to implementation. Accordingly, in order to solve the problem, a modified equation is proposed below.

$$c_{init}=2^{X+Y}(\lfloor n_s/M \rfloor+1) \cdot (2n_{ID}^{(nSCID)}1) \cdot 2^X n_{ID}^{(nSCID)}+n_{SCID} \quad \text{[Equation 18]}$$

In the equation, description of all parameters except for M is the same as that of [Equation 17]. In the equation, M is a parameter for controlling initialization of the DMRS sequence depending on the slot length, and a value of M for DMRS sequence initialization based on a slot length of 1 ms may be as shown in [Table 14] above. A method of varying DMRS sequence initialization depending on the slot length in [Equation 18] may be expressed by another method. For example, according to the use of [Equation 17], the following phrase may be used.

The UE is not expected to update $c_{init}$ less than X msec. Here, X=1 msec.

Another method TRP-specifically generating and initializing the DMRS sequence may be expressed by [Equation 19] below. The following method is a modified method of [Equation 17] and is to avoid repeatedly using $n_{ID}^{(nSCID)}$ in [Equation 17]. To this end, the following equation may be used.

$$c_{init}=2^X(n_s+1) \cdot (2n_{ID}^{(nSCID)}+1)+n_{SCID} \quad \text{[Equation 19]}$$

Description of all parameters in the equation is the same as that of [Equation 15].

However, in the NR system, as subcarrier spacing is larger, a slot length significantly becomes shorter. As shown in [Table 13] above, if as the subcarrier spacing is larger, the slot length becomes shorter, initialization of the DMRS sequence in every slot may be a burden to implementation. Accordingly, in order to solve the problem, a modified equation is proposed below.

$$c_{init}=2^X(\lfloor n_s M \rfloor) \cdot (2n_{ID}^{(nSCID)}+1)+n_{SCID} \quad \text{[Equation 20]}$$

In the equation, description of all parameters except for M is the same as that of [Equation 19]. In the equation, M is a parameter for controlling initialization of the DMRS sequence depending on the slot length, and a value of M for DMRS sequence initialization based on a slot length of 1 ms may be as shown in [Table 14] above. A method of varying DMRS sequence initialization depending on the slot length in [Equation 20] may be expressed by another method. For example, according to the use of [Equation 19], the following phrase may be used.

The UE is not expected to update $c_{init}$ less than X msec. Here, X=1 msec.

Embodiment 2-4

<Embodiment 2-4> describes a method of resource-specifically generating and initializing the DMRS sequence in the NR system. If the DMRS sequence is resource-specifically generated, every TRP has the same DMRS sequence since the DMRS sequence is not generated using a TRP ID unlike in <Embodiment 2-3>. The DMRS sequence has different sequences in allocated resource regions. Accordingly, the method has a disadvantage of increasing the cross-correlation of the DMRS sequence between different TRPs. However, the method has an advantage in that the UE does not need to receive signaling of DMRS information of another TRP such as another TRP ID in order to allow the UE to effectively remote an interference signal from another TRP.

The disclosure proposes detailed methods of resource-specifically generating and initializing the DMRS sequence. More specifically, <Embodiment 2-4> suggests a method of initializing the DMRS sequence with a slot number and a scrambling identifier. A first method may be expressed by [Equation 21] below.

$$c_{init}=2^X(n_s+1)+n_{SCID} \quad \text{[Equation 21]}$$

In the equation, $n_s$ denotes a slot number within a transmission frame and $n_{SCID}$ denotes a scrambling identifier, and it is assumed that a value of the scrambling identifier is 0 unless specifically mentioned. In the NR system, $n_{SCID}$ may have two or more values. In $n_{SCID}$, the number N of values may be configured to have two values such as 0 and 1 in consideration of DMRS sequence scrambling between two TRPs in CoMP operation like in the LTE system or configured to have two or more values such as i=0, 1, . . . , N in consideration of more various operation environments than the NR system. For example, extension of N=4 may be considered. Further, X denotes the number of bits identifying $n_{SCID}$ and may be determined as $X=\log_2(N)$.

Referring to [Equation 21] above, the DMRS sequence is initialized in every slot. However, in the NR system, as subcarrier spacing is larger, a slot length significantly becomes shorter. As shown in [Table 13] above, if as the subcarrier spacing is larger, the slot length becomes shorter, initialization of the DMRS sequence in every slot may be a burden to implementation. Accordingly, in order to solve the problem, a modified equation is proposed below.

$$c_{init}=2^X(\lfloor n_s/M \rfloor+1)+n_{SCID} \quad \text{[Equation 22]}$$

In the above equation, description of all parameters except for M is the same as that of [Equation 21]. In the equation, M is a parameter for controlling initialization of the DMRS sequence depending on the slot length, and a value of M for DMRS sequence initialization based on a slot length of 1 ms may be as shown in [Table 14] above. A method of varying DMRS sequence initialization depending on the slot length in [Equation 22] may be expressed by another method. For example, according to the use of [Equation 21], the following phrase may be used.

The UE is not expected to update $c_{init}$ less than X msec. Here, X=1 msec.

Another method resource-specifically generating and initializing the DMRS sequence may be expressed by [Equation 23] below. The following method is a method of further randomizing the cross-correlation of the DMRS sequence between different TRPs than the method of [Equation 2m]. Specifically, if it is assumed that $\overline{Y_1}$ and $\overline{Y_2}$ are PN sequences generated on the basis of initialization values of $X_1$=first cell ID and $X_2$=second cell ID and that $\overline{Y_1'}$ and $\overline{Y_2'}$ are PN sequences generated on the basis of initialization values of $X_1+Z$ and $X_2+Z$. It is assumed that Z is a slot number. At this time, based on the assumption of a time synchronized network, the cross-correlation between $\overline{Y_1'}$ and $\overline{Y_2'}$ is the same as the cross-correlation between $\overline{Y_1}$ and $\overline{Y_2}$. This means that $\overline{Y_1'}$ and $\overline{Y_2'}$ has the bad cross-correlation therebetween if $\overline{Y_1}$ and $\overline{Y_2}$ has the bad cross-correlation therebetween. Accordingly, in order to solve the problem, a modified equation is proposed below.

$$c_{init}=2^X(n_s+1)\cdot(2n_{SCID}+1)+n_{SCID} \quad \text{[Equation 23]}$$

In the above equation, description of all parameters except for $(2n_{SCID}+1)$ is the same as that of [Equation 21]. In the above equation, $(2n_{SCID}+1)$ may be replaced with $(n_{SCID}+1)$. In the above equation, the reason to use $(2n_{SCID}+1)$ is that using $(2n_{SCID}+1)$ can further randomize the cross-correlation of the DMRS sequence between different TRPs than using $(n_{SCID}+1)$. More specifically, when it is assumed that M1 and M2 are different scrambling identifiers, the case in which M2+1=2(M1+1) is considered. For example, the case corresponds to (0,1), (1,3), (2,5), (3,7), .... In this case, if the sequence is initialized using $(n_{SCID}+1)$, the cross-correlation between an I component corresponding to the cell ID M1 and a Q component corresponding to the cell ID M2 in [Equation 14] does not vary depending on the slot number. In this case, the above problem may be solved using $(2n_{SCID}+1)$.

If [Equation 23] is applied, the DMRS sequence is initialized in every slot. However, in the NR system, as subcarrier spacing is larger, a slot length significantly becomes shorter. As shown in [Table 13] above, if as the subcarrier spacing is larger, the slot length becomes shorter, initialization of the DMRS sequence in every slot may be a burden to implementation. Accordingly, in order to solve the problem, a modified equation is proposed below.

$$c_{init}=2^X(\lfloor n_s/M \rfloor+1)\cdot(2n_{SCID}+1)+n_{SCID} \quad \text{[Equation 24]}$$

In the above equation, description of all parameters except for M is the same as that of [Equation 23]. In the equation, M is a parameter for controlling initialization of the DMRS sequence depending on the slot length, and a value of M for DMRS sequence initialization based on a slot length of 1 ms may be as shown in [Table 14] above. A method of varying DMRS sequence initialization depending on the slot length in [Equation 24] may be expressed by another method. For example, according to the use of [Equation 23], the following phrase may be used.

The UE is not expected to update $c_{init}$ less than X msec. Here, X=1 msec.

Embodiment 2-5

<Embodiment 2-5> proposes a detailed method of mapping antenna ports on the basis of the front-loaded DMRS pattern based on current agreement of 3GPP. The front-loaded DMRS pattern agreed by 3GPP may be divided into type 1 and type 2, which may be configured through higher layer signaling. The DMRS density may vary depending on the method of mapping antenna ports, which results in channel estimation performance, and thus an optimized mapping method according to each type is very important to DMRS design. If an additional DMRS is transmitted in the transmission slot, a DMRS pattern which is the same as the following DMRS pattern may be repeated after the front-loaded DMRS.

Configuration type 1

One symbol: Comb 2+2 CS, up to 4 ports

Two symbols: Comb 2+2 CS+TD-OCC ({1 1} and {1 −1}), up to 8 ports

Note: It should be possible to schedule up to 4 ports without using both {1,1} and {1,−1}.

Configuration type 2

One symbol; 2-FD-OCC across adjacent REs in the frequency domain, up to 6 ports

Two symbols: 2-FD-OCC across adjacent REs in the frequency domain+TD-OCC (both {1,1} and {1,−1}) up to 12 ports Note: It should be possible to schedule up to 6 ports without using both {1,1} and {1,−1}.

Figure 28:
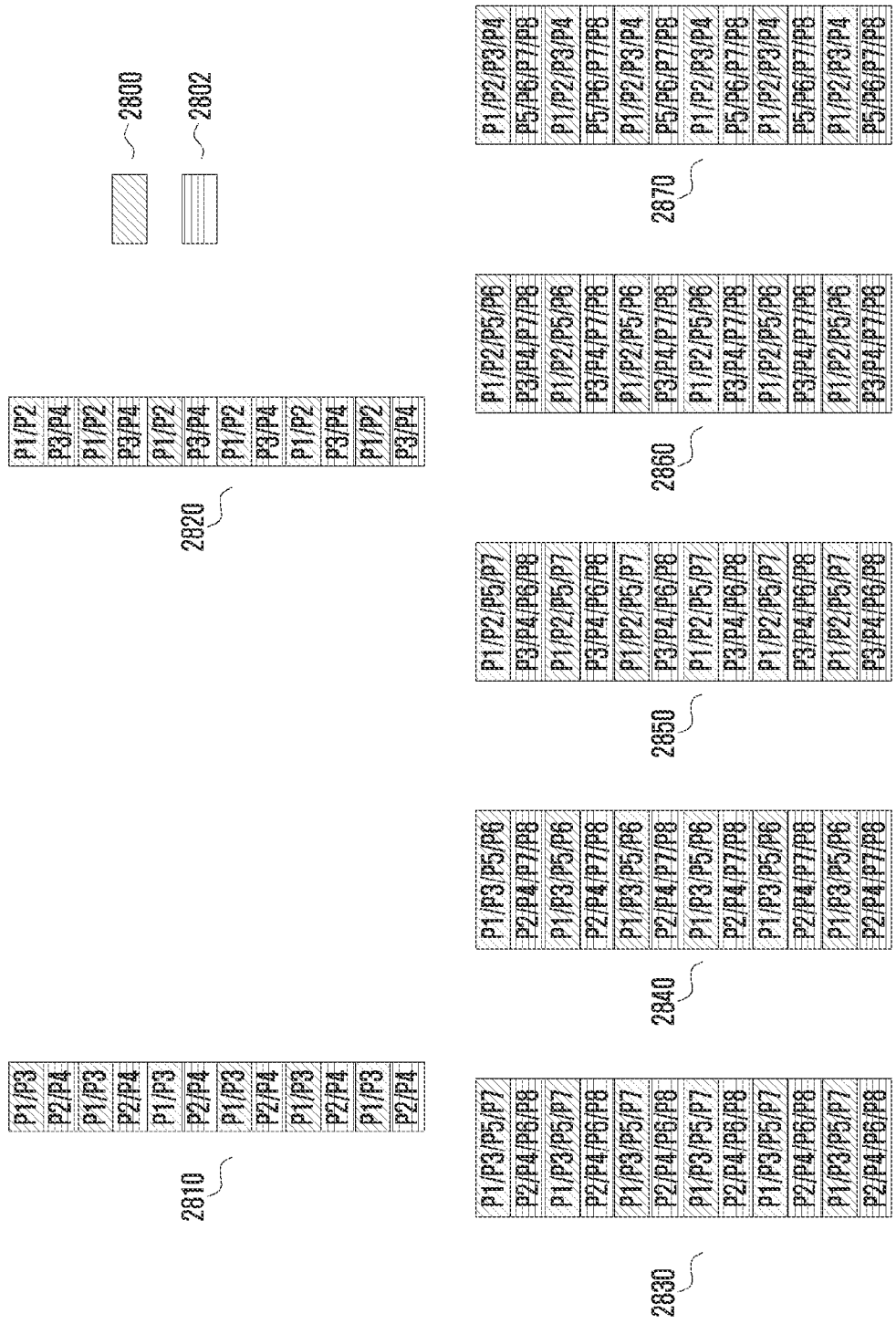
FIG. 28 illustrates an example of a pattern available in type 1 according to the antenna port mapping method.
Figure 29:
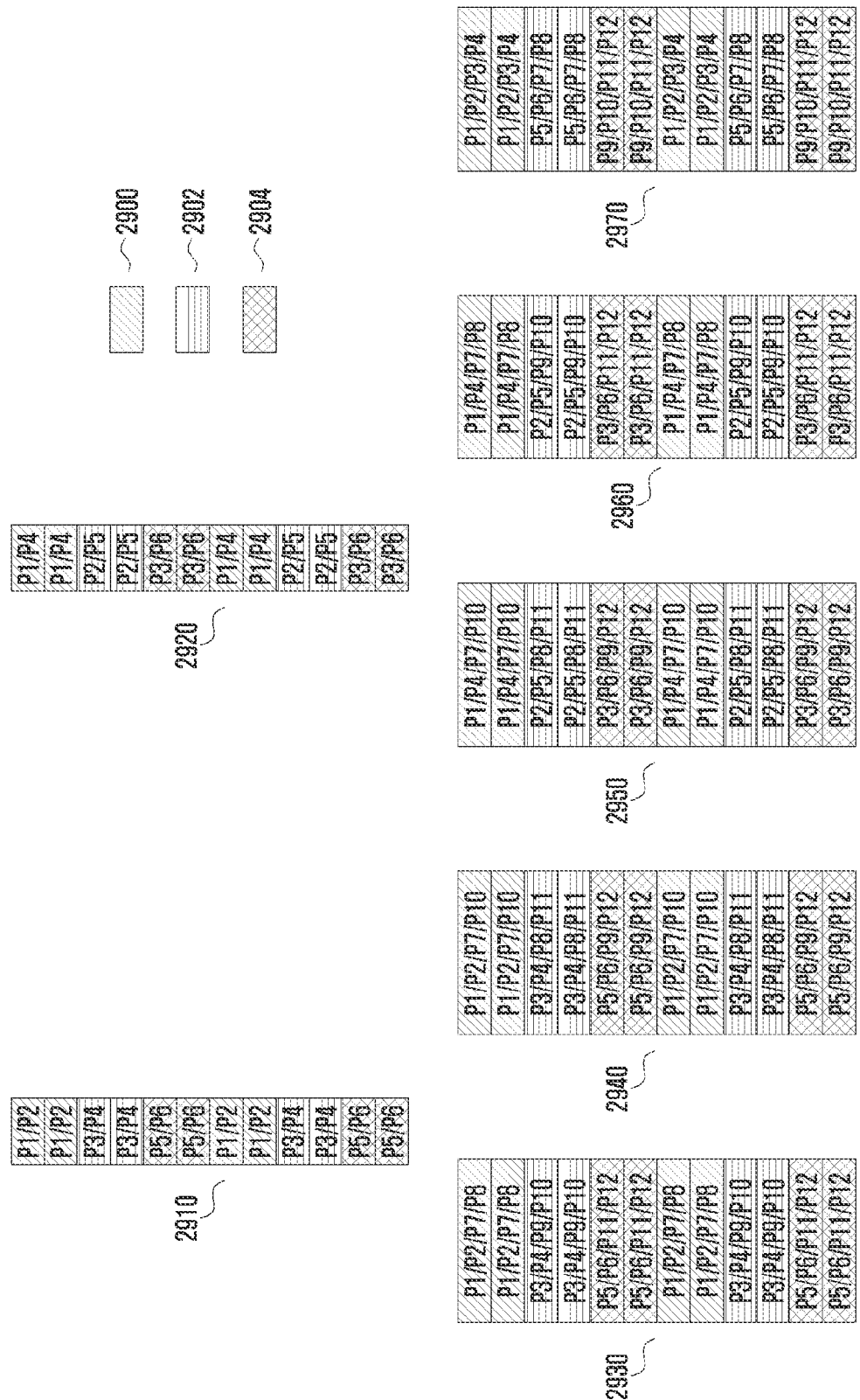
FIG. 29 illustrates an example of a pattern available in type 2 according to the antenna port mapping method.

FIGS. 28 and 29 illustrate in detail patterns varying depending on an antenna port mapping method based on the agreement. In the following embodiment, an antenna port p is expressed as p=P1 to P8 in type 1 and expressed as p=P1 to P12 in type 2. However, the port number may be displayed differently. For example, p=1000 to 1007 in type 1 and p=1000 to 1011 in type 2.

First, in the case of a type 1 pattern, comb 2 and 2 CS are the basic structure like the agreement, and in the case of the two-symbol pattern, TD-OCC(({1 1} and {1 −1}) is applied and a maximum of 8 orthogonal DMRS ports are supported. As described above, a method of supporting a plurality of antenna ports is applied and the DMRS may be mapped to a first OFDM symbol and a $k^{th}$ subcarrier on the time as shown in the following equation.

$$a_{k,l}^{(p,\mu)}=e^{j\phi_k}\cdot w_t(l')\cdot r(m+m_0)$$

$$k=k_0+2m+\Delta$$

$$l=l_0+l' \quad \text{[Equation 25]}$$

In [Equation 25], r(m) denotes the DMRS sequence generated in [Equation 14] of <Embodiment 2-2>, $w_t(l')$ denotes application of a TD-OCC applied to the two-symbol pattern, and $\varphi_k$ denotes a phase for application of 2 CS. The values varying depending on the antenna port method is described in detail in the following table.

FIG. 28 illustrates an example of a pattern available in type 1 according to the antenna port mapping method. Reference numerals 2800 and 2802 indicate antenna ports which can be mapped to different frequency locations. Reference numerals 2810 and 2820 indicate examples in which the DMRS according to type 1 is mapped to one symbol.

Reference numeral 2810 corresponds to a mapping method according to a method by which DMRS ports P1/P3 and P2/P4 are separated by comb 2, and reference numeral 2820 corresponds to a mapping method according to a method by which DRMS ports P1/P2 and P3/P4 are separated by comb 2. In reference numerals 2810 and 2820, a maximum of two ports can be separated using 2 CS within the same comp. Specifically, the mapping method 2810 may have the following DMRS density.

In the case in which 6 REs are used <=one layer transmission

In the case in which 12 REs are used > one layer transmission

Unlike the above, the mapping method 2820 may have the following DMRS density.

In the case in which 6 REs are used <=two layer transmission

In the case in which 12 REs are used >two layer transmission

Accordingly, the methods 2810 and 2820 may have different DMRS densities depending on the number of transmitted DMRS ports.

Subsequently, reference numerals 2830 to 2870 illustrate examples of mapping type 1 to two symbols. Reference numeral 2830 corresponds to a mapping method according to a method by which DMRS ports P1/P3/P5/P7 and P2/P4/P6/P8 are separated by comb 2, and reference numeral 2840 corresponds to a mapping method according to a method by which DRMS ports P1/P3/P5/P6 and P2/P4/P7/P8 are separated by comb 2. Reference numeral 2850 corresponds to a mapping method according to a method by which DMRS ports P1/P2/P5/P7 and P3/P4/P6/P8 are separated by comb 2, and reference numeral 2860 corresponds to a mapping method according to a method by which DRMS ports P1/P2/P5/P6 and P3/P4/P7/P8 are separated by comb 2. Last, reference numeral 2870 corresponds to a mapping method according to a method by which DMRS ports P1/P2/P3/P4 and P5/P6/P7/P8 are separated by comb 2. In reference numerals 2830 to 2870, a maximum of four ports may be separated using 2 CS and TD-OCC within the same comb.

Specifically, the mapping methods 2830 and 2840 may have the following DMRS density.

In the case in which 12 REs are used <=one layer transmission

In the case in which 24 REs are used > one layer transmission

Unlike the above, the mapping methods 2850 and 2860 may have the following DMRS density.

In the case in which 12 REs are used <=two layer transmission

In the case in which 24 REs are used >two layer transmission

Unlike the above, the mapping method 2870 may have the following DMRS density.

In the case in which 12 REs are used <=four layer transmission

In the case in which 24 REs are used >four layer transmission

According to the antenna port mapping method of type 1, it is noted that the DMRS density varies depending thereon and the one-symbol pattern and the two-symbol pattern for the DMRS may use different mapping patterns depending on the optimized mapping method.

More specifically, a detailed method of configuring parameters in [Equation 25] varying depending on which antenna port mapping method is used by the one-symbol pattern or the two-symbol pattern for the DMRS is presented. First, available configuration methods of the one-symbol pattern and the two-symbol pattern for the DMRS may be divided into 10 methods according to the antenna port mapping method illustrated in FIG. 28, and configuration of parameters in [Equation 25] is described through a table.

Case1: One symbol 2810 and Two symbol 2830
Case2: One symbol 2810 and Two symbol 2840
Case3: One symbol 2810 and Two symbol 2850
Case4: One symbol 2810 and Two symbol 2860
Case5: One symbol 2810 and Two symbol 2870
Case6: One symbol 2820 and Two symbol 2830
Case7: One symbol 2820 and Two symbol 2840
Case8: One symbol 2820 and Two symbol 2850
Case9: One symbol 2820 and Two symbol 2860
Case10: One symbol 2820 and Two symbol 2870

In the case of the two-symbol pattern, additional cases according to priorities of 2 CS and TD-OCC applied to antenna ports within the comb may be considered.

Method 1: first apply 2 CS and then apply TD-OCC in two-symbol pattern

Method 2: first apply TD-OCC and then apply 2 CS in two-symbol pattern

[Table 15-1] and [Table 15-2] below show configuration values of parameters in [Equation 25] according to case 1. [Table 15-1] shows parameters configured through a method (case 1-1) of first applying 2 CS and then applying TD-OCC in the two-symbol pattern.

TABLE 15-1

| Antenna port p | $\Delta$ | $\varphi_k$ | $w_t(l') = [w_t(0)\ w_t(1)]$ | |
|---|---|---|---|---|
| | | | One symbol | Two symbol |
| P1 | 0 | 0 | [+1] | [+1 +1] |
| P2 | 1 | 0 | [+1] | [+1 +1] |
| P3 | 0 | $\pi(\lfloor k/2 \rfloor)$ | [+1] | [+1 +1] |
| P4 | 1 | $\pi(\lfloor k/2 \rfloor)$ | [+1] | [+1 +1] |
| P5 | 0 | 0 | — | [+1 −1] |
| P6 | 1 | 0 | — | [+1 −1] |
| P7 | 0 | $\pi(\lfloor k/2 \rfloor)$ | — | [+1 −1] |
| P8 | 1 | $\pi(\lfloor k/2 \rfloor)$ | — | [+1 +1] |

[Table 15-2] shows parameters configured through a method (case 1-2) of first applying TD-OCC and then applying 2 CS in the two-symbol pattern. In [Table 15-2], Two symbol (*) considers the case in which one-symbol pattern is repeated and a maximum of 4 ports are scheduled in two symbols, which is a method of considering that it is difficult to apply TD-OCC to the high frequency band.

TABLE 15-2

| Antenna port p | $\Delta$ One symbol | $\varphi_k$ One symbol | $\Delta$ Two symbol | $\varphi_k$ Two symbol | $\Delta$ Two symbol(*) | $\varphi_k$ Two symbol(*) | One symbol | $w_t(l') = [w_t(0)\ w_t(1)]$ Two symbol | Two symbol(*) |
|---|---|---|---|---|---|---|---|---|---|
| P1 | 0 | 0 | 0 | 0 | 0 | 0 | [+1] | [+1 +1] | [+1 +1] |
| P2 | 1 | 0 | 1 | 0 | 1 | 0 | [+1] | [+1 +1] | [+1 +1] |
| P3 | 0 | $\pi(\lfloor k/2 \rfloor)$ | 0 | 0 | 0 | $\pi(\lfloor k/2 \rfloor)$ | [+1] | [+1 −1] | [+1 +1] |
| P4 | 1 | $\pi(\lfloor k/2 \rfloor)$ | 1 | 0 | 1 | $\pi(\lfloor k/2 \rfloor)$ | [+1] | [+1 −1] | [+1 +1] |

TABLE 15-2-continued

| Antenna port p | Δ One symbol | $\varphi_k$ One symbol | Δ Two symbol | $\varphi_k$ Two symbol | Two symbol(*) | | One symbol | $w_t(l') = [w_t(0)\ w_t(1)]$ Two symbol | Two symbol(*) |
|---|---|---|---|---|---|---|---|---|---|
| P5 | — | — | 0 | $\pi(\lfloor k/2 \rfloor)$ | — | — | — | [+1 +1] | — |
| P6 | — | — | 1 | $\pi(\lfloor k/2 \rfloor)$ | — | — | — | [+1 +1] | — |
| P7 | — | — | 0 | $\pi(\lfloor k/2 \rfloor)$ | — | — | — | [+1 −1] | — |
| P8 | — | — | 1 | $\pi(\lfloor k/2 \rfloor)$ | — | — | — | [+1 −1] | — |

[Table 16-1] and [Table 16-2] below show configuration values of parameters in [Equation 25] according to case 2. [Table 16-1] shows parameters configured through a method (case 2-1) of first applying 2 CS and then applying TD-OCC in the two-symbol pattern.

TABLE 16-1

| Antenna port p | Δ | $\varphi_k$ | $w_t(l') = [w_t(0)\ w_t(1)]$ One symbol | Two symbol |
|---|---|---|---|---|
| P1 | 0 | 0 | [+1] | [+1 +1] |
| P2 | 1 | 0 | [+1] | [+1 +1] |
| P3 | 0 | $\pi(\lfloor k/2 \rfloor)$ | [+1] | [+1 +1] |
| P4 | 1 | $\pi(\lfloor k/2 \rfloor)$ | [+1] | [+1 +1] |
| P5 | 0 | 0 | — | [+1 −1] |
| P6 | 0 | $\pi(\lfloor k/2 \rfloor)$ | — | [+1 −1] |
| P7 | 1 | 0 | — | [+1 −1] |
| P8 | 1 | $\pi(\lfloor k/2 \rfloor)$ | — | [+1 +1] |

[Table 16-2] shows parameters configured through a method (case 2-2) of first applying TD-OCC and then applying 2 CS in the two-symbol pattern. In [Table 16-2], Two symbol (*) considers the case in which one-symbol pattern is repeated and a maximum of 4 ports are scheduled in two symbols, which is a method of considering that it is difficult to apply TD-OCC to the high frequency band.

TABLE 16-2

| Antenna port p | Δ One symbol | $\varphi_k$ One symbol | Δ Two symbol | $\varphi_k$ Two symbol | Δ Two symbol(*) | $\varphi_k$ Two symbol(*) | One symbol | $w_t(l') = [w_t(0)\ w_t(1)]$ Two symbol | Two symbol(*) |
|---|---|---|---|---|---|---|---|---|---|
| P1 | 0 | 0 | 0 | 0 | 0 | 0 | [+1] | [+1 +1] | [+1 +1] |
| P2 | 1 | 0 | 1 | 0 | 1 | 0 | [+1] | [+1 +1] | [+1 +1] |
| P3 | 0 | $\pi(\lfloor k/2 \rfloor)$ | 0 | 0 | 0 | $\pi(\lfloor k/2 \rfloor)$ | [+1] | [+1 −1] | [+1 +1] |
| P4 | 1 | $\pi(\lfloor k/2 \rfloor)$ | 1 | 0 | 1 | $\pi(\lfloor k/2 \rfloor)$ | [+1] | [+1 −1] | [+1 +1] |
| P5 | — | — | 0 | $\pi(\lfloor k/2 \rfloor)$ | — | — | — | [+1 +1] | — |
| P6 | — | — | 0 | $\pi(\lfloor k/2 \rfloor)$ | — | — | — | [+1 +1] | — |
| P7 | — | — | 1 | $\pi(\lfloor k/2 \rfloor)$ | — | — | — | [+1 −1] | — |
| P8 | — | — | 1 | $\pi(\lfloor k/2 \rfloor)$ | — | — | — | [+1 −1] | — |

[Table 17-1] and [Table 17-2] show configuration values of parameters in [Equation 25] according to case 3. [Table 17-1] shows parameters configured through a method (case 3-1) of first applying 2 CS and then applying TD-OCC in the two-symbol pattern.

TABLE 17-1

| Antenna port p | Δ One symbol | $\varphi_k$ One symbol | Δ Two symbol | $\varphi_k$ Two symbol | One symbol $w_r(l') = [w_r(0)\ w_r(1)]$ | Two symbol $w_r(l') = [w_r(0)\ w_r(1)]$ |
|---|---|---|---|---|---|---|
| P1 | 0 | 0 | 0 | 0 | [+1] | [+1 +1] |
| P2 | 1 | 0 | 0 | $\pi(\lfloor k/2 \rfloor)$ | [+1] | [+1 +1] |
| P3 | 0 | $\pi(\lfloor k/2 \rfloor)$ | 1 | 0 | [+1] | [+1 +1] |
| P4 | 1 | $\pi(\lfloor k/2 \rfloor)$ | 1 | $\pi(\lfloor k/2 \rfloor)$ | [+1] | [+1 +1] |
| P5 | — | — | 0 | 0 | — | [+1 −1] |
| P6 | — | — | 1 | 0 | — | [+1 −1] |
| P7 | — | — | 0 | $\pi(\lfloor k/2 \rfloor)$ | — | [+1 −1] |
| P8 | — | — | 1 | $\pi(\lfloor k/2 \rfloor)$ | — | [+1 −1] |

[Table 17-2] shows parameters configured through a method (case 3-2) of first applying TD-OCC and then applying 2 CS in the two-symbol pattern. In [Table 17-2], Two symbol (*) considers the case in which one-symbol pattern is repeated and a maximum of 4 ports are scheduled in two symbols, which is a method of considering that it is difficult to apply TD-OCC to the high frequency band.

TABLE 17-2

| Antenna port p | Δ One symbol | $\varphi_k$ One symbol | Δ Two symbol | $\varphi_k$ Two symbol | Δ Two symbol(*) | $\varphi_k$ Two symbol(*) | One symbol $w_r(l')=[w_r(0)\ w_r(1)]$ | Two symbol $w_r(l')=[w_r(0)\ w_r(1)]$ | Two symbol(*) $w_r(l')=[w_r(0)\ w_r(1)]$ |
|---|---|---|---|---|---|---|---|---|---|
| P1 | 0 | 0 | 0 | 0 | 0 | 0 | [+1] | [+1 +1] | [+1 +1] |
| P2 | 1 | 0 | 0 | 0 | 1 | 0 | [+1] | [+1 +1] | [+1 +1] |
| P3 | 0 | $\pi(\lfloor k/2 \rfloor)$ | 1 | 0 | 0 | $\pi(\lfloor k/2 \rfloor)$ | [+1] | [+1 −1] | [+1 +1] |
| P4 | 1 | $\pi(\lfloor k/2 \rfloor)$ | 1 | 0 | 1 | $\pi(\lfloor k/2 \rfloor)$ | [+1] | [+1 −1] | [+1 +1] |
| P5 | — | — | 0 | $\pi(\lfloor k/2 \rfloor)$ | — | — | — | [+1 +1] | — |
| P6 | — | — | 1 | $\pi(\lfloor k/2 \rfloor)$ | — | — | — | [+1 +1] | — |
| P7 | — | — | 0 | $\pi(\lfloor k/2 \rfloor)$ | — | — | — | [+1 −1] | — |
| P8 | — | — | 1 | $\pi(\lfloor k/2 \rfloor)$ | — | — | — | [+1 −1] | — |

[Table 18-1] and [Table 18-2] below show configuration values of parameters in [Equation 25] according to case 4. [Table 18-1] shows parameters configured through a method (case 4-1) of first applying 2 CS and then applying TD-OCC in the two-symbol pattern.

TABLE 18-1

| Antenna port p | Δ One symbol | $\varphi_k$ One symbol | Δ Two symbol | $\varphi_k$ Two symbol | One symbol $w_r(l')=[w_r(0)\ w_r(1)]$ | Two symbol $w_r(l')=[w_r(0)\ w_r(1)]$ |
|---|---|---|---|---|---|---|
| P1 | 0 | 0 | 0 | 0 | [+1] | [+1 +1] |
| P2 | 1 | 0 | 0 | $\pi([k/2])$ | [+1] | [+1 +1] |
| P3 | 0 | $\pi([k/2])$ | 1 | 0 | [+1] | [+1 +1] |
| P4 | 1 | $\pi([k/2])$ | 1 | $\pi([k/2])$ | [+1] | [+1 +1] |
| P5 | — | — | 0 | 0 | — | [+1 −1] |
| P6 | — | — | 0 | $\pi([k/2])$ | — | [+1 −1] |
| P7 | — | — | 1 | 0 | — | [+1 −1] |
| P8 | — | — | 1 | $\pi([k/2])$ | — | [+1 −1] |

[Table 18-2] shows parameters configured through a method (case 4-2) of first applying TD-CC and then applying 2 CS in the two-symbol pattern. In [Table 18-2], Two symbol (*) considers the case in which one-symbol pattern is repeated and a maximum of 4 ports are scheduled in two symbols, which is a method of considering that it is difficult to apply TD-OCC to the high frequency band.

TABLE 18-2

| Antenna port p | Δ One symbol | $\varphi_k$ One symbol | Δ Two symbol | $\varphi_k$ Two symbol | Δ Two symbol(*) | $\varphi_k$ Two symbol(*) | One symbol $w_r(l')=[w_r(0)\ w_r(1)]$ | Two symbol $w_r(l')=[w_r(0)\ w_r(1)]$ | Two symbol(*) $w_r(l')=[w_r(0)\ w_r(1)]$ |
|---|---|---|---|---|---|---|---|---|---|
| P1 | 0 | 0 | 0 | 0 | 0 | 0 | [+1] | [+1 +1] | [+1 +1] |
| P2 | 1 | 0 | 0 | 0 | 1 | 0 | [+1] | [+1 +1] | [+1 +1] |

TABLE 18-2-continued

|  |  |  |  |  |  |  | $w_t(l') = [w_t(0)\ w_t(1)]$ | |
|---|---|---|---|---|---|---|---|---|
| Antenna port p | $\Delta\ \varphi_k$ One symbol | | $\Delta\ \varphi_k$ Two symbol | | Two symbol(*) | | One symbol | Two symbol | Two symbol(*) |
| P3 | 0 | $\pi([k/2])$ | 1 | 0 | 0 | $\pi([k/2])$ | [+1] | [+1 −1] | [+1 +1] |
| P4 | 1 | $\pi([k/2])$ | 1 | 0 | 1 | $\pi([k/2])$ | [+1] | [+1 −1] | [+1 +1] |
| P5 | — | — | 0 | $\pi([k/2])$ | — | — | — | [+1 +1] | — |
| P6 | — | — | 0 | $\pi([k/2])$ | — | — | — | [+1 +1] | — |
| P7 | — | — | 1 | $\pi([k/2])$ | — | — | — | [+1 −1] | — |
| P8 | — | — | 1 | $\pi([k/2])$ | — | — | — | [+1 −1] | — |

[Table 19-1] and [Table 19-2] show configuration values of parameters in [Equation 25] according to case 5. [Table 19-1] shows parameters configured through a method (case 5-1) of first applying 2 CS and then applying TD-OCC in the two-symbol pattern.

TABLE 19-1

|  |  |  |  |  | $w_t(l') = [w_t(0)\ w_t(1)]$ | |
|---|---|---|---|---|---|---|
| Antenna port p | $\Delta\ \varphi_k$ One symbol | | $\Delta\ \varphi_k$ Two symbol | | One symbol | Two symbol |
| P1 | 0 | 0 | 0 | 0 | [+1] | [+1 +1] |
| P2 | 1 | 0 | 0 | $\pi([k/2])$ | [+1] | [+1 +1] |
| P3 | 0 | $\pi([k/2])$ | 0 | 0 | [+1] | [+1 −1] |
| P4 | 1 | $\pi([k/2])$ | 0 | $\pi([k/2])$ | [+1] | [+1 −1] |
| P5 | — | — | 1 | 0 | — | [+1 +1] |
| P6 | — | — | 1 | $\pi([k/2])$ | — | [+1 +1] |
| P7 | — | — | 1 | 0 | — | [+1 −1] |
| P8 | — | — | 1 | $\pi([k/2])$ | — | [+1 −1] |

[Table 19-2] shows parameters configured through a method (case 5-2) of first applying TD-OCC and then applying 2 CS in the two-symbol pattern. In [Table 19-2], Two symbol (*) considers the case in which one-symbol pattern is repeated and a maximum of 4 ports are scheduled in two symbols, which is a method of considering that it is difficult to apply TD-OCC to the high frequency band.

TABLE 19-2

| Antenna port p | $\Delta\ \varphi_k$ One symbol | | $\Delta\ \varphi_k$ Two symbol | | Two symbol(*) | | $w_t(l') = [w_t(0)\ w_t(1)]$ | | |
|---|---|---|---|---|---|---|---|---|---|
| | | | | | | | One symbol | Two symbol | Two symbol(*) |
| P1 | 0 | 0 | 0 | 0 | 0 | 0 | [+1] | [+1 +1] | [+1 +1] |
| P2 | 1 | 0 | 0 | 0 | 1 | 0 | [+1] | [+1 −1] | [+1 +1] |
| P3 | 0 | $\pi([k/2])$ | 0 | $\pi([k/2])$ | 0 | $\pi([k/2])$ | [+1] | [+1 +1] | [+1 +1] |
| P4 | 1 | $\pi([k/2])$ | 0 | $\pi([k/2])$ | 1 | $\pi([k/2])$ | [+1] | [+1 −1] | [+1 +1] |
| P5 | — | — | 1 | 0 | — | — | — | [+1 +1] | — |
| P6 | — | — | 1 | 0 | — | — | — | [+1 −1] | — |
| P7 | — | — | 1 | $\pi([k/2])$ | — | — | — | [+1 +1] | — |
| P8 | — | — | 1 | $\pi([k/2])$ | — | — | — | [+1 −1] | — |

[Table 20-1] and [Table 20-2] below show configuration values of parameters in [Equation 25] according to case 6. [Table 20-1] shows parameters configured through a method (case 6-1) of first applying 2 CS and then applying TD-OCC in the two-symbol pattern.

TABLE 20-1

| Antenna port p | Δ One symbol | $\varphi_k$ One symbol | Δ Two symbol | $\varphi_k$ Two symbol | $w_r(l') = [w_r(0)\ w_r(1)]$ One symbol | $w_r(l') = [w_r(0)\ w_r(1)]$ Two symbol |
|---|---|---|---|---|---|---|
| P1 | 0 | 0 | 0 | 0 | [+1] | [+1 +1] |
| P2 | 0 | π([k / 2]) | 1 | 0 | [+1] | [+1 +1] |
| P3 | 1 | 0 | 0 | π([k / 2]) | [+1] | [+1 +1] |
| P4 | 1 | π([k / 2]) | 1 | π([k / 2]) | [+1] | [+1 +1] |
| P5 | — | — | 0 | 0 | — | [+1 −1] |
| P6 | — | — | 1 | 0 | — | [+1 −1] |
| P7 | — | — | 0 | π([k / 2]) | — | [+1 −1] |
| P8 | — | — | 1 | π([k / 2]) | — | [+1 −1] |

[Table 20-2] shows parameters configured through a method (case 6-2) of first applying TD-OCC and then applying 2 CS in the two-symbol pattern. In [Table 20-2], Two symbol (*) considers the case in which one-symbol pattern is repeated and a maximum of 4 ports are scheduled in two symbols, which is a method of considering that it is difficult to apply TD-OCC to the high frequency band.

TABLE 20-2

| Antenna port p | Δ One symbol | $\varphi_k$ One symbol | Δ Two symbol | $\varphi_k$ Two symbol | Δ Two symbol(*) | $\varphi_k$ Two symbol(*) | $w_r(l') = [w_r(0)\ w_r(1)]$ One symbol | $w_r(l') = [w_r(0)\ w_r(1)]$ Two symbol | $w_r(l') = [w_r(0)\ w_r(1)]$ Two symbol(*) |
|---|---|---|---|---|---|---|---|---|---|
| P1 | 0 | 0 | 0 | 0 | 0 | 0 | [+1] | [+1 +1] | [+1 +1] |
| P2 | 0 | π([k / 2]) | 1 | 0 | 0 | π([k / 2]) | [+1] | [+1 −1] | [+1 +1] |
| P3 | 1 | 0 | 0 | 0 | 1 | 0 | [+1] | [+1 +1] | [+1 +1] |
| P4 | 1 | π([k / 2]) | 1 | 0 | 1 | π([k / 2]) | [+1] | [+1 −1] | [+1 +1] |
| P5 | — | — | 0 | π([k / 2]) | — | — | — | [+1 +1] | — |
| P6 | — | — | 1 | π([k / 2]) | — | — | — | [+1 −1] | — |
| P7 | — | — | 0 | π([k / 2]) | — | — | — | [+1 +1] | — |
| P8 | — | — | 1 | π([k / 2]) | — | — | — | [+1 −1] | — |

[Table 21-1] and [Table 21-2] below show configuration values of parameters in [Equation 25] according to case 7. [Table 21-1] shows parameters configured through a method (case 7-1) of first applying 2 CS and then applying TD-OCC in the two-symbol pattern.

TABLE 21-1

| Antenna port p | Δ One symbol | $\varphi_k$ One symbol | Δ Two symbol | $\varphi_k$ Two symbol | $w_r(l') = [w_r(0)\ w_r(1)]$ One symbol | $w_r(l') = [w_r(0)\ w_r(1)]$ Two symbol |
|---|---|---|---|---|---|---|
| P1 | 0 | 0 | 0 | 0 | [+1] | [+1 +1] |
| P2 | 0 | π([k / 2]) | 1 | 0 | [+1] | [+1 +1] |
| P3 | 1 | 0 | 0 | π([k / 2]) | [+1] | [+1 +1] |
| P4 | 1 | π([k / 2]) | 1 | π([k / 2]) | [+1] | [+1 +1] |
| P5 | — | — | 0 | 0 | — | [+1 −1] |
| P6 | — | — | 0 | π([k / 2]) | — | [+1 −1] |
| P7 | — | — | 1 | 0 | — | [+1 −1] |
| P8 | — | — | 1 | π([k / 2]) | — | [+1 −1] |

[Table 21-2] shows parameters configured through a method (case 7-2) of first applying TD-OCC and then applying 2 CS in the two-symbol pattern. In [Table 21-2], Two symbol (*) considers the case in which one-symbol pattern is repeated and a maximum of 4 ports are scheduled in two symbols, which is a method of considering that it is difficult to apply TD-OCC to the high frequency band.

TABLE 21-2

| Antenna port p | Δ One symbol | $\varphi_k$ One symbol | Δ Two symbol | $\varphi_k$ Two symbol | Δ Two symbol(*) | $\varphi_k$ Two symbol(*) | $w_r(l') = [w_r(0)\ w_r(1)]$ One symbol | $w_r(l') = [w_r(0)\ w_r(1)]$ Two symbol | $w_r(l') = [w_r(0)\ w_r(1)]$ Two symbol(*) |
|---|---|---|---|---|---|---|---|---|---|
| P1 | 0 | 0 | 0 | 0 | 0 | 0 | [+1] | [+1 +1] | [+1 +1] |
| P2 | 0 | π([k / 2]) | 1 | 0 | 0 | π([k / 2]) | [+1] | [+1 −1] | [+1 +1] |

TABLE 21-2-continued

| Antenna port p | Δ One symbol | $\varphi_k$ One symbol | Δ Two symbol | $\varphi_k$ Two symbol | Δ Two symbol(*) | $\varphi_k$ Two symbol(*) | $w_t(l') = [w_t(0)\ w_t(1)]$ One symbol | $w_t(l') = [w_t(0)\ w_t(1)]$ Two symbol | $w_t(l') = [w_t(0)\ w_t(1)]$ Two symbol(*) |
|---|---|---|---|---|---|---|---|---|---|
| P3 | 1 | 0 | 0 | 0 | 1 | 0 | [+1] | [+1 +1] | [+1 +1] |
| P4 | 1 | $\pi(\lfloor k/2 \rfloor)$ | 1 | 0 | 1 | $\pi(\lfloor k/2 \rfloor)$ | [+1] | [+1 −1] | [+1 +1] |
| P5 | — | — | 0 | $\pi(\lfloor k/2 \rfloor)$ | — | — | — | [+1 +1] | — |
| P6 | — | — | 0 | $\pi(\lfloor k/2 \rfloor)$ | — | — | — | [+1 −1] | — |
| P7 | — | — | 1 | $\pi(\lfloor k/2 \rfloor)$ | — | — | — | [+1 +1] | — |
| P8 | — | — | 1 | $\pi(\lfloor k/2 \rfloor)$ | — | — | — | [+1 −1] | — |

[Table 22-1] and [Table 22-2] below show configuration values of parameters in [Equation 25] according to case 8. [Table 22-1] shows parameters configured through a method (case 8-1) of first applying 2 CS and then applying TD-OCC in the two-symbol pattern.

TABLE 22-1

| Antenna port p | Δ | $\varphi_k$ | $w_t(l') = [w_t(0)\ w_t(1)]$ One symbol | $w_t(l') = [w_t(0)\ w_t(1)]$ Two symbol |
|---|---|---|---|---|
| P1 | 0 | 0 | [+1] | [+1 +1] |
| P2 | 0 | $\pi(\lfloor k/2 \rfloor)$ | [+1] | [+1 +1] |
| P3 | 1 | 0 | [+1] | [+1 +1] |
| P4 | 1 | $\pi(\lfloor k/2 \rfloor)$ | [+1] | [+1 +1] |
| P5 | 0 | 0 | — | [+1 −1] |
| P6 | 1 | 0 | — | [+1 −1] |
| P7 | 0 | $\pi(\lfloor k/2 \rfloor)$ | — | [+1 −1] |
| P8 | 1 | $\pi(\lfloor k/2 \rfloor)$ | — | [+1 +1] |

[Table 22-2] shows parameters configured through a method (case 8-2) of first applying TD-OCC and then applying 2 CS in the two-symbol pattern. In [Table 22-2], Two symbol (*) considers the case in which one-symbol pattern is repeated and a maximum of 4 ports are scheduled in two symbols, which is a method of considering that it is difficult to apply TD-OCC to the high frequency band.

TABLE 22-2

| Antenna port p | Δ One symbol | $\varphi_k$ One symbol | Δ Two symbol | $\varphi_k$ Two symbol | Δ Two symbol(*) | $\varphi_k$ Two symbol(*) | $w_t(l') = [w_t(0)\ w_t(1)]$ One symbol | $w_t(l') = [w_t(0)\ w_t(1)]$ Two symbol | $w_t(l') = [w_t(0)\ w_t(1)]$ Two symbol(*) |
|---|---|---|---|---|---|---|---|---|---|
| P1 | 0 | 0 | 0 | 0 | 0 | 0 | [+1] | [+1 +1] | [+1 +1] |
| P2 | 0 | $\pi(\lfloor k/2 \rfloor)$ | 0 | 0 | 0 | $\pi(\lfloor k/2 \rfloor)$ | [+1] | [+1 +1] | [+1 +1] |
| P3 | 1 | 0 | 1 | 0 | 1 | 0 | [+1] | [+1 −1] | [+1 +1] |
| P4 | 1 | $\pi(\lfloor k/2 \rfloor)$ | 1 | 0 | 1 | $\pi(\lfloor k/2 \rfloor)$ | [+1] | [+1 −1] | [+1 +1] |
| P5 | — | — | 0 | $\pi(\lfloor k/2 \rfloor)$ | — | — | — | [+1 +1] | — |
| P6 | — | — | 1 | $\pi(\lfloor k/2 \rfloor)$ | — | — | — | [+1 +1] | — |
| P7 | — | — | 0 | $\pi(\lfloor k/2 \rfloor)$ | — | — | — | [+1 −1] | — |
| P8 | — | — | 1 | $\pi(\lfloor k/2 \rfloor)$ | — | — | — | [+1 −1] | — |

[Table 23-1] and [Table 23-2] below show configuration values of parameters in [Equation 25] according to case 9. [Table 23-1] shows parameters configured through a method (case 9-1) of first applying 2 CS and then applying TD-OCC in the two-symbol pattern.

TABLE 23-1

| Antenna port p | Δ | $\varphi_k$ | $w_t(l') = [w_t(0)\ w_t(1)]$ One symbol | Two symbol |
|---|---|---|---|---|
| P1 | 0 | 0 | [+1] | [+1 +1] |
| P2 | 0 | $\pi(\lfloor k/2 \rfloor)$ | [+1] | [+1 +1] |
| P3 | 1 | 0 | [+1] | [+1 +1] |
| P4 | 1 | $\pi(\lfloor k/2 \rfloor)$ | [+1] | [+1 +1] |
| P5 | 0 | 0 | — | [+1 −1] |
| P6 | 0 | $\pi(\lfloor k/2 \rfloor)$ | — | [+1 −1] |
| P7 | 1 | 0 | — | [+1 −1] |
| P8 | 1 | $\pi(\lfloor k/2 \rfloor)$ | — | [+1 −1] |

[Table 23-2] shows parameters configured through a method (case 9-2) of first applying TD-OCC and then applying 2 CS in the two-symbol pattern. In [Table 23-2], Two symbol (*) considers the case in which one-symbol pattern is repeated and a maximum of 4 ports are scheduled in two symbols, which is a method of considering that it is difficult to apply TD-OCC to the high frequency band.

TABLE 23-2

| Antenna port p | Δ One symbol | $\varphi_k$ One symbol | Δ Two symbol | $\varphi_k$ Two symbol | Δ Two symbol(*) | $\varphi_k$ Two symbol(*) | $w_t(l') = [w_t(0)\ w_t(1)]$ One symbol | Two symbol | Two symbol(*) |
|---|---|---|---|---|---|---|---|---|---|
| P1 | 0 | 0 | 0 | 0 | 0 | 0 | [+1] | [+1 +1] | [+1 +1] |
| P2 | 0 | $\pi(\lceil k/2 \rceil)$ | 0 | 0 | 1 | 0 | [+1] | [+1 +1] | [+1 +1] |
| P3 | 1 | 0 | 1 | 0 | 0 | $\pi(\lceil k/2 \rceil)$ | [+1] | [+1 −1] | [+1 +1] |
| P4 | 1 | $\pi(\lceil k/2 \rceil)$ | 1 | 0 | 1 | $\pi(\lceil k/2 \rceil)$ | [+1] | [+1 −1] | [+1 +1] |
| P5 | — | — | 0 | $\pi(\lceil k/2 \rceil)$ | — | — | — | [+1 +1] | — |
| P6 | — | — | 0 | $\pi(\lceil k/2 \rceil)$ | — | — | — | [+1 +1] | — |
| P7 | — | — | 1 | $\pi(\lceil k/2 \rceil)$ | — | — | — | [+1 −1] | — |
| P8 | — | — | 1 | $\pi(\lceil k/2 \rceil)$ | — | — | — | [+1 −1] | — |

[Table 24-1] and [Table 24-2] below show configuration values of parameters in [Equation 25] according to case 10. [Table 24-1] shows parameters configured through a method (case 10-1) of first applying 2 CS and then applying TD-OCC in the two-symbol pattern.

TABLE 24-1

| Antenna port p | Δ One symbol | $\varphi_k$ One symbol | Δ Two symbol | $\varphi_k$ Two symbol | $w_t(l') = [w_t(0)\ w_t(1)]$ One symbol | Two symbol |
|---|---|---|---|---|---|---|
| P1 | 0 | 0 | 0 | 0 | [+1] | [+1 +1] |
| P2 | 0 | $\pi(\lceil k/2 \rceil)$ | 0 | $\pi(\lceil k/2 \rceil)$ | [+1] | [+1 +1] |
| P3 | 1 | 0 | 0 | 0 | [+1] | [+1 −1] |
| P4 | 1 | $\pi(\lceil k/2 \rceil)$ | 0 | $\pi(\lceil k/2 \rceil)$ | [+1] | [+1 −1] |
| P5 | — | — | 1 | 0 | — | [+1 +1] |
| P6 | — | — | 1 | $\pi(\lceil k/2 \rceil)$ | — | [+1 +1] |
| P7 | — | — | 1 | 0 | — | [+1 −1] |
| P8 | — | — | 1 | $\pi(\lceil k/2 \rceil)$ | — | [+1 −1] |

[Table 24-2] shows parameters configured through a method (case 10-2) of first applying TD-OCC and then applying 2 CS in the two-symbol pattern. In [Table 24-2], Two symbol (*) considers the case in which one-symbol pattern is repeated and a maximum of 4 ports are scheduled in two symbols, which is a method of considering that it is difficult to apply TD-OCC to the high frequency band.

TABLE 24-2

| Antenna port p | Δ One symbol | $\varphi_k$ One symbol | Δ Two symbol | $\varphi_k$ Two symbol | Δ Two symbol(*) | $\varphi_k$ Two symbol(*) | $w_t(l') = [w_t(0)\ w_t(1)]$ One symbol | Two symbol | Two symbol(*) |
|---|---|---|---|---|---|---|---|---|---|
| P1 | 0 | 0 | 0 | 0 | 0 | 0 | [+1] | [+1 +1] | [+1 +1] |
| P2 | 0 | $\pi(\lceil k/2 \rceil)$ | 0 | 0 | 1 | 0 | [+1] | [+1 −1] | [+1 +1] |

TABLE 24-2-continued

| Antenna port p | Δ $\varphi_k$ One symbol | | Δ $\varphi_k$ Two symbol | | Δ $\varphi_k$ Two symbol(*) | | $w_t(l') = [w_t(0)\ w_t(1)]$ | |
|---|---|---|---|---|---|---|---|---|
| | | | | | | | One symbol | Two symbol | Two symbol(*) |
| P3 | 1 | 0 | 0 | $\pi([k/2])$ | 0 | $\pi([k/2])$ | [+1] | [+1 +1] | [+1 +1] |
| P4 | 1 | $\pi([k/2])$ | 0 | $\pi([k/2])$ | 1 | $\pi([k/2])$ | [+1] | [+1 −1] | [+1 +1] |
| P5 | — | — | 1 | 0 | — | — | — | [+1 +1] | — |
| P6 | — | — | 1 | 0 | — | — | — | [+1 −1] | — |
| P7 | — | — | 1 | $\pi([k/2])$ | — | — | — | [+1 +1] | — |
| P8 | — | — | 1 | $\pi([k/2])$ | — | — | — | [+1 −1] | — |

The parameters in [Table 15] to [Table 24] correspond to parameter values in [Equation 25], and it is noted that equations and some values may be differently expressed if the same effect can be obtained through different expressions.

Next, in the case of a type 2 pattern, the FD-OCC in 2 REs adjacent on the frequency is the basic structure like the agreement, and in the case of the two-symbol pattern, TD-OCC({1 1} and {1 −1}) is applied and a maximum of 12 orthogonal DMRS ports are supported. As described above, a method of supporting a plurality of antenna ports is applied and the DMRS may be mapped to a first OFDM system and a $k^{th}$ subcarrier on the time as shown in the following equation.

$$a_{k,l}^{(p,\mu)} = w_f(k') \cdot w_t(l') \cdot r(m+m_0)$$

$$k = k_0 + 6m + k' + \Delta$$

$$l = l_0 + l' \text{[Equation 26]}$$

In [Equation 26], r(m) denotes the DMRS sequence generated in [Equation 14] of <Embodiment 2-2>, $w_t(l')$ denotes application of a TD-OCC applied to the two-symbol pattern, and $w_f(k')$ denotes application of 2-FD-OCC in adjacent REs on the frequency.

The values varying depending on the antenna port mapping are presented in detail in the following table.

FIG. 29 illustrates an example of a pattern available in type 2 according to the antenna port mapping method. Reference numerals 2900, 2902, and 2904 indicate antenna ports which can be mapped to different frequency locations. Reference numerals 2910 and 2920 indicate examples of mapping type 2 to one symbol. Reference numeral 2910 corresponds to a mapping method according to a method by which DMRS ports P1/P2, P3/P4, and P5/P6 are separated by FDM, and reference numeral 2920 corresponds to a mapping method according to a method by which DMRS ports P1/P4, P2/P5, and P3/P6 are separated by FDM. In reference numerals 2910 and 2920, two ports mapped to adjacent two REs on the frequency may be separated using FD-OCC. Specifically, the mapping method 2910 may have the following DMRS density.

In the case in which 4 REs are used <=two layer transmission

In the case in which 8 REs are used >two and <=four layer transmission

In the case in which 12 REs are used >four layer transmission

Unlike the above, the mapping method 2920 may have the following DMRS density.

In the case in which 4 REs are used, one layer transmission

In the case in which 8 REs are used, two layer transmission

In the case in which 12 REs are used >two layer transmission

Accordingly, the methods 2910 and 2920 may have different DMRS densities depending on the number of transmitted DMRS ports.

Subsequently, reference numerals 2930 to 2970 illustrate examples of mapping type 2 to two symbols. Reference numeral 2930 corresponds to a mapping method according to a method by which DMRS ports P1/P3/P5/P7 and P2/P4/P6/P8 are separated by FDM, and reference numeral 2940 corresponds to a mapping method according to a method by which DRMS ports P1/P3/P5/P6 and P2/P4/P7/P8 are separated by FDM. Reference numeral 2950 corresponds to a mapping method according to a method by which DMRS ports P1/P2/P5/P7 and P3/P4/P6/P8 are separated by FDM, and reference numeral 2960 corresponds to a mapping method according to a method by which DRMS ports P1/P2/P5/P6 and P3/P4/P7/P8 are separated by FDM. Last, reference numeral 2970 corresponds to a mapping method according to a method by which DMRS ports P1/P2/P3/P4 and P5/P6/P7/P8 are separated by FDM. In reference numerals 2930 to 2970, the number of ports mapped to adjacent two REs on the frequency, which can be separated, may be a maximum of four through the FD-OCC and the TD-OCC. Specifically, the mapping methods 2930 and 2940 may have the following DMRS density.

In the case in which 8 REs are used <=two layer transmission

In the case in which 12 REs are used >two and <=four layer transmission

In the case in which 24 REs are used >four layer transmission

Unlike the above, the mapping methods 2950 and 2960 may have the following DMRS density.

In the case in which 8 REs are used, one layer transmission

In the case in which 12 REs are used, two layer transmission

In the case in which 24 REs are used >two layer transmission

Unlike the above, the mapping method 2970 may have the following DMRS density.

In the case in which 8 REs are used <=four layer transmission

In the case in which 12 REs are used >four and <=eight layer transmission

In the case in which 24 REs are used >eight layer transmission

According to the antenna port mapping method of type 2, it is noted that the DMRS density varies depending thereon and the one-symbol pattern and the two-symbol pattern for the DMRS may use different mapping patterns depending on the optimized mapping method.

More specifically, a detailed method of configuring parameters in [Equation 26] varying depending on which antenna port mapping method is used by the one-symbol pattern or the two-symbol pattern for the DMRS is presented. First, available configuration methods of the one-symbol pattern and the two-symbol pattern for the DMRS may be divided into 10 methods according to the antenna port mapping method illustrated in FIG. 29, and configuration of parameters in [Equation 26] is described through a table.

Case1: One symbol 2910 and Two symbol 2930
Case2: One symbol 2910 and Two symbol 2940
Case3: One symbol 2910 and Two symbol 2950
Case4: One symbol 2910 and Two symbol 2960
Case5: One symbol 2910 and Two symbol 2970
Case6: One symbol 2920 and Two symbol 2930
Case7: One symbol 2920 and Two symbol 2940
Case8: One symbol 2920 and Two symbol 2950
Case9: One symbol 2920 and Two symbol 2960
Case10: One symbol 2920 and Two symbol 2970

Further, the two-symbol pattern may consider additional cases according to priories of FD-OCC and TD-OCC applied to antenna ports within adjacent two REs on the frequency.

Method 1: first apply FD-OCC and then apply TD-OCC in two-symbol pattern
Method 2: first apply TD-OCC and then apply FD-OCC in two-symbol pattern

[Table 25-1] and [Table 25-2] below show configuration values of parameters in [Equation 26] according to case 1.

[Table 25-1] shows parameters configured through a method (case 1-1) of first applying FD-OCC and then applying TD-OCC in the two-symbol pattern.

TABLE 25-1

| Antenna port p | Δ | $w_f(l') =$ $[w_f(0)\ w_f(1)]$ | $w_t(l') = [w_t(0)\ w_t(1)]$ One symbol | Two symbol |
|---|---|---|---|---|
| P1 | 0 | [+1 +1] | [+1] | [+1 +1] |
| P2 | 0 | [+1 −1] | [+1] | [+1 +1] |
| P3 | 2 | [+1 +1] | [+1] | [+1 +1] |
| P4 | 2 | [+1 −1] | [+1] | [+1 +1] |
| P5 | 4 | [+1 +1] | [+1] | [+1 +1] |
| P6 | 4 | [+1 −1] | [+1] | [+1 +1] |
| P7 | 0 | [+1 +1] | — | [+1 −1] |
| P8 | 0 | [+1 −1] | — | [+1 −1] |
| P9 | 2 | [+1 +1] | — | [+1 −1] |
| P10 | 2 | [+1 −1] | — | [+1 −1] |
| P11 | 4 | [+1 +1] | — | [+1 −1] |
| P12 | 4 | [+1 −1] | — | [+1 −1] |

[Table 25-2] shows parameters configured through a method (case 1-2) of first applying TD-OCC and then applying FD-OCC in the two-symbol pattern. In [Table 25-2], Two symbol (*) considers the case in which one-symbol pattern is repeated and a maximum of 6 ports are scheduled in two symbols, which is a method of considering that it is difficult to apply TD-OCC to the high frequency band.

TABLE 25-2

| | Δ | | | $w_f(l') = [w_f(0)\ w_f(1)]$ | | | $w_t(l') = [w_t(0)\ w_t(1)]$ | | |
|---|---|---|---|---|---|---|---|---|---|
| Antenna port p | One symbol | Two symbol | Two symbol (*) | One symbol | Two symbol | Two symbol (*) | One symbol | Two symbol | Two symbol (*) |
| P1 | 0 | 0 | 0 | [+1 +1] | [+1 +1] | [+1 +1] | [+1] | [+1 +1] | [+1 +1] |
| P2 | 0 | 0 | 0 | [+1 −1] | [+1 +1] | [+1 −1] | [+1] | [+1 −1] | [+1 +1] |
| P3 | 2 | 2 | 2 | [+1 +1] | [+1 +1] | [+1 +1] | [+1] | [+1 +1] | [+1 +1] |
| P4 | 2 | 2 | 2 | [+1 −1] | [+1 +1] | [+1 −1] | [+1] | [+1 −1] | [+1 +1] |
| P5 | 4 | 4 | 4 | [+1 +1] | [+1 +1] | [+1 +1] | [+1] | [+1 +1] | [+1 +1] |
| P6 | 4 | 4 | 4 | [+1 −1] | [+1 +1] | [+1 −1] | [+1] | [+1 −1] | [+1 +1] |
| P7 | — | 0 | — | — | [+1 −1] | — | — | [+1 +1] | — |
| P8 | — | 0 | — | — | [+1 −1] | — | — | [+1 −1] | — |
| P9 | — | 2 | — | — | [+1 −1] | — | — | [+1 +1] | — |
| P10 | — | 2 | — | — | [+1 −1] | — | — | [+1 −1] | — |
| P11 | — | 4 | — | — | [+1 −1] | — | — | [+1 +1] | — |
| P12 | — | 4 | — | — | [+1 −1] | — | — | [+1 −1] | — |

[Table 26-1] and [Table 26-2] below show configuration values of parameters in [Equation 26] according to case 2. [Table 26-1] shows parameters configured through a method (case 2-1) of first applying FD-OCC and then applying TD-OCC in the two-symbol pattern.

TABLE 26-1

| Antenna port p | $\Delta$ | $w_f(l') =$ [$w_f(0)$ $w_f(1)$] | $w_t(l') =$ [$w_t(0)$ $w_t(1)$] One symbol | Two symbol |
|---|---|---|---|---|
| P1 | 0 | [+1 +1] | [+1] | [+1 +1] |
| P2 | 0 | [+1 −1] | [+1] | [+1 +1] |
| P3 | 2 | [+1 +1] | [+1] | [+1 +1] |
| P4 | 2 | [+1 −1] | [+1] | [+1 +1] |
| P5 | 4 | [+1 +1] | [+1] | [+1 +1] |
| P6 | 4 | [+1 −1] | [+1] | [+1 +1] |
| P7 | 0 | [+1 +1] | — | [+1 −1] |
| P8 | 2 | [+1 +1] | — | [+1 −1] |

TABLE 26-1-continued

| Antenna port p | $\Delta$ | $w_f(l') =$ [$w_f(0)$ $w_f(1)$] | $w_t(l') =$ [$w_t(0)$ $w_t(1)$] One symbol | Two symbol |
|---|---|---|---|---|
| P9 | 4 | [+1 +1] | — | [+1 −1] |
| P10 | 0 | [+1 −1] | — | [+1 −1] |
| P11 | 2 | [+1 −1] | — | [+1 −1] |
| P12 | 4 | [+1 −1] | — | [+1 −1] |

[Table 26-2] shows parameters configured through a method (case 2-2) of first applying TD-OCC and then applying FD-OCC in the two-symbol pattern. In [Table 26-2], Two symbol (*) considers the case in which one-symbol pattern is repeated and a maximum of 6 ports are scheduled in two symbols, which is a method of considering that it is difficult to apply TD-OCC to the high frequency band.

TABLE 26-2

| Antenna port p | $\Delta$ | | | $w_f(l') = [w_f(0)\ w_f(1)]$ | | | $w_t(l') = [w_t(0)\ w_t(1)]$ | | |
|---|---|---|---|---|---|---|---|---|---|
| | One symbol | Two symbol | Two symbol (*) | One symbol | Two symbol | Two symbol (*) | One symbol | Two symbol | Two symbol (*) |
| P1 | 0 | 0 | 0 | [+1 +1] | [+1 +1] | [+1 +1] | [+1] | [+1 +1] | [+1 +1] |
| P2 | 0 | 0 | 0 | [+1 −1] | [+1 +1] | [+1 −1] | [+1] | [+1 −1] | [+1 +1] |
| P3 | 2 | 2 | 2 | [+1 +1] | [+1 +1] | [+1 +1] | [+1] | [+1 +1] | [+1 +1] |
| P4 | 2 | 2 | 2 | [+1 −1] | [+1 +1] | [+1 −1] | [+1] | [+1 −1] | [+1 +1] |
| P5 | 4 | 4 | 4 | [+1 +1] | [+1 +1] | [+1 +1] | [+1] | [+1 +1] | [+1 +1] |
| P6 | 4 | 4 | 4 | [+1 −1] | [+1 +1] | [+1 −1] | [+1] | [+1 −1] | [+1 +1] |
| P7 | | 0 | | — | [+1 −1] | — | — | [+1 +1] | — |
| P8 | | 2 | | — | [+1 −1] | — | — | [+1 −1] | — |
| P9 | | 4 | | — | [+1 −1] | — | — | [+1 +1] | — |
| P10 | | 0 | | — | [+1 −1] | — | — | [+1 −1] | — |
| P11 | | 2 | | — | [+1 −1] | — | — | [+1 +1] | — |
| P12 | | 4 | | — | [+1 −1] | — | — | [+1 −1] | — |

[Table 27-1] and [Table 27-2] below show configuration values of parameters in [Equation 26] according to case 3. [Table 27-1] shows parameters configured through a method of first applying FD-OCC and then applying TD-OCC in the two-symbol pattern.

TABLE 27-1

| Antenna port p | $\Delta$ | | | $w_f(l') = [w_f(0)\ w_f(1)]$ | | | $w_t(l') = [w_t(0)\ w_t(1)]$ | | |
|---|---|---|---|---|---|---|---|---|---|
| | One symbol | Two symbol | Two symbol (*) | One symbol | Two symbol | Two symbol (*) | One symbol | Two symbol | Two symbol (*) |
| P1 | 0 | 0 | 0 | [+1 +1] | [+1 +1] | [+1 +1] | [+1] | [+1 +1] | [+1 +1] |
| P2 | 0 | 2 | 0 | [+1 −1] | [+1 +1] | [+1 −1] | [+1] | [+1 +1] | [+1 +1] |
| P3 | 2 | 4 | 2 | [+1 +1] | [+1 +1] | [+1 +1] | [+1] | [+1 +1] | [+1 +1] |
| P4 | 2 | 0 | 2 | [+1 −1] | [+1 −1] | [+1 −1] | [+1] | [+1 +1] | [+1 +1] |
| P5 | 4 | 2 | 4 | [+1 +1] | [+1 +1] | [+1 +1] | [+1] | [+1 +1] | [+1 +1] |
| P6 | 4 | 4 | 4 | [+1 −1] | [+1 −1] | [+1 −1] | [+1] | [+1 +1] | [+1 +1] |
| P7 | | 0 | | — | [+1 +1] | — | — | [+1 −1] | — |
| P8 | | 2 | | — | [+1 +1] | — | — | [+1 −1] | — |
| P9 | | 4 | | — | [+1 +1] | — | — | [+1 −1] | — |
| P10 | | 0 | | — | [+1 −1] | — | — | [+1 −1] | — |
| P11 | | 2 | | — | [+1 −1] | — | — | [+1 −1] | — |
| P12 | | 4 | | — | [+1 −1] | — | — | [+1 −1] | — |

[Table 27-2] shows parameters configured through a method (case 3-2) of first applying TD-OCC and then applying FD-OCC in the two-symbol pattern. In [Table 27-2], Two symbol (*) considers the case in which one-symbol pattern is repeated and a maximum of 6 ports are scheduled in two symbols, which is a method of considering that it is difficult to apply TD-OCC to the high frequency band.

TABLE 27-2

| | Δ | | | $w_f(l') = [w_f(0)\ w_f(1)]$ | | | $w_t(l') = [w_t(0)\ w_t(1)]$ | | |
|---|---|---|---|---|---|---|---|---|---|
| Antenna port p | One symbol | Two symbol | Two symbol (*) | One symbol | Two symbol | Two symbol (*) | One symbol | Two symbol | Two symbol (*) |
| P1 | 0 | 0 | 0 | [+1 +1] | [+1 +1] | [+1 +1] | [+1] | [+1 +1] | [+1 +1] |
| P2 | 0 | 2 | 0 | [+1 −1] | [+1 +1] | [+1 −1] | [+1] | [+1 −1] | [+1 +1] |
| P3 | 2 | 4 | 2 | [+1 +1] | [+1 +1] | [+1 +1] | [+1] | [+1 +1] | [+1 +1] |
| P4 | 2 | 0 | 2 | [+1 −1] | [+1 +1] | [+1 −1] | [+1] | [+1 −1] | [+1 +1] |
| P5 | 4 | 2 | 4 | [+1 +1] | [+1 +1] | [+1 +1] | [+1] | [+1 +1] | [+1 +1] |
| P6 | 4 | 4 | 4 | [+1 −1] | [+1 +1] | [+1 −1] | [+1] | [+1 −1] | [+1 +1] |
| P7 | — | 0 | — | — | [+1 −1] | — | — | [+1 +1] | — |
| P8 | — | 2 | — | — | [+1 −1] | — | — | [+1 −1] | — |
| P9 | — | 4 | — | — | [+1 −1] | — | — | [+1 +1] | — |
| P10 | — | 0 | — | — | [+1 −1] | — | — | [+1 −1] | — |
| P11 | — | 2 | — | — | [+1 −1] | — | — | [+1 +1] | — |
| P12 | — | 4 | — | — | [+1 −1] | — | — | [+1 −1] | — |

[Table 28-1] and [Table 28-2] below show configuration values of parameters in [Equation 26] according to case 4. [Table 28-1] shows parameters configured through a method (case 4-1) of first applying FD-OCC and then applying TD-OCC in the two-symbol pattern.

TABLE 28-1

| | Δ | | | $w_f(l') = [w_f(0)\ w_f(1)]$ | | | $w_t(l') = [w_t(0)\ w_t(1)]$ | | |
|---|---|---|---|---|---|---|---|---|---|
| Antenna port p | One symbol | Two symbol | Two symbol (*) | One symbol | Two symbol | Two symbol (*) | One symbol | Two symbol | Two symbol (*) |
| P1 | 0 | 0 | 0 | [+1 +1] | [+1 +1] | [+1 +1] | [+1] | [+1 +1] | [+1 +1] |
| P2 | 0 | 2 | 0 | [+1 −1] | [+1 +1] | [+1 −1] | [+1] | [+1 +1] | [+1 +1] |
| P3 | 2 | 4 | 2 | [+1 +1] | [+1 +1] | [+1 +1] | [+1] | [+1 +1] | [+1 +1] |
| P4 | 2 | 0 | 2 | [+1 −1] | [+1 −1] | [+1 −1] | [+1] | [+1 +1] | [+1 +1] |
| P5 | 4 | 2 | 4 | [+1 +1] | [+1 −1] | [+1 +1] | [+1] | [+1 +1] | [+1 +1] |
| P6 | 4 | 4 | 4 | [+1 −1] | [+1 −1] | [+1 −1] | [+1] | [+1 +1] | [+1 +1] |
| P7 | — | 0 | — | — | [+1 +1] | — | — | [+1 −1] | — |
| P8 | — | 0 | — | — | [+1 −1] | — | — | [+1 −1] | — |
| P9 | — | 2 | — | — | [+1 +1] | — | — | [+1 −1] | — |
| P10 | — | 2 | — | — | [+1 −1] | — | — | [+1 −1] | — |
| P11 | — | 4 | — | — | [+1 +1] | — | — | [+1 −1] | — |
| P12 | — | 4 | — | — | [+1 −1] | — | — | [+1 −1] | — |

[Table 28-2] shows parameters configured through a method (case 4-2) of first applying TD-OCC and then applying FD-OCC in the two-symbol pattern. In [Table 28-2], Two symbol (*) considers the case in which one-symbol pattern is repeated and a maximum of 6 ports are scheduled in two symbols, which is a method of considering that it is difficult to apply TD-OCC to the high frequency band.

TABLE 28-2

| | Δ | | | $w_f(l') = [w_f(0)\ w_f(1)]$ | | | $w_t(l') = [w_t(0)\ w_t(1)]$ | | |
|---|---|---|---|---|---|---|---|---|---|
| Antenna port p | One symbol | Two symbol | Two symbol (*) | One symbol | Two symbol | Two symbol (*) | One symbol | Two symbol | Two symbol (*) |
| P1 | 0 | 0 | 0 | [+1 +1] | [+1 +1] | [+1 +1] | [+1] | [+1 +1] | [+1 +1] |
| P2 | 0 | 2 | 0 | [+1 −1] | [+1 +1] | [+1 −1] | [+1] | [+1 −1] | [+1 +1] |

TABLE 28-2-continued

| Antenna port p | Δ | | | $w_f(l') = [w_f(0)\ w_f(1)]$ | | | $w_t(l') = [w_t(0)\ w_t(1)]$ | | |
|---|---|---|---|---|---|---|---|---|---|
| | One symbol | Two symbol | Two symbol (*) | One symbol | Two symbol | Two symbol (*) | One symbol | Two symbol | Two symbol (*) |
| P3 | 2 | 4 | 2 | [+1 +1] | [+1 +1] | [+1 +1] | [+1] | [+1 +1] | [+1 +1] |
| P4 | 2 | 0 | 2 | [+1 −1] | [+1 −1] | [+1 −1] | [+1] | [+1 −1] | [+1 +1] |
| P5 | 4 | 2 | 4 | [+1 +1] | [+1 +1] | [+1 +1] | [+1] | [+1 +1] | [+1 +1] |
| P6 | 4 | 4 | 4 | [+1 −1] | [+1 +1] | [+1 −1] | [+1] | [+1 −1] | [+1 +1] |
| P7 | — | 0 | | — | [+1 −1] | — | — | [+1 +1] | — |
| P8 | — | 0 | | — | [+1 −1] | — | — | [+1 −1] | — |
| P9 | — | 2 | | — | [+1 −1] | — | — | [+1 +1] | — |
| P10 | — | 2 | | — | [+1 −1] | — | — | [+1 −1] | — |
| P11 | — | 4 | | — | [+1 −1] | — | — | [+1 +1] | — |
| P12 | — | 4 | | — | [+1 −1] | — | — | [+1 −1] | — |

(*) Scheduled up to 6 ports in two symbols

[Table 29-1] and [Table 29-2] below show configuration values of parameters in [Equation 26] according to case 5. [Table 29-1] shows parameters configured through a method (case 5-1) of first applying FD-OCC and then applying TD-OCC in the two-symbol pattern.

TABLE 29-1

| Antenna port p | Δ | | | $w_f(l') = [w_f(0)\ w_f(1)]$ | | | $w_t(l') = [w_t(0)\ w_t(1)]$ | | |
|---|---|---|---|---|---|---|---|---|---|
| | One symbol | Two symbol | Two symbol (*) | One symbol | Two symbol | Two symbol (*) | One symbol | Two symbol | Two symbol (*) |
| P1 | 0 | 0 | 0 | [+1 +1] | [+1 +1] | [+1 +1] | [+1] | [+1 +1] | [+1 +1] |
| P2 | 0 | 0 | 0 | [+1 −1] | [+1 −1] | [+1 −1] | [+1] | [+1 +1] | [+1 +1] |
| P3 | 2 | 0 | 2 | [+1 +1] | [+1 +1] | [+1 +1] | [+1] | [+1 +1] | [+1 +1] |
| P4 | 2 | 0 | 2 | [+1 −1] | [+1 −1] | [+1 −1] | [+1] | [+1 +1] | [+1 +1] |
| P5 | 4 | 2 | 4 | [+1 +1] | [+1 +1] | [+1 +1] | [+1] | [+1 +1] | [+1 +1] |
| P6 | 4 | 2 | 4 | [+1 −1] | [+1 −1] | [+1 −1] | [+1] | [+1 +1] | [+1 +1] |
| P7 | — | 2 | | — | [+1 +1] | — | — | [+1 −1] | — |
| P8 | — | 2 | | — | [+1 −1] | — | — | [+1 −1] | — |
| P9 | — | 4 | | — | [+1 +1] | — | — | [+1 −1] | — |
| P10 | — | 4 | | — | [+1 −1] | — | — | [+1 −1] | — |
| P11 | — | 4 | | — | [+1 +1] | — | — | [+1 −1] | — |
| P12 | — | 4 | | — | [+1 −1] | — | — | [+1 −1] | — |

[Table 29-2] shows parameters configured through a method (case 5-2) of first applying TD-OCC and then applying FD-OCC in the two-symbol pattern. In [Table 29-2], Two symbol (*) considers the case in which one-symbol pattern is repeated and a maximum of 6 ports are scheduled in two symbols, which is a method of considering that it is difficult to apply TD-OCC to the high frequency band.

TABLE 29-2

| Antenna port p | Δ | | | $w_f(l') = [w_f(0)\ w_f(1)]$ | | | $w_t(l') = [w_t(0)\ w_t(1)]$ | | |
|---|---|---|---|---|---|---|---|---|---|
| | One symbol | Two symbol | Two symbol (*) | One symbol | Two symbol | Two symbol (*) | One symbol | Two symbol | Two symbol (*) |
| P1 | 0 | 0 | 0 | [+1 +1] | [+1 +1] | [+1 +1] | [+1] | [+1 +1] | [+1 +1] |
| P2 | 0 | 0 | 0 | [+1 −1] | [+1 +1] | [+1 −1] | [+1] | [+1 −1] | [+1 +1] |
| P3 | 2 | 0 | 2 | [+1 +1] | [+1 +1] | [+1 +1] | [+1] | [+1 +1] | [+1 +1] |
| P4 | 2 | 0 | 2 | [+1 −1] | [+1 +1] | [+1 −1] | [+1] | [+1 −1] | [+1 +1] |
| P5 | 4 | 2 | 4 | [+1 +1] | [+1 +1] | [+1 +1] | [+1] | [+1 +1] | [+1 +1] |
| P6 | 4 | 2 | 4 | [+1 −1] | [+1 +1] | [+1 −1] | [+1] | [+1 −1] | [+1 +1] |
| P7 | — | 2 | | — | [+1 −1] | — | — | [+1 +1] | — |
| P8 | — | 2 | | — | [+1 −1] | — | — | [+1 +1] | — |
| P9 | — | 4 | | — | [+1 −1] | — | — | [+1 +1] | — |

TABLE 29-2-continued

| | Δ | | | $w_f(l') = [w_f(0)\ w_f(1)]$ | | | $w_t(l') = [w_t(0)\ w_t(1)]$ | | |
|---|---|---|---|---|---|---|---|---|---|
| Antenna port p | One symbol | Two symbol | Two symbol (*) | One symbol | Two symbol | Two symbol (*) | One symbol | Two symbol | Two symbol (*) |
| P10 | — | 4 | — | — | [+1 −1] | — | — | [+1 −1] | — |
| P11 | — | 4 | — | — | [+1 −1] | — | — | [+1 +1] | — |
| P12 | — | 4 | — | — | [+1 −1] | — | — | [+1 −1] | — |

[Table 30-1] and [Table 30-2] below show configuration values of parameters in [Equation 26] according to case 6. [Table 30-1] shows parameters configured through a method (case 6-1) of first applying FD-OCC and then applying TD-OCC in the two-symbol pattern.

TABLE 30-1

| | Δ | | | $w_f(l') = [w_f(0)\ w_f(1)]$ | | | $w_t(l') = [w_t(0)\ w_t(1)]$ | | |
|---|---|---|---|---|---|---|---|---|---|
| Antenna port p | One symbol | Two symbol | Two symbol (*) | One symbol | Two symbol | Two symbol (*) | One symbol | Two symbol | Two symbol (*) |
| P1 | 0 | 0 | 0 | [+1 +1] | [+1 +1] | [+1 +1] | [+1] | [+1 +1] | [+1 +1] |
| P2 | 2 | 0 | 2 | [+1 +1] | [+1 −1] | [+1 +1] | [+1] | [+1 +1] | [+1 +1] |
| P3 | 4 | 2 | 4 | [+1 +1] | [+1 +1] | [+1 +1] | [+1] | [+1 +1] | [+1 +1] |
| P4 | 0 | 2 | 0 | [+1 −1] | [+1 −1] | [+1 −1] | [+1] | [+1 +1] | [+1 +1] |
| P5 | 2 | 4 | 2 | [+1 −1] | [+1 +1] | [+1 −1] | [+1] | [+1 +1] | [+1 +1] |
| P6 | 4 | 4 | 4 | [+1 −1] | [+1 −1] | [+1 −1] | [+1] | [+1 +1] | [+1 +1] |
| P7 | — | 0 | — | — | [+1 +1] | — | — | [+1 −1] | — |
| P8 | — | 0 | — | — | [+1 −1] | — | — | [+1 −1] | — |
| P9 | — | 2 | — | — | [+1 +1] | — | — | [+1 −1] | — |
| P10 | — | 2 | — | — | [+1 −1] | — | — | [+1 −1] | — |
| P11 | — | 4 | — | — | [+1 +1] | — | — | [+1 −1] | — |
| P12 | — | 4 | — | — | [+1 −1] | — | — | [+1 −1] | — |

[Table 30-2] shows parameters configured through a method (case 6-2) of first applying TD-OCC and then applying FD-OCC in the two-symbol pattern. In [Table 30-2], Two symbol (*) considers the case in which one-symbol pattern is repeated and a maximum of 6 ports are scheduled in two symbols, which is a method of considering that it is difficult to apply TD-OCC to the high frequency band.

TABLE 30-2

| | Δ | | | $w_f(l') = [w_f(0)\ w_f(1)]$ | | | $w_t(l') = [w_t(0)\ w_t(1)]$ | | |
|---|---|---|---|---|---|---|---|---|---|
| Antenna port p | One symbol | Two symbol | Two symbol (*) | One symbol | Two symbol | Two symbol (*) | One symbol | Two symbol | Two symbol (*) |
| P1 | 0 | 0 | 0 | [+1 +1] | [+1 +1] | [+1 +1] | [+1] | [+1 +1] | [+1 +1] |
| P2 | 2 | 0 | 2 | [+1 +1] | [+1 +1] | [+1 +1] | [+1] | [+1 −1] | [+1 +1] |
| P3 | 4 | 2 | 4 | [+1 +1] | [+1 +1] | [+1 +1] | [+1] | [+1 +1] | [+1 +1] |
| P4 | 0 | 2 | 0 | [+1 −1] | [+1 +1] | [+1 −1] | [+1] | [+1 −1] | [+1 +1] |
| P5 | 2 | 4 | 2 | [+1 −1] | [+1 +1] | [+1 −1] | [+1] | [+1 +1] | [+1 +1] |
| P6 | 4 | 4 | 4 | [+1 −1] | [+1 −1] | [+1 −1] | [+1] | [+1 −1] | [+1 +1] |
| P7 | — | 0 | — | — | [+1 −1] | — | — | [+1 +1] | — |
| P8 | — | 0 | — | — | [+1 −1] | — | — | [+1 −1] | — |
| P9 | — | 2 | — | — | [+1 −1] | — | — | [+1 +1] | — |
| P10 | — | 2 | — | — | [+1 −1] | — | — | [+1 −1] | — |
| P11 | — | 4 | — | — | [+1 −1] | — | — | [+1 +1] | — |
| P12 | — | 4 | — | — | [+1 −1] | — | — | [+1 −1] | — |

[Table 31-1] and [Table 31-2] below show configuration values of parameters in [Equation 26] according to case 7. [Table 31-1] shows parameters configured through a method (case 7-1) of first applying FD-OCC and then applying TD-OCC in the two-symbol pattern.

TABLE 31-1

| Antenna port p | Δ One symbol | Δ Two symbol | Δ Two symbol (*) | $w_f(l') = [w_f(0)\ w_f(1)]$ One symbol | $w_f(l') = [w_f(0)\ w_f(1)]$ Two symbol | $w_f(l') = [w_f(0)\ w_f(1)]$ Two symbol (*) | $w_t(l') = [w_t(0)\ w_t(1)]$ One symbol | $w_t(l') = [w_t(0)\ w_t(1)]$ Two symbol | $w_t(l') = [w_t(0)\ w_t(1)]$ Two symbol (*) |
|---|---|---|---|---|---|---|---|---|---|
| P1 | 0 | 0 | 0 | [+1 +1] | [+1 +1] | [+1 +1] | [+1] | [+1 +1] | [+1 +1] |
| P2 | 2 | 0 | 2 | [+1 +1] | [+1 −1] | [+1 +1] | [+1] | [+1 +1] | [+1 +1] |
| P3 | 4 | 2 | 4 | [+1 +1] | [+1 +1] | [+1 +1] | [+1] | [+1 +1] | [+1 +1] |
| P4 | 0 | 2 | 0 | [+1 −1] | [+1 −1] | [+1 −1] | [+1] | [+1 +1] | [+1 +1] |
| P5 | 2 | 4 | 2 | [+1 −1] | [+1 +1] | [+1 −1] | [+1] | [+1 +1] | [+1 +1] |
| P6 | 4 | 4 | 4 | [+1 −1] | [+1 −1] | [+1 −1] | [+1] | [+1 +1] | [+1 +1] |
| P7 | — | 0 | — | — | [+1 +1] | — | — | [+1 −1] | — |
| P8 | — | 2 | — | — | [+1 +1] | — | — | [+1 −1] | — |
| P9 | — | 4 | — | — | [+1 +1] | — | — | [+1 −1] | — |
| P10 | — | 0 | — | — | [+1 −1] | — | — | [+1 −1] | — |
| P11 | — | 2 | — | — | [+1 −1] | — | — | [+1 −1] | — |
| P12 | — | 4 | — | — | [+1 −1] | — | — | [+1 −1] | — |

[Table 31-2] shows parameters configured through a method (case 7-2) of first applying TD-OCC and then applying FD-OCC in the two-symbol pattern. In [Table 31-2], Two symbol (*) considers the case in which one-symbol pattern is repeated and a maximum of 6 ports are scheduled in two symbols, which is a method of considering that it is difficult to apply TD-OCC to the high frequency band.

TABLE 31-2

| Antenna port p | Δ One symbol | Δ Two symbol | Δ Two symbol (*) | $w_f(l') = [w_f(0)\ w_f(1)]$ One symbol | $w_f(l') = [w_f(0)\ w_f(1)]$ Two symbol | $w_f(l') = [w_f(0)\ w_f(1)]$ Two symbol (*) | $w_t(l') = [w_t(0)\ w_t(1)]$ One symbol | $w_t(l') = [w_t(0)\ w_t(1)]$ Two symbol | $w_t(l') = [w_t(0)\ w_t(1)]$ Two symbol (*) |
|---|---|---|---|---|---|---|---|---|---|
| P1 | 0 | 0 | 0 | [+1 +1] | [+1 +1] | [+1 +1] | [+1] | [+1 +1] | [+1 +1] |
| P2 | 2 | 0 | 2 | [+1 +1] | [+1 +1] | [+1 +1] | [+1] | [+1 −1] | [+1 +1] |
| P3 | 4 | 2 | 4 | [+1 +1] | [+1 +1] | [+1 +1] | [+1] | [+1 +1] | [+1 +1] |
| P4 | 0 | 2 | 0 | [+1 −1] | [+1 +1] | [+1 −1] | [+1] | [+1 −1] | [+1 +1] |
| P5 | 2 | 4 | 2 | [+1 −1] | [+1 +1] | [+1 −1] | [+1] | [+1 +1] | [+1 +1] |
| P6 | 4 | 4 | 4 | [+1 −1] | [+1 +1] | [+1 −1] | [+1] | [+1 −1] | [+1 +1] |
| P7 | — | 0 | — | — | [+1 −1] | — | — | [+1 +1] | — |
| P8 | — | 2 | — | — | [+1 −1] | — | — | [+1 −1] | — |
| P9 | — | 4 | — | — | [+1 −1] | — | — | [+1 +1] | — |
| P10 | — | 0 | — | — | [+1 −1] | — | — | [+1 −1] | — |
| P11 | — | 2 | — | — | [+1 −1] | — | — | [+1 +1] | — |
| P12 | — | 4 | — | — | [+1 −1] | — | — | [+1 −1] | — |

[Table 32-1] and [Table 32-2] below show configuration values of parameters in [Equation 26] according to case 8. [Table 32-1] shows parameters configured through a method (case 8-1) of first applying FD-OCC and then applying TD-OCC in the two-symbol pattern.

TABLE 32-1

| Antenna port p | Δ | $wf(l') = [wf(0)\ wf(1)]$ | $wt(l') = [wt(0)\ wt(1)]$ One symbol | $wt(l') = [wt(0)\ wt(1)]$ Two symbol |
|---|---|---|---|---|
| P1 | 0 | [+1 +1] | [+1] | [+1 +1] |
| P2 | 2 | [+1 +1] | [+1] | [+1 +1] |
| P3 | 4 | [+1 +1] | [+1] | [+1 +1] |
| P4 | 0 | [+1 −1] | [+1] | [+1 +1] |
| P5 | 2 | [+1 −1] | [+1] | [+1 +1] |
| P6 | 4 | [+1 −1] | [+1] | [+1 +1] |
| P7 | 0 | [+1 +1] | — | [+1 −1] |
| P8 | 2 | [+1 +1] | — | [+1 −1] |
| P9 | 4 | [+1 +1] | — | [+1 −1] |
| P10 | 0 | [+1 −1] | — | [+1 −1] |
| P11 | 2 | [+1 −1] | — | [+1 −1] |
| P12 | 4 | [+1 −1] | — | [+1 −1] |

[Table 32-2] shows parameters configured through a method (case 8-2) of first applying TD-OCC and then applying FD-OCC in the two-symbol pattern. In [Table 32-2], Two symbol (*) considers the case in which one-symbol pattern is repeated and a maximum of 6 ports are scheduled in two symbols, which is a method of considering that it is difficult to apply TD-OCC to the high frequency band.

TABLE 32-2

| Antenna port p | Δ One symbol | Δ Two symbol | Δ Two symbol (*) | $w_f(l') = [w_f(0)\ w_f(1)]$ One symbol | $w_f(l') = [w_f(0)\ w_f(1)]$ Two symbol | $w_f(l') = [w_f(0)\ w_f(1)]$ Two symbol (*) | $w_t(l') = [w_t(0)\ w_t(1)]$ One symbol | $w_t(l') = [w_t(0)\ w_t(1)]$ Two symbol | $w_t(l') = [w_t(0)\ w_t(1)]$ Two symbol (*) |
|---|---|---|---|---|---|---|---|---|---|
| P1 | 0 | 0 | 0 | [+1 +1] | [+1 +1] | [+1 +1] | [+1] | [+1 +1] | [+1 +1] |
| P2 | 2 | 2 | 2 | [+1 +1] | [+1 +1] | [+1 +1] | [+1] | [+1 −1] | [+1 +1] |
| P3 | 4 | 4 | 4 | [+1 +1] | [+1 +1] | [+1 +1] | [+1] | [+1 +1] | [+1 +1] |
| P4 | 0 | 0 | 0 | [+1 −1] | [+1 +1] | [+1 −1] | [+1] | [+1 −1] | [+1 +1] |
| P5 | 2 | 2 | 2 | [+1 −1] | [+1 +1] | [+1 −1] | [+1] | [+1 +1] | [+1 +1] |
| P6 | 4 | 4 | 4 | [+1 −1] | [+1 +1] | [+1 −1] | [+1] | [+1 −1] | [+1 +1] |
| P7 | — | 0 | — | — | [+1 −1] | — | — | [+1 +1] | — |
| P8 | — | 2 | — | — | [+1 −1] | — | — | [+1 −1] | — |
| P9 | — | 4 | — | — | [+1 −1] | — | — | [+1 +1] | — |
| P10 | — | 0 | — | — | [+1 −1] | — | — | [+1 −1] | — |
| P11 | — | 2 | — | — | [+1 −1] | — | — | [+1 +1] | — |
| P12 | — | 4 | — | — | [+1 −1] | — | — | [+1 −1] | — |

[Table 33-1] and [Table 33-2] below show configuration values of parameters in [Equation 26] according to case 9. [Table 33-1] shows parameters configured through a method (case 9-1) of first applying FD-OCC and then applying TD-OCC in the two-symbol pattern.

TABLE 33-1

| Antenna port p | Δ | $wf(l') = [wf(0)\ wf(1)]$ | $wt(l') = [wt(0)\ wt(1)]$ One symbol | $wt(l') = [wt(0)\ wt(1)]$ Two symbol |
|---|---|---|---|---|
| P1 | 0 | [+1 +1] | [+1] | [+1 +1] |
| P2 | 2 | [+1 +1] | [+1] | [+1 +1] |
| P3 | 4 | [+1 +1] | [+1] | [+1 +1] |
| P4 | 0 | [+1 −1] | [+1] | [+1 +1] |
| P5 | 2 | [+1 −1] | [+1] | [+1 +1] |
| P6 | 4 | [+1 −1] | [+1] | [+1 +1] |
| P7 | 0 | [+1 +1] | — | [+1 −1] |
| P8 | 0 | [+1 −1] | — | [+1 −1] |
| P9 | 2 | [+1 +1] | — | [+1 −1] |
| P10 | 2 | [+1 −1] | — | [+1 −1] |
| P11 | 4 | [+1 +1] | — | [+1 −1] |
| P12 | 4 | [+1 −1] | — | [+1 −1] |

[Table 33-2] shows parameters configured through a method (case 9-2) of first applying TD-OCC and then applying FD-OCC in the two-symbol pattern. In [Table 33-2], Two symbol (*) considers the case in which one-symbol pattern is repeated and a maximum of 6 ports are scheduled in two symbols, which is a method of considering that it is difficult to apply TD-OCC to the high frequency band.

TABLE 33-2

| Antenna port p | Δ One symbol | Δ Two symbol | Δ Two symbol (*) | $w_f(l') = [w_f(0)\ w_f(1)]$ One symbol | $w_f(l') = [w_f(0)\ w_f(1)]$ Two symbol | $w_f(l') = [w_f(0)\ w_f(1)]$ Two symbol (*) | $w_t(l') = [w_t(0)\ w_t(1)]$ One symbol | $w_t(l') = [w_t(0)\ w_t(1)]$ Two symbol | $w_t(l') = [w_t(0)\ w_t(1)]$ Two symbol (*) |
|---|---|---|---|---|---|---|---|---|---|
| P1 | 0 | 0 | 0 | [+1 +1] | [+1 +1] | [+1 +1] | [+1] | [+1 +1] | [+1 +1] |
| P2 | 2 | 2 | 2 | [+1 +1] | [+1 +1] | [+1 +1] | [+1] | [+1 −1] | [+1 +1] |
| P3 | 4 | 4 | 4 | [+1 +1] | [+1 +1] | [+1 +1] | [+1] | [+1 +1] | [+1 +1] |
| P4 | 0 | 0 | 0 | [+1 −1] | [+1 +1] | [+1 −1] | [+1] | [+1 −1] | [+1 +1] |
| P5 | 2 | 2 | 2 | [+1 −1] | [+1 +1] | [+1 −1] | [+1] | [+1 +1] | [+1 +1] |
| P6 | 4 | 4 | 4 | [+1 −1] | [+1 +1] | [+1 −1] | [+1] | [+1 −1] | [+1 +1] |
| P7 | — | 0 | — | — | [+1 −1] | — | — | [+1 +1] | — |
| P8 | — | 0 | — | — | [+1 −1] | — | — | [+1 −1] | — |
| P9 | — | 2 | — | — | [+1 −1] | — | — | [+1 +1] | — |
| P10 | — | 2 | — | — | [+1 −1] | — | — | [+1 −1] | — |
| P11 | — | 4 | — | — | [+1 −1] | — | — | [+1 +1] | — |
| P12 | — | 4 | — | — | [+1 −1] | — | — | [+1 −1] | — |

[Table 34-1] and [Table 34-2] below show configuration values of parameters in [Equation 26] according to case 10. [Table 34-1] shows parameters configured through a method (case 10-1) of first applying FD-OCC and then applying TD-OCC in the two-symbol pattern.

TABLE 34-1

| | Δ | | | $w_f(l') = [w_f(0)\ w_f(1)]$ | | | $w_t(l') = [w_t(0)\ w_t(1)]$ | | |
|---|---|---|---|---|---|---|---|---|---|
| Antenna port p | One symbol | Two symbol | Two symbol (*) | One symbol | Two symbol | Two symbol (*) | One symbol | Two symbol | Two symbol (*) |
| P1 | 0 | 0 | 0 | [+1 +1] | [+1 +1] | [+1 +1] | [+1] | [+1 +1] | [+1 +1] |
| P2 | 2 | 0 | 2 | [+1 +1] | [+1 −1] | [+1 +1] | [+1] | [+1 +1] | [+1 +1] |
| P3 | 4 | 0 | 4 | [+1 +1] | [+1 +1] | [+1 +1] | [+1] | [+1 +1] | [+1 +1] |
| P4 | 0 | 0 | 0 | [+1 −1] | [+1 −1] | [+1 −1] | [+1] | [+1 +1] | [+1 +1] |
| P5 | 2 | 2 | 2 | [+1 −1] | [+1 +1] | [+1 −1] | [+1] | [+1 +1] | [+1 +1] |
| P6 | 4 | 2 | 4 | [+1 −1] | [+1 −1] | [+1 −1] | [+1] | [+1 +1] | [+1 +1] |
| P7 | — | 2 | — | — | [+1 +1] | — | — | [+1 −1] | — |
| P8 | — | 2 | — | — | [+1 −1] | — | — | [+1 −1] | — |
| P9 | — | 4 | — | — | [+1 +1] | — | — | [+1 −1] | — |
| P10 | — | 4 | — | — | [+1 −1] | — | — | [+1 −1] | — |
| P11 | — | 4 | — | — | [+1 +1] | — | — | [+1 −1] | — |
| P12 | — | 4 | — | — | [+1 −1] | — | — | [+1 −1] | — |

[Table 34-2] shows parameters configured through a method (case 10-2) of first applying TD-OCC and then applying FD-OCC in the two-symbol pattern. In [Table 34-2], Two symbol (*) considers the case in which one-symbol pattern is repeated and a maximum of 6 ports are scheduled in two symbols, which is a method of considering that it is difficult to apply TD-OCC to the high frequency band.

TABLE 34-2

| | Δ | | | $w_f(l') = [w_f(0)\ w_f(1)]$ | | | $w_t(l') = [w_t(0)\ w_t(1)]$ | | |
|---|---|---|---|---|---|---|---|---|---|
| Antenna port p | One symbol | Two symbol | Two symbol (*) | One symbol | Two symbol | Two symbol (*) | One symbol | Two symbol | Two symbol (*) |
| P1 | 0 | 0 | 0 | [+1 +1] | [+1 +1] | [+1 +1] | [+1] | [+1 +1] | [+1 +1] |
| P2 | 2 | 0 | 2 | [+1 +1] | [+1 +1] | [+1 +1] | [+1] | [+1 −1] | [+1 +1] |
| P3 | 4 | 0 | 4 | [+1 +1] | [+1 +1] | [+1 +1] | [+1] | [+1 +1] | [+1 +1] |
| P4 | 0 | 0 | 0 | [+1 −1] | [+1 +1] | [+1 −1] | [+1] | [+1 −1] | [+1 +1] |
| P5 | 2 | 2 | 2 | [+1 −1] | [+1 +1] | [+1 −1] | [+1] | [+1 +1] | [+1 +1] |
| P6 | 4 | 2 | 4 | [+1 −1] | [+1 +1] | [+1 −1] | [+1] | [+1 −1] | [+1 +1] |
| P7 | — | 2 | — | — | [+1 −1] | — | — | [+1 +1] | — |
| P8 | — | 2 | — | — | [+1 −1] | — | — | [+1 −1] | — |
| P9 | — | 4 | — | — | [+1 −1] | — | — | [+1 +1] | — |
| P10 | — | 4 | — | — | [+1 −1] | — | — | [+1 −1] | — |
| P11 | — | 4 | — | — | [+1 −1] | — | — | [+1 +1] | — |
| P12 | — | 4 | — | — | [+1 −1] | — | — | [+1 −1] | — |

The parameters in [Table 25] to [Table 34] above correspond to parameter values in [Equation 26], and it is noted that equations and some values may be differently expressed if the same effect can be obtained through different expressions.

Embodiment 2-6

<Embodiment 2-6> suggests a DMRS power boosting method based on the DMRS pattern described in <Embodiment 2-5>. It is noted that the DMRS power boosting method may vary depending on the DMRS pattern. As illustrated in FIG. 28, in the case of the type 1 DMRS pattern, comb 2 and 2 CS may be used, and if the number of data transmission layers is larger than 2, transmission can be performed with DMRS power increased two times compared to data.

FIG. 30 illustrates an example of DMRS transmission for the type 1 DMRS pattern.

Specifically, as indicated by reference numeral 3010, if the number of data transmission layers is 4, the DRMS is transmitted through only 2 ports in REs in which the DMRS is transmitted in the case of reference numeral 2810, so that transmission can be performed with increased power two times. This is applied to all patterns illustrated in FIG. 28. As described above, in the case of the type 1 DMRS pattern, DMRS power boosting can be presented at a ratio of a PDSCH (data) and energy per resource element (EPRE) of a UE-specific RS (DMRS) as described below.

For DMRS configuration type1, if UE-specific RSs are present in the PRBs upon which the corresponding PDSCH is mapped, the UE may assume the ratio of PDSCH EPRE to UE-specific RS EPRE within each OFDM symbol containing the UE-specific RS.

0 dB for number of transmission layers less than or equal to two and −3 dB otherwise Unlike the above, as illustrated in FIG. 29, in the case of the type 2 DMRS pattern, OCC is applied to two adjacent REs on the frequency, and if the number of transmission layers is larger than 2, transmission can be performed with DMRS power increased two times compared to data. If the number of data transmission layers is larger than 4, transmission can be performed with DMRS power increased three times compared to data. Specifically, as indicated by reference numeral 3020, if the number of data transmission layers is 6, the DRMS is transmitted through only 2 ports in REs in which the DMRS is transmitted in the case of reference numeral 2910, so that transmission can be performed with DMRS power increased three times. This is applied to all patterns illustrated in FIG. 29. As described above, in the case of the type 2 DMRS pattern, DMRS power boosting can be presented at a ratio of a PDSCH (data) and EPRE of a UE-specific RS (DMRS) as described below.

For DMRS configuration type1, if UE-specific RSs are present in the PRBs upon which the corresponding PDSCH is mapped, the UE may assume the ratio of PDSCH EPRE to UE-specific RS EPRE within each OFDM symbol containing the UE-specific RS.

0 dB for number of transmission layers less than or equal to two

−3 dB for number of transmission layers less than or equal to two and −4.77 dB otherwise Embodiment 2-7

<Embodiment 2-7> proposes a DMRS information signaling method based on the DMRS pattern described in <Embodiment 2-5>. The DMRS signaling method may vary depending on the DMRS pattern. DMRS signaling information may include the following.

Number of layers & port number
SCID (Scrambling ID)
One symbol and two symbol indicators The number of layers and the port number are information required for SU/MU dynamic switching and MU operation. As described in <Embodiment 2-5>, the type 1 DMRS pattern is a method of supporting a maximum of four ports in one symbol and a maximum of eight ports in two symbols, and the type 2 DMRS pattern is a method of supporting a maximum of six port in one symbol and a maximum of twelve ports in two symbols. Accordingly, the type 1 and type 2 DMRS patterns have different total numbers of orthogonal DMRS layers and different port numbers. Further, the SCID is a parameter which can be used for Coordinated Multi-Point (CoMP) operation, and may function as a virtual cell ID and identify the DMRS from adjacent cells. Although one-bit SCID is used in the LTE system, the number of SCID bits may increase in the NR system. Last, one symbol and two symbol indicators have the DMRS pattern consisting of one symbol or two symbols. Since two symbols can be configured even in low layer transmission, the base station should signal information thereon to the UE through one bit.

Among the information, the number of layers, the port number, and the SCID are information requiring dynamic switching and thus should be dynamically signaled through DCI. However, one symbol and two symbol indicators may be configured through a higher layer or dynamically signaled through DCI. If one symbol and two symbol indicators are configured through the higher layer, operation of the DMRS through one symbol or two symbols may be limited.

Hereinafter, difference between type 1 and type 2 will be described on the basis of a signaling method according to the number of layers and the port number among the DMRS information. More specifically, in the following embodiment, the number of bits described below is used to signal information on the number of layers and the port number with respect to type 1 and type 2.

Type 1: number of layers and port number→4 bits
Type 2: number of layers and port number→5 bits At this time, an amount of information of 1 bit is different depending on the configuration of type 1 and type 2, so that a total number of bits of DCI may vary depending on whether the DMRS pattern is configured as type 1 or type 2 through the higher layer. Alternatively, through zero padding, the number of required DCI bits may be configured to fit a larger side in the case of type 1 or type 2.

As described above, the type 1 DMRS pattern is a method supporting a maximum of four ports in one symbol and a maximum of eight ports in two symbols, and [Table 35] shows a DMRS table design method when a maximum number of MU-MIMO layers supported per UE is 2 in the case in which MU-MIMO is supported using eight orthogonal ports for the type 1 DMRS pattern.

TABLE 35

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, P1 | 0 | 5 layer, P1-P5 |
| 1 | 1 layer, P2 | 1 | 6 layer, P1-P6 |
| 2 | 1 layer, P3 | 2 | 7 layer, P1-P7 |
| 3 | 1 layer, P4 | 3 | 8 layer, P1-P8 |
| 4 | 1 layer, P5 | 4 | Reserved |
| 5 | 1 layer, P6 | 5 | Reserved |
| 6 | 1 layer, P7 | 6 | Reserved |
| 7 | 1 layer, P8 | 7 | Reserved |
| 8 | 2 layer, P1-P2 | 8 | Reserved |
| 9 | 2 layer, P3-P4 | 9 | Reserved |
| 10 | 2 layer, P5-P6 | 10 | Reserved |
| 11 | 2 layer, P7-P8 | 11 | Reserved |
| 12 | 3 layer, P1-P3 | 12 | Reserved |
| 13 | 4 layer, P1-P4 | 13 | Reserved |
| 14 | Reserved | 14 | Reserved |
| 15 | Reserved | 15 | Reserved |

Unlike the above, [Table 36] shows a DMRS table design method when a maximum number of MU-MIMO layers supported per UE is 4 in the case in which MU-MIMO is supported using 8 orthogonal ports for the type 1 DMRS pattern.

TABLE 36

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, P1 | 0 | 5 layer, P1-P5 |
| 1 | 1 layer, P2 | 1 | 6 layer, P1-P6 |
| 2 | 1 layer, P3 | 2 | 7 layer, P1-P7 |
| 3 | 1 layer, P4 | 3 | 8 layer, P1-P8 |
| 4 | 1 layer, P5 | 4 | Reserved |
| 5 | 1 layer, P6 | 5 | Reserved |
| 6 | 1 layer, P7 | 6 | Reserved |

TABLE 36-continued

| One Codeword: Codeword 0 enabled, Codeword 1 disabled | | Two Codewords: Codeword 0 enabled, Codeword 1 enabled | |
|---|---|---|---|
| Value | Message | Value | Message |
| 7 | 1 layer, P8 | 7 | Reserved |
| 8 | 2 layer, P1-P2 | 8 | Reserved |
| 9 | 2 layer, P3-P4 | 9 | Reserved |
| 10 | 2 layer, P5-P6 | 10 | Reserved |
| 11 | 2 layer, P7-P8 | 11 | Reserved |
| 12 | 3 layer, P1-P3 | 12 | Reserved |
| 13 | 3 layer, P4-P6 | 13 | Reserved |
| 14 | 4 layer, P1-P4 | 14 | Reserved |
| 15 | 4 layer, P5-P8 | 15 | Reserved |

As described above, the type 2 DMRS pattern is a method supporting a maximum of six ports in one symbol and a maximum of twelve ports in two symbols, and [Table 37] shows a DMRS table design method when a maximum number of MU-MIMO layers supported per UE is 2 in the case in which MU-MIMO is supported using twelve orthogonal ports for the type 2 DMRS pattern. In this case, the number of cases in which the number of MU-MIMO layers supported per UE is 1 is expressed as 12 and the number of cases in which the number of MU-MIMO layers supported per UE is 2 is expressed as 6.

TABLE 37

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, P1 | 0 | 5 layers, P1-5 |
| 1 | 1 layer, P2 | 1 | 6 layers, P1-6 |
| 2 | 1 layer, P3 | 2 | 7 layers, P1-7 |
| 3 | 1 layer, P4 | 3 | 8 layers, P1-8 |
| 4 | 1 layer, P5 | 4 | Reserved |
| 5 | 1 layer, P6 | 5 | Reserved |
| 6 | 1 layer, P7 | 6 | Reserved |
| 7 | 1 layer, P8 | 7 | Reserved |
| 8 | 1 layer, P9 | 8 | Reserved |
| 9 | 1 layer, P10 | 9 | Reserved |
| 10 | 1 layer, P11 | 10 | Reserved |
| 11 | 1 layer, P12 | 11 | Reserved |
| 12 | 2 layers, P1-2 | 12 | Reserved |
| 13 | 2 layers, P3-4 | 13 | Reserved |
| 14 | 2 layers, P5-6 | 14 | Reserved |
| 15 | 2 layers, P7-8 | 15 | Reserved |
| 16 | 2 layers, P9-10 | 16 | Reserved |
| 17 | 2 layers, P11-12 | 17 | Reserved |
| 18 | 3 layers, P1-3 | 18 | Reserved |
| 19 | 4 layers, P1-4 | 19 | Reserved |
| 20 | Reserved | 20 | Reserved |
| 21 | Reserved | 21 | Reserved |
| 22 | Reserved | 22 | Reserved |
| 23 | Reserved | 23 | Reserved |
| 24 | Reserved | 24 | Reserved |
| 25 | Reserved | 25 | Reserved |
| 26 | Reserved | 26 | Reserved |
| 27 | Reserved | 27 | Reserved |
| 28 | Reserved | 28 | Reserved |
| 29 | Reserved | 29 | Reserved |
| 30 | Reserved | 30 | Reserved |
| 31 | Reserved | 31 | Reserved |

Unlike the above, [Table 38] shows a DMRS table design method when a maximum number of MU-MIMO layers supported per UE is 4 in the case in which MU-MIMO is supported using twelve orthogonal ports for the type 2 DMRS pattern. In this case, the number of cases in which the number of MU0MIMO layers supported per UE 1 is expressed as 12, the number of cases in which the number of MU0MIMO layers supported per UE 2 is expressed as 6, the number of cases in which the number of MU0MIMO layers supported per UE 3 is expressed as 4, and the number of cases in which the number of MU0MIMO layers supported per UE 4 is expressed as 3.

TABLE 38

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, P1 | 0 | 5 layers, P1-5 |
| 1 | 1 layer, P2 | 1 | 6 layers, P1-6 |
| 2 | 1 layer, P3 | 2 | 7 layers, P1-7 |
| 3 | 1 layer, P4 | 3 | 8 layers, P1-8 |
| 4 | 1 layer, P5 | 4 | Reserved |
| 5 | 1 layer, P6 | 5 | Reserved |
| 6 | 1 layer, P7 | 6 | Reserved |
| 7 | 1 layer, P8 | 7 | Reserved |
| 8 | 1 layer, P9 | 8 | Reserved |
| 9 | 1 layer, P10 | 9 | Reserved |
| 10 | 1 layer, P11 | 10 | Reserved |
| 11 | 1 layer, P12 | 11 | Reserved |
| 12 | 2 layers, P1-2 | 12 | Reserved |
| 13 | 2 layers, P3-4 | 13 | Reserved |
| 14 | 2 layers, P5-6 | 14 | Reserved |
| 15 | 2 layers, P7-8 | 15 | Reserved |
| 16 | 2 layers, P9-10 | 16 | Reserved |
| 17 | 2 layers, P11-12 | 17 | Reserved |
| 18 | 3 layers, P1-3 | 18 | Reserved |
| 19 | 3 layers, P4-6 | 19 | Reserved |
| 20 | 3 layers, P7-9 | 20 | Reserved |
| 21 | 3 layers, P10-12 | 21 | Reserved |
| 22 | 4 layers, P1-4 | 22 | Reserved |
| 23 | 4 layers, P5-8 | 23 | Reserved |
| 24 | 4 layers, P9-12 | 24 | Reserved |
| 25 | Reserved | 25 | Reserved |
| 26 | Reserved | 26 | Reserved |
| 27 | Reserved | 27 | Reserved |
| 28 | Reserved | 28 | Reserved |
| 29 | Reserved | 29 | Reserved |
| 30 | Reserved | 30 | Reserved |
| 31 | Reserved | 31 | Reserved |

[Table 37] and [Table 38] above separately show 1 codeword (CW) transmission and 2 CW transmission using two columns, but information on the numbers of antenna ports and transmission layers may be signaled using only one column as shown in [Table 39] and [able 40]. In [Table 39] and [able 40], it is assumed that 2CW transmission is marked but 1CW transmission is not separately marked.

Specifically, [Table 39] is a form modified from [Table 30] and shows a DMRS table design method when a maximum number of MU-MIMO layers supported per UE is 2 in the case in which MU-MIMO is supported using twelve orthogonal ports based on one column, and [Table 40] is a from modified from [Table 31] and shows a DMRS table design method when a maximum number of MU-MIMO layers is 4 in the case in which MU-MIMO is supported using twelve orthogonal ports based on one column. The signaling methods proposed by [Table 39] and [Table 40] may be considered as methods for preventing many reserved indexes which are not used for 2CW in [Table 30] and [Table 31].

TABLE 39

| Value | Message |
|---|---|
| 0 | 1 layer, P1 |
| 1 | 1 layer, P2 |
| 2 | 1 layer, P3 |
| 3 | 1 layer, P4 |
| 4 | 1 layer, P5 |
| 5 | 1 layer, P6 |
| 6 | 1 layer, P7 |
| 7 | 1 layer, P8 |
| 8 | 1 layer, P9 |
| 9 | 1 layer, P10 |
| 10 | 1 layer, P11 |
| 11 | 1 layer, P12 |
| 12 | 2 layers, P1-2 |
| 13 | 2 layers, P3-4 |
| 14 | 2 layers, P5-6 |
| 15 | 2 layers, P7-8 |
| 16 | 2 layers, P9-10 |
| 17 | 2 layers, P11-12 |
| 18 | 3 layers, P1-3 |
| 19 | 4 layers, P1-4 |
| 20 | 5 layers, P1-5 (2CW) |
| 21 | 6 layers, P1-6 (2CW) |
| 22 | 7 layers, P1-7 (2CW) |
| 23 | 8 layers, P1-8 (2CW) |
| 24 | Reserved |
| 25 | Reserved |
| 26 | Reserved |
| 27 | Reserved |
| 28 | Reserved |
| 29 | Reserved |
| 30 | Reserved |
| 31 | Reserved |

TABLE 40

| Value | Message |
|---|---|
| 0 | 1 layer, P1 |
| 1 | 1 layer, P2 |
| 2 | 1 layer, P3 |
| 3 | 1 layer, P4 |
| 4 | 1 layer, P5 |
| 5 | 1 layer, P6 |
| 6 | 1 layer, P7 |
| 7 | 1 layer, P8 |
| 8 | 1 layer, P9 |
| 9 | 1 layer, P10 |
| 10 | 1 layer, P11 |
| 11 | 1 layer, P12 |
| 12 | 2 layers, P1-2 |
| 13 | 2 layers, P3-4 |
| 14 | 2 layers, P5-6 |
| 15 | 2 layers, P7-8 |
| 16 | 2 layers, P9-10 |
| 17 | 2 layers, P11-12 |
| 18 | 3 layers, P1-3 |
| 19 | 3 layers, P4-6 |
| 20 | 3 layers, P7-9 |
| 21 | 3 layers, P10-12 |
| 22 | 4 layers, P1-4 |
| 23 | 4 layers, P5-8 |
| 24 | 4 layers, P9-12 |
| 25 | 5 layers, P1-5 (2CW) |
| 26 | 6 layers, P1-6 (2CW) |
| 27 | 7 layers, P1-7 (2CW) |
| 28 | 8 layers, P1-8 (2CW) |
| 29 | Reserved |
| 30 | Reserved |
| 31 | Reserved |

Embodiment 2-8

<Embodiment 2-8> synthetically describes the operations of the UE and the base station for DMRS pattern type 1 and type 2 on the basis of the methods proposed by <Embodiment 2-5>, <Embodiment 2-6>, and <Embodiment 2-7> above.

Figure 31:
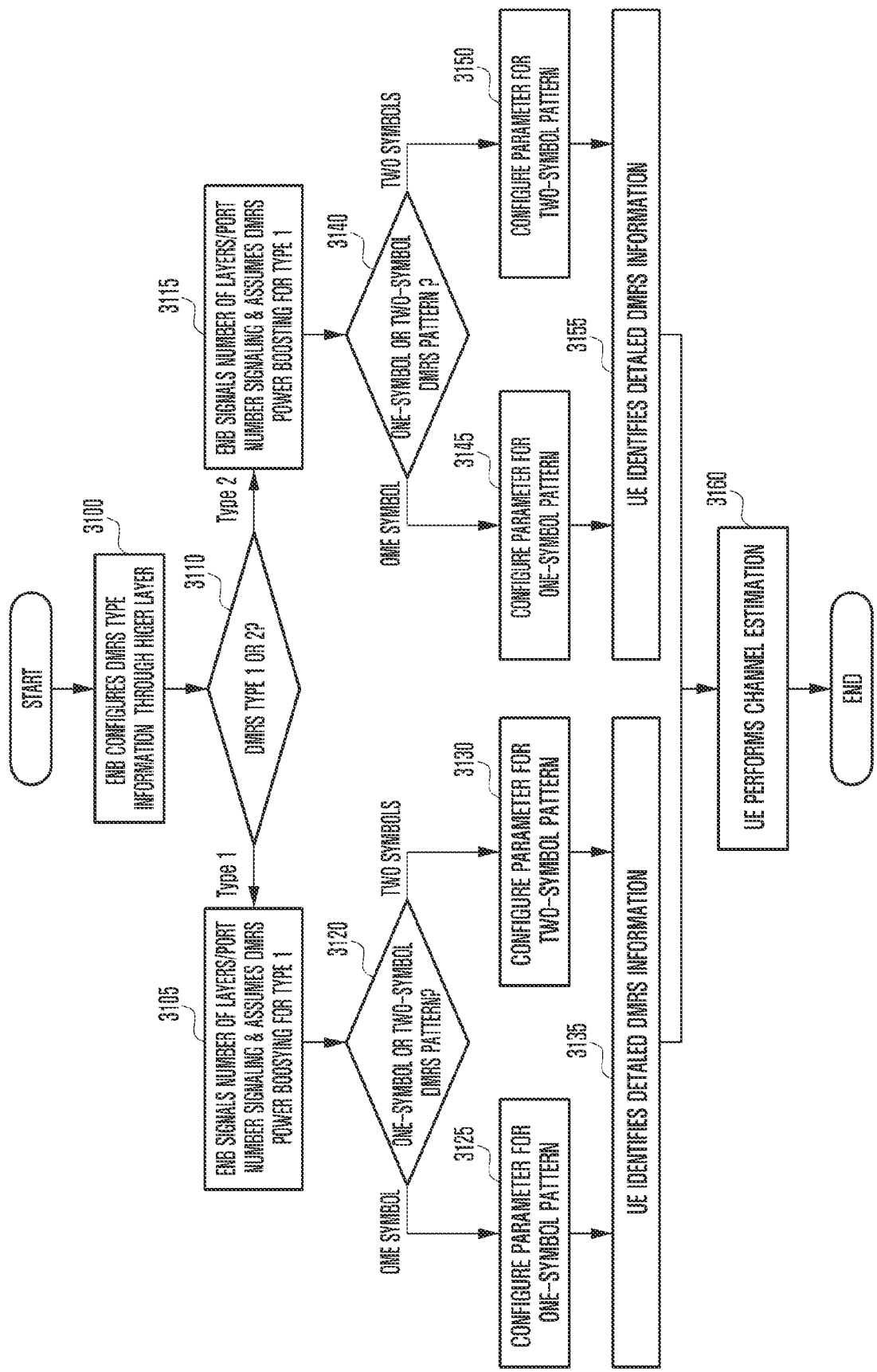
FIG. 31 illustrates the operations of the base station and the UE according to the present embodiment.

FIG. 31 illustrates the operations of the base station and the UE according to the present embodiment. In a first step, the base station configures information of DMRS pattern type 1 and type 2 through higher layer in step 3100. Next, if DMRS pattern type 1 is configured in step 3110, the process moves to step 3105 and the base station may signal information on the number of layers and a port number for type 1 as described in <Embodiment 2-7>. Further, as described in <Embodiment 2-6>, DMRS power boosting may be differently configured according to the number of configured layers.

Next, it is identified whether the DMRS is configured in the one-symbol pattern or the two-symbol pattern in step 3120, and if the DMRS is configured in the one-symbol pattern, configure a DMRS parameter for the one symbol as described in <Embodiment 2-5> in step 3125. If the DMRS is configured in the two-symbol pattern, the base station configures a DMSR parameter for the two symbols as described in <Embodiment 2-5> in step 3130. Thereafter, the UE identifies information configured to the DMRS in step 3135 and performs channel estimation in step 3160.

If the DMRS pattern is configured as type 2 in step 3110, the same operation as the operation in the case in which the DMRS pattern is configured as type 1 may be performed. As proposed by <Embodiment 2-5>, the DMRS density may vary depending on DMRS port mapping, and different antenna port mapping methods may be used according to the DMRS including one or two symbols depending on the DMRS type. Specifically, in the case of type 1, parameters configurations in step 3125 and 3130 may be different. In the case of type 2, parameter configurations in step 3145 and 3150 may be different.

More specifically, if the type 1 pattern is applied in consideration of DMRS overhead and channel estimation performance, a pattern 2810 may be preferred when the DMRS includes one symbol. Further, in the case of the type 1 pattern, if the DMRS includes two symbols, a pattern 2850 or 2860 may be preferred. In the case of type 1, parameter configurations in step 3125 and step 3130 may be different as described in <Embodiment 2-5>.

Unlike the above, if the type 2 pattern is applied in consideration of DMRS overhead and channel estimation performance, a pattern 2910 may be preferred when the DMRS includes one symbol. Further, in the case of the type 2 pattern, if the DMRS includes two symbols, a pattern 2930 or 2940 may be preferred. In the case of type 2, parameter configurations in step 3145 and step 3150 may be the same as described in <Embodiment 2-5>.

Figure 32:
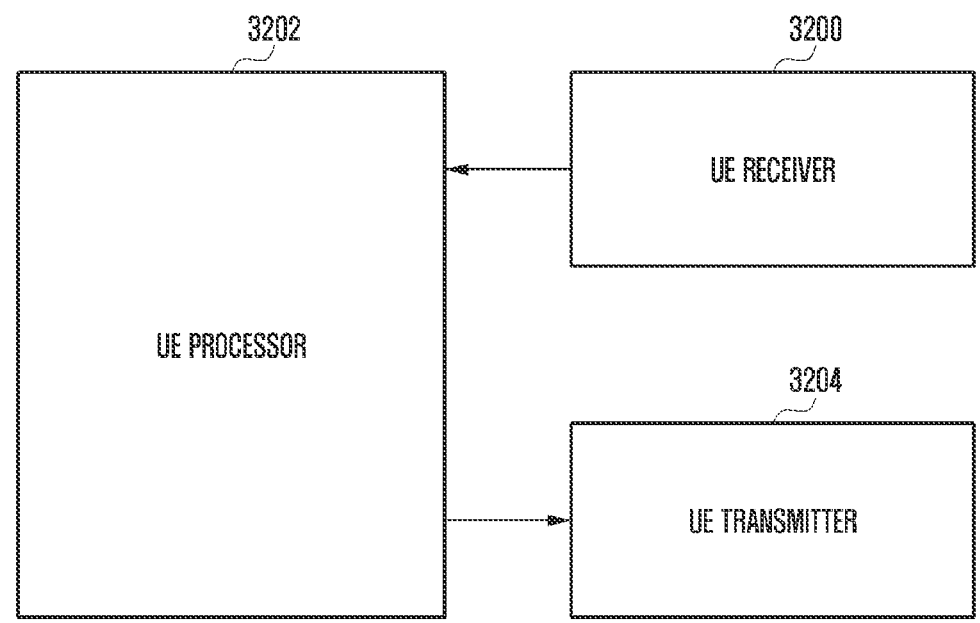
FIG. 32 is a block diagram illustrating an internal structure of the UE according to an embodiment of the disclosure.
Figure 33:
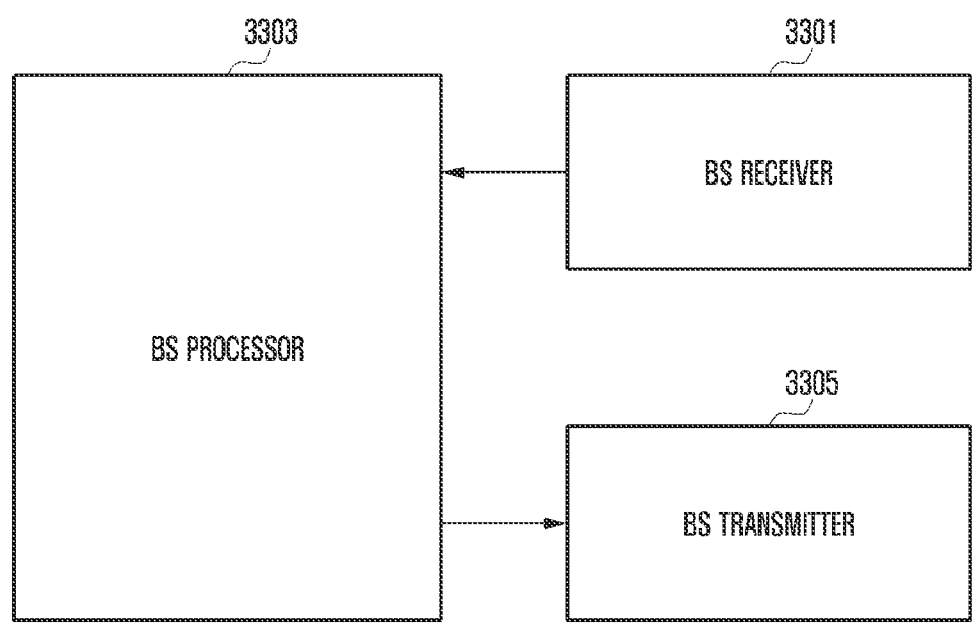
FIG. 33 is a block diagram illustrating an internal structure of the base station according to an embodiment of the disclosure.

To perform the above-described embodiments of the disclosure, a transmitter, a receiver, and a processor of each of the UE and the base station are illustrated in FIGS. 32 and 33. The method of configuring the DMRS structure, the method by which the base station generates the DMRS sequence, and the transmission/reception method of the base station and the UE are described in <Embodiment 2-1> to <Embodiment 2-8>, and each of the receiver, the processor, and the transmitter of the base station should be operated according to each embodiment in order to perform the methods.

FIG. 32 is a block diagram illustrating an internal structure of the UE according to an embodiment of the disclosure. As illustrated in FIG. 32, the UE of the disclosure may include a UE receiver 3200, a UE transmitter 3204, and a UE processor 3202. The UE receiver 3200 and the UE transmitter 3204 are commonly called a transceiver in the embodiment of the disclosure. The transceiver may transmit and receive a signal to/from the base station. The signal may include control information and data. To this end, the transceiver includes an RF transmitter that up-converts and amplifies a frequency of a transmitted signal, an RF receiver that low-noise amplifies a received signal and down-converts the frequency, and the like. Also, the transceiver may receive a signal through a radio channel, output the signal to the UE processor 3202, and transmit the signal output from the UE processor 3202 via the radio channel. The UE processor 3202 may control a series of processes such that the UE operates according to the above-described embodiments of the disclosure. For example, the UE receiver 3200 may receive a reference signal from the base station and the UE processor 3202 may perform control to analyze a reference signal application method. Further, the UE transmitter 3204 may transmit a reference signal.

FIG. 33 is a block diagram illustrating an internal structure of the base station according to an embodiment of the disclosure. As illustrated in FIG. 33, the base station according to the disclosure may include an base station receiver 3301, an base station transmitter 3305, and an base station processor 3303. The base station receiver 3301 and the base station transmitter 3305 are commonly called a transceiver in the embodiment of the disclosure. The transceiver may transmit and receive a signal to/from the UE. The signal may include control information and data. To this end, the transceiver includes an RF transmitter that up-converts and amplifies a frequency of a transmitted signal, an RF receiver that low-noise amplifies a received signal and down-converts the frequency, and the like. Also, the transceiver may receive a signal through a radio channel, output the signal to the base station processor 3303, and transmit the signal output from the base station processor 3303 via the radio channel. The base station processor 3303 may control a series of processes such that the base station operates according to the above-described embodiments of the disclosure. For example, the base station processor 3303 may determine a structure of a reference signal and perform control to generate configuration information of a reference signal to be transmitted to the UE. Further, the base station may generate a DMRS sequence on the basis thereof. Thereafter, the base station transmitter 3305 may transmit the reference signal and the configuration information to the UE and the base station receiver 3301 may receive the reference signal.

Third Embodiment

Transmission of an aperiodic channel state information reference signal (CSI-RS) may be used to reduce increasing CSI-RS transmission overhead in order to support transmission a UE-specific beamformed CSI-RS, a plurality of transmission and reception points (TRPs), or operation of a plurality of panels. Meanwhile, in the LTE system, the aperiodic CSI-RS is supported only for wide band transmission. However, in the NR system, it is required to support a narrow band (subband) aperiodic CSI-RS in order to support various UE bandwidths and efficiently use resources. To this end, the disclosure provides a method and an apparatus for determining a bandwidth for transmission and measurement of the aperiodic CSI-RS in a wireless communication system.

Embodiment 3-1

Hereinafter, the disclosure relates to a method of transmitting/receiving channel status information by which the UE measures a radio channel status (channel quality) and informs the base station of a measurement result in a wireless mobile communication system applying a multi-access scheme using a multi-carrier, such as orthogonal frequency division multiple access (OFDMA).

In a detailed description of embodiments of the disclosure, an OFDM-based wireless communication system, particularly, 3GPP EUTRA standard will be mainly described, but the main subject of the disclosure can be slightly modified without departing from the scope of the disclosure in other communication systems having similar technical background and channel form.

Figure 34:
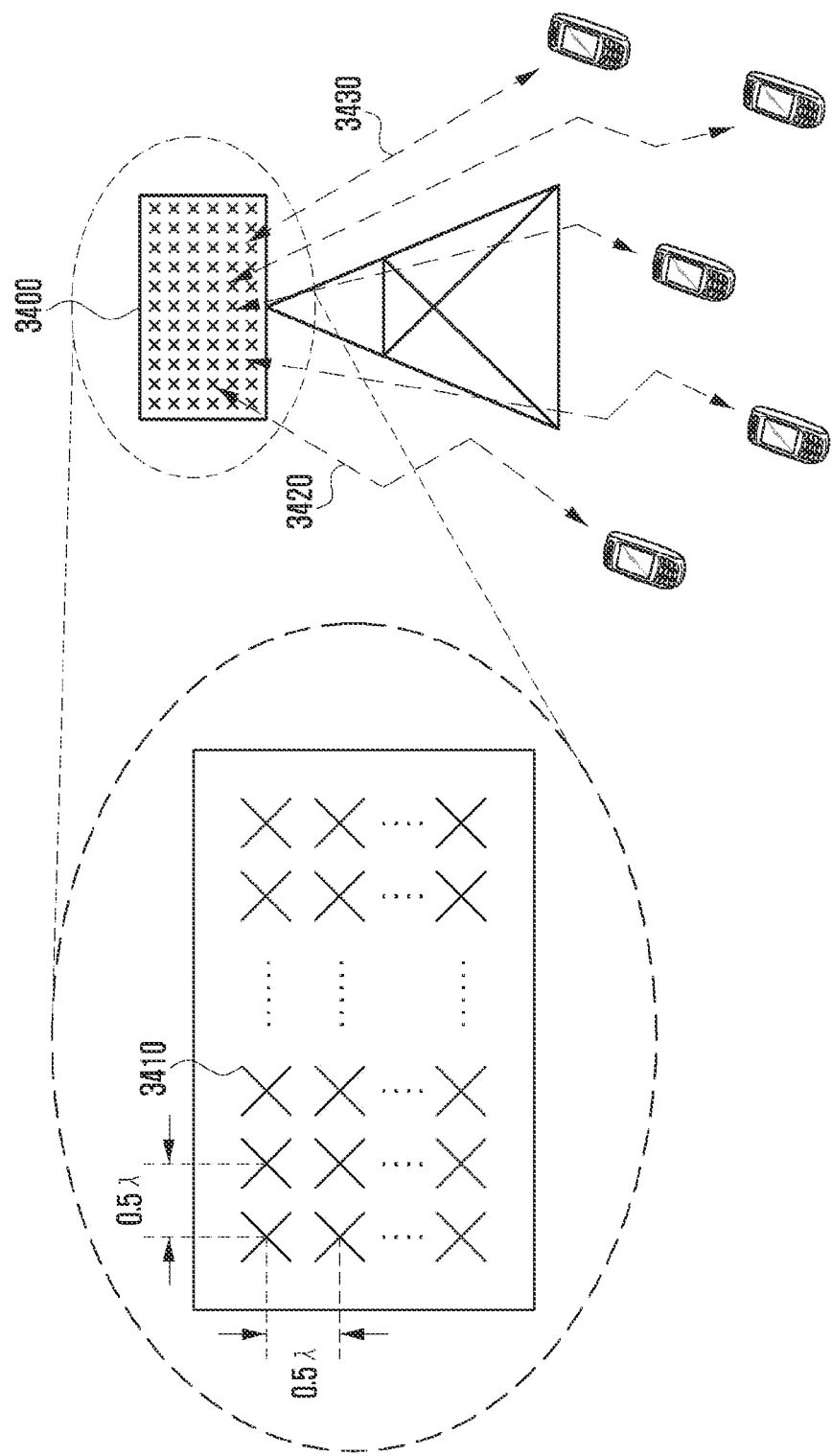
FIG. 34 illustrates an FD-MIMO system to which an embodiment of the disclosure is applied.

FIG. 34 illustrates an FD-MIMO system to which an embodiment of the disclosure is applied. The FD-MIMO system introduced to LTE-A Pro is evolved from the conventional LTE and LTE-A MIMO technology and may use multiple transmission antennas larger than or equal to 8 antennas. In FIG. 34, an eNB transmission device 3400 transmits a wireless signal to 8 or more transmission antennas. A plurality of transmission antennas may be disposed to maintain a minimum distance therebetween as indicated by reference numeral 3410. For example, the minimum distance may be half the wavelength of the wireless signal. In general, if the distance corresponding to half the wavelength of the wireless signal is maintained between the transmission antennas, a signal transmitted from each transmission antenna is influenced by a wireless channel having low correlation. If a bandwidth of the transmitted wireless signal is 2 GHz, the distance may be 7.5 cm, and if the band becomes higher than 2 GHz, the distance becomes shorter.

In FIG. 34, 8 or more transmission antennas arranged in an eNB transmission device 3400 may be used to transmit signals to one or a plurality of UEs as indicated by reference numeral 3420. Appropriate precoding is applied to a plurality of transmission antennas and signals are simultaneously transmitted to a plurality of UEs. At this time, one UE may receive one or more of information streams. In general, the number of information streams which one UE can receive is determined according to the number of reception antennas which the UE occupies and a channel condition.

Figure 35:
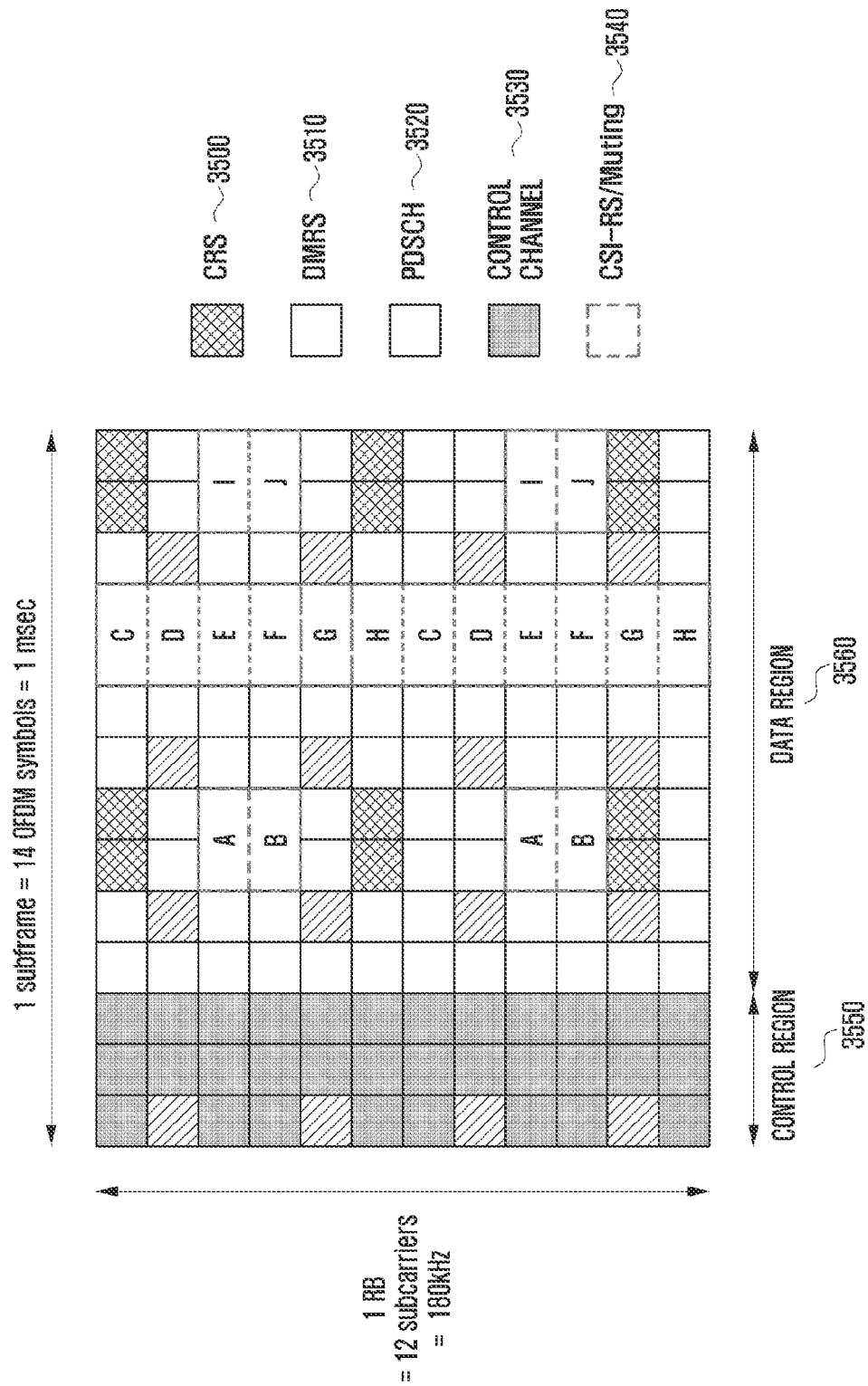
FIG. 35 illustrates radio resources corresponding to one subframe and one RB which are minimum units that can be scheduled to the downlink in the LTE and LTE-A systems.

FIG. 35 illustrates radio resources corresponding to one subframe and one resource block (RB) which are minimum units that can be scheduled to the downlink in the LTE and LTE-A systems. The radio resources illustrated in FIG. 35 consists of one subframe on the time axis and one RB on the frequency axis. The radio resources include 12 subcarriers in the frequency region and 14 OFDM symbols in the time region and thus have a total of 168 inherent frequency and time locations. In LTE and LTE-A, each of the inherent frequency and time locations in FIG. 35 may be referred to as a resource element (RE).

In the radio resources illustrated in FIG. 35, a plurality of different types of signals below may be transmitted.

1. Cell specific RS (CRS) 3500: refers to a reference signal periodically transmitted for all UEs belonging to one cell and may be used by a plurality of UEs in common.
2. Demodulation reference signal (DMRS) 3510: refers to a reference signal transmitted for a specific UE and is transmitted only when data is transmitted to the corresponding UE. The DMRS may consist of a total of 8 DMRS ports. In LTE-A, port 7 to port 14 correspond to DMRS ports, and each port maintain orthogonality to prevent interference through code division multiplexing (CDM) or frequency division multiplexing (FDM).
3. Physical downlink shared channel (PDSCH) 3520: refers to a data channel transmitted to downlink, and is used when the base station transmits traffic to the UE and transmitted using an RE through which a reference signal is not transmitted in a data region 3560.

4. Channel status information reference signal (CSI-RS) 3540: refers to a reference signal transmitted for UEs belonging to one cell and is used to measure a channel status. A plurality of CSI-RSs may be transmitted in one cell. In the LTE-A system, one CSI-RS may correspond to one, two, four, or eight antenna ports (APs) (or interchangeably used with ports). In the LTE-A Pro system, one CSI-RS may correspond to one, two, four, eight, twelve, or sixteen antenna ports and may be extended to a maximum of thirty antenna ports in the future.

5. Other channels (a physical hybrid-ARQ indicator channel (PHICH), a physical control format indicator channel (PCFICH), and a physical downlink control channel (PDCCH)) 3530: used when the UE provides control information required for receiving a PDSCH or to transmit ACK/NACK for operating HARQ of uplink data transmission. The control channels are transmitted in a control region 3550.

In addition to the above signals, in order to allow the CSI-RS which another base station transmits to be received by UEs in the corresponding cell, muting may be set in the LTE-A and LTE-A Pro systems. Muting may be applied to a location where the CSI-RS may be transmitted, and generally, the UE may skip the corresponding radio resources and receive a traffic signal. In the LTE-A and LTE-A Pro systems, the muting may be referred to as a zero-power CSI-RS as a different term. This is because muting is equally applied to the location of the CSI-RS and transmission power is not transmitted due to a muting characteristic.

In FIG. 35, CSI-RSs may be transmitted using some of the locations marked by A, B, C, D, E, F, G, H, I, and J according to the number of antennas for transmitting the CSI-RSs. In addition, the muting may also be applied to some of the locations marked with A, B, C, D, E, F, G, H, I, and J. Particularly, CSI-RSs may be transmitted using two, four, or eight REs according to the number of transmission antenna ports. A CSI-RS is transmitted to half of a particular pattern in FIG. 35 if the number of antenna ports is 2, a CSI-RS is transmitted to the entirety of a particular pattern if the number of antenna ports is 4, and a CSI-RS is transmitted using two patterns if the number of antenna ports is 8. In contrast, the muting is always applied in units of one pattern. That is, muting may be applied to a plurality of patterns but may not be applied only to some of a single pattern when the location does not overlap the CSI-RS. However, only when the locations of the CSI-RS and the muting overlap each other, the muting may be applied only to a portion of one pattern.

As described above, in LTE-A, two, four, or eight antenna ports may be configured in one CSI-RS resource. If CSI-RSs for two antenna ports are transmitted, the signal of each antenna port is transmitted in two REs contiguous on the time axis, and the signals of the antenna ports may be distinguished by orthogonal code. Further, if CSI-RSs for four antenna ports are transmitted, in additional to the CSI-RSs for the two antenna ports, signals for the remaining two antenna ports are transmitted in the same way as the above by using additional two REs. In the same manner, the transmission of CSI-RSs for eight antenna ports may be executed.

Figure 36:
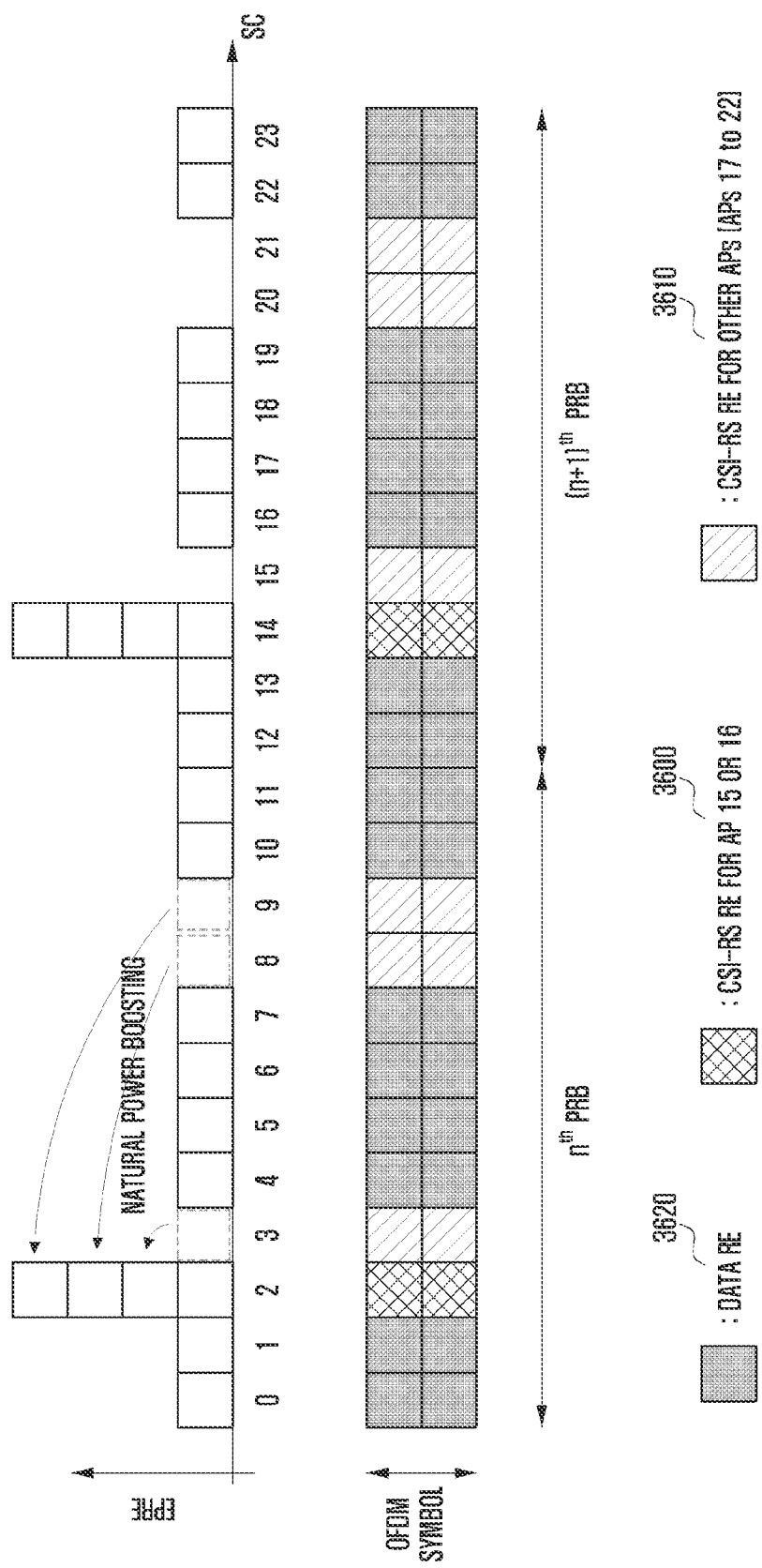
FIG. 36 illustrates an example of CSI-RS RE mapping for $n^{th}$ and $n+1^{th}$ PRBs in the case in which the base station transmits CSI-RSs of eight antenna ports.

The base station may boost CSI-RS transmission power in order to improve channel estimation accuracy. If four or eight antenna port CSI-RSs are transmitted, a specific CSI-RS port may be transmitted only in a CSI-RS RE at a predetermined location and may not be transmitted in another OFDM symbol within the same OFDM symbol. FIG. 36 illustrates an example of CSI-RS RE mapping for $n^{th}$ and $n+1^{th}$ PRBs in the case in which the base station transmits CSI-RSs of eight antenna ports. As illustrated in FIG. 36, if the CSI-RS RE location for a $15^{th}$ or $16^{th}$ AP is as indicated by reference numeral 3600 (second subcarrier), no transmission power is used in CSI-RS REs 3610 (third, eighth, and ninth subcarriers) for the remaining $17^{th}$ to $22^{nd}$ APs like the $15^{th}$ or $16^{th}$ AP. Accordingly, in a second subcarrier, the $15^{th}$ or $16^{th}$ AP may use transmission power to be used in third, eighth, and ninth subcarriers.

The natural power boosting can be configured such that power of the $15^{th}$ CSI-RS port transmitted through the second subcarrier is higher by a maximum of 6 dB than transmission power used in a data RE 3620. The current $2^{nd}/4^{th}/8^{th}$ port CSI-RS patterns may perform natural power boosting of 0/2/6 dB, and each AP may transmit the CSI-RS with full power utilization.

Further, the UE may receive allocation of CSI-IM (or interference measurement resource (IMR)) together with the CSI-RS, and CSI-IM resources have the same structure and location as the CSI-RS supporting 4 ports. The CSI-IM corresponds to resources for accurately measuring interference from adjacent base stations by the UE receiving data from one or more base station. If the base station desires to measure an amount of interference when the adjacent base station transmits data and an amount of interference when the adjacent base station does not transmit data, the base station may configure the CSI-RS and two CSI-IM resources to effectively measure the amounts of interference from the adjacent base station by allowing the adjacent base station to always transmit a signal in one CSI-IM and allowing the adjacent base station to not always transmit a signal in the other CSI-IM.

In the LTE-A and LTE-A Pro systems, the base station may notify the UE of CSI-RS resource configuration information (or CSI-RS resource configuration) through higher layer signaling. The CSI-RS resource configuration information includes an index of the CSI-RS configuration information, the number of ports included in the CSI-RS, a transmission period of the CSI-RS, a transmission offset, CSI0RS configuration information (CSI-RS configuration), a CSI-RS scrambling ID, and quasi co-location (QCL) information. Specifically, the UE may determine REs in which the CSI-RS is transmitted by combining the CSI-RS configuration information and information on the number of ports included in the CSI-RS.

In the LTE-A and LTE-A Pro systems, the base station transmits a reference signal to the UE in order to measure a downlink channel state and the UE measures a channel state between the base station and the UE through the CRS or the CSI-RS which the base station transmits. In association with the channel state, several factors need to be basically considered, and the amount of interference in downlink may be included therein. The amount of interference in downlink may include an interference signal generated by an antenna that belongs to a neighboring base station, a thermal noise, and the like, which is important when a UE determines the channel status of the downlink.

For example, if the base station having one transmission antenna transmits a signal to the UE having one reception antenna, the UE may determine energy per symbol which can be received through downlink on the basis of the reference signal received from the base station and amounts of interference to be simultaneously received in an interval in which the corresponding symbol is received and may determine Es/Io (energy per symbol-to-interference ratio). The determined Es/Io is converted to a data transmission rate or a value corresponding thereto and transmitted to the base station in a form of channel quality indicator (CQI), and thus the base station may determine a data transmission rate at which the base station performs transmission to the UE in the downlink.

In LTE-A and LTE-A Pro systems, the UE transmits feedback of information on a downlink channel status to the base station to allow the base station to use the received information for scheduling. That is, the UE measures a reference signal which the base station transmits through the downlink and transmits feedback of information extracted therefrom to the base station in a form defined by the LTE/LTE-A standard. In LTE and LTE-A systems, information fed back by the UE largely includes three pieces of information below.

Rank indicator (RI): a number of spatial layers which the UE can receive in a current channel status Precoder matrix indicator (PMI): an indicator of a precoding matrix which the UE prefers in a current channel status Channel quality indicator (CQI): a maximum data rate at which the UE can perform reception in a current channel status The CQI may be replaced with an SINR, a maximum error correction code rate, a modulation scheme, data efficiency per frequency, and the like, which may be utilized to be similar to the maximum data rate.

The RI, PMI, and CQI are interrelated. For example, precoding matrixes supported by LTE and LTE-A systems are differently defined for each rank. Accordingly, even though values of the PMI when the RI is 1 and the value of the PMI when the RI is 2 are the same as each other, they are interpreted differently. Further, when the UE determines CQI, the UE assumes that a rank value and a PMI value, which the UE provides to the base station, are applied to the base station. That is, if the UE provides RI_X, PMI_Y, and CQI_Z to the base station, it means that the UE can perform reception at a data transmission rate corresponding to CQI_Z when the rank is RI_X and the precoding is PMI_Y. As described above, when the UE calculates CQI, the UE considers which transmission scheme is used for the base station and thus acquire optimal performance when actual transmission is performed using the corresponding transmission scheme.

The RI, the PMI, and the CQI may be fed back periodically or aperiodically. If the base station desires to obtain aperiodic feedback information of a specific UE, the base station may configure an aperiodic feedback indicator included in downlink control information (DCI) for uplink data scheduling of the corresponding UE to execute specific aperiodic feedback, and perform uplink data scheduling of the corresponding UE. If the UE receive the indicator configured to execute aperiodic feedback in an $n^{th}$ subframe, the UE performs uplink transmission by inserting aperiodic feedback information into data transmission in an $n+k^{th}$ subframe. Here, k is 4 in frequency division duplexing (FDD) and is defined as shown in [Table 41] in time division duplexing (TDD).

TABLE 41

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

In order to generate and report the channel information, the base station having massive antennas is required to configure reference signal resources for measuring channels of 8 or more antennas and transmit the reference signal resources to the UE. To this end, in the LTE-A Pro system, two, four, eight, twelve, or sixteen antenna ports may be configured in one CSI-RS resource, and a function for configuring twenty, twenty two, twenty eight, and thirty two antenna ports may be added in the future. Specifically, in LTE-A Pro release-13, two types of CSI-RS configuration methods are provided.

In a first method, the base station configures one or more 4- or 8-port CSI-RS patterns in the UE through a non-precoded (NP) CSI-RS (CSI-RS for reporting class A channel state information (CSI)) and combine a combination of the configured CSI-RS patterns so as to allow the UE to receive CSI-RSs according to 8 or more CSI-RS ports. Specifically, a {1, 2, 4, 8}-port CSI-RS follows the conventional mapping rule. Aggregation of three 4-port CSI-RS patterns is configured in the case of a 12-port CSI-RS, and aggregation of two 8-port CSI-RS patterns may be configured in the case of a 16-port CSI-RS. Further, in LTE-A release-13, code division multiplexing (CDM)-2 or CDM-4 is supported using orthogonal cover code (OCC) having a length of 2 or 4 for the 12-/16-port CSI-RS.

The description of FIG. 36 is about CSI-RS power boosting based on CDM-2, and a maximum of 9 dB of power boosting compared to a PDSCH is needed for full power utilization for the 12-/16-port CSI-RS based on CDM-2 according to the description. This means that higher-performance hardware is required for full power utilization in the operation of the 12-/16-port CSI-RS based on CDM-2. In LTE-A Pro release-13, the 12-/16-port CSI-RS based on CDM-4 is introduced in consideration thereof, in which case full power utilization is possible through power boosting of 6 dB which is the same as the conventional power boosting.

In a second method, the base station may apply a specific beam to a plurality of transceiver units (TXRUs) through a beamformed (BF) CSI-RS (CSI-RS for reporting Class B CSI) to allow the UE to recognize the plurality of TXRUs as one CSI-RS port. If the base station knows UE channel information in advance, the base station may configure only a few of CSI-RSs to which a beam suitable for the channel information is applied in its own TXRU. In another example, the base station may configure a plurality of CSI-RS resources including 8 or fewer CSI-RS ports in the UE. At this time, the base station may apply different direction of beams for each CSI-RS resource configuration to beamform the CSI-RS ports.

Figure 37:
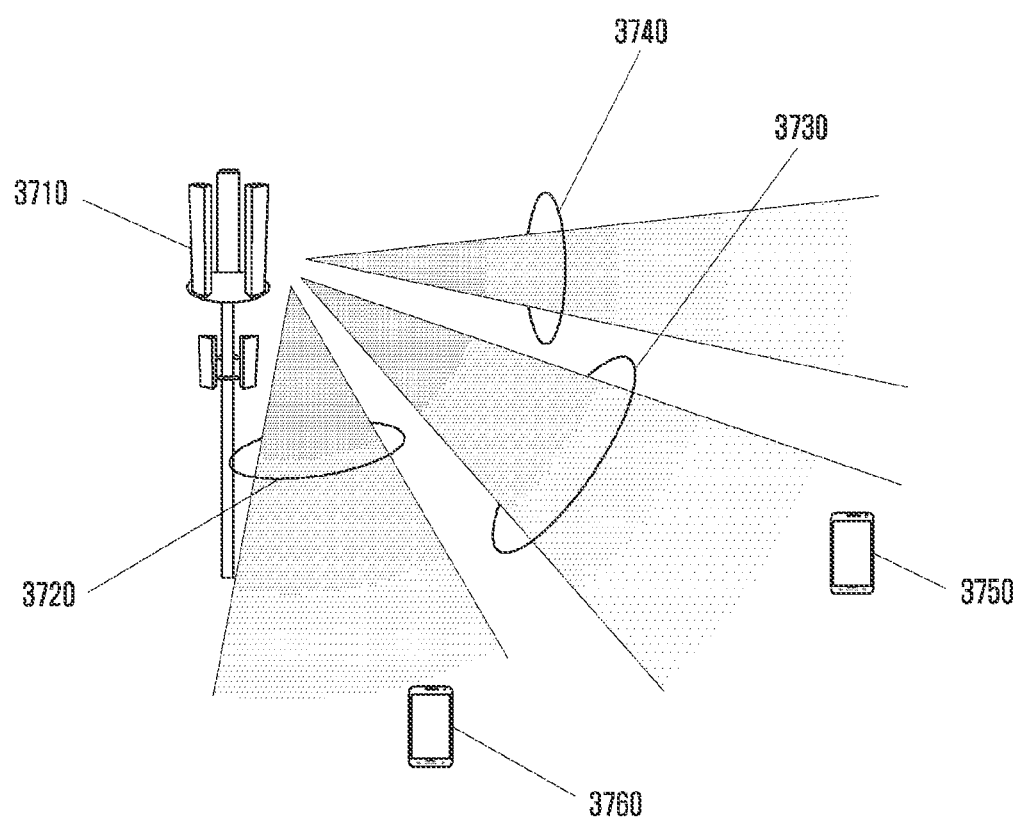
FIG. 37 illustrates an example of BF CSI-RS operation.

FIG. 37 illustrates an example of BF CSI-RS operation. Referring to FIG. 37, an base station 3710 may configure three CSI-RSs 3720, 3730, and 3740, which are beamformed in different directions, in UEs 3750 and 3760. Each of the CSI-RS resources 3720, 3730, and 3740 may include one or more CSI-RS ports. A UE 3750 may generate channel state information for the configured CSI-RS resources 3720, 3730, and 3740 and report an index of CSI-RS resources which the UE prefers among the CSI-RS resources to the base station through a CSI-RS resource indicator (CRI). In the example of FIG. 37, if the UE 3750 prefers the CSI-RS resources 3730, the UE may report an index corresponding to the CSI-RS resource 3730 to the base station. If the UE 3760 prefers CSI-RS resources 3720, the UE may report an index corresponding to the CSI-RS resources 3720 to the base station.

The CRI supports a report on one CSI-RS index which the UE most prefers based on LTE-A Pro release-13, but may be extended to a combination of CSI-RS indexes which the UE prefers in the future. For example, if two CSI-RS resources which the UE 3750 most prefers are CSI-RS resources 3730 and 3740, the UE 3750 may directly report two indexes of the corresponding CSI-RS resources or report an index indicating a set of the corresponding CSI-RS resources. This is to allow various applications by supporting a UE having wide angular spread of a channel or having high mobility with beams in various directions or supporting selection of a plurality of CSI-RSs transmitted in different transmission and reception points (TRPs).

Embodiment 3-2

<Embodiment 3-2> proposes a method of configuring an aperiodic CSI-RS. Up to LTE-A Pro release-13, detailed configuration values of the CSI-RS are semi-statically determined by higher layer signaling (or RRC signaling) as described in <Embodiment 3-1>.

CSI-RS resource configuration information up to LTE-A Pro release-13 includes the following information.

The number of CSI-RS ports: indicates the number of CSI-RS ports included in one CSI-RS resource.

CSI-RS configuration: indicates a configuration value indicating locations of CSI-RS REs together with the number of CSI-RS ports.

CSI-RS subframe configuration, $I_{CSI-RS}$: indicate configuration values indicating a CSI-RS transmission period, a $T_{CSI-RS}$, a CSI-RS subframe offset, and $\Delta_{CSI-RS}$.

CSI-RS power boosting factor, $P_C$: assumes a UE for ratio of CSI-RS transmission power to a PDSCH.

Scrambling ID, $n_{ID}$

Quasi co-location (QCL) information

The conventional CSI-RS is periodically transmitted, including the determined number of ports according to the determined detailed configuration values. Accordingly, if it is assumed that UE-specific beamforming is applied to the beamformed CSI-RS, CSI-RS resource configurations corresponding to the number of UEs are needed, which may be a big burden. Alternatively, if cell-specific beamforming is applied to the beamformed CSI-RS, the number of antennas of the base station also increases, and thus if a beam width becomes narrower, many CSI-RS resource configurations are needed as well.

In order to solve the problem and enable efficient CSI-RS resource allocation, it is possible to introduce aperiodic CSI-RS (Ap-CSI-RS) transmission. In a viewpoint of one UE, the aperiodic CSI-RS is not always transmitted in all the configured resources but is transmitted only in resources satisfying a particular condition.

Figure 38:
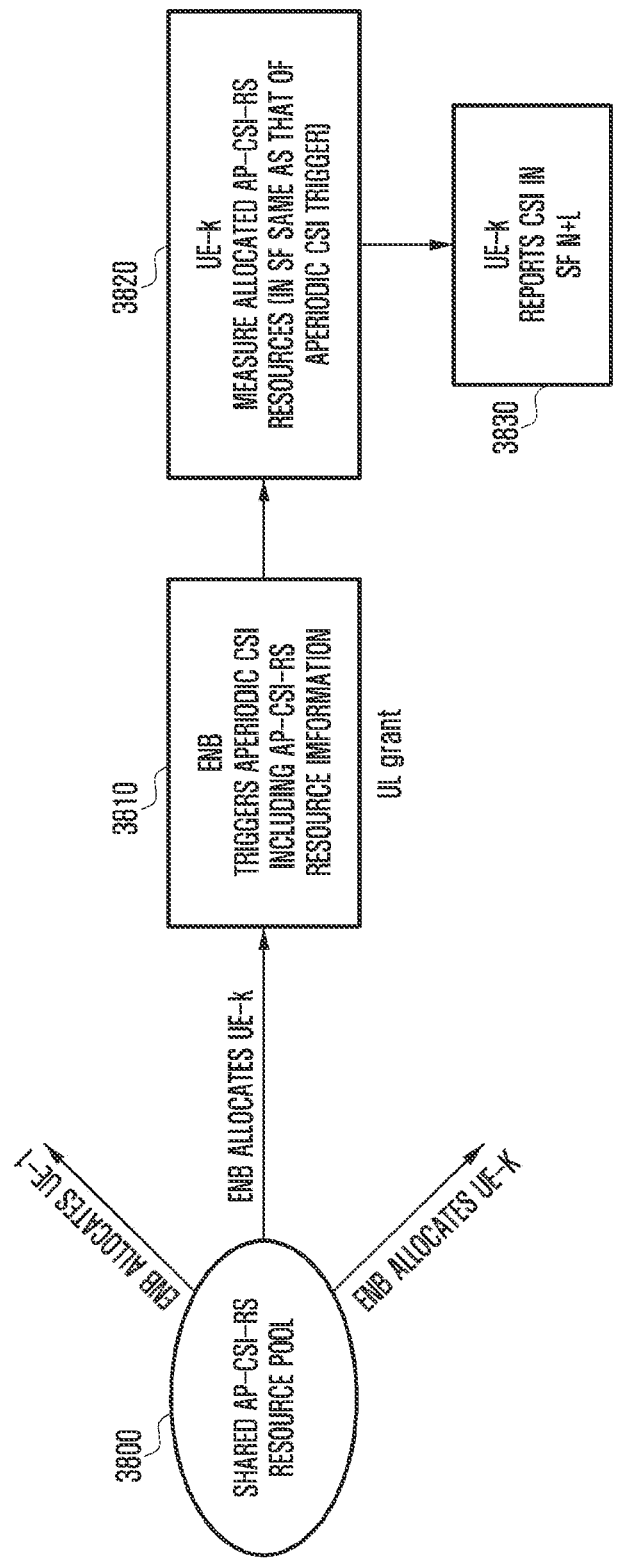
FIG. 38 illustrates an example of CSI-RS transmission/reception and a CSI report according thereto.

FIG. 38 illustrates an example of CSI-RS transmission/reception and a CSI report according thereto. Referring to FIG. 38, the base station may configure CSI-RS resources for aperiodic CSI-RS transmission in each UE as indicated by reference numeral 3800. At this time, the base station may configure the same aperiodic CSI-RS resources in a plurality of UEs in consideration of information indicating that the aperiodic CSI-RS is not always transmitted. This is to increase efficiency of the use of CSI-RS resources by operating an aperiodic CSI-RS resource pool shared between a predetermined number of UEs.

The base station may trigger the aperiodic CSI report to the UE through L1 signaling such as UL grant on the basis of the CSI-RS configuration information as indicated by reference numeral 3810. The UE can perform the following operation according to an aperiodic CSI-RS configuration method based on the aperiodic CSI triggering.

1. Method of receiving aperiodic CSI-RS transmitted in a subframe which is the same as that in which the aperiodic CSI triggering is transmitted.
2. Method of receiving the aperiodic CSI-RS transmitted in a subframe which is the closest to the subframe in which the aperiodic CSI triggering is signaled.
3. Method of receiving the aperiodic CSI-RS transmitted in a subframe which is the closest to a subframe after the subframe in which the aperiodic CSI triggering is signaled.
4. Method of receiving the aperiodic CSI-RS transmitted after a predetermined time from the subframe in which the aperiodic CSI triggering is signaled, for example, after an $1^{th}$ subframe, wherein 1 may be configured to be smaller than k described above. Further, 1 may be a predetermined value or a value designated by higher layer signaling or L1 signaling.

Thereafter, the UE may generate CSI on the basis of the received aperiodic CSI-RS and report the CSI to the base station in the $n+k^{th}$ subframe as described above as indicated by reference numerals 3820 and 3830. Here, the $n^{th}$ subframe is a subframe including the aperiodic CSI trigger. If the UE follows "4. The method of receiving the aperiodic CSI-RS transmitted after a predetermined time from the subframe in which the aperiodic CSI triggering is signaled, for example, after an $1^{th}$ subframe, wherein 1 may be configured to be smaller than k described above", the CSI generated by the UE may be reported to the base station in an $n+k+1^{th}$ subframe. This is to secure a UE processing time for the CSI generation.

A detailed method of operating the aperiodic CSI-RS resource pool is described below.

1. Method of using RRC signaling+L1 signaling
2. Method of using RRC signaling+MAC CE signaling+L1 signaling
3. Method of using RRC signaling+MAC CE signaling The RRC signaling, the MAC CE signaling, and the L1 signaling have higher reliability in the order of RRC >MAC CE >L1 in terms of reliability and require a delay time in the order of L1<MAC CE<RRC in terms of delay. For example, when the UE receives the information, the information configured through the RRC signaling has high reliability but requires a long time for reception, and the information configured through the L1 signaling has a very short delay time required for reception but relatively low reliability. Further, the L1 signaling has a disadvantage of high signaling costs due to transmission by limited DCI.

As described in the first example, if the method of 1. RRC signaling+L1 signaling is used, the base station may configure N CSI-RS resources in the UE through RRC signaling and then select L (<N) resources from among the N configured CSI-RS resources through L1 signaling. At this time, since L1 signaling overhead is determined by N and L (N combination L, NCL), if N=8 CSI-RS resources are configured through RRC and L≤2 resources are selected through L1 signaling, very large DCI payload corresponding to a total of $\lceil \log_2(28+8) \rceil = 6$ bits may be needed.

Meanwhile, as described in the second example, if the method of 2. RRC signaling+MAC CE signaling+L1 signaling is used, specific CSI-RS resources designated through MAC CE signaling among the RRC-signaled CSI-RS resources may be activated or deactivated and L1 signaling may be performed therefor. Accordingly, the base station may acquire proper tradeoff between the CSI-RS resource configuration delay time and the DCI signaling overhead. For example, if N=8 CSI-RS resources are configured through RRC, K=4 resources among the N=8 CSI-RS resources are activated through the MAC CE, and then L≤2 resources are selected through L1 signaling, it is noted that required DCI payload may be reduced to a total of $\lceil \log_2(6+4) \rceil = 4$ bits compared to the first example.

As described in the third example, if the method of 3. RRC signaling+MAC CE signaling is used, K CSI-RS resources designated through MAC CE signaling among the RRC-signaled N CSI-RS resources may be activated or deactivated. At this time, unlike the first and second examples, the UE finally determines whether to transmit the CSI-RS through the MAC CE without L1 signaling. In this case, CSI-RS aperiodic transmission indication for every subframe is not possible, but there is an advantage of significantly reduced DCI overhead.

In the present embodiment, the aperiodic CSI-RS can be configured through higher layer signaling. CSI-RS resource configuration information for the aperiodic CSI-RS may include detailed configuration information such as the number of CSI-RS ports, CSI-RS configuration, CSI-RS subframe configuration, the CSI-RS power boosting index, the scrambling ID, and quasi co-location (QCL) information as described above. If CSI-RS resource configuration information for the aperiodic CSI-RS includes the CSI-RS subframe among the detailed configuration information, "2. The method of receiving the aperiodic CSI-RS transmitted in a subframe which is the closest to the subframe in which the aperiodic CSI triggering is signaled" or "3. The method of receiving the aperiodic CSI-RS transmitted in a subframe which is the closest to a subframe after the subframe in which the aperiodic CSI triggering is signaled" may be used among the aforementioned aperiodic CSI-RS reception methods. This is because the CSI-RS subframe configuration includes information on candidate subframes in which the aperiodic CSI-RS can be transmitted.

Meanwhile, if CSI-RS resource configuration information for the aperiodic CSI-RS does not include the CSI-RS subframe configuration among the detailed configuration information or if, even though the CSI-RS resource configuration information includes the CSI-RS subframe configuration, ignorance thereof is appointed (or indicated by the base station), the CSI-RS resource configuration information may not include information on candidate subframes in which the aperiodic CSI-RS can be transmitted. Accordingly, among the aforementioned aperiodic CSI-RS reception methods, "1. The method of receiving aperiodic CSI-RS transmitted in a subframe which is the same as that in which the aperiodic CSI triggering is transmitted" or "4. The method of receiving the aperiodic CSI-RS transmitted after a predetermined time from the subframe in which the aperiodic CSI triggering is signaled, for example, after an $1^{th}$ subframe" may be used.

In L1 signaling (UL, DCI, or UL grant), aperiodic CSI-RS triggering including 1 bit or a plurality of bits may exist. If 1-bit aperiodic CSI-RS triggering is supported through L1 signaling, a method of analyzing a CSI request field of DCI format 0 or DCI format 4 may vary depending on whether triggering is performed. The DCI format is only an example, and a DCI format for uplink grant such as DCI format 0 or 4 may correspond thereto. For example, if the aperiodic CSI-RS is not triggered, the CSI request field may serve to indicate a set to report the CSI among a set of serving cells configured by a higher layer, a set of CSI processes, or a set of CSI subframes like in the prior art. On the other hand, if the aperiodic CSI-RS is triggered, the CSI request field may serve to indicate CSI-RS resources in which the aperiodic CSI-RS is transmitted among a plurality of CSI-RS resource candidates as shown in [Table 42]. At this time, since the aperiodic CSI-RS transmission is triggered through additional 1-bit L1 signaling, all code points of the CSI request field may have another meaning other than "no aperiodic CSI-RS and aperiodic CSI are triggered".

In another example, if 1-bit aperiodic CSI-RS triggering is supported, the method of analyzing the CSI request field of DCI format 1 or DCI format 4 may be indicated by higher layer signaling (RRC signaling). In this case, the CSI request field may serve to indicate a set to report the CSI among a set of serving cells configured through the higher layer, a set of CSI processes, or a set of CSI subframes like in the prior art or serve to indicate CSI-RS resources in which the aperiodic CSI-RS is transmitted among a plurality of CSI-RS resource candidates as described in the example of [Table 43]. At this time, since the CSI request field should include a function for triggering the aperiodic CSI-RS, at least one code point may have a meaning indicating that "no aperiodic CSI-RS and aperiodic CSI are triggered"

TABLE 42

| Value of CSI request field | Description |
|---|---|
| 00 | Aperiodic CSI-RS and aperiodic CSI report are triggered for a set of CSI-RS resources configured by higher layers for serving cell c |
| 01 | Aperiodic CSI-RS and aperiodic CSI report are triggered for a 1st set of CSI-RS resources configured by higher layers |
| 10 | Aperiodic CSI-RS and aperiodic CSI report are triggered for a 2nd set of CSI-RS resources configured by higher layers |
| 11 | Aperiodic CSI-RS and aperiodic CSI report are triggered for a 3rd set of CSI-RS resources configured by higher layers |

TABLE 43

| Value of CSI request field | Description |
| --- | --- |
| 00 | No aperiodic CSI-RS and aperiodic CSI reporting are triggered |
| 01 | Aperiodic CSI-RS and aperiodic CSI report are triggered for a set of CSI-RS resources configured by higher layers for serving cell c |
| 10 | Aperiodic CSI-RS and aperiodic CSI report are triggered for a 1st set of CSI-RS resources configured by higher layers |
| 11 | Aperiodic CSI-RS and aperiodic CSI report are triggered for a 2nd set of CSI-RS resources configured by higher layers |

On the other hand, aperiodic CSI-RS triggering including a plurality of bits may include a function of indicating which CSI-RS resources are used to transmit the aperiodic CSI-RS. [Table 44] shows an example of an aperiodic CSI-RS triggering field including two bits. According to the example of [Table 44], at least one code point in the aperiodic CSI-RS triggering field may have a meaning indicating that "no aperiodic CSI-RS and aperiodic CSI are triggered". Other three code points means aperiodic CSI-RS triggering (01) in a serving cell c, and aperiodic CSI-RS triggering (10, 11) for first and second CSI-RS sets higher layer-signaled for a plurality of serving cells (across serving cells). At this time, the CSI-RSs are associated with different aperiodic CSI-RSs and aperiodic CSI reports. Even when the aperiodic CSI triggering field includes three or more bits, extension is possible on the basis of a principle similar to [Table 44]. A new table like [Table 44] may be designated by a new transmission mode (TM), for example, TM 11.

TABLE 44

| Value of aperiodic CSI-RS field | Description |
| --- | --- |
| 00 | No aperiodic CSI-RS and aperiodic CSI reporting are triggered |
| 01 | Aperiodic CSI-RS and aperiodic CSI report are triggered for a set of CSI-RS resources configured by higher layers for serving cell c |
| 10 | Aperiodic CSI-RS and aperiodic CSI report are triggered for a 1st set of CSI-RS resources configured by higher layers |
| 11 | Aperiodic CSI-RS and aperiodic CSI report are triggered for a 2nd set of CSI-RS resources configured by higher layers |

The present embodiment describes an example of dynamic port numbering configuration in the method of configuring the aperiodic CSI-RS. Dynamic port numbering means that the number of CSI-RS ports included in aperiodic CSI-RS resources may be different when the aperiodic CSI-RS is transmitted. For example, this means that the aperiodic CSI-RS resources may be configured by dynamic CSI-RS resource aggregation.

Figure 39:
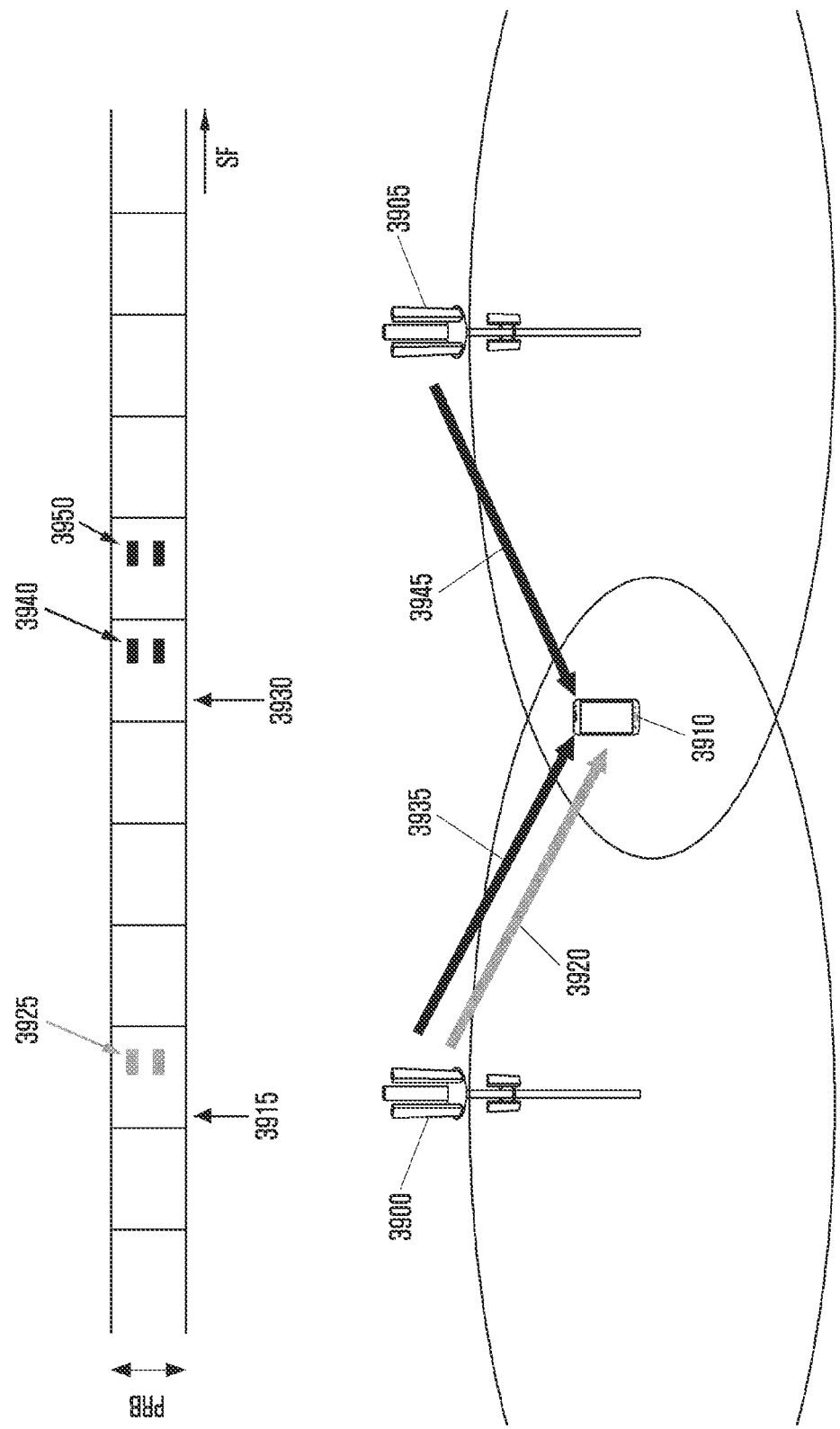
FIG. 39 illustrates an example of a dynamic port numbering operation scenario for the aperiodic CSI-RS.

FIG. 39 illustrates an example of a dynamic port numbering operation scenario for the aperiodic CSI-RS. In FIG. 39, it is assumed that each of base stations 3900 and 3905 operates eight CSI-RS ports.

For example, if a UE 3910 receives data from the base station 3900, the base station 3900 may transmit the aperiodic CSI-RS and trigger aperiodic CSI in a subframe 3915 through 11 signaling. The UE 3910 may receive the aperiodic CSI-RS transmitted in aperiodic CSI-RS resources 3925 through a method similar to <Embodiment 3-2>, generate CSI for a channel 3920 including 8-port CSI-RSs, and reports the same to the base station.

In another example, if the UE 3910 simultaneously receives data from the base stations 3900 and 3905 (for example, like in CoMP JT), the base station may transmit the aperiodic CSI-RS and trigger the aperiodic CSI in a subframe 3930 through L1 signaling. At this time, aperiodic CSI-RS triggering may mean that aperiodic CSI-RS resources 3940 for measuring a channel 3935 and aperiodic CSI-RS resources 3950 for measuring a channel 3945 are simultaneously transmitted. Although FIG. 29 illustrates the situation in which the CSI-RS resources 3940 and 3950 are configured in different subframes for convenience of description, the disclosure is not limited thereto and the CSI-RS resources may be transmitted in the same subframe according to the aperiodic CSI-RS triggering method in <Embodiment 3-2>.

The UE may receive the aperiodic CSI-RSs 3940 and 3950 and generate and report CSI based on the 8-port CSI-RSs for each CSI-RS resource (use 8Tx codebook), but may recognize the CSI-RSs 3940 and 3950 as one CSI-RS resource (aggregation between aperiodic CSI-RS resources) and generate and report CSI based on 16-port CSI-RSs (use 16Tx codebook). This is to allow the UE to generate a PMI using a codebook larger than the number of antennas, and the generated PMI includes not only a phase between base station antennas but also implicitly a phase difference between the TRP 3900 and TRP 3905, so that a CQI mismatch problem in coordinated multipoint (CoMP) joint transmission (JT) may be solved.

Figure 40:
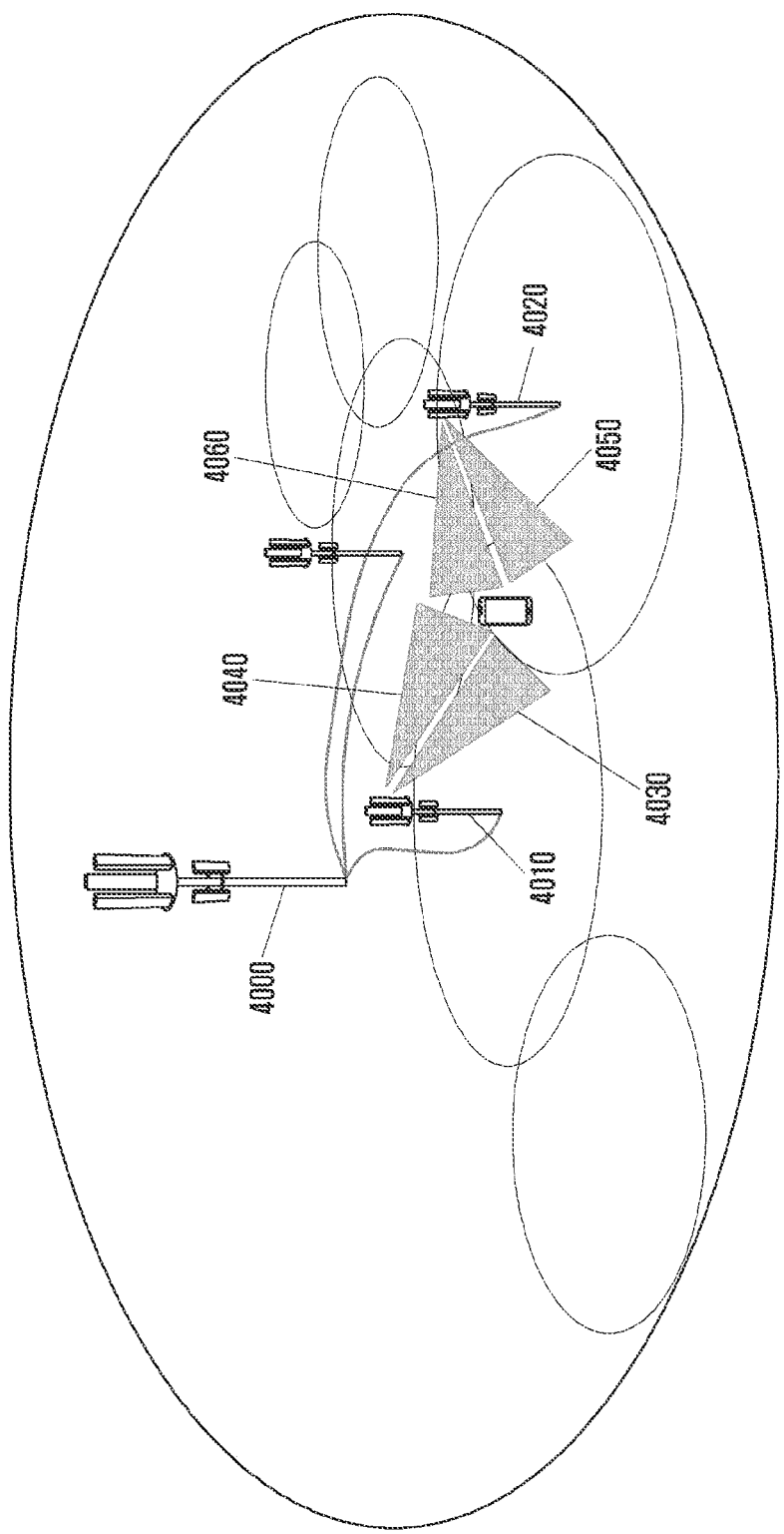
FIG. 40 illustrates another example of the dynamic port numbering operation scenario for the aperiodic CSI-RS.

FIG. 40 illustrates another example of the dynamic port numbering operation scenario for the aperiodic CSI-RS. In the future, the CSI may be extended to have a function for indicating a plurality of preferred CSI-RS sources or one subset including a plurality of CSI-RS resources. If a total sum of the numbers of CSI-RS ports of CSI-RS resources included in one subset is different, it may be required to apply a different precoding scheme according to the selected CSI-RS resource subset.

For example, a "one cell" operation scenario as illustrated in FIG. 40 is assumed. At this time, a coverage RS (CRS, coverage CSI-RS, or cell-specific CSI-RS) is transmitted by a macro base station 4000, but a UE-specific RS 4030, 4040, 4050, or 4060 (CSI-RS, UE-specific CSI-RS, or dedicated CSI-RS) may be transmitted in a different TRP. That is, respective TRPs may be distinguished by a UE-specific RS. When it is assumed that each TRP has a plurality of UE-specific RS resources to which different beams are applied, the UE may report preferred UE-specific RS resource information for each TRP to the base station through CRI. For example, when it is assumed that the UE receives data in a plurality of TRPs, if data is received in TRPs 4010 and 4020, the UE may report one preferred CSI-RS among CSI-RSs 4030 and 4040 for the TRP 4010 and one preferred CSI-RS among CSI-RSs 4050 and 4060 for the TRP 4020. In this case, the base station may selectively transmit the aperiodic CSI-RS in a plurality of CSI-RS resources with reference to UE preference. As described above, if the aperiodic CSI-RS is transmitted in a plurality of CSI-RS resources, a detailed configuration and transmission method may be similar to the example of FIG. 39.

Specifically, the following methods may be considered for dynamic port configuration-based or dynamic resource aggregation-based aperiodic CSI-RS configuration.

Aperiodic CSI-RS Configuration Method 1

A first method is aperiodic CSI-RS configuration through higher layer signaling and 1-bit L1 signaling. In the example, higher layer-signaled CSI-RS resource configuration information for the aperiodic CSI-RS is as illustrated in FIG. 41.

Figure 41:
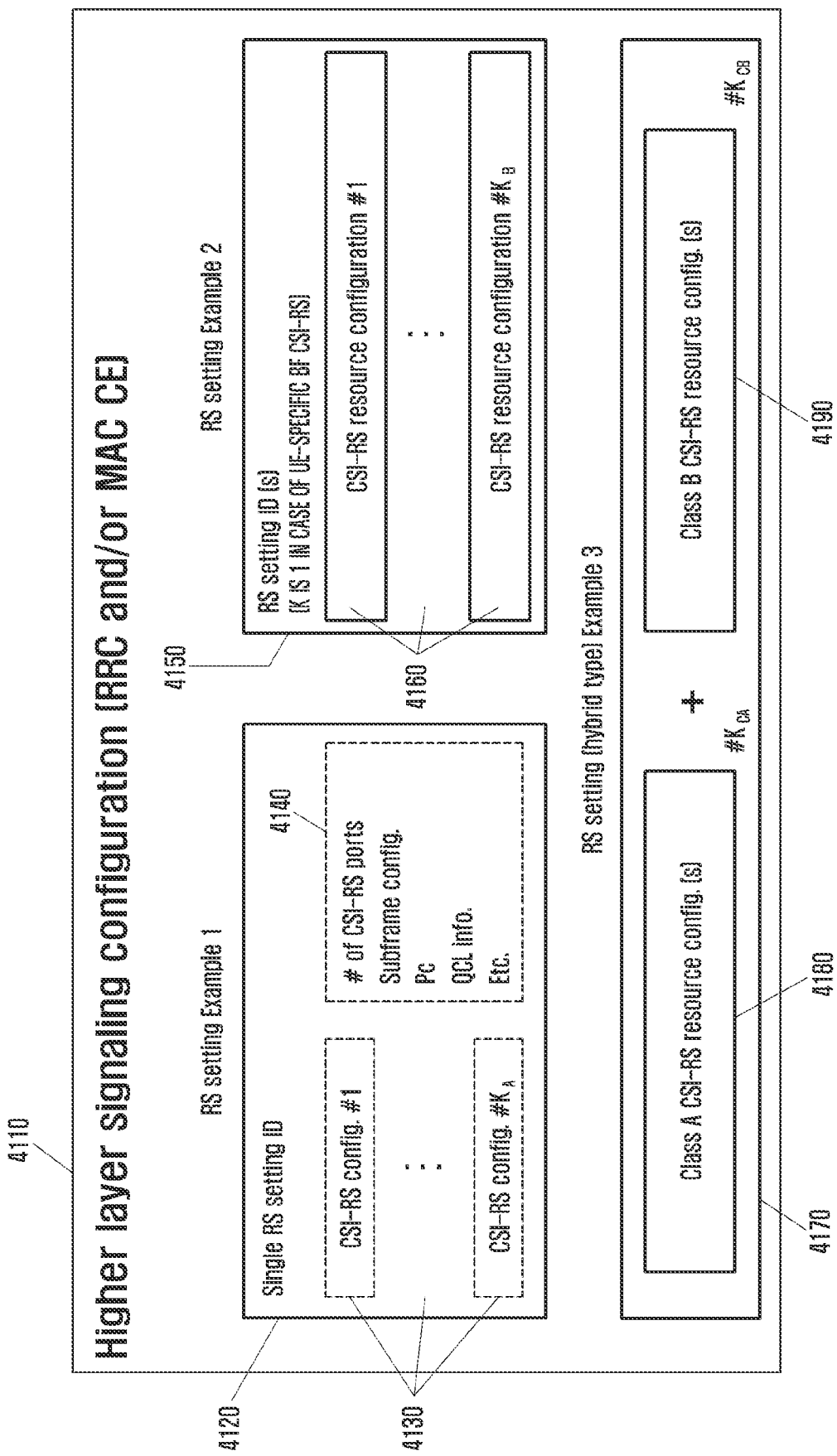
FIG. 41 illustrates an example of CSI-RS resource configuration information.

FIG. 41 illustrates an example of CSI-RS resource configuration information. Referring to FIG. 41, three types of higher layer signaling can be performed in consideration of CSI-RS types such as a non-precoded CSI-RS, a beamformed CSI-RS, and a hybrid CSI-RS. At this time, higher layer signaling may include RRC signaling and MAC CE signaling as described in <Embodiment 3-2>. This means that CSI-RS resources or configurations indicated by $K_A$, $K_B$, $K_{CA}$, or $K_{CB}$ in FIG. 41 may depend on only RRC configuration but may be activated or deactivated through MAC CE configuration. Although FIG. 41 mainly illustrates RRC configuration, it may be extended to aggregation of RRC and MAC CE similarly to description of <Embodiment 3-2>, so a detailed description thereof will be omitted.

In the case of the non-precoded CSI-RS, higher layer signaling may include signaling information 4120. Specifically, the signaling information 4120 includes $K_A$ CSI-RS configurations 4130 for configuring a plurality of CSI-RS ports larger than or equal to 8 CSI-RS ports and another detailed configuration information 4140. At this time, if the aperiodic CSI-RS is triggered through 1-bit L1 signaling, this may mean that the aperiodic CSI-RS is transmitted in all CSI-RS REs designated by reference numeral 4130.

In the case of the beamformed CSI-RS, higher layer signaling may include signaling information 4150. Specifically, the signaling information 4150 may include $K_B$ CSI-RS resource configuration information to which different beams can be applied, and CSI-RS resource configuration information 4160 may include CSI-RS detailed configuration information. At this time, if the aperiodic CSI-RS is triggered through 1-bit L1 signaling, two methods below may be considered.

A first method is to transmit the aperiodic CSI-RS in all CSI-RS REs designated by reference numeral 4160. In this case, a CRI can be reported through the aperiodic CSI-RS, but an effect of reduction in CSI-RS overhead due to the aperiodic CSI-RS may be reduced. A second method is to transmit the aperiodic CSI-RS only in CSI-RS resources designated by the CRI reported by the UE among the information 4160. In this case, the effect of reduction in CSI-RS overhead may be maximized but it is difficult to perform the CRI report through the aperiodic CSI-RS. In the second method, if the CRI designates a plurality of CSI-RS resources, the designated CSI-RS resources may be recognized as a single CSI-RS resource. For example, if the CRI designates two 8-port CSI-RS resources as aperiodic CSI-RS resources, the number of aperiodic CSI-RS ports assumed by the UE is a sum of the numbers of CSI-RS ports included in the two CSI-RS resources, that is, 16.

In the case of the hybrid CSI-RS, higher layer signaling may include signaling information 4170. Specifically, the signaling information 4170 may include two parts such as a part 4180 including $K_{CA}$ CSI-RS configurations for configuring a plurality of CSI-RS ports and a part 4190 including $K_{CA}$ pieces of CSI-RS resource configuration information to which different beams can be applied. For example, the part 4180 may be similar to reference numeral 4120, and the part 4190 may be similar to reference numeral 4150. At this time, if the aperiodic CSI-RS is triggered through 1-bit L1 signaling, two methods below may be considered.

A first method is to transmit the aperiodic CSI-RS in all CSI-RS REs designated by reference numeral 4180. In this case, CSI-RS ports designated by reference numeral 4190 are transmitted periodic CSI-RS resources. A second method is to transmit the aperiodic CSI-RS only in a part designated by CRI among all CSI-RS REs designated by reference numeral 4190 or all CSI-RS resources designated by reference numeral 4190. In the case of the hybrid CSI-RS, aperiodic CSI-RS triggering through 2-bit L1 signaling may be supported. For example, the respective bits may be used to indicate whether the aperiodic CSI-RS is transmitted in CSI-RS resources designated by reference numeral 4180 and indicate whether the aperiodic CSI-RS is transmitted in CSI-RS resources designated by reference numeral 4190.

In this example, if L1 signaling for aperiodic CSI-RS triggering is applied to "all CSI-RS resources", the L1 signaling may be individually supported for each CSI process. Alternatively, if L1 signaling for aperiodic CSI-RS triggering is applied to "CSI-RS resources designated by the CRI", the L1 signaling may be applied to the corresponding CSI-RS resources regardless of the CSI process.

Aperiodic CSI-RS Configuration Method 2

The second method corresponds to aperiodic CSI-RS configuration through higher layer signaling and L1 signaling including a plurality of bits. In this example, CSI-RS resource configuration information higher layer-signaled for the aperiodic CSI-RS is as illustrated in FIG. 42.

Figure 42:
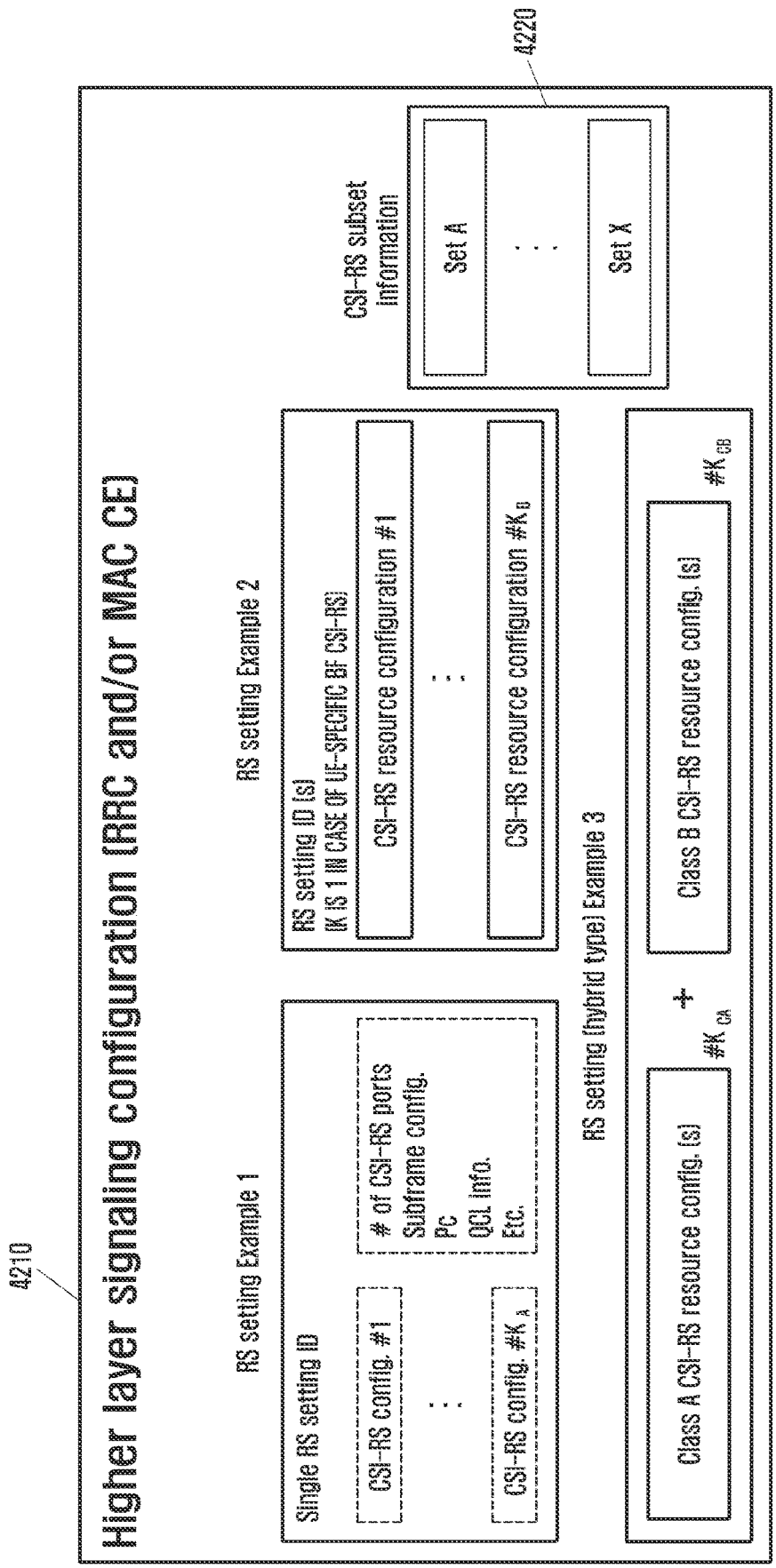
FIG. 42 illustrates another example of CSI-RS resource configuration information.

FIG. 42 illustrates another example of CSI-RS resource configuration information. Since configurations of FIG. 42 are the same as or similar to those of FIG. 41 except for the configuration 4220, FIG. 42 may refer to reference numerals of FIG. 41. At this time, higher layer signaling may include RRC signaling and MAC CE signaling as described in <Embodiment 3-2>. This means that CSI-RS resources or configurations indicated by $K_A$, $K_B$, $K_{CA}$, or $K_{CB}$ in FIG. 42 may depend on only RRC configuration but may be activated or deactivated through MAC configuration. In FIG. 42, RRC configuration is mainly described, but extension is possible to aggregation of RRC and the MAC CE like in <Embodiment 3-2>, so a detailed description thereof will be omitted.

Referring to FIG. 42, three types of higher layer signaling can be performed in consideration of a non-precoded CSI-RS, a beamformed CSI-RS, and a hybrid CSI-RS. In this example, it is possible to designate CSI-RS resource subsets to transmit the aperiodic CSI-RS through L1 signaling, and the CSI-RS resource subsets may be notified to the UE through higher layer signaling as indicated by reference numeral 4220. In reference numeral 4220, one or more CSI-RS resources may be allocated to set A to set X, and if two or more CSI-RS resources are allocated to one set, the allocated CSI-RS resources may be recognized as a single CSI-RS resource. For example, if set A is designated as aperiodic CSI-RS resources through L1 signaling, the number of aperiodic CSI-RS ports assumed by the UE is a sum of the numbers of CSI-RS ports included in all CSI-RS resources belonging to set A. In <Embodiment 3-2>, activation and deactivation by MAC CE signaling are one of detailed examples for configuring the CSI-RS resource subsets. If only the RRC and MAC CE configurations are provided and L1 signaling is not supported as in the third example of <Embodiment 3-2>, the UE may assume that all CSI-RSs belonging to set A to set X of the CSI-RS resource subsets are transmitted.

In the case of the non-precoded CSI-RS, higher layer signaling may include signaling information 4120 like aperiodic CSI-RS configuration method 1. Specifically, the signaling information 4120 includes $K_A$ CSI-RS configurations 4130 for configuring a plurality of CSI-RS ports larger than or equal to 8 CSI-RS ports and another detailed configuration information 4140. At this time, if the aperiodic CSI-RS is triggered through L1 signaling including a plurality of bits, it may mean that some configuration information of the information 4120 is ignored, the ignored information is replaced with CSI-RS resource configuration information designated by reference numeral 4220, and the aperiodic CSI-RS is transmitted in the corresponding RE. For example, if the aperiodic CSI-RS is triggered through 2-bit L1 signaling, the aperiodic CSI-RS may be transmitted with reference to [Table 42], [Table 43], or [Table 44] above, or [Table 45] below. The purpose of [Table 42] to [Table 44] is as described above. In the case of [Table 45], if the base station configures "00", the UE may use the CRI to perform a report without aggregating CSI-RS resources in which the aperiodic CSI-RS is transmitted. In another method, whether to transmit the aperiodic CSI-RS for the CSI-RS configuration 4130 may be signaled through L1 signaling including $K_A$ bits.

TABLE 45

| Value of aperiodic CSI-RS field | Description |
| --- | --- |
| 00 | Aperiodic CSI-RS and aperiodic CSI report are triggered for all CSI-RS resources |
| 01 | Aperiodic CSI-RS and aperiodic CSI report are triggered for a 1st set of CSI-RS resources configured by higher layers |
| 10 | Aperiodic CSI-RS and aperiodic CSI report are triggered for a 2nd set of CSI-RS resources configured by higher layers |
| 11 | Aperiodic CSI-RS and aperiodic CSI report are triggered for a 3rd set of CSI-RS resources configured by higher layers |

In the case of the beamformed CSI-RS, higher layer signaling may include signaling information 4150 like aperiodic CSI-RS configuration method 1. Specifically, the signaling information 4150 may include $K_B$ CSI-RS resource configuration information to which different beams can be applied, and CSI-RS resource configuration information 4160 may include CSI-RS detailed configuration information. At this time, if the aperiodic CSI-RS is triggered through 1-bit L1 signaling including a plurality of bits, two methods below may be considered.

A first method is to signal whether to transmit the aperiodic CSI-RS for each of the CSI-RS resource configuration information 4160 through L1 signaling including $K_B$ bits. This is a most flexible method but requires high L1 signaling overhead. A second method is to receive aperiodic CSI-RS configuration information with reference to configuration information 4220 through L1 signaling including a smaller number of bits in order to reduce L1 signaling overhead. For example, the aperiodic CSI request field may be used as aperiodic CSI-RS configuration information on the basis of [Table 42], [Table 43], or [Table 44], or a new table like [Table 45] may be introduced. Since a detailed description thereof is similar to the examples above, the description will be omitted.

In the case of the hybrid CSI-RS, higher layer signaling may include signaling information 4170 like aperiodic CSI-RS configuration method 1. Specifically, the signaling information 4170 may include two parts such as a part 4180 including $K_{CA}$ CSI-RS configurations for configuring a plurality of CSI-RS ports and a part 4190 including $K_{CB}$ pieces of CSI-RS resource configuration information to which different beams can be applied. For example, the part 4180 may be similar to reference numeral 4120, and the part 4190 may be similar to reference numeral 4150. At this time, if the aperiodic CSI-RS is triggered through 1-bit L1 signaling including a plurality of bits, two methods below may be considered.

A first method is to signal whether to transmit the aperiodic CSI-RS for each of the CSI-RS resource configuration information 4170 through L1 signaling including $K_{CA}+K_{CB}$ or $1+K_{CB}$ bits. If L1 signaling includes $1+K_{CB}$ bits, CSI-RS configurations included in the part 4180 may determine whether to transmit the aperiodic CSI-RS as one group. This is a most flexible method but requires high L1 signaling overhead. A second method is to receive aperiodic CSI-RS configuration information with reference to configuration information 4220 through L1 signaling including a smaller number of bits in order to reduce L1 signaling overhead. For example, the aperiodic CSI request field may be used as aperiodic CSI-RS configuration information on the basis of [Table 42], [Table 43], or [Table 44], or a new table like [Table 45] may be introduced. Since a detailed description thereof is similar to the examples above, the description will be omitted.

Aperiodic CSI-RS Configuration Method 3

A third method corresponds to aperiodic CSI-RS configuration through higher layer signaling and L1 signaling including a plurality of bits. In this example, higher layer-signaled CSI-RS resource configuration information for the aperiodic CSI-RS is as illustrated in FIG. 41. At this time, higher layer signaling may include RRC signaling and MAC CE signaling as described in <Embodiment 3-2>. This means that CSI-RS resources or configurations indicated by $K_A$, $K_B$, $K_{CA}$, or $K_{CA}$ in FIG. 41 may depend on only RRC configuration but may be activated or deactivated through MAC configuration. In FIG. 41, RRC configuration is mainly described, but extension is possible to aggregation of RRC and the MAC CE like in <Embodiment 3-2>, so a detailed description thereof will be omitted.

Referring to FIG. 41, three types of higher layer signaling can be performed in consideration of CSI-RS types such as a non-precoded CSI-RS, a beamformed CSI-RS, and a hybrid CSI-RS. In the example, similar to aperiodic CSI-RS configuration method 1, the aperiodic CSI-RS can be triggered using 1-bit or 2-bit L1 signaling. A difference between the example and aperiodic CSI-RS configuration method 1 will be described. In the example, reconfiguration of "the number of CSI-RS ports" in detailed configuration information of the aperiodic CSI-RS is possible, and therefor, the conventional L1 signaling such as the CSI request field may be reused as shown in [Table 46] or [Table 47] below or new L1 signaling may be introduced as shown in [Table 48] or [Table 49] below.

[Table 46] is a table indicating a method by which the UE analyzes the CSI request field when the aperiodic CSI-RS is triggered by 1-bit L1 signaling. Similar to aperiodic CSI-RS configuration method 1, the UE may assume that the aperiodic CSI-RS is transmitted in CSI-RS resources for a non-precoded CSI-RS, the aperiodic CSI-RS is transmitted in CSI-RS resources corresponding to recently reported CSI among CSI-RS resources for a beamformed CSI-RS, or the aperiodic CSI-RS is transmitted in CSI-RS resources for a UE-specific beamformed CSI-RS (in this case, one CSI-RS resource is configured in the UE). The UE may identify CSI-RS configuration in each piece of CSI-RS resource configuration information according to the condition.

Thereafter, the UE may know how many CSI-RS ports are transmitted in the corresponding CSI-RS resources according to 1 bit and the CSI request field value for triggering the aperiodic CSI-RS triggering configured by the base station. For example, the number of CSI-RS ports may be 1 if the CSI request field is 00, may be 2 if the CSI request field is 01, may be 4 if the CSI request field is 10, and may be 8 if the CSI request field is 11. Thereafter, the UE can analyze the RE location at which the aperiodic CSI-RS is transmitted by combining the CSI-RS configuration and the number of CSI-RS ports. The method of analyzing the CSI request field is an example, and other various numbers may be RRC-signaled. For example, if the CSI request field is 00, the number of CSI-RS ports which is RRC-signaled while being inserted into the conventional CSI-RS resource configuration is reused. Otherwise, the number of CSI-RS ports may be analyzed as 1 if the CSI request field is 01, analyzed as 2 if the CSI request field is 10, and analyzed as 4 if the CSI request field is 11.

TABLE 46

| Value of CSI request field | Description |
| --- | --- |
| 00 | Aperiodic CSI-RS and aperiodic CSI report are triggered with a 1st candidate of the number of CSI-RS ports (configured by higher layers) |

TABLE 46-continued

| Value of CSI request field | Description |
|---|---|
| 01 | Aperiodic CSI-RS and aperiodic CSI report are triggered with a 2nd candidate of the number of CSI-RS ports (configured by higher layers) |
| 10 | Aperiodic CSI-RS and aperiodic CSI report are triggered with a 3rd candidate of the number of CSI-RS ports (configured by higher layers) |
| 11 | Aperiodic CSI-RS and aperiodic CSI report are triggered with a 4th candidate of the number of CSI-RS ports (configured by higher layers) |

[Table 47] is a table indicating a method by which the UE analyzes the CSI request field when the CSI request field is configured to be used for triggering the aperiodic CSI-RS by 1-bit RRC signaling. Similar to aperiodic CSI-RS configuration method 1, the CSI request field may be configured to be used for triggering the aperiodic CSI-RS by 1-bit RRC signaling, and the UE may assume that the aperiodic CSI-RS is transmitted in CSI-RS resources for the non-precoded CSI-RS, the aperiodic CSI-RS is transmitted in CSI-RS resources corresponding to the recently reported CRI among CSI-RS resources for the beamformed CSI-RS, or the aperiodic CSI-RS is transmitted in CSI-RS resources for the UE-specific beamformed CSI-RS (in this case, one CSI-RS source is configured in the UE).

The UE may identify CSI-RS configuration in each piece of CSI-RS resource configuration information according to the condition. Thereafter, the UE may know if the aperiodic CSI-RS is transmitted in the corresponding CSI-RS resources through the CSI request field value configured by the base station, and if the aperiodic CSI-RS is transmitted, know how many CSI-RS ports are transmitted. For example, if the CSI request field is 00, it means that no aperiodic CSI-RS is transmitted. The number of CSI-RS ports may be analyzed as 1 if the CSI request field is 01, analyzed as 2 if the CSI request field is 10, and analyzed as 4 if the CSI request field is 11. Thereafter, the UE can analyze the RE location at which the aperiodic CSI-RS is transmitted by combining the CSI-RS configuration and the number of CSI-RS ports.

The method of analyzing the CSI request field is one example, and a specific value may be defined in a table but various numbers may be RRC-signaled. For example, if the CSI request field is 00, it means that no aperiodic CSI-RS is transmitted. If the CSI request field is 01, the number of CSI-RS ports which is RRC-signaled while being inserted into the conventional CSI-RS resource configuration information is reused. The number of CSI-RS ports may be analyzed as 1 if the CSI request field is 10 and analyzed as 2 if the CSI request field is 11.

ports by L1 signaling. Similar to aperiodic CSI-RS configuration method 1, the UE may assume that the aperiodic CSI-RS is transmitted in CSI-RS resources for a non-precoded CSI-RS, the aperiodic CSI-RS is transmitted in CSI-RS resources corresponding to recently reported CSI among CSI-RS resources for a beamformed CSI-RS, or the aperiodic CSI-RS is transmitted in CSI-RS resources for a UE-specific beamformed CSI-RS (in this case, one CSI-RS resource is configured in the UE). At this time, the UE may identify CSI-RS configuration in each piece of CSI-RS resource configuration information according to the condition.

Thereafter, when the aperiodic CSI-RS is triggered, the UE may know how many CSI-RS ports are transmitted in the corresponding aperiodic CSI-RS resources according to the aperiodic CSI-RS field value as shown in [Table 48] or [Table 49]. In the example of [Table 48], the number of CSI-RS ports according to the aperiodic CSI-RS field value may be predetermined by the aperiodic CSI-RS field table. For example, the number of CSI-RS ports may be analyzed as 1 if the CSI request field is 00, analyzed as 2 if the CSI request field is 01, analyzed as 4 if the CSI request field is 10, and analyzed as 8 if the CSI request field is 11. Thereafter, the UE can analyze the RE location at which the aperiodic CSI-RS is transmitted by combining the CSI-RS configuration and the number of CSI-RS ports.

The method of analyzing the aperiodic CSI-RS field is one example, and the specific number may be defined in the table as shown in [Table 48] but various numbers may be RRC-signaled as shown in [Table 49]. For example, if the CSI request field is 00, the number of CSI-RS ports which is RRC-signaled while being inserted into the conventional CSI-RS resource configuration is reused. The number of CSI-RS ports may be analyzed as 1 if the CSI request field is 01, analyzed as 2 if the CSI request field is 10, and analyzed as 4 if the CSI request field is 11.

Similar to the examples of [Table 48] and [Table 49], [Table 50] below may be used in consideration of the

TABLE 47

| Value of CSI request field | Description |
|---|---|
| 00 | No aperiodic CSI-RS and aperiodic CSI reporting are triggered |
| 01 | Aperiodic CSI-RS and aperiodic CSI report are triggered with a 1st candidate of the number of CSI-RS ports (configured by higher layers |
| 10 | Aperiodic CSI-RS and aperiodic CSI report are triggered with a 2nd candidate of the number of CSI-RS ports (configured by higher layers) |
| 11 | Aperiodic CSI-RS and aperiodic CSI report are triggered with a 3rd candidate of the number of CSI-RS ports (configured by higher layers) |

In another method, the number of CSI-RS ports included in aperiodic CSI-RS resources may be notified by additional L1 signaling. [Table 48] and [Table 49] are tables indicating examples of configuring the number of aperiodic CSI-RS coexistence of the periodic CSI-RS and the aperiodic CSI-RS. Through [Table 50], an aperiodic CSI report based on the periodic CSI-RS and an aperiodic CSI report based on the aperiodic CSI-RS may be individually turned on/off.

TABLE 48

| Value of aperiodic CSI-RS field | Description |
| --- | --- |
| 00 | Aperiodic CSI-RS resource contains 1 port CSI-RS |
| 01 | Aperiodic CSI-RS resource contains 2 port CSI-RS |
| 10 | Aperiodic CSI-RS resource contains 4 port CSI-RS |
| 11 | Aperiodic CSI-RS resource contains 8 port CSI-RS |

TABLE 49

| Value of aperiodic CSI-RS field | Description |
| --- | --- |
| 00 | Aperiodic CSI-RS resource contains A port CSI-RS and A is configured by higher layers |
| 01 | Aperiodic CSI-RS resource contains B port CSI-RS and B is configured by higher layers |
| 10 | Aperiodic CSI-RS resource contains C port CSI-RS and C is configured by higher layers |
| 11 | Aperiodic CSI-RS resource contains D port CSI-RS and D is configured by higher layers |

TABLE 50

| Value of aperiodic CSI-RS field | Description |
| --- | --- |
| 00 | No aperiodic CSI-RS resource is triggered |
| 01 | Aperiodic CSI-RS resource contains A port CSI-RS and A is configured by higher layers |
| 10 | Aperiodic CSI-RS resource contains B port CSI-RS and B is configured by higher layers |
| 11 | Aperiodic CSI-RS resource contains C port CSI-RS and C is configured by higher layers |

Embodiment 3-4

<Embodiment 3-4> describes a rate mapping method according to aperiodic CSI-RS transmission. In LTE-A and LTE-A Pro systems, the UE may identify non-zero power (NZP) CSI-RS configuration information and zero power (ZP) CSI-RS configuration information to identify PDSCH RE mapping and perform rate matching. In the conventional CSI-RS transmission, CSI-RS transmission information is semi-statically configured, so that additional signaling for rate matching is not needed. However, if the aperiodic CSI-RS transmission proposed by the disclosure is introduced, whether to perform CSI-RS transmission and some pieces of CSI-RS configuration information may be dynamically changed, and thus a method for efficient rate matching is required. The present embodiment provides the following three methods as the rate matching method considering the aperiodic CSI-RS.

Rate Matching Method 1 for Aperiodic CSI-RS

A first method is a method of performing rate matching based on RRC-signaled CSI-RS resource configuration information and ZP CSI-RS configuration. As described in the embodiments, as the method of the aperiodic CSI-RS transmission, the conventional CSI-RS subframes designated through CSI-RS resource configuration information are considered as an aperiodic CSI-RS resource pool and a subframe in which the actual aperiodic CSI-RS is transmitted is notified to the UE through L1 signaling such as UL grant. The first method is a method of performing rate matching on the assumption that the UE considers that CSI-RS subframes other than a CSI-RS subframe allocated to the UE itself are allocated to other UEs. If the first method is used, a rate matching mechanism is simple, but if the number of UEs is small, data transmission efficiency may decrease more than needs.

Rate Matching Method 2 for Aperiodic CSI-RS

A second method is a method of performing rate matching based on RRC-signaled CSI-RS resource configuration information, ZP CSI-RS configuration, L1-signaled aperiodic CSI-RS triggering, and a CSI request field. If the aperiodic CSI-RS is triggered on the assumption that whether aperiodic CSI-RS triggering is performed is determined by 1-bit L1 signaling, the UE can interpret aperiodic CSI-RS configuration information according to [Table 42] to [Table 50] as described above.

Meanwhile, even though the aperiodic CSI-RS is not triggered, the UE can interpret aperiodic CSI-RS configuration information according to [Table 42] to [Table 50] and recognize the corresponding CSI-RS resources as aperiodic ZP CSI-RSs or aperiodic interference measurement resources (IMR). This is to aperiodically perform rate matching according to whether aperiodic CSI-RS transmission is performed. If the aperiodic CSI-RS for the corresponding UE does not currently exist, it is possible to provide information on whether an aperiodic CSI-RS for another UE exists, and if the aperiodic CSI-RS exists, provide an RE in which the aperiodic CSI-RS exists through the method.

According to the example, methods of analyzing a CSI request field or an aperiodic CSI field in the cases in which the aperiodic CSI-RS is triggered and is not triggered do not need to be the same. For example, the method follows [Table 42] if the aperiodic CSI-RS is triggered and follows [Table 50] if the aperiodic CSI-RS is not triggered. This is because there is no need to inform that the aperiodic CSI-RS does not exists if the aperiodic CSI-RS is triggered but there is a need to inform another UE as well as the corresponding UE that the aperiodic CSI-RS does not exists if the aperiodic CSI-RS is not triggered.

Rate Matching Method 3 for Aperiodic CSI-RS

A third method is a method of performing rate matching based on RRC-signaled CSI-RS resource configuration information, ZP CSI-RS configuration, RRC-signaled aperiodic CSI-RS triggering, and a CSI request field. It is assumed that it is determined whether to use a CSI request field for aperiodic CSI-RS triggering or an aperiodic CSI-RS field by 1-bit RRC signaling and also assumed that both the CSI request field and the aperiodic CSI-RS field are signaled to the UE for convenience of description. At this time, if the aperiodic CSI-RS field is as shown in [Table 50], the aperiodic CSI-RS field may be interpreted as aperiodic NZP CSI-RS resource information when the CSI request field has a value other than 00, that is, when aperiodic CSI is triggered. On the other hand, when the CSI request field is 00, that is, when the aperiodic CSI is not triggered, the aperiodic CSI RS field may be interpreted as aperiodic ZP CSI-RS resources or aperiodic IMR information. In other words, by synthetically interpreting the CSI request field and the aperiodic CSI-RS field, it is possible to support dynamic rate matching for not only the NZP CSI-RS but also the ZP CSI-RS.

Embodiment 3-5

<Embodiment 3-5> proposes a method of configuring aperiodic CSI-RS transmission bandwidth. In the above embodiments, the method of configuring resources for aperiodic CSI-RS transmission in one or more CSI-RS resources and the method of determining transmission timing have been described. Meanwhile, in order to maximize efficiency of aperiodic CSI-RS transmission efficiency, it is very important to manage an aperiodic CSI-RS transmission bandwidth. For example, in the LTE system, the UE determines a channel bandwidth which the corresponding UE should support according to an E-UTRA band supported by the UE. Referring to [Table 51] below, the UE should support channel bandwidths of {1.4, 3, 5, 10, 15, 20} MHz if the UE supports E-UTRA band 2, and should support channel bandwidths of {5, 10} MHz if the UE supports E-UTRA band 6. That is, the LTE system does not separately support a UE-specific maximum bandwidth, and a channel bandwidth may vary depending on the service such as MTC, eMTC, or NB-IoT.

TABLE 51

E-UTRA band/Channel bandwidth

| E-UTRA Band | 1.4 MHz | 3 MHz | 5 MHz | 10 MHz | 15 MHz | 20 MHz |
|---|---|---|---|---|---|---|
| 1 | | | Yes | Yes | Yes | Yes |
| 2 | Yes | Yes | Yes | Yes | Yes1 | Yes1 |
| 3 | Yes | Yes | Yes | Yes | Yes1 | Yes1 |
| 4 | Yes | Yes | Yes | Yes | Yes | Yes |
| 5 | Yes | Yes | Yes | Yes1 | | |
| 6 | | | Yes | Yes1 | | |
| 7 | | | Yes | Yes | Yes3 | Yes1, 3 |
| 8 | Yes | Yes | Yes | Yes1 | | |
| 9 | | | Yes | Yes | Yes1 | Yes1 |
| ... | | | | | | |

On the other hand, the NR system may support different UE bandwidths according to each UE due to various factors such as the coexistence of various verticals such as eMBB, URLLC, and mMTC within the same band, and a low cost eMBB UE. Accordingly, UEs having different maximum UE bandwidths may coexist within a wide system bandwidth, and supporting all of them through a wideband aperiodic CSI-RS may waste resources. In order to solve the problem, the present embodiment provides methods of managing an aperiodic CSI-RS transmission bandwidth.

In the NR system, RRC configuration for the CSI-RS may include timing information such as a CSI-RS transmission period and a time offset. The time offset may include one or more values of a slot offset for a periodic CSI-RS or a semi-persistent CSI-RS and a triggering offset for an aperiodic CSI-RS. The triggering offset includes information on a time difference to actual transmission after aperiodic CSI-RS transmission is triggered through DCI. In aperiodic CSI-RS transmission, the timing information may be ignored. For example, in the case of the aperiodic CSI-RS, the UE may ignore the transmission period and the offset value and may identify whether the aperiodic CSI-RS transmission is performed through DCI reception timing including aperiodic CSI-RS transmission information.

Further, in the NR system, RRC configuration for the CSI-RS may include transmission band information such as a CSI-RS transmission bandwidth, a frequency offset, and an RB or subband location. The frequency offset may be an offset in units of PRBs based on a PRB including a downlink or uplink DC subcarrier or based on a scheduled PDSCH or an offset in units of subbands including a plurality of PRBs. As described above, CSI-RS transmission band information configured through RRC is suitable for semi-static management of the CSI-RS transmission band but a dynamic change in the CSI-RS transmission band is not possible. The following methods may be considered for the dynamic CSI-RS transmission band configuration and change.

A first method is to dynamically change the CSI-RS transmission band through CSI-RS frequency hopping. The base station and the UE may share predetermined frequency hopping patterns and determine the location of frequency resources of the CSI-RS transmitted in a narrow band (subband) according to a particular rule, LI (DCI), or L2 (MAC CE or RRC) signaling. The frequency hopping timing may be defined as an absolute value by the slot or subframe location or defined as a relative value by DCI including an aperiodic CSI-RS trigger. For example, if the hopping timing is defined as an absolute value, the subband location for CSI-RS transmission may vary depending on a slot or subframe index regardless of the aperiodic CSI-RS triggering. On the other hand, if the hopping timing is defined as a relative value, the subband location for CSI-RS transmission varies depending on the aperiodic CSI-RS triggering. In the disclosure, the subband for CSI-RS transmission may be determined by a hopping pattern type and the control of transmission timing, but once the hopping pattern is determined, it takes a lot of time to change the hopping pattern and thus a degree of freedom of subband configuration is limited.

A second method is a subband/wideband transmission indication through L1 (DCI) or MAC CE signaling or subband/wideband switching signaling. The method of the disclosure supports dynamic signaling (L1 or MACE CE) for changing the CSI-RS transmission band information configured through RRC.

Figure 43:
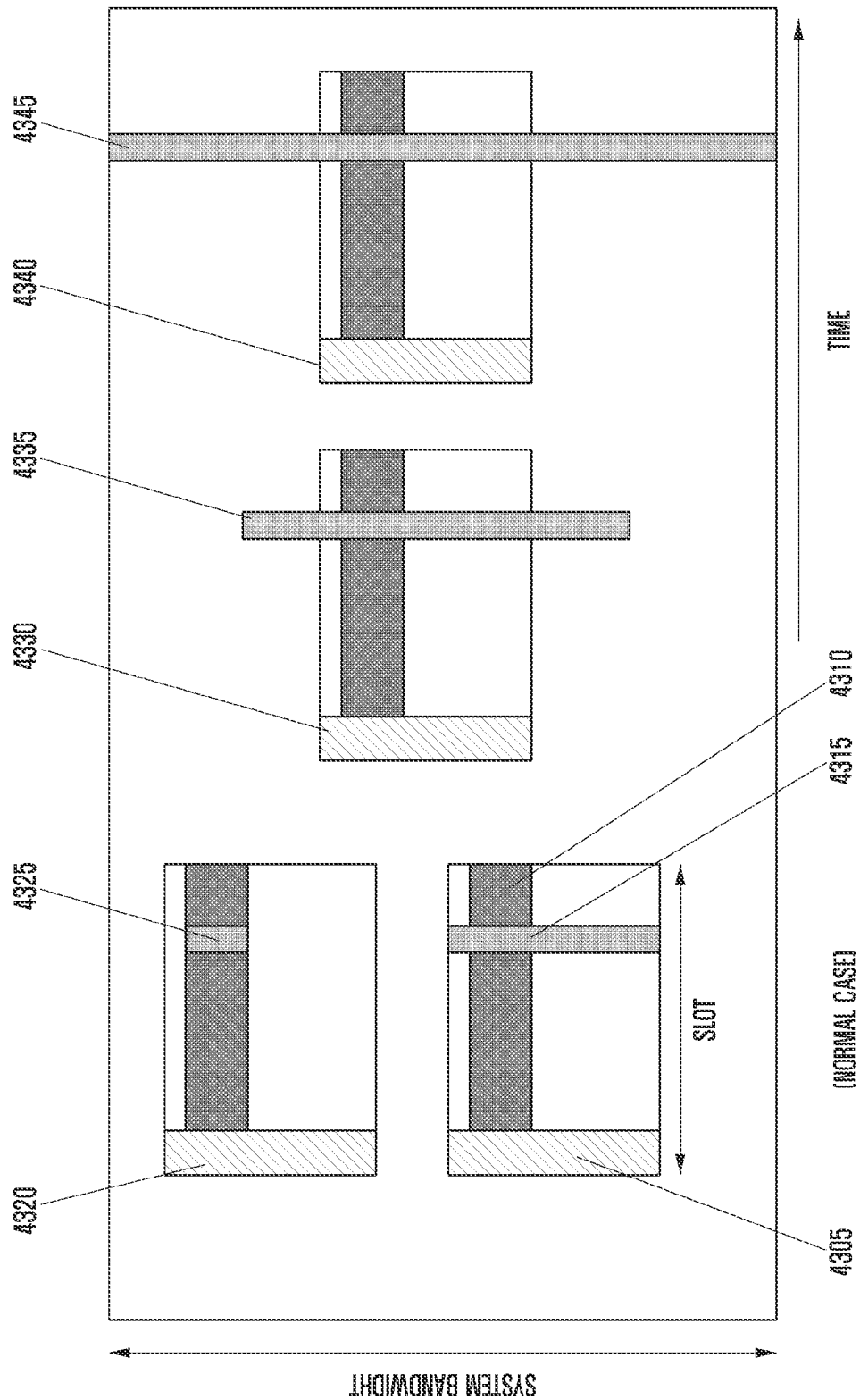
FIG. 43 illustrates an example of the second method for configuring and changing the CSI-RS transmission band.

FIG. 43 illustrates an example of the second method for configuring and changing the CSI-RS transmission band. In FIG. 43, DCI is transmitted in a common search space (CSS) or a UE-specific search space (USS) defined in control resource sets (CORESETs) 4305, 4320, 4330, and 4340 configured in the UE may indicate whether aperiodic CSI-RSs 4315, 4325, 4335, and 4345 are transmitted and frequency and/or time resource indexes. In addition to this, the DCI includes transmission band change signaling indicating whether the corresponding aperiodic CSI-RS is transmitted in a subband 4315 or 4325 or a wideband 4335 or 4345. The two pieces of information may be joint-encoded but it is assumed that the two piece of information are independently encoded for convenience of description below.

If the transmission band change signaling means subband transmission, the corresponding aperiodic CSI-RS transmission band is the same as the bandwidth of the CORESET as indicated by reference numeral 4315 or the corresponding aperiodic CSI-RS transmission band is the same as a configured PDSCH transmission band 4310 as indicated by reference numeral 4325. If the transmission band change signaling means wideband transmission, the corresponding aperiodic CSI-RS transmission band is the same as a CSI-RS transmission band configured through RRC as indicated by reference numeral 4335, or the corresponding aperiodic CSI-RS transmission band is the same as a system bandwidth or, if the system bandwidth is divided into a plurality of bandwidth parts, is the same as a band corresponding to the bandwidth part as indicated by reference numeral 4345.

Similarly, the transmission band change signaling may be used as an indicator indicating whether to use the CSI-RS transmission band configured through RRC or perform wideband CSI-RS transmission corresponding to the system bandwidth, the bandwidth part, or the UE bandwidth.

Figure 44:
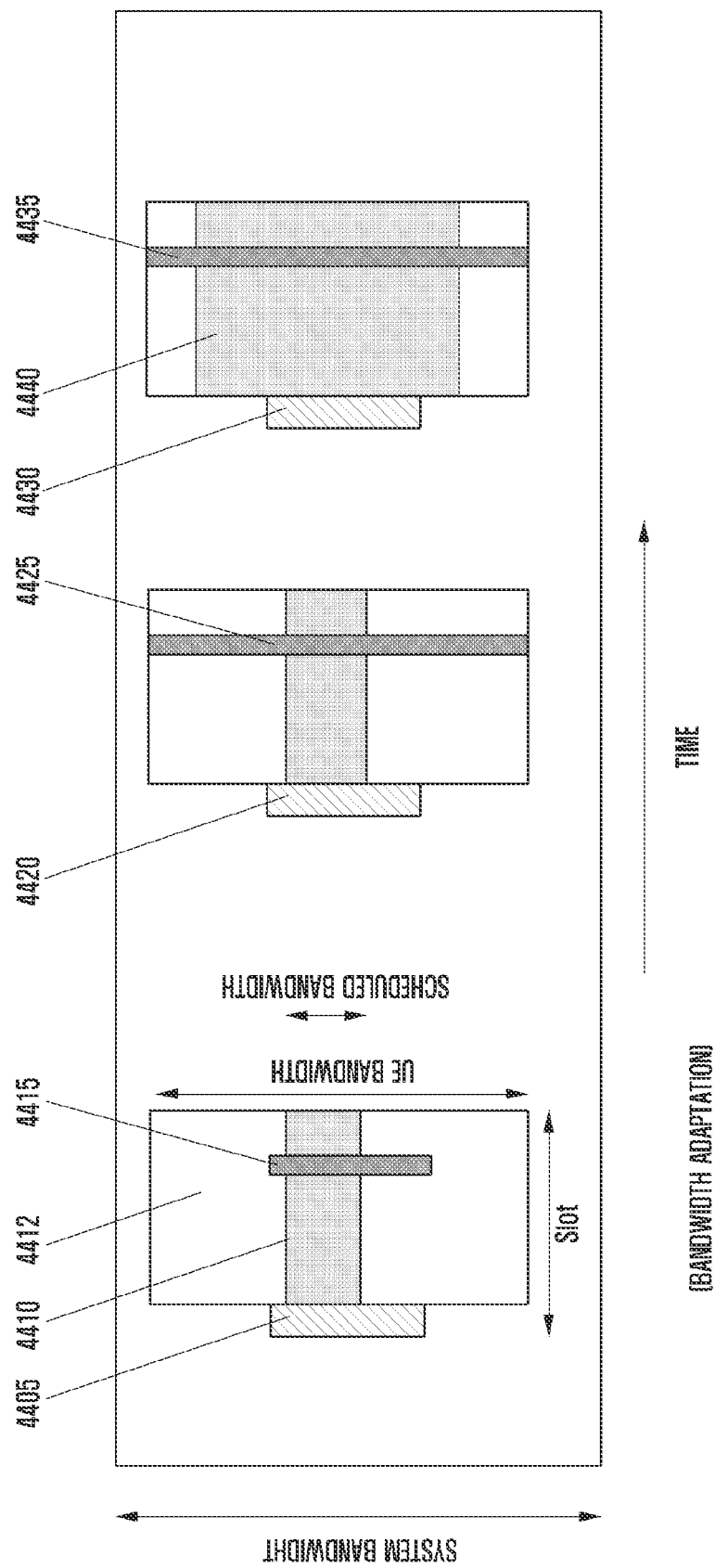
FIG. 44 illustrates a process in which the UE performs bandwidth adaptation through transmission band changing signaling.

FIG. 44 illustrates a process of performing bandwidth adaptation of the UE through transmission band changing signaling. The base station may schedule a PDSCH 4410 within a UE bandwidth 4412 through DCI transmitted in a CORESET 4405 and trigger an aperiodic CSI-RS 4415. At this time, the base station may instruct the UE to use a CSI-RS transmission band configured through RRC via the transmission band change signaling (configured as 0). In reference numeral 4415, it is assumed that the CSI-RS transmission band configured through RRC is the same as the CORESET band.

Meanwhile, if the base station desires to allocate the PDSCH of the UE to a wider band as indicated by reference numeral 4440, the base station may need CSI for the band wider than the band 4415. Accordingly, the base station configures the transmission band change signal (as 1) such that the UE receives the wideband aperiodic CSI-RS 4425 through DCI transmitted in the CORESET 4420. The UE may receive the CSI-RS 4425, generate CSI, and then report the generated CSI to the base station, and the base station may perform scheduling through the CSI. The base station may allocate and transmit the PDSCH 4440 of the wide band to the UE through DCI transmitted in a CORESET 4430 to the UE on the basis of the scheduling result.

Similarly, the transmission band change signaling may be used as an indicator indicating whether to use the CSI-RS transmission band configured through RRC or whether to match the most recently configured downlink bandwidth with the CSI-RS transmission band. Since a detailed description thereof is similar to that of FIGS. 43 and 44, it will be omitted.

Although it is illustrated and described that the UE has a single CORESET in the description and drawings, this is only for convenience of description, and the description can be extended and applied to the case in which the UE has a plurality of CORESETs. In the above description, the CORESET may be replaced with a UE bandwidth or a bandwidth part separately configured from a control channel and the same methods can be applied thereto. Since a detailed description thereof is similar to the examples, it will be omitted.

The description and drawing are an example of the case in which the aperiodic CSI-RS is transmitted in a single resource and correspond to a method of supporting an aperiodic CSI-RS transmission band change through signaling of small payload (1 bit is used in the simplest example). Meanwhile, if the aperiodic CSI-RS is transmitted in a plurality of resources, the examples can be extended through the following two methods. A first method is to apply the same transmission band change signaling to a plurality of CSI-RS resources. In this case, there is no additional DCI payload increase but a degree of freedom of the CSI-RS transmission band configuration is reduced. A second method is to support CSI-RS resource-specific or resource group-specific transmission band change signaling. In this case, DCI payload increases according to the number of simultaneously transmitted aperiodic CSI-RS resources, but the degree of freedom of CSI-RS transmission band configuration increases. If the second method is applied, the number of simultaneously transmitted aperiodic CSI-RS resources is limited to 2 or 3.

Although it is described and illustrated that the DCI including the aperiodic CSI-RS triggering and the transmission band change signaling and the corresponding aperiodic CSI-RS are transmitted in the same slot in the description and drawing, this is only for convenience of description, and it is apparent that they can be transmitted in one or more slots according to CSI-RS transmission timing information.

Embodiment 3-6

<Embodiment 3-6> provides a method of configuring an aperiodic CSI-RS transmission band for acquiring CSI of a control channel. In this case, the transmission band change signaling can be understood as control channel CSI triggering signaling.

Figure 45:
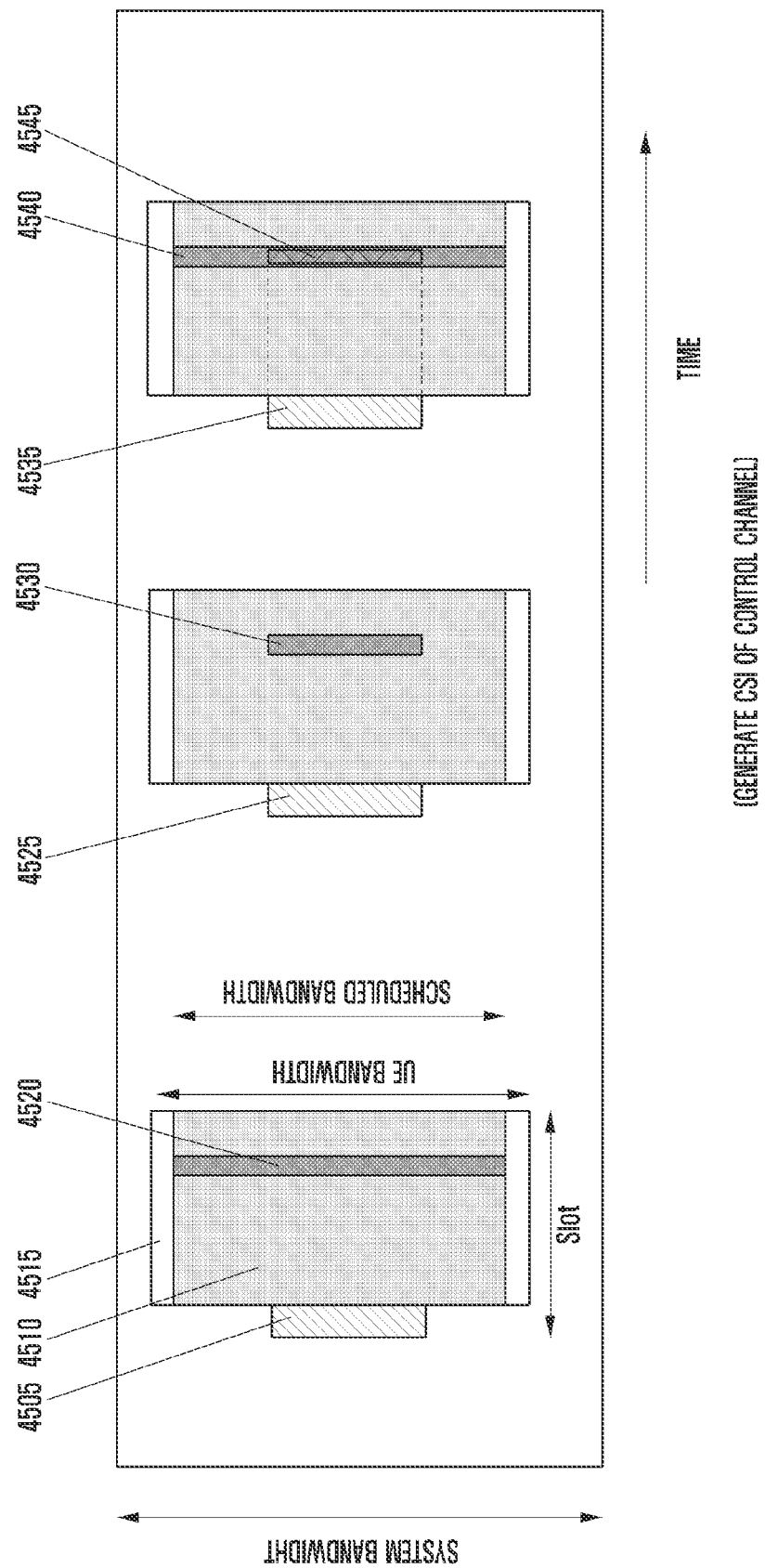
FIG. 45 illustrates a process of controlling aperiodic CSI-RS transmission and reception bands through control channel CSI triggering signaling.

FIG. 45 illustrates a process of controlling aperiodic CSI-RS transmission and reception bands through control channel CSI triggering signaling. The base station may schedule a PDSCH 4505 within a UE bandwidth 4515 through DCI transmitted in a CORESET 4510 and trigger an aperiodic CSI-RS 4520. At this time, the base station may instruct the UE to use the CSI-RS transmission band configured through RRC via the control channel CSI triggering signaling (configured as 0). This is to generate CSI for the PDSCH by the UE, and the UE generate required CSI such as CQI, PMI, RI, and CRI in consideration of a transmission environment for the PDSCH (channel coding using low density parity check code (LDPC), {4-1024} modulation order, and PDSCH transport block size (TBS)). In reference numeral 4520, it is assumed that the CSI-RS transmission band configured through RRC is the same as a band in which the PDSCH is scheduled.

Meanwhile, if the base station requires CSI for a control channel, the base station configures control channel CSI triggering signaling (as 1) such that the UE receives CSI-RSs 4530 and 4540 for generating the control channel CSI through DCI transmitted in a CORESET 4525. At this time, configuring control channel CSI triggering signaling such that the UE receives the CSI-RSs 4530 and 4540 for generating the control channel CSI may mean changing the actual CSI-RS transmission band as indicated by reference numeral 4530 but mean changing only a reception window of the UE as indicated by reference numeral 4545 without changing the actual CSI-RS transmission band as indicated by reference numeral 4540. Thereafter, the UE receives the CSI-RS 4530 or 4545, generate CSI for a PDCCH, and generate required CSI such as CQI, PMI, RI, and CRI in consideration of a transmission environment for the PDCCH (channel coding using polar code, 4-QAM modulation order, and PDCCH payload size). The base station may perform scheduling on the PDSCH and the PDCCH therethrough.

Although it is illustrated and described that the UE has a single CORESET in the description and drawings, this is only for convenience of description, and the description can be extended and applied to the case in which the UE has a plurality of CORESETs. In the above description, the CORESET may be replaced with a UE bandwidth or a bandwidth part separately configured from a control channel and the same methods can be applied thereto. Since a detailed description thereof is similar to the examples, it will be omitted.

The description and drawing are an example of the case in which the aperiodic CSI-RS is transmitted in a single resource and correspond to a method of supporting an aperiodic CSI-RS transmission band change through signaling of small payload (1 bit is used in the simplest example). Meanwhile, if the aperiodic CSI-RS is transmitted in a plurality of sources, the examples can be extended through the following two methods. A first method is to apply the same transmission band change signaling to a plurality of CSI-RS resources. In this case, there is no additional DCI payload increase but a degree of freedom of the CSI-RS transmission band configuration is reduced. A second method is to support CSI-RS resource-specific or resource group-specific transmission band change signaling. In this case, DCI payload increases according to the number of simultaneously transmitted aperiodic CSI-RS resources, but the degree of freedom of CSI-RS transmission band configuration increases. If the second method is applied, the number of simultaneously transmitted aperiodic CSI-RS resources is limited to 2 or 3.

Although it is described and illustrated that the DCI including the aperiodic CSI-RS triggering and the transmission band change signaling and the corresponding aperiodic CSI-RS are transmitted in the same slot in the description and drawing, this is only for convenience of description, and it is apparent that they can be transmitted in one or more slots according to CSI-RS transmission timing information.

Embodiment 3-7

<Embodiment 3-5> and <embodiment 3-6> mainly describe the control of the transmission band for an NZP CSI-RS. Meanwhile, a ZP CSI-RS plays various roles such as performing PDSCH rate matching by emptying a CSI-RS resource part from another cell (or beam or TRP), measuring interference from another cell (or beam or TRP), or performing NZP CSI-RS power boosting, and thus it may be important to handle the control of the ZP CSI-RS transmission band. <Embodiment 3-7> proposes a method of controlling the ZP CSI-RS transmission band.

Figure 46:
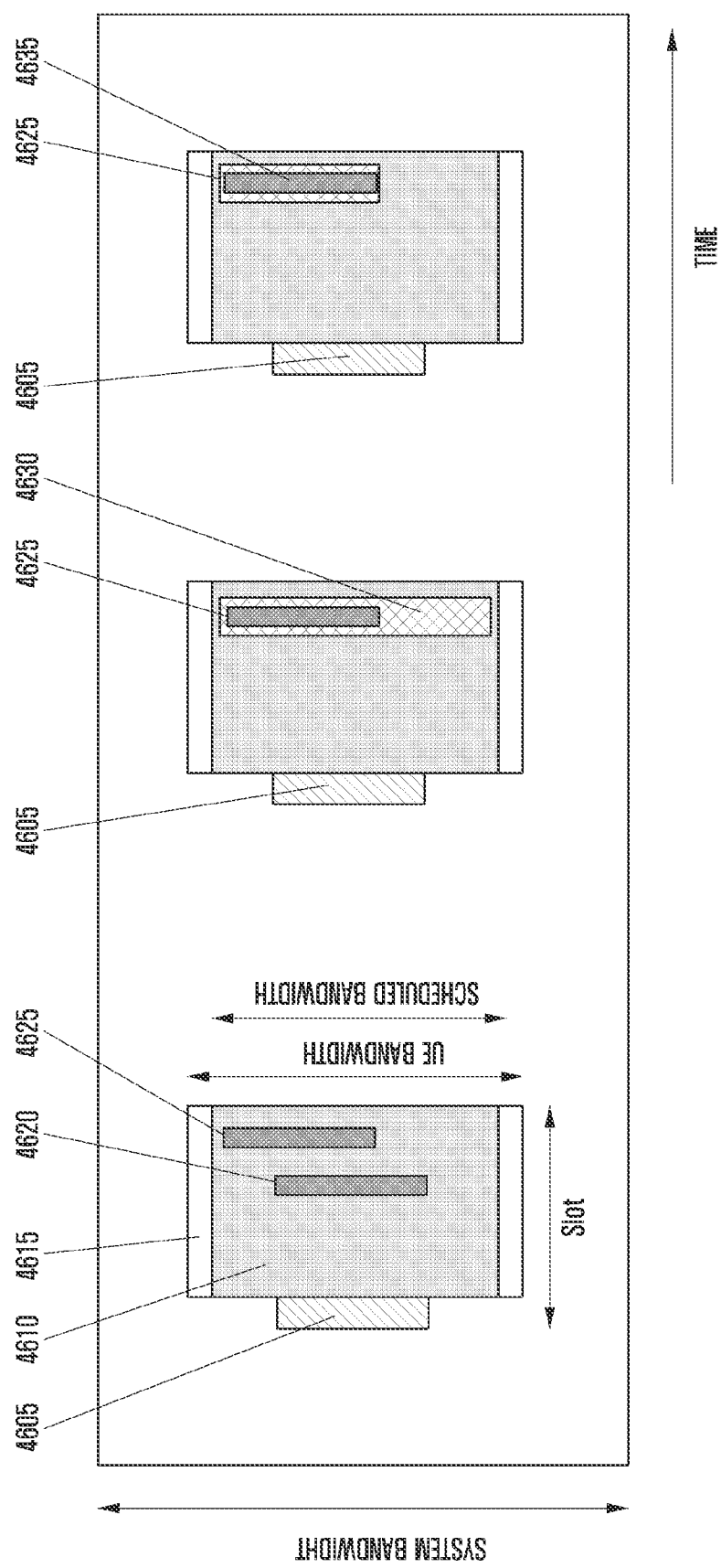
FIG. 46 illustrates a process of controlling aperiodic ZP CSI-RS transmission and reception bands.

FIG. 46 illustrates a process of controlling aperiodic ZP CSI-RS transmission and reception bands. The base station may schedule a PDSCH 4605 within a UE bandwidth 4615 through DCI transmitted in a CORESET 4610 and trigger an aperiodic CSI-RS 4620. It is assumed that the aperiodic CSI-RS transmission band is configured to be the same as a CORESET transmission band of the corresponding UE. Meanwhile, a PDSCH 4640 of the UE may overlap other subband period CSI-RS resources 4625 which the UE does not receive (which are not transmitted from a serving cell or a TRP). At this time, the CORESET of the UE receiving the aperiodic CSI-RS 4525 can be transmitted in a band different from the band in which the CORESET 4605 is transmitted, and accordingly the transmission band 4625 may also be different from the band 4620.

In consideration of such a situation, the following two methods can be used to configure the ZP CSI-RS to correspond to reference numeral 4625. A first method is to manage the ZP CSI-RS transmission band by separately supporting transmission band change signaling for the NZP NCSI-RS and transmission band change signaling for the ZP CSI-RS. For example, if the ZP CSI-RS transmission band configured through RRC is not sufficient to cover reference numeral 4625, the base station may configure a wideband area expressed as a system bandwidth, a bandwidth part, or a bandwidth in which the PDSCH is scheduled as indicated by reference numeral 4630 instead of the ZP CSI-RS transmission band configured through RRC via the ZP CSI-RS transmission band change signaling. This somewhat increases overhead for the ZP CSI-RS, but has an advantage of preventing a significant increase in transmission band change signaling overhead. In another example of the first method, if the ZP CSI-RS transmission band configured through RRC is not sufficient to cover reference numeral 4625, the base station may directly insert ZP CSI-RS transmission band information into the ZP CSI-RS transmission band change signaling. In this case, the ZP CSI-RS transmission band configuration 4635 may be the same as or similar to the NP CSI-RS transmission band configuration 4625, and thus ZP CSI-RS configuration overhead may be optimized but transmission band change signaling overhead may greatly increase.

A second method is to use the same transmission band change signaling both for the NZP CSI-RS and the ZP CSI-RS in which case transmission band change signaling may be joint-encoded together with one or all of aperiodic NZP CSI-RS triggering signaling, aperiodic ZP CSI-RS triggering signaling, and resource selection signaling or independently encoded from aperiodic NZP CSI-RS triggering signaling, aperiodic ZP CSI-RS triggering signaling, and resource selection signaling. If the aperiodic NZP CSI-RS triggering signaling, the resource selection signaling, and the transmission band change signaling are joint-encoded, the aperiodic ZP CSI-RS bandwidth may be determined according to recently configured aperiodic NZP CSI-RS transmission bandwidth signaling. If the aperiodic NZP CSI-RS triggering signaling, the ZP CSI-RS triggering signaling, the resource selection signaling, and the transmission band change signaling are joint-encoded, the aperiodic ZP CSI-RS bandwidth is determined according to a joint encoding method. If the aperiodic NZP CSI-RS triggering signaling, the ZP CSI-RS triggering signaling, the resource selection signaling, and the transmission band change signaling are independently encoded, the aperiodic ZP and NZP CSI-RS bandwidths may be independently determined according to encoded transmission band change signaling.

Although it is illustrated and described that the UE has a single CORESET in the description and drawings, this is only for convenience of description, and the description can be extended and applied to the case in which the UE has a plurality of CORESETs. In the above description, the CORESET may be replaced with a UE bandwidth or a bandwidth part separately configured from a control channel and the same methods can be applied thereto. Since a detailed description thereof is similar to the examples, it will be omitted.

The description and drawing are an example of the case in which the aperiodic CSI-RS is transmitted in a signal resource and correspond to a method of supporting an aperiodic CSI-RS transmission band change through signaling of small payload (1 bit is used in the simplest example). Meanwhile, if the aperiodic CSI-RS is transmitted in a plurality of sources, the examples can be extended through the following two methods. A first method is to apply the same transmission band change signaling to a plurality of CSI-RS resources. In this case, there is no additional DCI payload increase but a degree of freedom of the CSI-RS transmission band configuration is reduced. A second method is to support CSI-RS resource-specific or resource group-specific transmission band change signaling. In this case, DCI payload increases according to the number of simultaneously transmitted aperiodic CSI-RS resources, but the degree of freedom of CSI-RS transmission band configuration increases. If the second method is applied, the number of simultaneously transmitted aperiodic CSI-RS resources is limited to 2 or 3.

Although it is described and illustrated that the DCI including the aperiodic CSI-RS triggering and the transmission band change signaling and the corresponding aperiodic CSI-RS are transmitted in the same slot in the description and drawing, this is only for convenience of description, and it is apparent that they can be transmitted in one or more slots according to CSI-RS transmission timing information.

The examples in [Table 45] to [Table 50] may have different meanings according to the definition of the "higher layer". For example, if the higher layer means only RRC signaling, the tables may mean a list of RRC-signaled CSI-RSs. If the higher layer also means MAC CE signaling, the tables may mean activated CSI-RS resources by the MAC CE. Similarly, it is apparent that the meanings of the CSI-RS resource indicated by L1 signaling may be changed. For example, if the higher layer means only RRC signaling, CSI-RS resources indicated by L1 signaling may mean a list of RRC-signaled CSI-RSs signaled. If the higher layer also means MAC CE signaling, CSI-RS resources indicated by L1 signaling may mean activated CSI-RS resources by the MAC CE.

Figure 47:
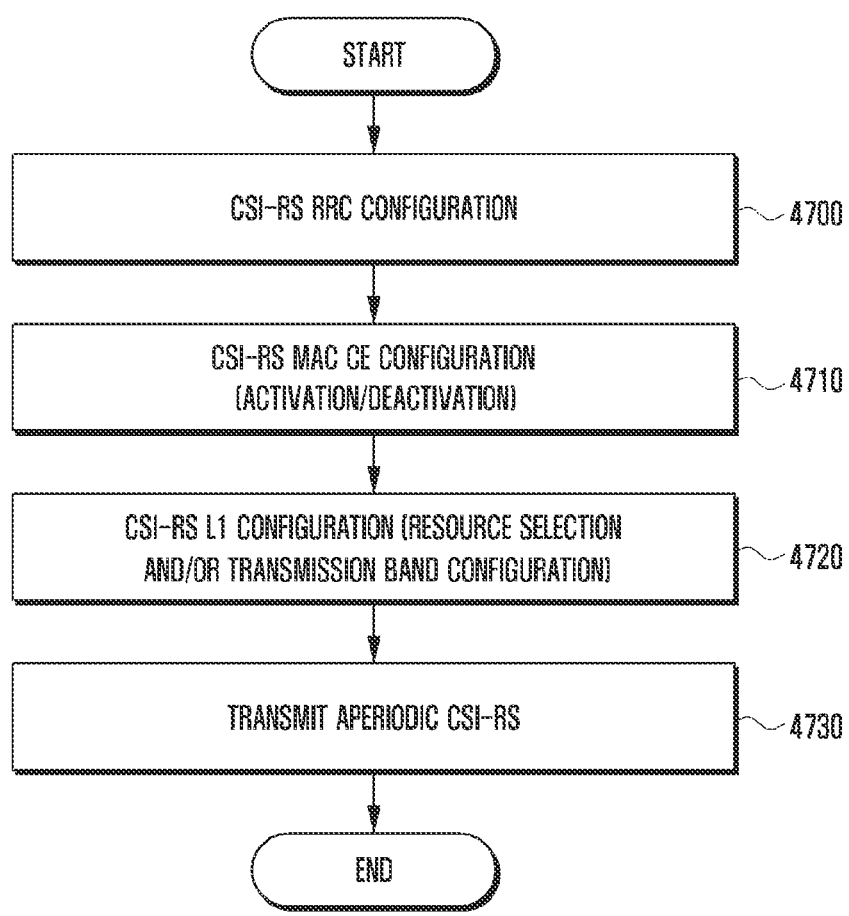
FIG. 47 illustrates the operation of the base station for transmitting an aperiodic CSI-RS.

If the aperiodic CSI-RS is transmitted according to an embodiment of the disclosure, the operation of the base station will be described with reference to FIG. 47. FIG. 47 illustrates the operation of the base station for transmitting an aperiodic CSI-RS. Referring to FIG. 47, the base station configures at least one aperiodic CSI-RS through RRC signaling in step 4700. At this time, RRC signaling may include transmission band information of the aperiodic CSI-RSs. Thereafter, the base station may configure resources to be activated or deactivated among the RRC-configured CSI-RSs through the higher layer (including the MAC CE) according to the embodiment proposed by the disclosure in step 4710, if necessary. Further, the base station may trigger the aperiodic CSI-RS through L1 signaling and may indicate a change in the RRC-configured transmission band in step 4720. Thereafter, in step 4730, the base station transmits the aperiodic CSI-RS in aperiodic CSI-RS resources notified in steps 4700, 4710, and 4720.

Figure 48:
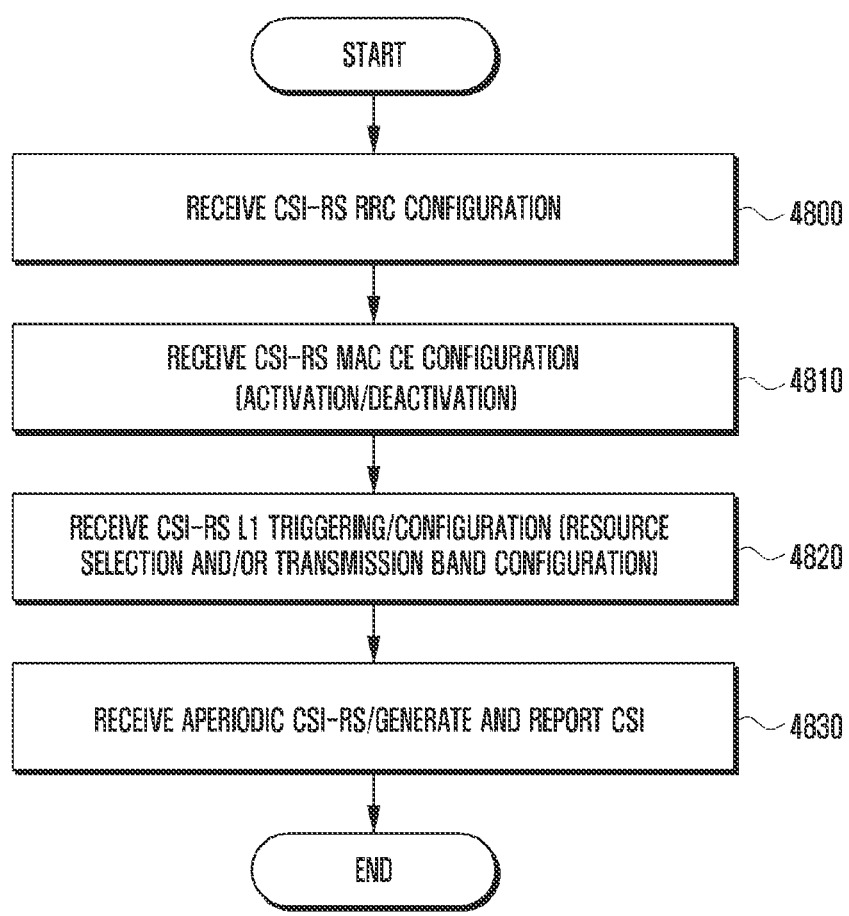
FIG. 48 illustrates the operation of the UE for receiving the aperiodic CSI-RS.

According to an embodiment of the disclosure, the operation of the UE based on the aperiodic CSI-RS will be described with reference to FIG. 48. FIG. 48 illustrates the operation of the UE for receiving the aperiodic CSI-RS. Referring to FIG. 48, the UE receives semi-static configuration information related to the aperiodic CSI-RS through higher layer (RRC) signaling in step 4800. Thereafter, in step 4810, the UE receives configuration information of resources to be activated or deactivated among the RRC-configured CSI-RSs through higher layer (including the MAC CE) signaling if necessary according to the embodiment proposed by the disclosure. Further, the UE receives dynamic configuration information including aperiodic CSI-RS-related transmission band change signaling through L1 signaling in step 4820. Thereafter, the UE receives the aperiodic CSI-RS in the corresponding CSI-RS resources on the basis of the aperiodic CSI-RS configuration information received in steps 4800, 4810, and 4820. Subsequently, the UE generates CSI information on the basis of the aperiodic CSI-RS received in step 4830 and reports the CSI information to the base station at predetermined timing.

Figure 49:
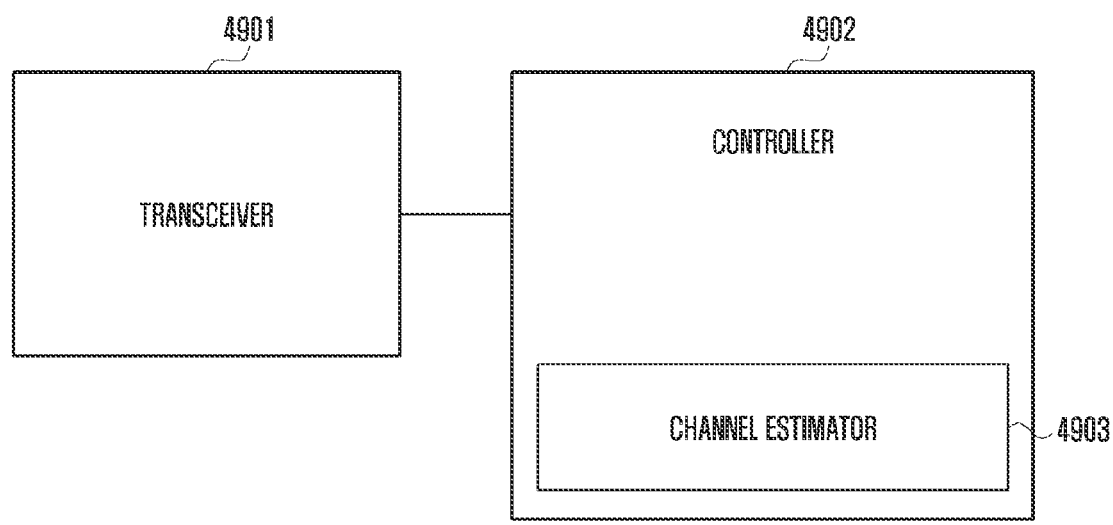
FIG. 49 is a block diagram illustrating an internal structure of the UE according to an embodiment of the disclosure.

FIG. 49 is a block diagram illustrating an internal structure of the UE according to an embodiment of the disclosure.

Referring to FIG. 49, the UE includes a communication unit 4901 and a controller 4902. The communication unit 4901 performs a function of transmitting or receiving data to or from the outside (for example, the base station). Here, the communication unit 4901 may transmit feedback information to an base station under the control of the controller 4902.

The controller 4902 controls statuses and operations of all elements in the UE. Specifically, the controller 4902 generates feedback information according to information allocated by the base station. Also, the controller 4902 may control the communication unit 4901 to feed back generated channel information to the base station on the basis of timing information allocated by the base station. To this end, the controller 4902 may include a channel estimator 4903.

The channel estimator 4903 may determine required feedback information through a CSI-RS and feedback allocation information received from the base station, and estimate a channel using the received CSI-RS based on the feedback information Although FIG. 49 has described the example in which the UE includes the transceiver 4901 and the controller 4902, the UE is not limited thereto and may further include various elements based on a function executed in the UE. For example, the UE may further include a display for displaying the current status of the UE, an input unit for inputting a signal to perform a function by the user, and a storage unit for storing generated data in the UE.

Also, it is illustrated that the channel estimator 4903 is included in the controller 4902, but is not be limited thereto. The controller 4902 may control the transceiver 4901 to receive configuration information associated with each of at least one reference signal resource from the base station. Also, the controller 4902 may measure at least one reference signal and control the transceiver 4901 to receive, from the base station, feedback configuration information for generating feedback information based on the measurement result.

The controller 4902 may measure at least one reference signal received through the transceiver 4901, and may generate feedback information based on the feedback configuration information. The controller 4902 may control the transceiver 4901 to transmit, to the base station, the generated feedback information at the feedback timing defined in the feedback configuration information.

The controller 4902 may receive a CSI-RS periodically or aperiodically transmitted from the base station, generate feedback information on the basis of the received CSI-RS, and transmit the generated feedback information to the base station. At this time, the controller 4902 may select a precoding matrix with reference to the relation between antenna port groups of the base station.

The controller 4902 may receive the CSI-RS periodically or aperiodically transmitted from the base station, generate feedback information on the basis of the received CSI-RS, and transmit the generated feedback information to the base station. At this time, the controller 4902 may select one precoding matrix with reference to all antenna port groups of the base station. Also, the controller 4902 may receive feedback configuration information from the base station, receive a periodically or aperiodically transmitted CSI-RS from the base station, generate feedback information on the basis of the received feedback configuration information and the received CSI-RS, and transmit the generated feedback information to the base station.

Figure 50:
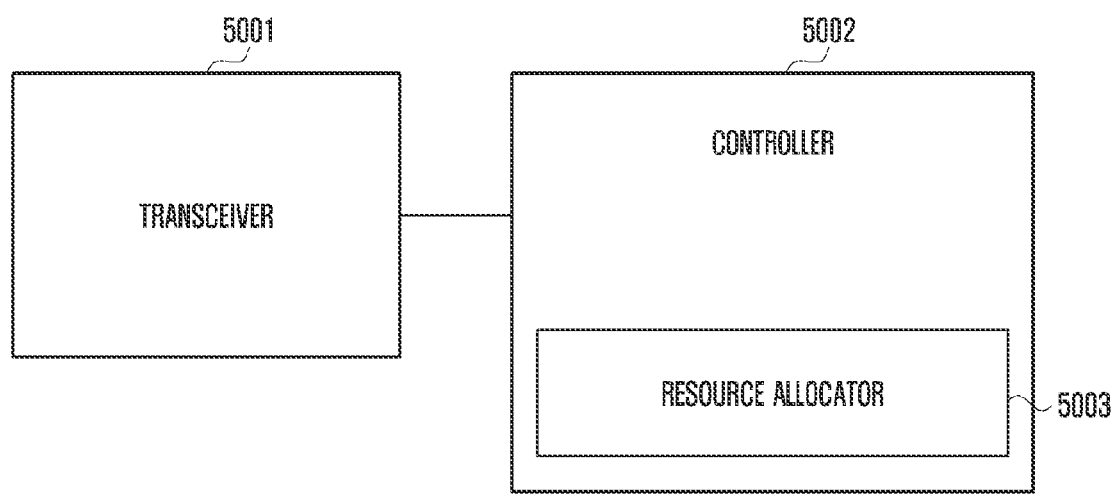
FIG. 50 is a block diagram illustrating an internal structure of the base station according to an embodiment of the disclosure.

FIG. 50 is a block diagram illustrating an internal structure of the base station according to an embodiment of the disclosure.

Referring to FIG. 50, the base station includes a controller 5002 and a transceiver 5001.

The controller 5002 controls statuses and operations of all elements in the base station. Specifically, the controller 5002 may allocate CSI-RS resources for estimating a channel of the UE to the UE and allocate feedback resources and feedback timing to the UE. To this end, the controller 5002 may further include a resource allocator 5003. Also, the controller 2210 may allocate a feedback configuration and the feedback timing to prevent a collision between feedbacks from multiple UEs and receive and analyze configured feedback information at the corresponding timing.

The transceiver 5001 may perform a function of transmitting and receiving a reference signal and feedback information to and from the UE. Here, the transceiver 5001 may transmit a CSI-RS to the UE through the allocated resources and may receive feedback of channel information from the UE under the control of the controller 5002.

Although it is illustrated that the resource allocator 5003 is included in the controller 5001, it is not be limited thereto.

The controller 5002 may control the transceiver 5001 to transmit, to the UE, configuration information associated with each of at least one reference signal, or may generate the at least one reference signal. Also, the controller 5002 may control the transceiver 5001 to transmit feedback configuration information for generating feedback information based on the measurement result to the UE.

The controller 5002 may control the transceiver 5001 to transmit the at least one reference signal to the UE and receive feedback information transmitted from the UE at the feedback timing defined in the feedback configuration information.

The controller 5002 may transmit the feedback configuration information to the UE, periodically or aperiodically transmit a CSI-RS to the UE, and receive feedback information generated on the basis of the feedback configuration information and the CSI-RS from the UE. In this instance, the controller 5002 may transmit feedback configuration information corresponding to each antenna port group of the base station, and additional feedback configuration information based on the relation between antenna port groups. The controller 5002 may periodically or aperiodically transmit CSI-RSs beamformed on the basis of the feedback information to the UE and receive the generated feedback information from the UE on the basis of the CSI-RSs.

What is claimed is:

1. A method performed by a user equipment (UE) in a communication system, the method comprising:
   receiving, from a base station, one or more configurations via higher layer signaling, wherein a configuration is associated with an aperiodic channel state information (CSI) report and includes information for a CSI-reference signal (RS) resource;
   receiving, from the base station, downlink control information (DCI) including information field for triggering the aperiodic CSI report, wherein the information field is defined as one of a first interpretation and a second interpretation based on a number of the one or more configurations and a size of the information field, where:
   the first interpretation is that the information field directly indicates the configuration from the one or more configurations received via the higher layer signaling, and
   the second interpretation is that the information field indicates the configuration from at least one configuration selected via a medium access control (MAC) control element (CE) among the one or more configurations received via the higher layer signaling,
   receiving, from the base station, an aperiodic CSI-RS based on an offset for the aperiodic CSI-RS; and
   transmitting, to the base station, the aperiodic CSI report including CSI generated based on the aperiodic CSI-RS.

2. The method of claim 1, wherein the offset for the aperiodic CSI-RS corresponds to a CSI-RS resource associated with the aperiodic CSI report indicated based on the information field in the DCI.

3. The method of claim 1, wherein the aperiodic CSI-RS is received in a second transmission time interval (TTI) after the offset for the aperiodic CSI-RS from a first TTI in which the DCI is received.

4. The method of claim 1, wherein the configuration includes information for a CSI-RS resource set and a CSI-interference measurement (CSI-IM) resource set.

5. The method of claim 1, wherein, in case that all bits of the information field are equal to 0, the information field indicates that the aperiodic CSI report is not triggered.

6. A method performed by a base station in a communication system, the method comprising:
   transmitting, to a user equipment (UE), one or more configurations via higher layer signaling, wherein a configuration is associated with an aperiodic channel state information (CSI) report and includes information for a CSI-reference signal (RS) resource;
   transmitting, to the UE, downlink control information (DCI) including information field for triggering the aperiodic CSI; CSI report, wherein the information field is defined as one of a first interpretation and a second interpretation based on a number of the one or more configurations and a size of the information field, where:
   the first interpretation is that the information field directly indicates the configuration from the one or more configurations transmitted via the higher layer signaling, and
   the second interpretation is that the information field indicates the configuration from at least one configuration selected via a medium access control (MAC) control element (CE) among the one or more configurations transmitted via the higher layer signaling,
   transmitting, to the UE, an aperiodic CSI-RS based on an offset for the aperiodic CSI-RS; and
   receiving, from the UE, the aperiodic CSI report including CSI generated based on the aperiodic CSI-RS.

7. The method of claim 6, wherein the CSI RS offset for the aperiodic CSI-RS corresponds to a CSI-RS resource associated with the aperiodic CSI report indicated based on the information field in the DCI.

8. The method of claim 6, wherein the aperiodic CSI-RS is transmitted in a second transmission time interval (TTI) after the offset for the aperiodic CSI-RS from a first TTI in which the DCI is transmitted.

9. The method of claim 6, wherein the configuration includes information for a CSI-RS resource set and a CSI-interference measurement (CSI-IM) resource set.

10. The method of claim 6, wherein, in case that all bits of the information field are equal to 0, the information field indicates that the aperiodic CSI report is not triggered.

11. A user equipment (UE) in a communication system, the UE comprising:
    a transceiver; and
    a controller configured to:
    receive, from a base station, one or more configurations via higher layer signaling, a configuration is associated with an aperiodic channel state information (CSI) report and includes information for a CSI-reference signal (RS) resource;
    receive, from the base station, downlink control information (DCI) including information field for triggering the aperiodic CSI report, wherein the information field is defined as one of a first interpretation and a second interpretation based on a number of the one or more configurations and a size of the information field, where:
    the first interpretation is that the information field directly indicates the configuration from the one or more configurations received via the higher layer signaling, and
    the second interpretation is that the information field indicates the configuration from at least one configuration selected via a medium access control (MAC)

control element (CE) among the one or more configurations received via the higher layer signaling, receive, from the base station, an aperiodic CSI-RS based on an offset for the aperiodic CSI-RS; and transmit, to the base station, the aperiodic CSI report including CSI generated based on the aperiodic CSI-RS.

12. The UE of claim 11, wherein the offset for the aperiodic CSI-RS corresponds to a CSI-RS resource associated with the aperiodic CSI report indicated based on the information field in the DCI.

13. The UE of claim 11, wherein the aperiodic CSI-RS is received in a second transmission time interval (TTI) after the offset for the aperiodic CSI-RS from a first TTI in which the DCI is received.

14. The UE of claim 11, wherein the configuration includes information for a CSI-RS resource set and a CSI-interference measurement (CSI-IM) resource set.

15. The UE of claim 11, wherein, in case that all bits of the information field are equal to 0, the information field indicates that the aperiodic CSI report is not triggered.

16. A base station in a communication system, the base station comprising:
a transceiver; and
a controller configured to:
transmit, to a user equipment (UE), one or more configurations via higher layer signaling, wherein a configuration is associated with an aperiodic channel state information (CSI) report and includes information for a CSI-reference signal (RS);
transmit, to the UE, downlink control information (DCI) including information field for triggering the aperiodic CSI report, wherein the information field is defined as one of a first interpretation and a second interpretation based on a number of the one or more configurations and a size of the information field, where:
the first interpretation is that the information field directly indicates the configuration from the one or more configurations transmitted via the higher layer signaling, and
the second interpretation is that the information field indicates the configuration from at least one configuration selected via a medium access control (MAC) control element (CE) among the one or more configurations transmitted via the higher layer signaling,
transmit, to the UE, an aperiodic CSI-RS based on an offset for the aperiodic CSI-RS; and
receive, from the UE, the aperiodic CSI report including CSI generated based on the aperiodic CSI-RS.

17. The base station of claim 16, wherein the offset for the aperiodic CSI-RS corresponds to a CSI-RS resource associated with the aperiodic CSI report indicated based on the information field in the DCI.

18. The base station of claim 16, wherein the aperiodic CSI-RS is transmitted in a second transmission time interval (TTI) after the offset for the aperiodic CSI-RS from a first TTI in which the DCI is transmitted.

19. The base station of claim 16, wherein the configuration includes information for a CSI-RS resource set and a CSI-interference measurement (CSI-IM) resource set.

20. The base station of claim 16, wherein, in case that all bits of the information field are equal to 0, the information field indicates that the aperiodic CSI report is not triggered.

* * * * *